United States Patent [19]

Castleman et al.

[11] 4,122,518

[45] Oct. 24, 1978

[54] AUTOMATED CLINICAL SYSTEM FOR CHROMOSOME ANALYSIS

[75] Inventors: Kenneth R. Castleman, Glendale; Howard J. Frieden, Pasadena; Elbert T. Johnson, La Crescenta; Paul A. Rennie, Pasadena; Raymond J. Wall, Glendale, all of Calif.

[73] Assignee: The United States of America as represented by the Administrator of the National Aeronautics & Space Administration, Washington, D.C.

[21] Appl. No.: 687,251

[22] Filed: May 17, 1976

[51] Int. Cl.[2] .............................................. G06F 15/42
[52] U.S. Cl. .................................. 364/300; 128/2 R; 364/120; 364/415; 364/900
[58] Field of Search .................. 444/1; 128/1 R, 2 R; 356/39; 235/151.3, 151; 364/200, 300, 900, 413, 415–417, 555, 496, 497, 120

[56] References Cited

U.S. PATENT DOCUMENTS 3,833,796 9/1974 Fetner et al. .............................. 444/1

OTHER PUBLICATIONS

Golab, T.J.; MACDAC - An Inexpensive and Complete Biomedical Input and Output Display System; Proc. 23rd ACEMB; Nov. 1970.

Patrick et al.; Computer Controlled Picture Scanning with Application to Labeled Biological Cells, Comput. Biol. Med. 1972, vol. 2, No. 1, pp. 5–14.

Primary Examiner—Charles E. Atkinson
Assistant Examiner—Errol A. Krass
Attorney, Agent, or Firm—Monte F. Mott; John R. Manning; Paul F. McCaul

[57] ABSTRACT

An automatic chromosome analysis system is provided wherein a suitably prepared slide with chromosome spreads thereon is placed on the stage of an automated microscope. The automated microscope stage is computer operated to move the slide to enable detection of chromosome spreads on the slide. The X and Y location of each chromosome spread that is detected is stored. At the conclusion of this searching operation, the computer directs the microscope to again sequence through the chromosome spread locations in response to the stored X and Y locations. At this time an operator can view these spreads to determine which ones are worthwhile and which ones are not. He is provided with an accept-reject switch. The microscope stage thereafter again sequences through only the accepted chromosome spreads, and this time a digital photograph of each of the chromosome spreads is made and entered into the computer storage. The computer thereafter measures the chromosomes in a spread, classifies them by group or by type and also prepares a digital karyotype image. This image is converted to analog form, displayed and printed out and constitutes a primary output of the system. Chromosome measurement data is filed in an interactive data base for subsequent statistical analysis. The computer system can also prepare a patient report summarizing the result of the analysis and listing suspected abnormalities.

15 Claims, 4 Drawing Figures

AUTOMATED CLINICAL SYSTEM FOR CHROMOSOME ANALYSIS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to automated medical analysis equipment and more particularly to improvements therein.

Since the introduction of a method allowing microscopic examination of individual human chromosomes, the karyotype has emerged as a tool of increasing diagnostic value. Under microscopic examination, the chromosomes, from a somatic cell in the metaphase stage of cell division, appear in scattered disarray. The karyotype is a systematic grouping of metaphase chromosomes from a single cell. This grouping was conceived to assist the geneticist in the identification of individual chromosomes. In normal humans, the 46 chromosomes can be reliably ordered into 24 types (seven groups). The diagnostic value of the karyotype is predicated upon the existence of a consistent pattern in normal patients and the correlation of certain chromosomal aberrations with specific clinical observations. There are two types of chromosomal irregularities: numerical and structural. Numerical aberrations exist when the number of chromosomes in one or more groups differs from the normal case. Structural aberrations manifest themselves in many forms, some presumably unobserved as yet. Those which presently merit nomenclature, amongst others, include variations in arm length and centromere position.

At present, manual karyotyping is so tedious and expensive that its general application is usually limited to those situations involving a suspected abnormality. In these circumstances, the clinical evidence is often so overpowering that the karyotype serves primarily as a corroborative tool. In a addition, manual karyotyping offers little prospect of quantitative data. It is desirable to extend karyotype analysis to the clinically asymptomatic situation. For example, screening all newborns by karyotype may detect certain inherited disorders long before clinical symptoms appear. As the potency and reliability of the karyotype improves, fetal karyotyping through amniocentesis may become a routine part of prenatal care. Screening studies on large populations offer the potential of uncovering the effects of industrial and environmental poisons, aging, and long term low dosage ionizing radiations. These factors may manifest themselves in subtle structural aberrations requiring detailed analysis of the chromosome morphology. The ability to process cells rapidly and inexpensively would also aid in the detection of mosaicism, in which two or more cytogenetically distinct lines of cells exist in the individual.

There are certain functional requirements for an automated chromosome analysis system which should be met before widespread acceptance thereof can be anticipated. One of these is that the system should be compatible with current practice producing results compatible with those obtained with the present manual system of analysis. Further, the system should provide significant time savings in processing cytogenetic specimens without sacrificing accuracy. Its cost should not be prohibitive and it should be accurate.

OBJECTS AND SUMMARY OF THE INVENTION

An object of this invention is to provide a system for automating chromosome karyotyping.

Another object of this invention is to provide an automated chromosome analysis system which is compatible with current practice.

Still another object of this present invention is one which operates rapidly without sacrificing accuracy, and which reduces the cost.

The foregoing and other objects of the invention are achieved in a system wherein a previously prepared slide, which has a number of chromosome spreads is mounted on the stage of a microscope. Under instructions of a computer, a search of the slide is undertaken to locate the various chromosome spreads on the slide. The spread locations are stored. At the end of the slide search, it is again initiated with the stage of the microscope being stopped at each chromosome spread location, to enable a human observer to inspect the chromosome spread and determine whether it is acceptable for the purpose of analysis or not. If it is not acceptable the observer pushes a button whereby its location is removed from the spread storage list and the microscope stage is moved to the next location. The microscope automatically focuses at each location.

After all of the chromosome spread locations have been inspected, the microscope is again actuated to move its stage so that each one of the accepted chromosome spreads are passed under the optics of the microscope for the purpose of enabling digital pictures of the various spreads to be generated and stored in memory. The computer then proceeds to locate and analyze the chromosomes in each of the chromosome spreads by measuring the chromosomes, classifying them by group or by type and preparing a digital karyotype image format. This image is then converted to pictorial form and displayed on an image display tube to enable any corrections, if needed. A joystick control is provided so that a cursor, which is produced on the display tube screen can have its position moved whereby the operator an point out to the computer objects in the image which he wants removed or chromosomes which need repositioning. Communication with the computer is made using a typewriter. The corrected karyotype image is then printed out. Provision is also made for a printout of the computer analysis of the optical image derived from a slide.

DESCRIPTION OF THE PREFERRED EMBODIMENTS

Figure 1:
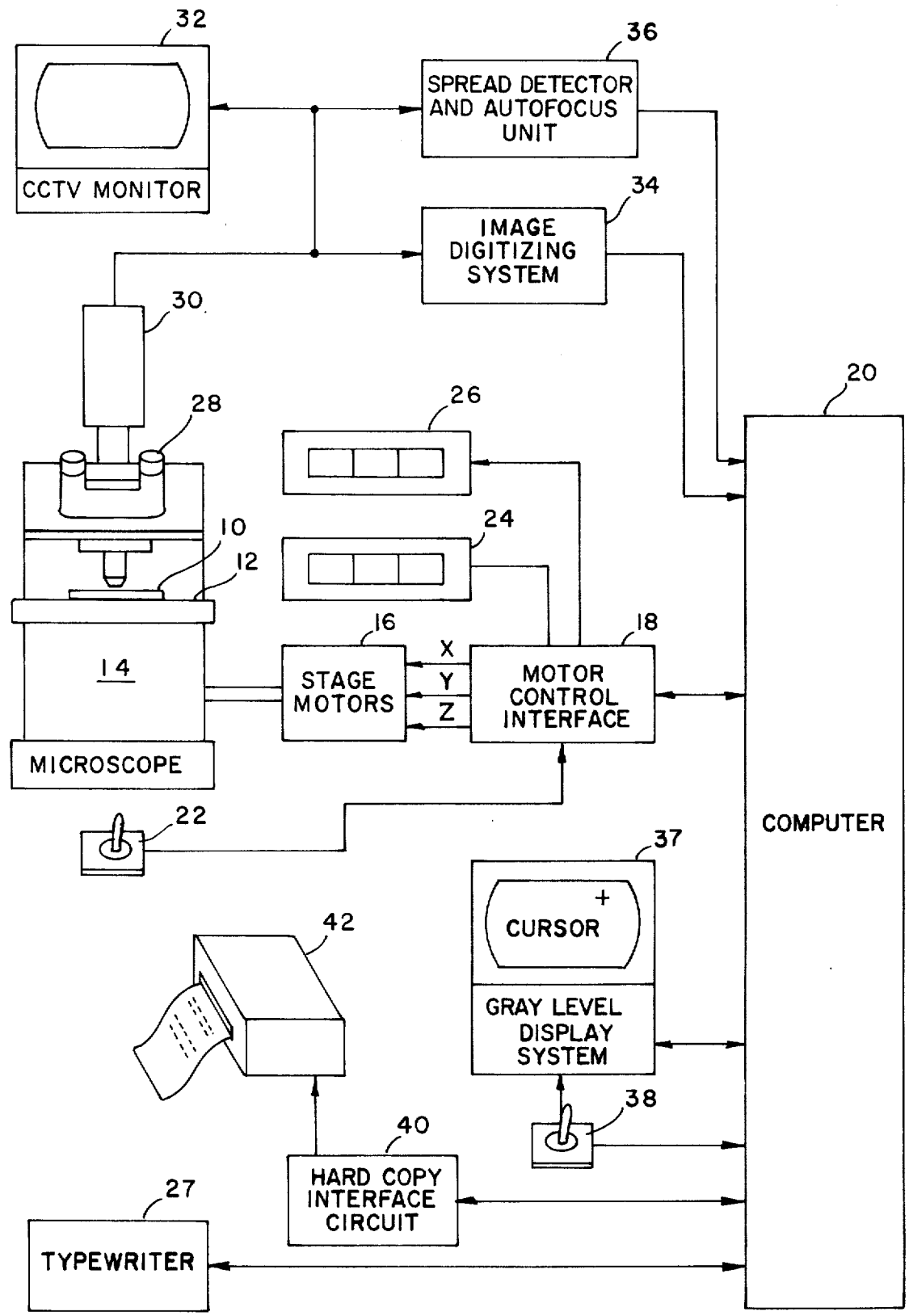
FIG. 1 is a schematic drawing of a chromosome analysis system, in accordance with this invention.

FIG. 1 is a block schematic diagram of the configuration of the system in accordance with this invention. The preparation of glass slides containing stained metaphase chromosome spreads suitable for use with this invention is known. The slides can be prepared by different techniques, such as the homogeneous Giemsa staining technique or by the Trypsin-Giemsa banding technique. Slides are produced with patient identification marks. A specimen slide 10 is placed on the stage 12 of a microscope 14. The stage 12 is motorized, that is it is capable of being driven in the X, Y and Z directions by three stage motors 16. The stage motors may either be controlled via a motor control interface circuit arrangement 18, from a computer 20, or by a stage joystick 22, when it is enabled to control stage position. A stage keyboard 24 enables an operator to select the mode of operation desired, that is, either computer mode or operator mode. Control of the selection is normally with the operator; however the computer has the option to override the operator mode and/or to inhibit subsequent selection of the operator mode. The mode of operation is displayed by a stage display 26. A typewriter 27 serves to enable entry of data, instructions or queries into the computer or to receive data from the computer.

The configuration of the optical imaging system of the microscope allows the specimen to be viewed simultaneously through a binocular eyepiece 28 and by a television camera 30. The output of the television camera is applied to a monitor 32, to an image digitizing system, 34 and also to circuitry designated as "Spread Detector and Auto Focus Unit" 36.

The Spread Detector and Auto Focus Unit 36 comprises circuitry which serves the function of detecting the presence of a chromosome spread and also for automatically focusing the television camera equipment for performing these functions is described in an article entitled "Metaphase Spread Detection and Focus Using Closed Circuit Television," by Johnson and Goforth, published in *The Journal of Histochemistry and Cytochemistry* in 1974, by the Histochemical Society, Inc. The Image Digitizing System 34 serves the purpose of digitizing the image being viewed by the television camera which is then entered into computer memory. The computer 20 processes each digital image, as will be described and arranges each image in a karyotype format. A gray level display system 37 displays a karyotype image the information for which is supplied by the computer. A joystick 38 associated with the gray level display system is used for positioning a cursor at a location on the face of the display system for the purpose of pointing out certain locations or objects in the display to the computer. The computer can then be instructed by the typewriter to correct the object designated by the cursor, i.e. correct or erase, etc.

The hard copy printout of a karyotype image is produced in response to the corrected karyotype information received from the computer. This is applied to the hard copy interface circuit 40. This constitutes a circuit for converting the corrected digital karyotype digital signals to analog form and the associated timing required for enabling the hard copy output device 42, wich is essentially a facsimile printer, to print out a karyotype picture from the analog signals.

Figure 2:
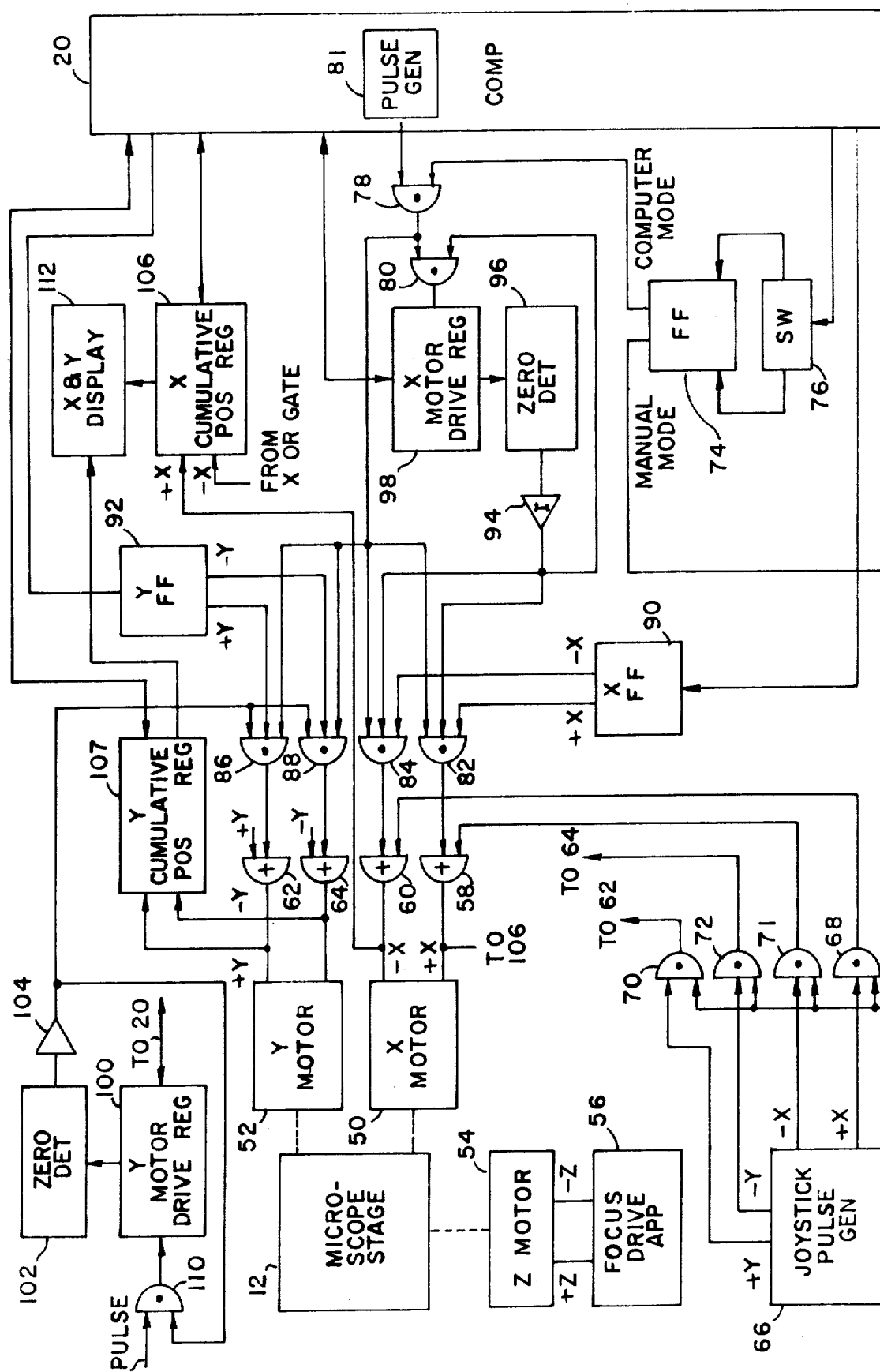
FIG. 2 is a schematic drawing of the apparatus used to drive the microscope stage.

FIG. 2 is a block schematic diagram illustrating the circuits used in controlling movements of the motorized stage of the microscope. The stage is driven in the X, Y and Z directions respectively by three motors 50, 52, and 54. The Z motor is driven in the +Z or −Z direction by signals from the computer in response to focus drive apparatus 56 in the Spread Detector and Autofocus Unit 36 (FIG. 1). Both X and Y motors are driven in the +X or −X directions and +Y or −Y directions in response to outputs froma +X Or gate 58, or a −X Or gate 60 and a +Y Or gate 62, or a −Y Or gate 64. The inputs to these Or gates, come either from the computer 20, through logic circuits to be described or from the joystick pulse generator 66, as determined by whether the operation is to be in the manual mode or the computer mode.

In the manual mode, the direction in which the joystick is moved determines whether pulses are provided on a +X, or a −X or a +Y or a −Y line. +X and −X pulses are applied, in response to joystick motion, from the joystick oscillator to And gates 68 and 71 respectively. These And gates are enabled in response to the output of a mode flip flop 74. When flip flop 74 is set by means of switch 76 to its manual mode, then And gates 68 through 72 are enabled. The other output of the flip flop indicates that the system is in its computer mode. Flip flop 74 can be set in its computer mode by means of a manual switch 76, or the computer can override the switch 76 if a situation arises where computer operation must be maintained.

When in the computer mode, the output of flip flop 74 enables an And gate 78 to transfer pulses received from a pulse generator 81, within the computer 20, to another And gate 80, and also to four And gates 82, 84, 86 and 88 whose outputs respectively provide pulse inputs to the Or gates 58, 60, 62 and 64.

And gates 82 and 84 are three input And gates. One of the inputs required to enable And gate 82 is the output of an X direction flip flop 90. The computer determines which direction the stage is to move, when the system is in the computer mode,and for one direction sets flip flop 90 with its +X output whereby And gate 82 receives one of its two required enabling inputs. The computer sets the flip flop with its −X output high for the opposite direction, whereby And gate 84 receives one of its two required enabling inputs. Similarly a Y direction flip flop 92 is provided which for one direction is set with its +Y output high thereby providing one of the two enabling inputs required by And gate 86, and for the opposite direction its −Y output is high whereby And gate 88 receives one of two required enabling inputs.

The second required enabling input to And gates 82 and 84 is provided by an inverter 94, which is driven by the output of a zero detector 96. The zero detector senses when an X motor drive register 98 has reached zero at which time it supplies an output to the inverter 94 whereby And gates 82 and 84 are disenabled.

A similar function is provided by a Y motor drive register 100. When it reaches zero, this is sensed by a zero detector 102. The zero detector output drives an inverter whereby And gates 86 and 88, which are otherwise enabled becomes disenabled.

The absolute X position of the microscope stage 12 is maintained by an X cumulative position register 106, which can provide this information to the computer. The X cumulative position register is a reversible counter which can receive +X and −X pulses which are applied to the X motor 50, whereby the X cumulative position register is driven to retain the exact X position of the microscope stage. The computer generates an X coordinate number representing the location to which it desires the microscope stage to move in the X direction. This number is subtracted from the number in the X cumulative position register. The difference represents the distance along the X axis, the microscope stage must move and also represents the number of pulses required to complete such a move. This number is entered into the X motor drive register 98 by the computer. The pulse generator 81 is then instructed to commence supplying pulses, and if And gate 78 is enabled, as it should be in the computer mode, then these pulses are applied through And gate 80 to the X motor drive register, causing it to count down towards zero. These pulses from the pulse generator 81 are also applied to all of the And gates 82, through 86.

Since the motor drive register is in its non-zero state, until it has counted down to zero, the one of the two X And gates 82, 84 which is enabled by the X direction flip flop 90 will be able to apply pulses to the X motor causing it to drive the microscope stage. When the X motor drive register reaches zero, this is detected, and the And gate which has been applying pulses to the X motor is disenabled.

The circuitry for driving the Y motor in the computer mode is the same as the circuitry used for driving the X motor in the computer mode. A Y cumulative position mode register 107 retains the absolute Y position of the microscope stage 12. It is driven in response to the same pulses which are applied to the $+Y$ and $-Y$ inputs to the Y motor 52. This cumulative position is supplied to the computer which determines the location along the Y axis to which it desires the microscope stage to move. This is subtracted from the Y cumulative position information and the difference is applied to the Y motor drive register by the computer. Pulses from the pulse generator 81 are applied to an And gate 110, which is enabled when the Y motor drive register is not in its zero position. These pulses start to drive the Y motor drive register and are also applied to the $+Y$ and $-Y$ And gates 62 and 64. The one of these two which is enabled is determined by the output of the Y flip flop 92.

Accordingly, the Y motor is driven until it reaches the position determined by the computer at which time the Y motor drive register will be at zero. This is detected by the zero detector with the consequent inverter output 104 disenabling the one of the two And gates which was enabled by the Y flip flop 92. Also, no further pulses are applied to the Y motor drive register.

Both the X and Y cumulative position register outputs are applied to an X and Y display 112 to be visually displayed. The display comprises apparatus which converts the digital information in the X and Y cumulative position registers into visual information.

Figure 3:
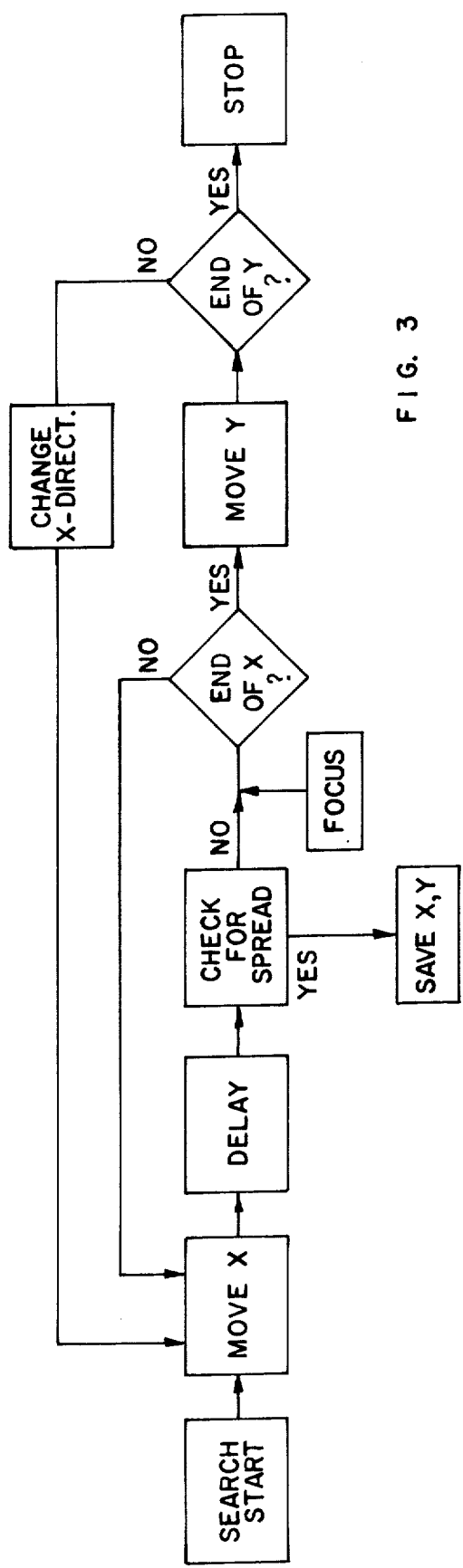
FIG. 3 is a flow chart illustrative of the searching and detecting operation, in accordance with this invention.

FIG. 3 is a flow chart exemplifying the search mode of operation. When the computer starts a search the circuitry shown in FIG. 2 is instructed to move a predetermined amount in the X direction. In the embodiment of the invention which was constructed, each step of motion in either X or Y direction is 10 microns, however each move instruction from the computer in either the X or the Y direction is a 160 micron move. The field of view is 200 microns square, and a cell containing chromosomes is on the order of 80 microns in diameter. Accordingly, the instruction by the computer to the circuitry shown in FIG. 2 is to move the stage 160 microns in the X direction and then to institute a delay in order to focus and to permit the spread detector to determine if a spread is present in the field of view. If there is a spread the X-Y coordinates of that location are stored by the computer.

Next, a test is made to see if a limit of X travel which is the end of the X line has been reached. If it has not been reached, then the computer issues an instruction to move the next 160 microns in the X direction. If the end of the X line has been reached then a Y move instruction is issued. At the time of issuing the Y move instruction a test is made to see whether or not a limit of Y travel has been reached. If it has been reached, then the search mode is terminated. If it has not been reached, then an instruction to change the X direction is issued. The computer then moves in the Y direction and changes the X direction of motion by applying a signal to drive the X flip flop 90. Thereafter the microscope stage moves until it reaches the end of the new X line where the foregoing routine recurs.

To clarify the foregoing, in the search mode the microscope stage is moved from the beginning to the end of one line. It is then instructed to move in the Y direction to the end of the adjacent line, and then instructed to move in the X direction back to the beginning of that adjacent line. At the beginning of that adjacent line the microscope stage is moved again in the Y direction one line and then starts again in the X direction towards the end of the line to which it has been moved. The microscope slide is scanned in this manner from top to bottom over the entire area to be searched.

Automatic focusing is carried out each time a chromosome spread is detected.

The television camera 30 scans a spread seen through the microscope and displays this on a monitor 32. The spread may also be viewed through the microscope viewing lens 28. Thus, during the editing mode, the operator can use either or both means for editing.

After the editing mode, the system goes into its scanning mode. It sequences the microscope stage to the locations of the chromosome spreads which have been accepted, automatically focuses the image, and digitizes the spread image into a scan data set (SDS). The digitization is accomplished by the television camera 30 and the image digitizing system 36. This equipment is commercially available and, by way of example, in an embodiment of the invention which was built, this equipment, called the model 108 Computer Eye, was furnished by a company called Spatial Data Systems, Inc. The camera scanned the image at the standard television rate (525 lines, 60 frames per second, interlace 2:1) and produced a video signal which was monitored on the television display. The brightness value in the scan picture is sampled at each point of a 512 by 480 grid and converted to a 7-bit binary number. Points anywhere in the picture may be selected on the program control, or the digitization can proceed through all points in sequence. A cursor is displayed on the monitor to show the points to be digitized.

As soon as the computer detects the presence of a spread image in one of the scan data sets provided by the image digitizing apparatus, it enters into its analysis mode. If the spread image is not to be karyotyped, the chromosomes are located, counted and displayed to the operator for verification. However, if the cell is to be karyotyped, a sequence of programs are executed to effect the karyotype analysis of the cell. These programs locate the chromosomes in a cell, orient them, extract measurements, classify the chromosomes and compose the digital karyotype. After the chromosomes have been isolated, they are displayed on the gray level display device 37 along with sequence numbers to allow the operator to correct cases of chromosome touching and fragmentation. The karyotype is also displayed to allow the operator to verify correct classification. After the karyotype has been approved by the operator, it is formatted for output, combined with the spread image and copied into one of the output data sets. The analysis phase processes cell images one at a time from a raw spread image to digital karyotype.

Figure 4:
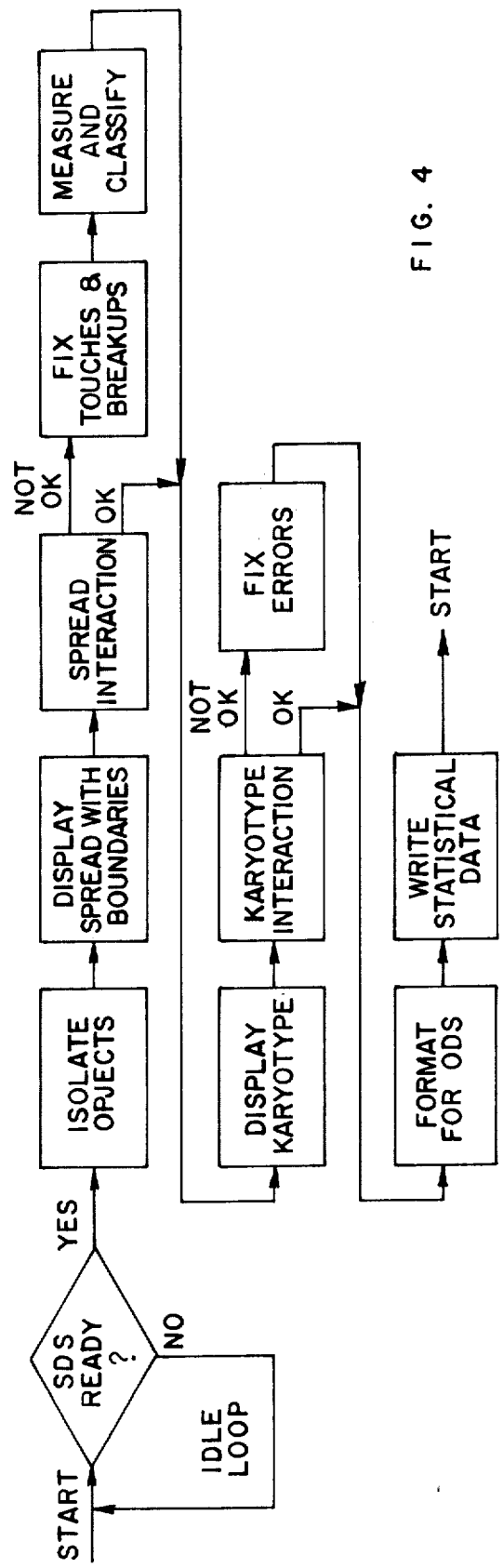
FIG. 4 is a flow chart illustrating the analysis operation in accordance with this invention.

FIG. 4 represents a flow chart illustrating the steps in the analysis phase of operation which have just been described. SDS stands for scan data set. Each chromosome is tagged with a number. Where operator intervention is required, in the case of the spread interaction or karyotype interaction, where break ups are to be fixed or chromosomes are touching, or other problems. The operator moves the interactive joystick to the location of a picture element which required correction. The operator then, by means of the typewriter 27, types an instruction to the computer in response to which the computer performs the required operation.

The gray level display system presents a picture of the chromosome spread which has been organized into the standard karyotype format for ease of diagnosis. Similar pairs of autosomes are collected and numbered with homologous pairs being numbered from 1 - 22 and similar pairs being collected into groups lettered A through G based on similar morphology.

The gray level display device is a 1029 line television monitor driven by a scan converter called a Hughes 639 scan converter. This is provided by the Hughes Aircraft Co. with instructions for its use and its operation.

Hard copy printout is achieved by converting the digital elements into analog signals by the circuits 40, which are applied to the hard copy output device. This comprises essentially a facsimile recorder.

There has accordingly been shown and described above, a novel and useful system for scanning chromosome spreads detecting those spreads; editing the detected spreads. Thereafter digitizing the spread images, analyzing, classifying and placing a spread in a karyotype format. This format is displayed on a gray scale display for final correction. Then a hard copy printout of the corrected karyotype image is provided.

The Appendix that follows provides a specific description of the computer programs as well as a copy of the program, in the FORTRAN language, used on a DEC PDP-11 computer for performing the operations described. The computer is made by Digital Equipment Corporation, One Iran Way, Marlborough, Mass. This is to be considered as exemplary and not as limiting. The program can be translated for use on other types of general purpose computers, made by other manufacturers by those skilled in the art.

The chromosome indentification technique, that is a general description of a method of chromosome identification which was implemented by the programming is described in a volume entitled *Chromosome Identification* edited by Torbjorn, Casperson and Lore Zech, which is a publication of Proceedings of the Twenty-Third a Noble Symposia published by the Academic Press in 1973. The chromosome analysis procedure which was implemented by the programming is generally described in *Perspectives in Genetics,* edited by S. W. Wright et al., and published in 1972, by Charles C. Thomas.

APPENDIX

The computer has a core memory and the software fits into 64K bytes of core memory. It also has three disk drives each of which has two 2.5 million byte disk cartridges. The core memory is partitioned so that it can simultaneously perform three tasks; slide search, chromosome spread analysis on a recorded digital picture of a chromosome spread; and pictorial output generation of an analyzed chromosome spread. All software runs under a disk operating system monitor supplied by the manufacturer, as well as maintenance and interactive statistical analysis. Automatic keryotyping runs under a specially written supervisor (CALMS).

CALMS

Purpose: Clinical ALMS supervisor - Controls slide search, scanning, analysis and hardcopy output of karyotypes or counts.

The CALMS supervisor controls the three "partitions," search, analysis, and hardcopy.

The supervisor occupies core from 30000 to 37777 and includes the hardcopy driver. The search partition is permanently resident at locations 40000 to 46777. System subroutines are permanently resident at locations 47000 to 57777.

Scan and analysis consist of 20 phases that residue on disk in core-image format. One phase at a time is loaded into locations 60000 to 156777 and called by the supervisor. (Locations 157000 to 157775 may be used for COMMON storage.)

Each analysis phase has a unique identifying number, from 1-20. Scan is phase 1, binary is phase 2, etc. The data set CALMS.OVR is used to store the phases. Each phase required 63 blocks. Program OVB is used to store a phase in CALMS.OVR after it has been linked with a bottom switch of 60000.

The following batch stream builds scan (phase 1):
$JOB [2,2]
$R LINK
DK5:PHASE/CO,LP:/SH<CALMS,STB,-
SCAN,EXIT,FTNLIB/B:60000/E
$R OVB
*1
$FI Similar batch streams build the other phases.

An Analysis phase is loaded into core and then called as if it were a subroutine. The disk unit, file name and extension of the current scan data set are passed as parameters. The phase must return to the CALMS supervisor when it is finished. This can be done with a return statement in a subroutine or a call to the CALMS EXIT subroutine from a main program.

The following symbols are used to define the scan and hardcopy data sets.

NSDS = 3 # of scan data sets
NHDS = 2 # of hardcopy data sets
SDU = 5 scan disk unit (DK5:)
HDU = 3 hardcopy disk unit (DK3:)

The scan data sets are named S1,S2,S3. The hardcopy data sets are named H1,H2. They are stored under UIC [2,2]. Allocation of data sets is done by:

NFSDS: .WORD .-. # full scan data sets (F)
SDS: .BLKB NSDS if NFSDS contains F (F>0) the
  first F bytes contain the data set numbers (1=S1,
  2=S2, etc) ordered by time of scan.
HDS: .BLKB NHDS each byte gives the status of a
  particular data set:
  0 = available
  1 = in use by mask
  −1 = full (ready for hardcopy output)

When CALMS calls the MASK phase, it gives the current hardcopy data set as a parameter, instead of the current scan data set. When MASK returns, CALMS calls HCOPY, unless it is already operating. Whenever HCOPY finishes, it checks to see if another hardcopy data set is full, and if so, it starts to process it.

HCOPY and SEARCH are interrupt-driven and must not call any non-reentrant DOS routines, because the routine they call might be the one that was interrupted.

OPEN results in a call to the .INIT routine which is not re-entrant because it gets buffer space for a DDB. Therefore, HCOPY and SEARCH cannot call OPEN.

CALMS initially opens all the hardcopy data sets to find their start block numbers and saves them in the HSBN table.

The CALMS supervisor flow chart illustrates its operation. The 'idle loop' starts at S10 and the program will cycle until a spread can be scanned or analyzed, or a special request has been made (See Flow Chart 1).

After a spread is scanned, the program INT1 is called. If the operator only wants to do a count, the spread will not be placed in the analysis queue, and the counting and masking are done at this time.

If the spread is to be karyotyped, it will be added to the analysis queue, but if more spreads are to be scanned (and scan data sets are available), they will be scanned before analysis begins. When all spreads on a slide have been scanned, a new slide can be searched while spreads from the previous slide are karyotyped.

Flow Chart 2 details the flow of data through the various program and data sets during the karyotyping process.

The analysis loop begins at S75, and CALMS stays in this loop until the MASK phase is called (or a restart or abort is requested).

After MASK is called, CALMS starts the hard copy partition (unless it is already running), and returns to the "idle loop."

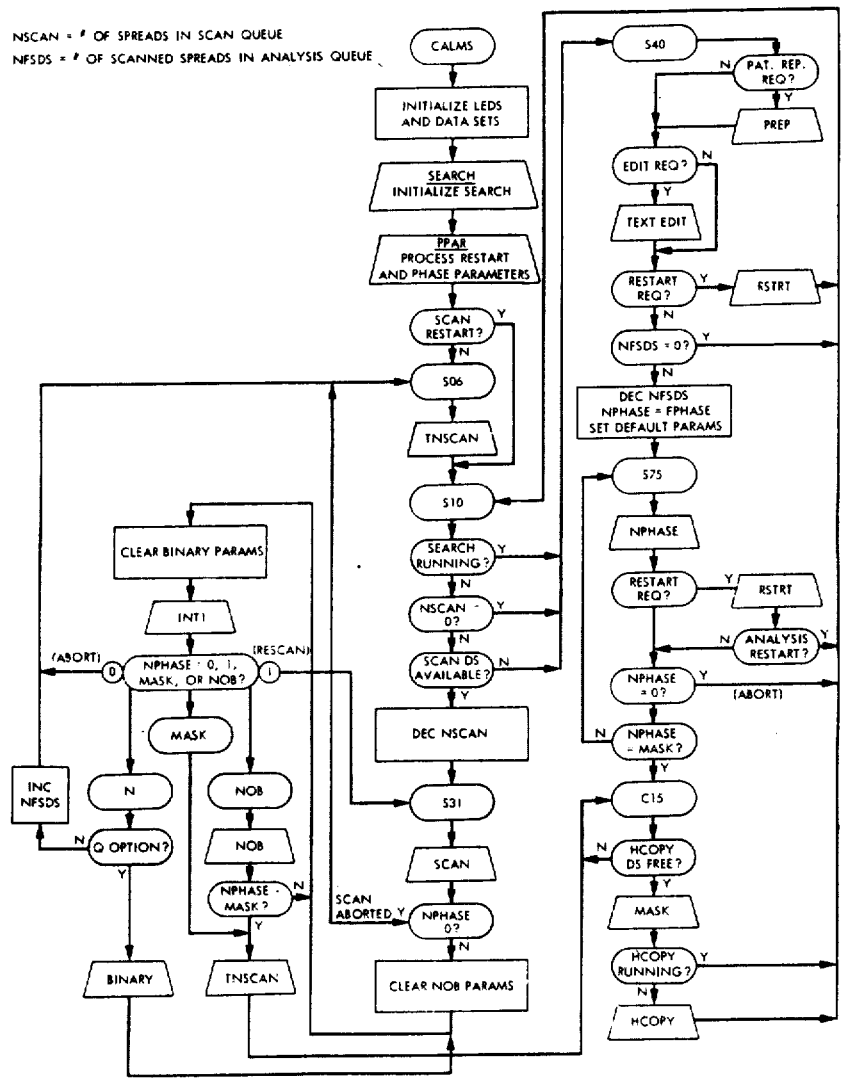

FLOW CHART 1

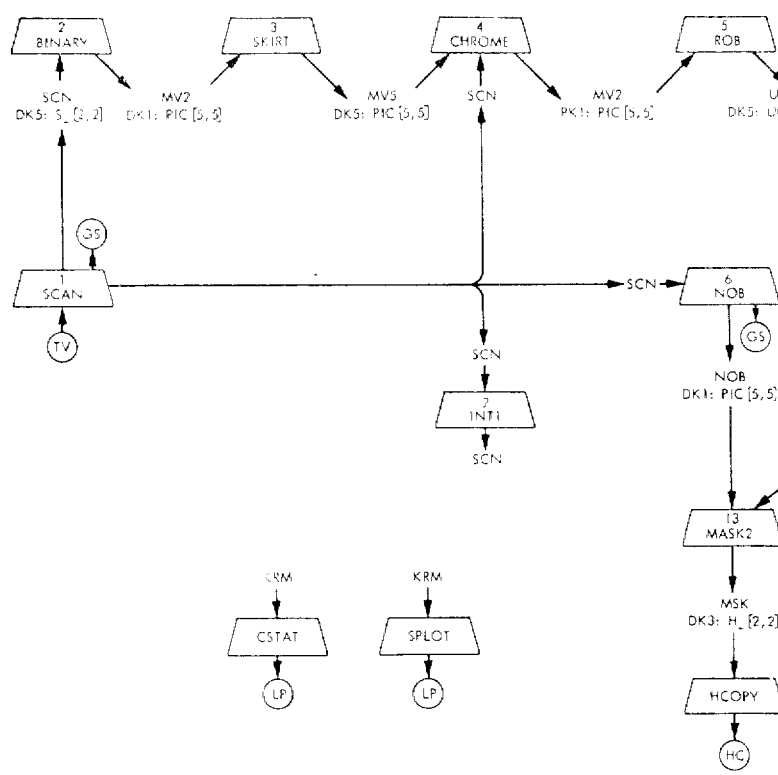
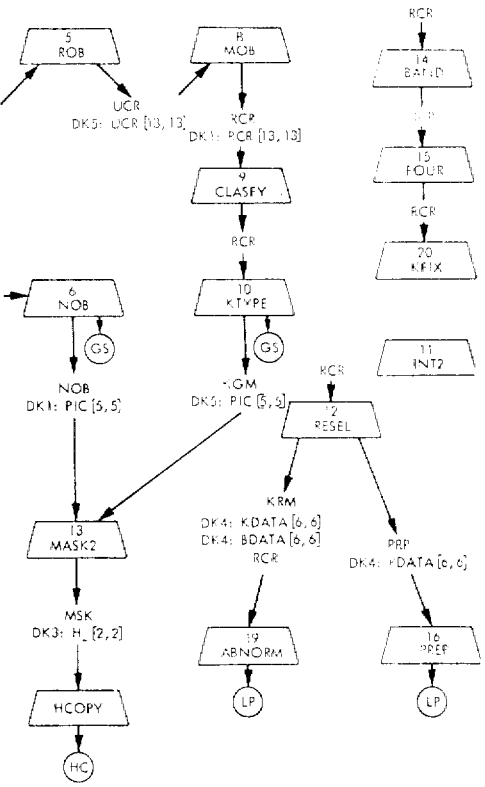

FLOW CHART 2   CALMS Data Flow

SEARCH

Purpose: Slide search edit, and focus. SEARCH partition of CALMS

SEARCH controls the microscope stage and handles the interrupts from the special-function keyboard and spread/focus data ready. Initially, CALMS calls SEARCH to set up some of the interrupts. Thereafter, SEARCH is interrupt-driven.

The operator presses SEARCH start on the special-function keyboard to start a search. Patient ID, sex, slide ID, and source are entered from the typewriter, before the SEARCH actually starts. The SEARCH pattern is a boustrophedon. Each step is 160 microns, and 60 horizontal steps are taken, before a vertical step is taken. Thus, the slide is searched in rows.

SEARCH is entered via the spread/focus data ready interrupt, after each step. If the "spread" bit is on, the X and Y values are saved in the spread queue, SPQ. SEARCH will perform an auto-focus whenever 15 steps have elapsed since the last auto-focus, and there is something to focus on.

The operator can manually halt the search with the SEARCH halt key. He can then move to another area of the slide and resume the search by pressing SEARCH resume. SEARCH disables the spread/focus data ready interrupt when it receives a SEARCH hlt interrupt, and re-enables it for SEARCH resume.

The SEARCH is terminated when 300 spreads have been found, or when the operator presses the edit-start key.

Normally, both SEARCH and edit are done at 63X, and there is only one edit. (There is also an option to search at 40X and do a "low-magnification" edit at 40X, followed by a "high magnification" edit at 100X).

Edit moves the stage to each spread location saved in the spread queue and initiates an auto-focus sequence. The operator can reject the spread before the auto-focus sequence finishes, and edit will immediately move to the next spread in the queue. If the auto-focus sequence finishes, edit turns on the operator action light and waits for the operator to press "accept," "reject," "next" or "last."

The operator normally centers the spreads he wishes to accept. When the accept key is pressed, edit saves the X and Y values in the same place in the queue and flags them by setting them negative. It also increments the rating for the spread by one each time the accept key is pressed. The ratings are stored in a byte table named SPR.

When the reject key is pressed, spread rating is zeroed and the X and Y values are made positive. The stage is then moved to the next spread.

The next key causes edit to move to the next spread without altering the accept-reject state.

The last key causes edit to move to the previous spread.

The edit finishes when the end of the queue is reached, or when the operator presses edit-end. The queue is then sorted according to rating. The highest rated spread is moved to the start of the queue, and the stage is moved to this spread in preparation for the first scan. At this point, the queue and other critical information is saved, by calling WPARAM for phase one. This allows a scan restart at a later time.

GNSTS is the entry point for the "get next spread to scan" subroutine. It initiates a motor move and auto-focus on the next spread in the scan queue. CSPQ contains the current location. It also enables a spiral search, if search start is pressed. The spiral search is useful in locating a spread close to known coordinates. It takes steps of 50 microns in a spiral pattern and focuses when there is something to focus on. The operator can halt it or resume it with the search halt and resume keys.

The focus routine can be entered via the focus key interrupt, or it can be called as a subroutine via a simulated interrupt. It operates by initiating focus motor moves and executing an RTI instruction, after setting up the spread/focus data ready interrupt. When the move is completed, it is reentered and compares the new focus value with the old one to see what the next move should be. Each lens has an initial and final step based on its magnification. The step size is decreased until the final step size is reached. The focus flow chart illustrates the algorithm.

(See Flow Chart 3).

onto a disk. The picture is scanned by columns, with alternating even and odd TV fields, to achieve the minimum scan time of 17 seconds. Each column is assembled in core and output as a line on disk and on the gray scale. The coils on the SDS monitor have been rotated so that the orientation is the same as on the gray scale monitor.

Sector histograms are accumulated as the picture is scanned, and sector thresholds are calculated at the end of each row of sectors. The thresholds are typed out if SW1 is up. The thresholds are written after the last picture line.

SCAN sets priority 6 during the pixel digitization loop to prevent interrupts from other devices which would cause it to lose "sync." Hardcopy interrupts (which are at priority 7) are the only ones allowed, due

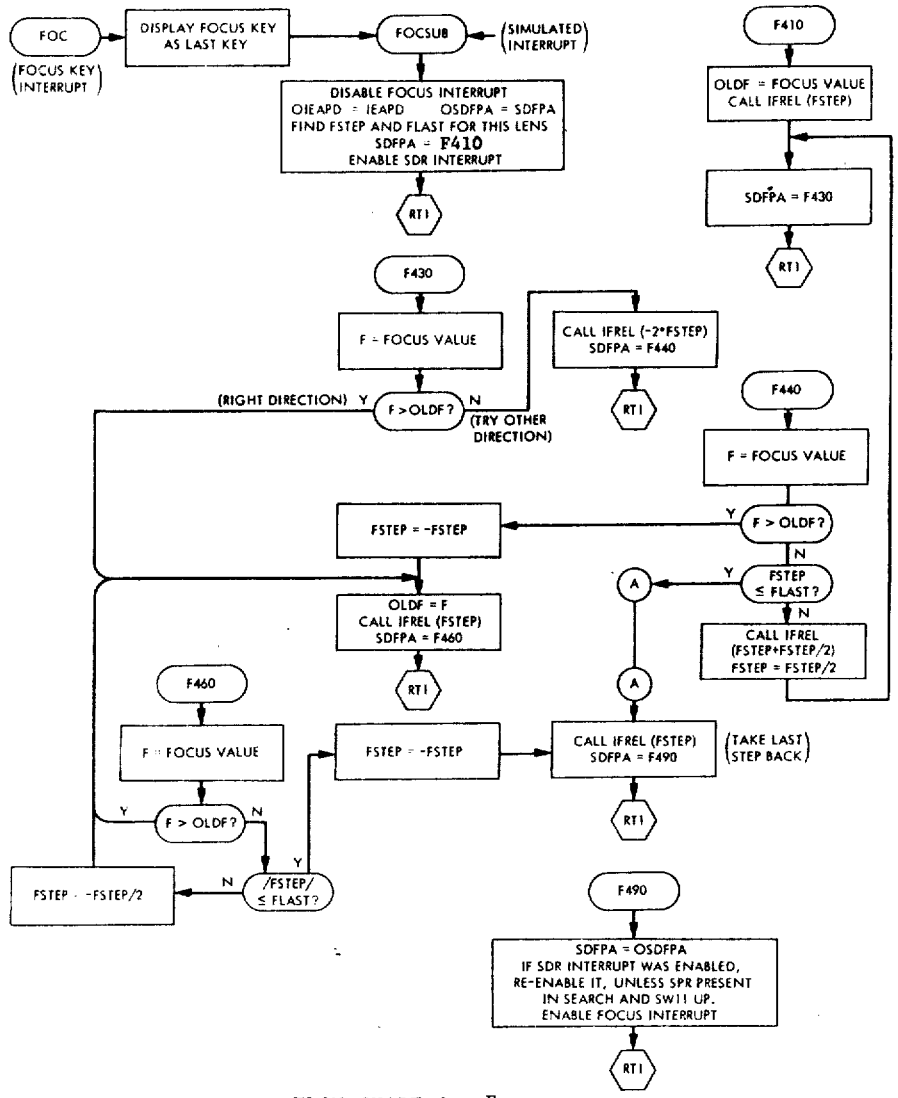

FLOW CHART 3    Focus

SCAN

Purpose: To scan a picture onto disk, display it on the gray scale, and calculate sector thresholds.

SCAN uses the SDS data camera to scan a picture to their critical nature. When the hardcopy is running, the SCAN takes several seconds longer.

SCAN converts pixel values of 0 to 1, and values of 127 to 126. This allows cut and join lines to be differentiated from normal data values.

SCAN stores the source code, patient ID and sex, slide ID, X and Y values, date and time of scan into the label of the output data set.

The operator may enter additional information as the SCAN ID.

BINARY

Purpose: To segment the chromosomes and generate an edge file containing the end point coordinates for each segmented chromosome.

BINARY will read in a scanned spread and assemble a reduced core image of binary sample points. Each sample point is obtained by averaging a 2×2 pixel area. If this average is above the sector threshold, then the sample point is recorded as a 1-bit. Otherwise, a zero bit is recorded. Thus a digitized spread of 500×480 pixels is reduced to a 250×240 grid of sample points. The resulting binary image is surrounded with zero bits to provide a physical boundary to keep the perimeter walker used in the segmentation algorithm from wandering off the edge of the picture. The binary reduction is accomplished through multiple calls to the subroutines QTHR or STHR.

After the binary image has been completely assembled in core, it is scanned line-by-line for chromosomes (1-bits). Each chromosome is "segmented" by recording its starting and ending coordinates on each scan line. Provision also exists for multiple segments to occur on any given line. (See Flow Chart 5)

The segmentation algorithm is implemented in the subroutine SEGMENT, which scans the binary image line-by-line for chromosomes. The search is performed by ROACH, which scans each line from left to right, stopping only when it encounters a chromosome. The starting bit location of any chromosome found is recorded and control is transferred to the subroutine TURTLE. TURTLE will walk counterclockwise around the perimeter of the chromosome, recording the segment end. point coordinates as it proceeds. Since the coordinates are recorded in the order they are encountered along the perimeter, they must be rearranged so that they correspond to starting and ending segment coordinates. This is accomplished by sorting the coordinates with the integer sort routine SORTIN.

After a chromosome has been completely segmented, it must be removed from the image in order to prevent ROACH from re-encountering it while scanning the next line. The subroutine ERASE will use the segment coordinates to erase (set all 1-bits to zero) the chromosome from the image.

At this point, chromosomes may be accepted or rejected on the basis of length, width, area and perimeter measurements. All chromosomes thus accepted are recorded in an edge file, (see Flow Chart 5), in a format suitable for input to the phase SKIRT.

PARAMETERS: All parameters are optional and may appear in any order except where specified.

- AREA followed by two integers representing the minimum and maximum allowable cross sectional areas.
- EP followed by two integers representing the minimum and maximum number of perimeter points allowable.
- LENGTH followed by two integers representing the minimum and maximum allowable length.
- SKIRT followed by an integer representing the width of the skirt (in pixels) to be added to all the chromosomes during the SKIRT phase.

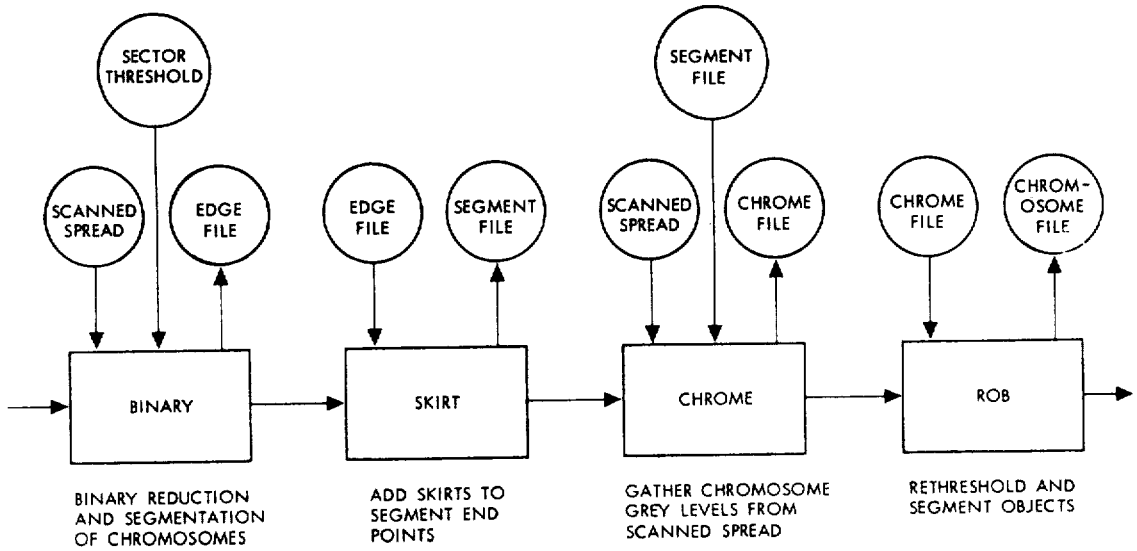

FLOW CHART 4   CALMS Segmentation Sequence

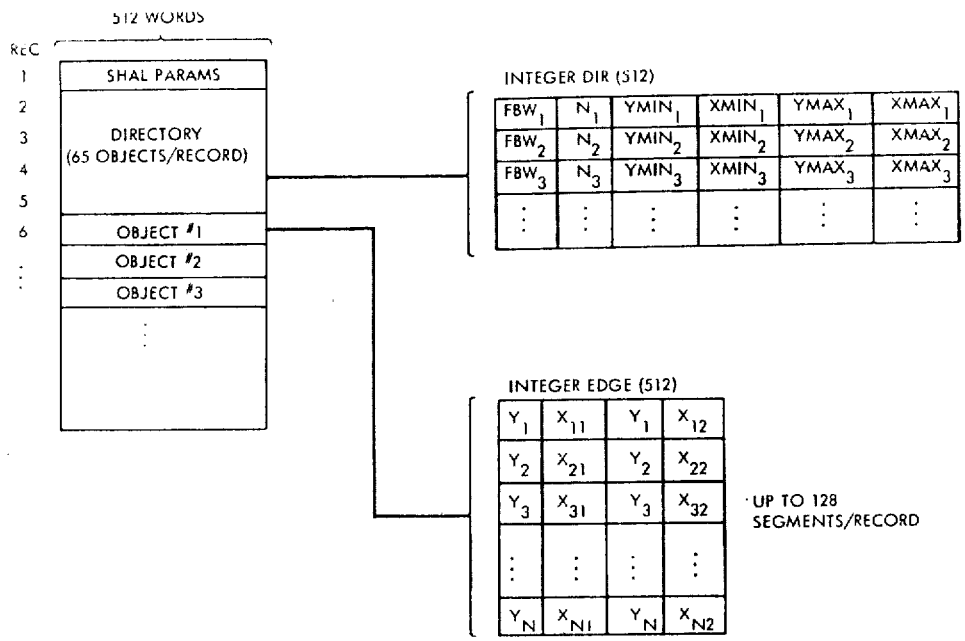

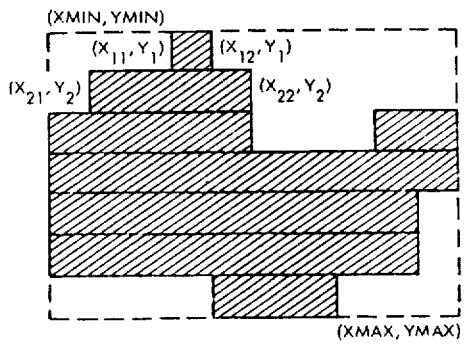

FBW = FIRST RECORD FOR OBJECT
N = NUMBER OF END POINTS

FLOW CHART 5    Edge File Format

SKIRT

Purpose: To increase the cross sectional area of each segmented chromosome by recomputing the segment end points and storing the results in a segment file suitable for input to the CHROME phase.

SKIRT will increase the area of each chromosome by extending its boundary outward a uniform distance in all directions. (Flow Chart 6.) Each chromosome is thus skirted with marginal elements to prevent loss of data when the boundaries are recomputed during the rethresholding step (ROB phase). SKIRT requires an edge file as input and generates a segment file. (See Flow Chart 7).

The width of the skirt is controlled by the parameter B (number of boundary samples), which is introduced in the BINARY phase. The chromosomes are enlarged by recomputing the segment end points, adding new segments where necessary and merging segments that have grown together. The segment end points are stored in the segment file as triplets (line coordinate and starting and ending sample coordinates).

The background gray levels and thresholds for each chromosome are computed by estimating its center of mass and interpolating over the values for the four nearest sectors.

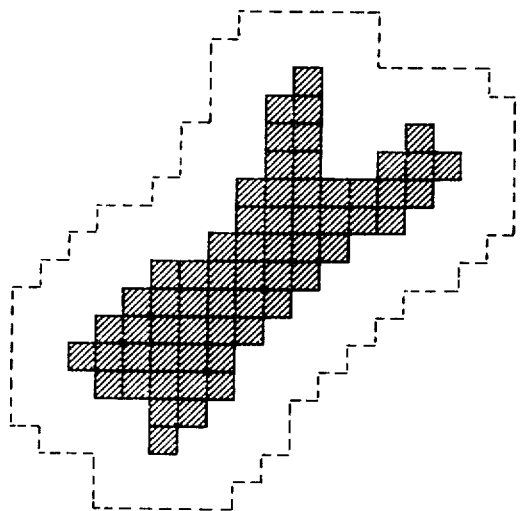
FLOW CHART 6    Segmented Chromosome Surrounded by Skirt
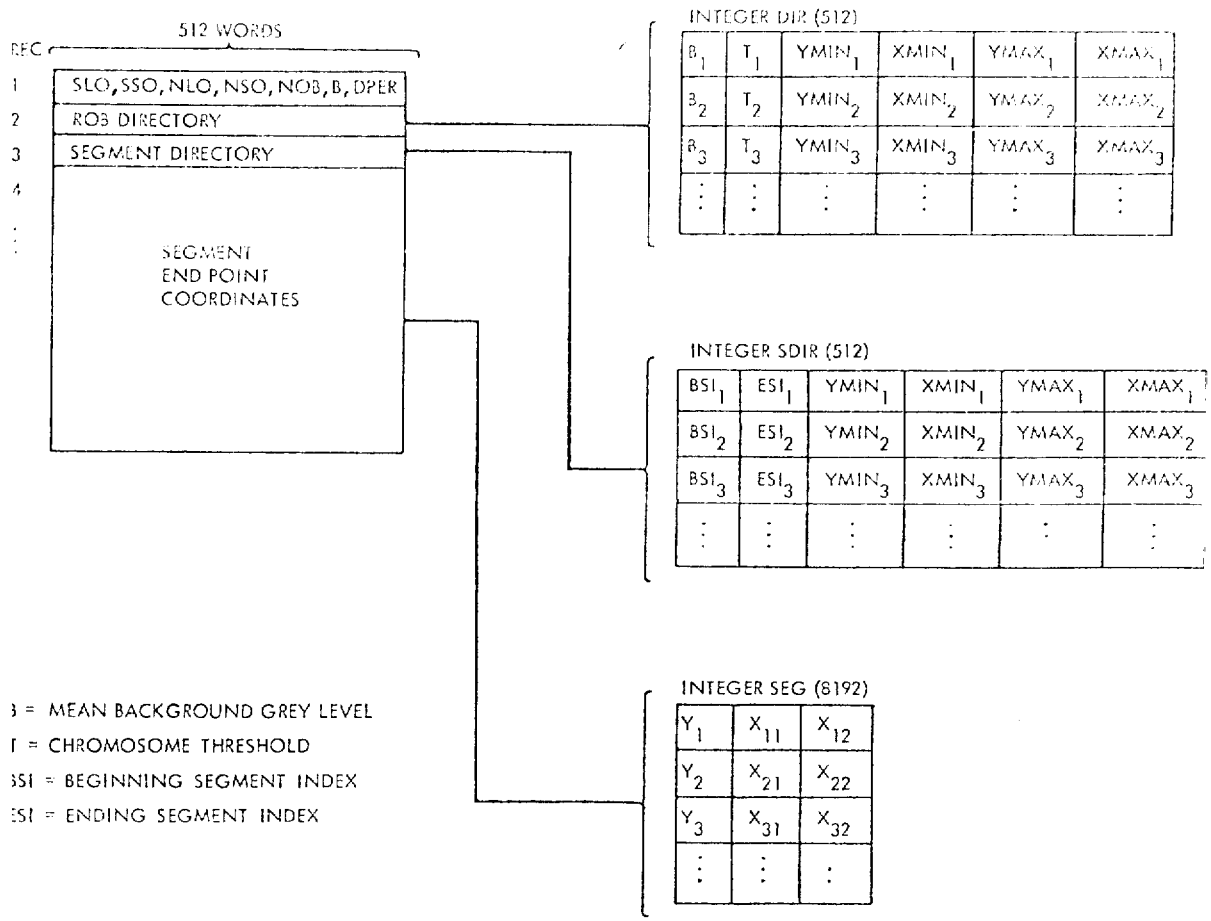
B = MEAN BACKGROUND GREY LEVEL
T = CHROMOSOME THRESHOLD
BSI = BEGINNING SEGMENT INDEX
ESI = ENDING SEGMENT INDEX
FLOW CHART 7    Segment File Format

CHROME

Purpose: To gather the gray values of the segmented chromosome from the scanned spread and to store them in a chrome file.

CHROME requires as input a scanned spread and its corresponding segment file. Using the segment end point coordinates, CHROME gathers the gray values for each chromosome and stores them in a chrome file in a format suitable for input to the ROB phase (Flow Chart 8).

In order to avoid re-reading scan lines, chromosomes which appear on the same line are processed concurrently. For this reason, the gray values are stored in an intermediate buffer (CBUF) until an entire chromosome has been processed or the buffer becomes full. When all the gray values for a chromosome have been gathered in CBUF, the gray values and their associated segment end point coordinates are assembled in one or more chromosome records (see Flow Chart 8) and written onto the chrome file. This task is performed by the subroutine WBUF. If the intermediate buffer becomes full, the chromosome occupying the most space in the buffer will be assembled and written out with a call to WBUF.

The intermediate buffer is partitioned into sections of a fixed size and formatted into a list structure to facilitate the allocation and release of buffer areas. The first word of each section contains the buffer index of the next section in the list (=0 for the last section in the list). The remaining words in each section is used to store gray level information.

Initially, all the sections are formatted into a single list representing all available sections. The next free section index (NFSI) points to the beginning of this list, and is updated whenever sections are removed from or added to the front of the list.

When sections are allocated to a chromosome, indexes pointing to the first and last sections of the chromosome list (FSI and LSI) are maintained in a chromosome directory.

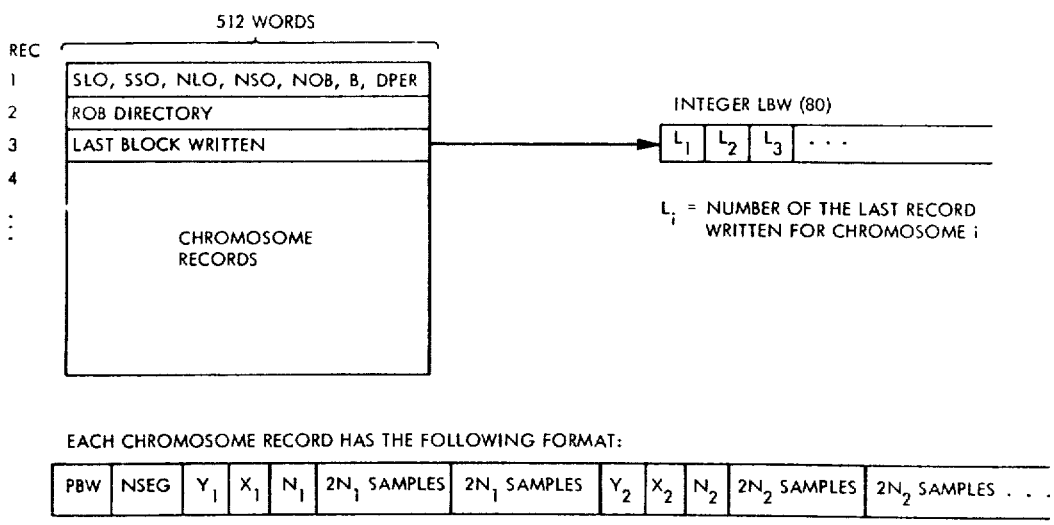

FLOW CHART 8  Chrome File Format

ROB

Purpose: To rethreshold and resegment the chromosomes and to store them in a chromosome file.

ROB requires as input a chrome file containing segment end point coordinates and gray level information for each chromosome. Each chromosome is reassembled in core and its histogram is generated. Based on its histogram, a new threshold is computed for the chromosome. Using this new threshold, the chromosomes are resegmented by applying algorithms very similar to those used in the BINARY phase, except that the algorithms are applied on the gray values themselves rather than on a binary reduction.

The segmentation process begins with a line by line scan for pixels above the computed threshold. This task is performed by the subroutine ISEG, which records the location of any objects that it finds. The task of tracking the perimeter of the object is performed by the subroutine SOT (Son of Turtle), which records the segment end point coordinates as it walks around the object on a counterclockwise direction. The coordinates are sorted to correspond to segment end points by the subroutine SORTIN.

The segments are examined for pixels lying within the original boundary for the chromosome established in the BINARY phase. If this search fails (i.e., if the object lies completely in the skirt), the object is rejected. This is necessary to prevent fragments of neighboring chromosomes from being included in the chromosome file.

The object is then assembled into one or more chromosome records and the space it occupied in core is zeroed out. The task of moving the object is performed by the subroutine REMOVE, which may optionally contrast stretch the gray values for maximal display. The object may be rejected at this point based on area measurements. The assembled chromosome records are written onto the chromosome file and the object entered into a chromosome directory.

The first record of the chromosome file contains the following:

| WORD | |
|---|---|
| 1 | Number of chromosomes (maximum of 60) |
| 2–241 | Chromosome directory containing the following four numbers for each chromosome: |
| | FBW = First chromosome record written |
| | YMIN = Minimum line coordinate |
| | XMIN = Minimum sample coordinate |
| | LBW = Last chromosome record written |
| 242–302 | Thresholds used for each chromosome |

The second record contains the following:

| WORD | |
|---|---|
| 1–60 | Line coordinate of an internal point for each chromosome |
| 61–120 | Sample coordinate of an internal point |
| 121–180 | Perimeter measure for each chromosome |

The remainder of the file is composed of one or more contiguous chromosomes records for each chromosome. Each such record will contain the following:

| WORD | |
|---|---|
| 1 | Number of segments in this records |
| 2 | Line coordinate for first segment |
| 3 | Sample coordinate for first segment |
| 4 | Number of samples (N) in segment |
| 5 to N+4 | N Gray levels for this segment |
| N+5 | Line coordinate for second segment |
| . | |
| . | |
| . | |

NOB

Purpose: To number the objects found by SEGMENT or ROB and display the picture on the gray scale.

NOB reads 122 words of parameters into NK, LT(60), ST(60), and FI. If FI is zero, NOB does not display the picture on the gray scale, and calls APHASE (MASKPH).

NK is the number of chromosomes and LT and ST are the lines and samples where the numbers are to be placed.

NOB reads one line at a time and adds any numbers required on that line. If LT is in order, NOB runs a little faster since it doesn't have to search the entire table for each line.

INT1

Purpose: To correct errors in object isolation.

INT1 is called immediately after each spread is scanned. The operator normally requests a quick count at this time. If the spread is only to be used for a count, the operator can correct for missing or extra objects and finish it.

If the spread is to be karyotyped, cuts, joins, and threshold changes are needed to correct for errors in object isolation. After the objects have been isolated, INT1 is called again to check for any remaining errors.

INT1 communicates with CALMS by calling APHASE. It writes parameters to BINARY to indicate a quick count, and to NOB to tell it to call MASK and not display the picture when finishing up a count.

MOB

Purpose: To orient and measure the chromosomes.

MOB orients each input object, accumulates IOD, area and length and calculates centromeric index by length, IOD and area. The unrotated chromosome file (UCR) is MOB's input (which is ROB's output) and the rotated chromosome file (RCR) is MOB's output. The format of RCR is as follows:

| Rec. 1: | Word (1) = # of input objects (integer) |
|---|---|
| | Word (2,3) = Spread IOD (real) |
| | Word (4,5) = Spread length (real) |
| | Word (6,7) = Spread area (real) |
| | Word (8) = Next available record in RCR (integer) |
| | Word (9) = # of chromosomes |
| | Words (16–465) = Chromosome directory |
| Rec. 2: | Words (16–465) = Chromosome directory |
| Rec. 3: | Reserved for CLASFY results |
| Rec 4–7: | Reserver for BANDS results |
| Rec 8 & following records: | Rotated chromosome images |

The chromosome directory (Rec 1 and Rec 2) has the following format:

| Integer | CHDIR (15, 60) |
|---|---|
| | CHDIR (1,1) - CHDIR (15,30) on Rec 1 |
| | CHDIR (1,31) - CHDIR (15,60) on Rec 2 |

Each entry is as follows:

| CHDIR | (1,I) | = 1st Rec. # of Ith rotated image, or zero if rejected |
|---|---|---|
| CHDIR | (2,I) | = # of lines in image |
| CHDIR | (3,I) | = # of samples in image |
| CHDIR | (4,I) | = Length of chromosome |
| CHDIR | (5,I) | = IOD/8 of chromosome |
| CHDIR | (6,I) | = Centromeric Index by Length |
| CHDIR | (7,I) | = Centromeric Index by Density |
| CHDIR | (8,I) | = Centromeric Index by Area |
| CHDIR | (9,I) | = Centromere line |
| CHDIR | (10,I) | = Perimeter of chromosome |
| CHDIR | (11,I) | = Area |
| CHDIR | (12,I) | = $P^2$/Area |
| CHDIR | (13,I) | = Centromere Location Method |
| CHDIR | (14,I) | = Available for expansion |
| CHDIR | (15,I) | = Available for expansion |

MOB will reject objects if they are too large or too small. The maximum allowable size before rotation is 88 × 88. The maximum allowable size after rotation is 88 × 48. The maximum area is 2000 points, and minimum area is 30 points. The minimum length and width are 5 lines and 5 samples. When an object is rejected, its area, length, and width are typed.

Originally, MOB had an option to use a skeleton method in locating centromeres. However, this method took 25 sec. longer with little or no improvement in centromere accuracy. This option was removed in order to save core space and allow a larger maximum chromosome size.

CLASFY

Purpose: To classify the rotated chromosomes into 10 groups (conventional classifier).

CLASFY reads in the chromosome directory produced by MOB and classifies each object. Once classification is complete, CLASFY writes the classification tables into RCR, record 3. The format is:

| Word (1) | = | # of samples in karyogram |
|---|---|---|
| Word (2) | = | No object # flag |
| Word (3–12) | = | Group ID's |
| Words (13–102) | = | Slot ID's |
| Words (103–108) | = | Initial slot for each row |
| Words (109–199) | = | Object found in each slot |
| Words (200–204) | = | Center line table for each row |
| Words (205–294) | = | Center sample for each slot |

This table is then used by KTYPE to build the output karyogram.

Classification is based on an internal table that gives the minimum and maximum allowable centromeric indexes for each length, for each of the ten groups of chromosomes. The table is called CT and is dimensioned (20, 51). The twenty entries for each length are minimum and maximum CI for A-1, A-2, A-3, B, C+X, D, E-16, E-17 and E-18, F and G+Y.

First, an initial classification is made. Then, moves are made from "heavy" groups to "light" groups. When there are several candidates for a move, the one with "maximum likelihood" is chosen.

After all possible moves have been made, the chromosomes within each group are ordered according to the slope table which describes the slope of a line that sweeps in from the right. Most groups are ordered by size. When the C+X group has 15 or 16 members, the third largest or third and fourth largest are placed in the X slots. When G+Y has five members, the chromosome with the maximum fit factor is placed in the Y slot.

The classification table can be supplied to CLASFY with the OS parameter, followed by the object numbers for the slots. In this case, CLASFY sets up the karyotype format but does not do any classifications.

KTYPE

Purpose: Builds KARYOGRAM and displays it on the gray scale.

KTYPE utilizes the chromosome directory, the classification tables and the rotated images on RCR to build the karyogram on KGM.

IBUF is a 20480 byte buffer that holds one record for each object on the current line. Since the record length is 1024 bytes, twenty objects can be accommodated.

KTYPE builds the karyogram one line at a time, inserting line segments from IBUF, object numbers, centromere marks and slot ID's at the appropriate time in the appropriate place.

INT2

Purpose: Provide operator interaction to fix karyotype errors.

INT2 is called after the chromosomes have been measured, classified, and displayed as a karyotype. The operator can correct rotation errors, centromere errors, and classification errors. The corrections are normally done in the above order, since a rotation error usually causes a centromere error and a centromere error usually causes a classification error.

INT2 uses WPARAM to write parameters to MOB and CLASFY and uses RPARAM to read them back to see what has previously occurred. If the operator corrects rotation and centromere errors and does not move any chromosomes around, INT2 will allow CLASFY to reclassify on the basis of the new measurements. After the operator starts making moves, INT2 tells CLASFY what the karyotype should look like and does not allow an automatic reclassification.

RESEL

Purpose: Save information on measured chromosomes.

RESEL uses the MOB output to rearrange the measurements in order of type and store them in KDATA (BDATA for banded spreads). It also writes the patient report line in PDATA.

| Format of KDATA: RECLEN = 1024 | | | |
|---|---|---|---|
| Line 1 Bytes | Directory Record 1 for Source 1 spreads | | |
| 1–2 | NEXT | 1*2 | Line # of next Dir Rec for Source 1, or 0 |
| 3–4 | NUSED | 1*2 | # of spreads in this Dir Rec max is 85 |
| 5–854 | PID (850) | BYTE | 10 byte patient ID for each spread, or 0 |
| 855–1024 | LINE (85) | 1*2 | Corresponding data line # for each spread |
| Line 2 | Directory Record 1 for Source 2 spreads | | |
| ⋮ | | | |
| Line 15 | Directory Record 1 for Source 15 spreads | | |

When "NUSED" becomes 85, next available line # will be inserted into NEXT. Then the line in NEXT will be the next directory record for this source.

Line 16–500 Data Records and Directory Records, if necessary

| Bytes | | | |
|---|---|---|---|
| 1–64 | | LABEL 1 | (First 64 bytes) source, patient, sex, slide, X,Y |
| 65–84 | | LABEL 2 | (First 20 bytes) scan time |
| 85–104 | | LABEL 3 | (First 20 bytes)scan ID |
| 105–124 | | LABEL 4 | (First 20 bytes) diagnosis |
| 125–126 | NC | I*2 | # of chromosomes in the karyotype |
| 127–128 | LSUM | I*2 | Length sum (not normalized for 46) |
| 129–132 | ISUM | REAL*4 | IOD sum (not normalized for 46) |
| 133–136 | ASUM | REAL*4 | Area sum (not normalized for 46) |
| 137–144 | UNUSED | | |
| 145–224 | ON (80) | BYTE | Object #'s for types 1–24, 25–30, 31–40, or 0 |
| 225–304 | ONL (80) | BYTE | # lines for each object |
| 305–384 | ONS (80) | BYTE | # samples |
| 385–464 | LEN (80) | BYTE | Length (adjusted for bend)-unnormalized) |
| 465–624 | IOD (80) | I*2 | IOD/8 - unnormalized |
| 625–784 | AREA (80) | I*2 | Area |
| 785–864 | CIL (80) | BYTE | CIL |
| 865–944 | CID (80) | BYTE | CID |
| 945–1024 | CIA (80) | BYTE | CIA |
| Records 2–4 for Banded Data | | | |
| 1–1632 | OCFOUR(51,8) | REAL*4 | C for types 1–24,25,26 |
| 1633–3060 | OPHI (51,7) | REAL*4 | PHI for types 1–24, 25, 26 |
| Negative Source = Banded spread and uses DK4:BDATA[6,6] | | | |

MASK 2

Purpose: To combine two pictures and add a border.

MASK2 combines the numbered spread and karyotype into a single picture formatted for the hardcopy. The output is written on disk, with an option to also write it on tape if switch 5 is up.

The picture on disk is written in hardcopy format, with four bits for each element, and the picture on tape is written with eight bits for each element. Gray scales, reference masks and annotation are added to the picture.

MASK2 is also used to combine the numbered spread and the raw spread for counts. It checks for the KG parameter followed by the disk unit and filename for the raw spread.

MASK2 calls subroutines MSUB, WEDGE, REF, and WLINE to do the bulk of the work in creating the output picture.

BAND

Purpose: To find the waveform and calculate Fourier coefficients for banded chromosomes.

The input to BAND is the rotated chromosome file, RCR. For each chromosome, BAND first decides if the chromosome is straight or bent.

For bent chromosomes, BAND curve fits a parabola to the boundary points and recalculates the chromosome length. The waveform is determined by sampling along the parabola, and using three points perpendicular to the slope of the parabola.

For straight chromosomes, the waveform is determined by sampling along each line, using a moving window of eight points. The maximum value found along the line is used.

A and B Fourier coefficients are then computed from the waveform values for eight harmonics. From these, the C (Amplitudes) and PHI (Phase Angle) are computed and saved in records 4–7 of the rotated chromosome file, RCR. Length and centromeric index are passed to FOUR as parameters.

BAND recognizes the following parameters:
WA: Store a representation of the waveform in place of the rotated chromosome images.
AX: Mark the axis for each chromosome
QB: Quick BAND — process only the C group.

FOUR

Purpose: To classify banded chromosomes using Fourier coefficients, length and centromeric index.

The inputs to FOUR are the classification table of means and variances, and the banded chromosome measurements. FOUR computes the likelihood that each chromosome belongs to each of the chromosome types, using 14 measurements — length, centromeric index by area, C(2) to C(8), and PHI (2) to PHI (6).

If a chromosome's length or centromeric index differs by more than 6 S.D. for a particular chromosome type, that type is ruled out for that chromosome. Similarly, if the C sum or PHI sum exceeds 7 S.D. or the total sum exceeds 8 S.D., that type is excluded for that chromosome.

The chromosomes are then classified in order of likelihood, subject to group membership rules. This procedure may leave some chromosomes unclassified, since certain types may have been excluded for certain chromosomes.

Using the unclassified chromosomes, the most likely classification is found, say chromosome $i$ belongs to group $j$. The chromosomes in group $j$ are then examined to see if one of them can be moved to another group that is not yet full. If so, the most likely move is made.

The classification results are written as parameters for CLASFY.

PREP

Purpose: To print the patient report

PREP reads the patient report records that were written on disk by RESEL, and prints them on the line printer. If the parameter PL is used, the records for differnet patients are separated by a double space. Otherwise, each patient's report is on a separate page.

ABNORM

Purpose: To print information on abnormal chromosomes ABNORM is called only when console switch 10 is down. It reads the rotated chromosome file, RCR, and examines the profile of each chromosome to determine centromere information. It then prints a message for each chromosome, regarding its normality.

KFIX

Purpose: Syntactical classification within B,D,F, and G groups.

KFIX is the final phase of the hybrid classifier for banded chromosomes, and operates as follows:

(1) Take the 4 chromosomes in the G group. Measure the position along the length of the chromosome of the brightest band. The 2 chromosomes with the bright band closest to the center correspond to the G-21 the other two are the G-22.

(2) Take the 6 chromosomes in the D group. Measure the ratio of average IOD in the upper half of the chromosome so that of the lower half of the chromosome. The two smallest values correspond to the D-13, the two largest values correspond to the D-15 and the remaining two are the B-14.

(3) Separate the F-19 and F-20 chromosome by IOD. The two chromosomes with the smallest integrated optical density are the F-19's.

(4) Take the B group. Measure the average IOD between the centromere position and a distance along the long arm equal to the short arm length or to the midpoint of the chromosome, whichever is shorter. The two chromosomes with the largest value correspond the B-4.

MVIO

Purpose: To read and write contiguous files with automatic double buffering, blocking, and random or sequential access to lines of data.

The calling sequences for the six entry points are as follows:

```
CALL OPEN (MVB,BUFSIZ(DBFLAG,MODE,LNAME)
CALL GET (MVB,LINE,INDEX[,NORA])
CALL PUT (MVB,LINE,INDEX)
CALL CLOSE (MVB)
CALL READ (MVB,LINE,INDEX,LOC)
CALL WRITE (MVB,LINE,LOC)
```

An OPEN call is required before any GET or PUT calls can be made to a dataset. The user must provide core space large enough to hold all the necessary control blocks and control information, as well as the data that is to be read or written. This allows MVIO to be re-entrant. In addition, no space is wasted on unused data sets, as would happen if MVIO contained storage for a fixed number of data sets.

The control information can be considered as a "mini-VICAR-block" or MVB. Each MVB is 56 bytes long and contains a tran block, link block, filename block and the information required by MVIO. (See Flow Chart 9)

The MVB is followed by one or two buffers to hold the data that is read or written. Each buffer is a multiple of the RK11 disk block size (512 bytes). An entire buffer is normally read from or written onto the disk with a single access. This greatly increases the effective transfer rate. When two buffers are provided, MVIO allows the user to overlap computation with the disk input/output.

GET and PUT are called to obtain the index relative to the start of the MVB for the desired record in the data set. Thus the data does not have to be moved from one buffer to another. On most "get" calls, the requested line will already be in one of the buffers and MVIO simply returns the index without any physical I/O required.

PUT is called to obtain the index of where to store the line that is to be written. MVIO initiates physical I/O when a buffer has been completely filled. A "close" call is required to write any data left in a buffer by earlier "put" calls.

MV10 — BLOCKING AND DOUBLE BUFFERING EXAMPLE

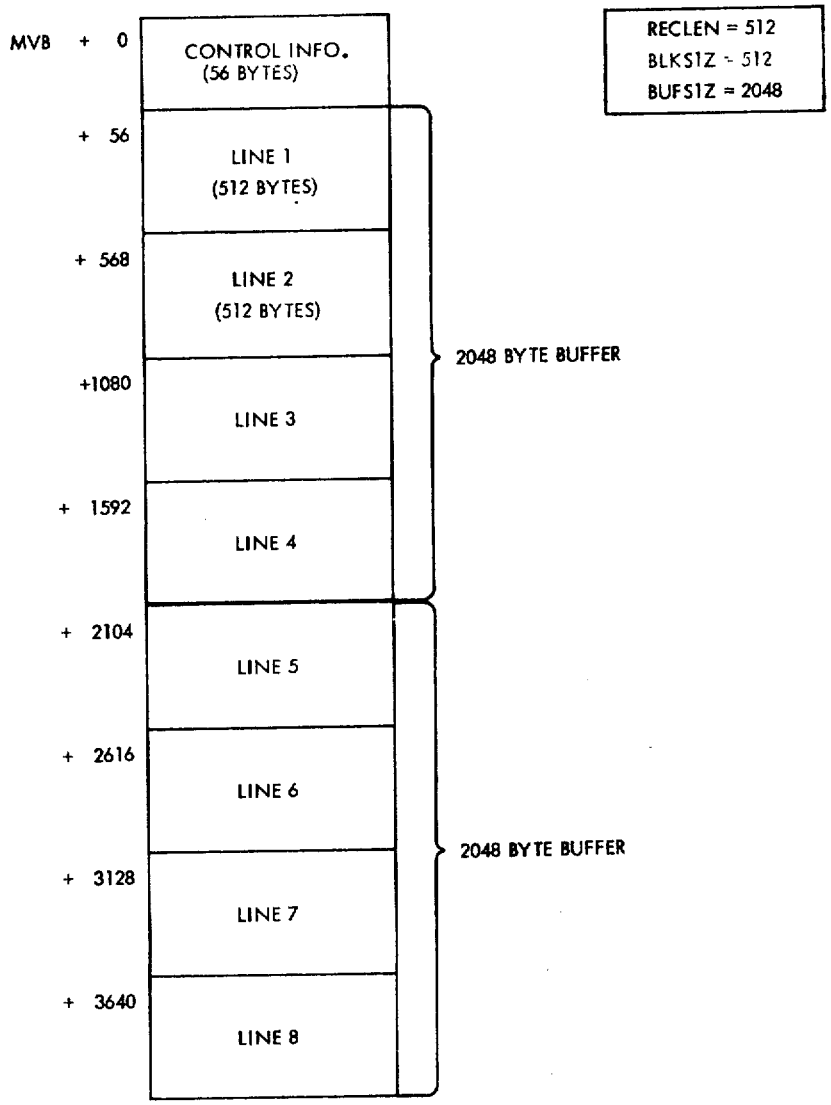

FLOW CHART 9    MV10 — Blocking and Double Buffering Example

A logical record (or line) can be smaller than, larger than, or the same size as the physical block size (512 bytes). As previously noted, each buffer is a multiple of 512 bytes in length, but the buffer must also be large enough to hold a complete logical record.

MVIO (See Flow Chart 9) is normally used in conjunction with the label subroutines GLABEL and PLABEL, which are described in more detail elsewhere. They set up some of the fields in the MVB when the picture data is preceded by a label.

The fields in the calling sequences are defined as follows:

MVB is the location of the MVB for the data set. The user must reserve enough core for his buffers immediately following the MVB.

BUFSIZ is the size of each buffer (multiple of 512 bytes).

DBFLAG is the flag for double buffering, 0 = no double buffering (one buffer), 1 = double buffer (two buffers).

MODE is defined as:

| | |
|---|---|
| 0 = Disk Input | 0, 1 and 2 are functionally equivalent |
| 1 = Disk Output | |
| 2 = Disk Update | |
| 4 = Tape Input | 4, and 5 are functionally equivalent |
| 5 = Tape Output | |

LNAME is a three character logical name for the data set that can be used to assign it to a file with the $AS command. (Subroutine AFILE can be used to make a default assignment).

LINE is the desired line number, positive for data lines, negative for label records, and zero for the "next" line.

INDEX is the offset in bytes from the start of the MVB to the requested line. In Fortran, when MVB is defined as a byte array, sample J of the requested line is at MVB(J+INDEX). In Marco, MVB+INDEX is the location of the first sample of the requested line.

INDEX is set to zero for an end-of-file read from tape.

NORA is an optional parameter to prevent read-ahead.

READ and WRITE can be used when RECLEN = BUFSIZ and single buffering is specified. A line is read into LOC, or written from LOC, without any overlap.

Updating is normally done with a GET and a PUT for the record to be updated. (The same index value will be returned on the GET and PUT.) This insures that other records in the block and other blocks in the buffer will not be changed.

The "get" can be omitted only if all records are "put" sequentially, starting with the first record of a block.

The MVB format is shown below. Word numbers are in decimal, starting at 1 and byte numbers are in octal, starting at 0. TB = tran block, LB = link block, and FB = filename block.

| WORD | BYTE | | CONTENTS |
|---|---|---|---|
| 1 | 0 | TB | Active Block # |
| 2 | 2 | +2 | Active Buffer Address |
| 3 | 4 | +4 | Word Count |
| 4 | 6 | +6 | Function/Status |
| 5 | 10 | +8 | Words Not Transferred |
| 6 | 12 | IBN | Inactive Block # |
| 7 | 14 | IBA | Inactive Buffer Address |
| 8 | 16 | −2 | Error Return |
| 9 | 20 | LB | Link Pointer |
| 10 | 22 | +2 | Logical Name |
| 11 | 24 | +4 | Unit #! Words To Follow |
| 12 | 26 | +6 | Device Name |
| 13 | 30 | CRC | Current Record # |
| 14 | 32 | −2 | Indicator ! Unused |
| 15 | 34 | FB | File Name (Word 1) |
| 16 | 36 | +2 | File Name (Word 2) |
| 17 | 40 | +4 | Extension |
| 18 | 42 | +6 | UIC |
| 19 | 44 | WNT | Words Not Transferred |
| 20 | 46 | SBN | Start Block # |
| 21 | 50 | NBF | # Blocks In The File |
| 22 | 52 | NLR | # Label Records |
| 23 | 54 | RECLEN | Record Length (Multiple or Divisor of BLKSIZ) |
| 24 | 56 | BLKSIZ | Block Size |
| 25 | 60 | BUFSIZ | Buffer Size (Multiple of BLKSIZ and RECLEN) |
| 26 | 62 | BPB | Blocks Per Buffer |
| 27 | 64 | DBF/MD | Mode ! Double Buffering Flag |
| 28 | 66 | WFLAG | Write Flag (Last Block # To Be Written + 1) |

LABEL

Callable Entry Point Names: GLABEL, PLABEL
Purpose: To obtain and store label information on disk data sets.

These subroutines are used in conjunction with MVIO, when processing labeled data sets. They obtain or store the label parameters, and also set up the BLKSIZ, RECLEN, NLR, and BPB fields in the MVB. GLABEL and PLABEL must be called after the OPEN call for the MVB.

CALL GLABEL (MVB, SPAR, INDEX) to get a label

CALL PLABEL (MVB,SPAR,LABEL) to put a label

MVB is the mini-VICAR block for the data set.
SPAR is a five word table of system parameters
SPAR (1) = NL, # Lines of picture data
SPAR (2) = BPL, Bytes per line
SPAR (3) = BPE, Bits per element
SPAR (4) = NLR, # of label records
SPAR (5) = BLKSIZ, Block size
GLABEL transfers the label information into SPAR.
PLABEL transfers the data in SPAR to the label.
Index is the offset from MVB to the first byte of the label, as returned by 'get.'
Label is the location of the label to be output.
Example:

| | |
|---|---|
| INTEGER SPAR (5) | |
| BYTE A (4200), B (4200) | |
| CALL OPEN (A,2048,1,0,'MV1') | Open A for input |
| CALL OPEN (B,2048,1,1,'MV2') | Open B for output |
| CALL GLABEL (A,SPAR,IA) | Get label from A |
| CALL PLABEL (B,SPAR,A(IA+1)) | Put label to B |

GLABEL can also be used with an unlabeled data set. It will return NL as the # blocks in the data set
BPL = 512
BPE = 8
NLR = 0

These routines are re-entrant, except when GLABEL is used with an unlabeled data set.

EXIT

Purpose: To replace the FORTRAN exit and error subroutines and save 1260 bytes of core.

EXIT can be used to save core after a FORTRAN program has been checked out. ERRA gives a single error message (A367), instead of the individual messages normally given by the FORTRAN error routine ERRA.

When EXIT is called, it will either return to DOS via a .EXIT or return to CALMS via an RTS R5. It makes this decision by checking the value of R5 when EXIT was called. When DOS loads a program, it clears R5, but when CALMS loads a program, R5 is equal to a location within CALMS.

Therefore, CALL EXIT will work for programs running under DOS or under CALMS.

In order to select EXIT.OBJ over the FORTRAN exit subroutine, specify EXIT before FTNLIB in the link command string. The /SU switch should be used in the FORTRAN command string to save additional core and time.

All FORTRAN modules of CALMS should be compiled with /SU or they may not fit in core.

SAVER

Purpose: To save and restore registers 0–4 on the stack, for subroutines called with an R5 calling sequence.

SAVER and RESTR provide a convenient way for MACRO subroutines to save and restore registers 0–4 on the stack.

To save registers 0–4:
JSR R4, SAVER
To restore registers 0–4 and return via R5:
JMP RESTR
(SAVER is called via R4, and R5 is not saved.)

AFILE

Purpose: To assign a file to a dataset.
CALL AFILE (MVB, DUNIT, FILPEX, GRP, USR)
 MVB is the mini-VICAR block for the dataset.
 DUNIT is the disk unit (1 for DK1:, 2 for DK2:, etc.)
 FILPEX is the 6 character filename plus 3 character extension.
 GRP is the group number from the UIC
 USR is the user number from the UIC.
Example:
CALL ALFILE (A,1, 'PIC ', 5,5)
Assigns DK1:PIC[5,5] to MVB A

PARAM

Callable Entry Point Names: PARAM, PARBUF
Purpose: To read free-field parameters from the keyboard and convert them.

PARAM types an *, then reads up to 80 characters from the keyboard, terminated by a carriage return. Parameters are separated by blanks or commas, and can be one of the following:

1. One word integer — negative integers are preceded by a minus sign.
2. Two word alphameric — first character must be alphabetic. The character string is padded with trailing blanks if less than 4 characters. It is truncated if more than 4 characters.
3. Variable length alphameric — the string is enclosed in apostrophes. If an odd number of characters, the last word is padded with a trailing blank. If an apostrophe is desired, type two consecutive apostrophes.

The raw character string is saved at 'PARBUF' which is accessible to MACRO programs, but not FORTRAN. However, the user can optionally supply his own PARBUF.

The calling sequence is:
CALL PARAM (N,P PAR, MAXNP [,PARBUF])
 NP is the number of parameter words that were stored in PAR
 MAXNP is the maximum allowable number of parameter words (the size of PAR)
 PARBUF is optional 83 byte user buffer for the raw character string.
Example:
INTEGER PAR (20)
CALL PARAM (NP, PAR, 20)
If the user types:
NH, PRINT, 42, −1, 'ABC' 'DEF'
The result is:
PAR (1) = NH
PAR (2) = AA
PAR (3) = PR
PAR (4) = IN
PAR (5) = 42
PAR (6) = −1
PAR (7) = AB
PAR (8) = C'
PAR (9) = DE
PAR (10) = FA
NP = 10

PARAM is reentrant if the user supplies PARBUF. However, an earlier keyboard input request must be satisfied before a latera one can be done.

PARAM maintains a byte with the global name 'PBUSY'. It is set to one when PARAM is entered, and cleared when PARAM exits.

Any program which is entered by an interrupt (such as SEARCH or HCOPY) must check that PBUSY = 0 before calling PARAM. If PBUSY is not zero, the program must signal PARAM that it is waiting to call it, but could not because PARAM was busy. It does this by storing the location for PARAM to transfer control to in 'PINT' or PINT+2, and then executing an RT1.

PARAM will then call the waiting routine with a simulated interrupt, when it has finished with the earlier request.

(The PBUSY, PINT method is required under DOS; otherwise the KB driver gets confused).

QPRINT

Purpose: To print a message, with automatic buffering

QPRINT waits for completion of a previous print, moves the message to its own buffer, initiates a print with a TRAN request, and returns to the user.
CALL QPRINT (LOC[,NBYTES])
 LOC is the first byte to be printed (carriage control).
 NBYTES is the number of bytes to be printed. (maximum — 132).
 NBYTES can be omitted if the message is terminated with a "zero" byte.

FORTRAN automatically inserts a zero byte for literal strings and 'ASCIZ', in MACRO, also does this.
Example:
CALL QPRINT ('single space')
CALL QPRINT ('0 double space')

TYPE

Purpose: To type a message with automatic buffering
TYPE is similar to QPRINT, except that output is on the keyboard and the maximum message length is 80 bytes.
CALL TYPE (LOC [,NBYTES])
If NBYTES is omitted or zero, a null (0) terminates the message. TYPE inserts a <CR> at the end of the message unless NBYTES = 0.

IV

Purpose: To convert and move logical *1 (byte) data and word data

IV is a function and the other entry points are subroutines. These routines consider bytes to be positive numbers from 0–255. (FORTRAN treats bytes as signed numbers from −128 to +127.)
IV (byte) = Integer value (0-255) of a byte variable
CALL ITL (INT, L1) (INTEGER TO LOGICAL)
Move the low order byte of INT to L1.
CALL MVL(L1, L2, N) (Move LOGICAL)
Move N bytes starting at L1 to L2
CALL MVW (I1, I2, N) (Move WORD)
Move N WORDS starting at I1 to I2
CALL ZIA (IBUF,N) (Zero INTEGER array)
Zero N WORDS starting at IBUF
CALL ITLA (INT,L1,N) (INTEGER to LOGICAL array)
Store INT in N bytes starting at L1
CALL SWAP (I1, I2)
Interchange I1 and I2.
Note: RO is not saved by these routines!

TEXT

Purpose: To generate readable characters for labeling of pictorial output.

Each character is generated from a six sample by seven line array of BIT, where a one BIT represents black and a zero bit represents white. The left most of the six samples is always zero.

CALL TEXT(INBUF, INCHR, LINE, OUTBUF, SIZE)

INBUF is the location of the input ASCII characters
INCHR is the # of input characters
LINE is the line number (0–6) of the bit array
OUTBUF is the location for the output bytes
SIZE is the number of bytes to store for each bit (1,2, ...)
OUTBUF must be at least INCHR*SIZE*6 bytes long

HCPAK

Purpose: To pack and unpack data in hardcopy format (4 bits) and convert from 7 to 8 bit format.
CALL HCPAK (BUF8, BUF4, NE)
CALL HCUPK (BUF4, BUF8, NE)
CALL MVW78 (BUF7, BUF8, NW)
BUF8 is the LOC of 8-Bit Data
BUF4 is the LOC of 4-Bit Data
BUF7 is the LOC of 7-Bit Data
NE is the number of elements to pack or unpack. NW is the number of works to convert from 7-Bit format to 8-Bit format.

RPARAM

Purpose: To pass parameters to a CALMS phase and to assign the next phase to be loaded.
CALL WPARAM (NP, PAR, PNUM)
NP is the number of words of parameters to write
PAR is the location of the parameters
PNUM is the number of the phase which is to receive the parameters
CALL RPARAM (NP, PAR, NPMAX [,PNUM])
To read parameters through the CALMS supervisor. See the PARAM writeup for details. PNUM is an optional phase nunber used to read another phase's parameters.
CALL APHASE (N)
Normally, phases are loaded in sequence, but APHASE is used to change the sequence.
N is the number of the phase.

DLINE

Purpose: Subroutines used to access the gray scale and cursor, when running under the CALMS supervisor.
CALL DECLEAR to erase the entire gray scale.
CALL DLINE (LOC,Y,X,NS,REPL,ERASE) to write a line of data.
LOC is location of data in core.
Y is line on gray scale (0-1023)
X is starting sample on gray scale (0-1023)
NS is number of samples
REPL is non-zero to replicate samples and lines. (If switch 3 is up, only samples are replicated)
ERASE is
positive to erase this line before writing
negative to erase only
zero to write only.
CALL DWAIT to wait for gray scale ready
CALL CURSOR (Y,X,LINE,SAMP) to read the cursor.
Y is the line on the gray scale (0-1023)
X is the sample on the gray scale (0-1023)
LINE is the picture line (1-512)
SAMP is the picture sample (1-512)
CALL SC sets up the cursor adjustments and saves them on disk as parameters for INT1.
CALL RCA reads in the cursor adjustments from disk.
CALL MCU moves the cursor up one line
CALL MCD moves the cursor down one line
CALL MCL moves the cursor left one sample
CALL MCR moves the cursor right one sample
CALL UDLR (PAR) moves the cursor one step according to whether PAR is a U,D,L, or R.

The cursor adjustment process is required to correct for cursor drift. Two marks are written on the gray scale, one at 32, 32 and one at 992, 992. The operator is requested to move the cursor to these reference positions and the readings are saved. Thereafter, CURSOR performs a linear interpolation on all cursor readings, using the saved values.

There is also a standalone version of DLINE in FTNLIB. It differs from the CALMS version in the way the cursor adjustments are saved and read back.

MCISUB

Purpose: Subroutines to control the MCI and sort the spread queue.

This module consists of miscellaneous subroutines used by SEARCH and CALMS. It also globally defines the MCI register addresses and interrupt vector locations.

CALL IXYABS (Y,Y) Initiates a motor move to X,Y
CALL IXREL (XDEL) Initiates a relative X move
CALL IYREL (YDEL) Initiates a relative Y move
CALL IFREL (FDEL) Initiates a relative F move
CALL CFOC (F) Stores the sum of the two focus parameters
CALL LED (CODE,VAL) Puts VAL in the LED whose code is given
CALL MFST (MAGN, FPOS) Stores the magnification and filter position in MAGN and EPOS, and displays the magnification in the magnification LED. It also stores FSTEP, FLAST, XADJ, and YADJ for the lens in use.
CALL SORTQ Sorts the spread queue according to its rating.

ROACH

FUNCTION: ROACH (WI,BI,WORD,EWI,MASK)

ROACH will scan a binary line to locate the first set bit. The scan will begin at WORD (WI) and end at WORD (EWI). If no set bit is found, the return code is zero. If a set bit is found, WI is returned as the index of the word containing the bit. BI is the bit index within the word (numbered 0, 1, 2, ..., 15). The corresponding bit position within the MASK is also set.

TURTLE

TURTLE is invoked by SEGMENT to walk counterclockwise around the perimeter of objects in the binary picture.
CALL TURTLE (COMMON,EDGE,WOD,MASK,NW2)
COMMON is composed of the following six words:
N = the number of segment end points found PERIM = the number of perimeter points found YMIN,XMIN, YMAX,XMAX, = the extreme coordinates of the object EDGE is an integer array into which is placed the coordinates of the detected end points. On input, WORD points to the word containing the first detected bit of the object and MASK designates the bit positions within that word. NW2 is the number of bytes per line.

The TURTLE uses a four point connectivity algorithm in walking around the perimeter. At each step, the TURTLE will examine its four adjacent neighbors, numbered 0,1,2, and 3 (See Flow Chart 10) to determine its new direction. The order in which neighboring samples are examined is predetermined to ensure that the TURTLE will always proceed in a counterclockwise direction (See Flow Chart 11).

Since not all perimeter points are segment end points, the TURTLE uses a decision table to identify the end points. End point determination is based on the TURTLE's previous and current directions, and his conviction that since he is traversing the perimeter in a counterclockwise direction, the chromosome will always remain on his left. Line segments which contain only one sample are recorded twice so that all segments have starting and ending end point coordinates. The TURTLE's decision table is given in Flow Chart 10. The number of times perimeter points are recorded as end point coordinates appears in parentheses.

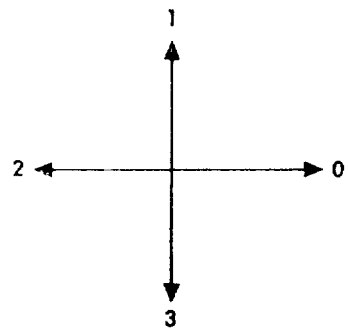

SEGMENT END POINT DECISION TABLE

FLOW CHART 10    Segment and Point Decision Table

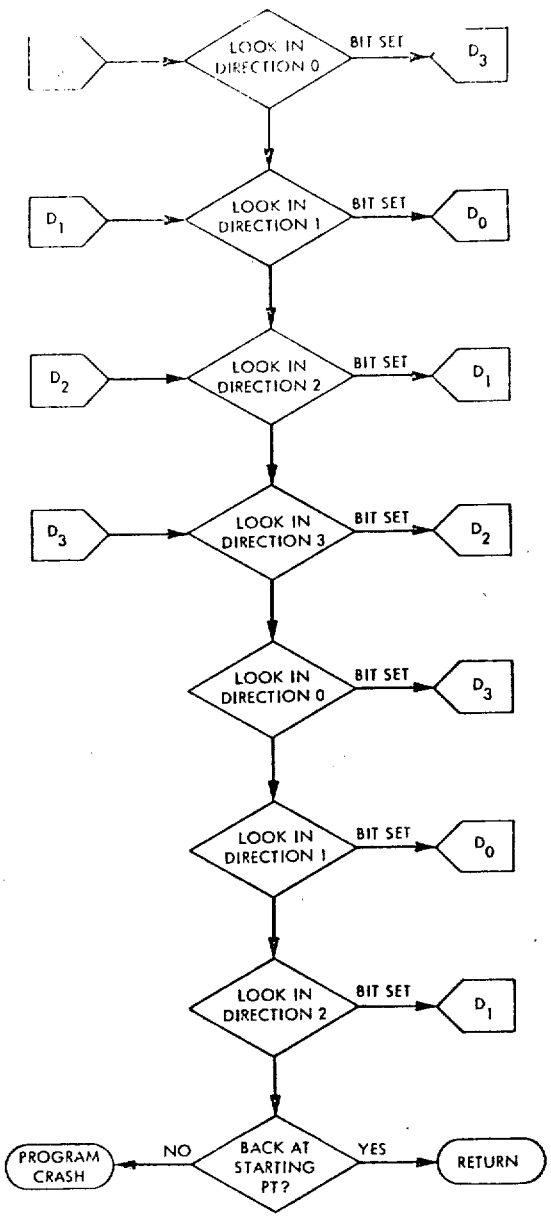

FLOW CHART 11 Four Point Connectivity Algorithm

SORTIN

SORTIN is invoked by SEGMENT to sort the end point coordinates for a chromosome in the order that they would be encountered while scanning the chromosome line-by-line from left to right. Thus, the short is in assending order, first by line coordinate, and second by sample coordinate.

CALL SORTIN(EDGE,N,IND)

N is the number of end points.

Upon return, IND=0 if the sort was successful, $\neq 0$ if not.

EDGE is a buffer area 4N words long. The first 2N words contain the end point coordinates for the chromosome. The remaining 2N words is used as a work area for the bucket sort routine.

SORTIN uses a byte array to keep track of the ordering of the end points. Because of this, a maximum of 255 end points may be sorted.

ERASE

ERASE is invoked by SEGMENT to remove a chromosome from the binary spread image.

CALL ERASE(WORD,EDGE,AREA,N2,NW)

WORD points to the buffer area containing the binary image.

EDGE points to the end point coordinates for the chromosome.

N2 is the number of coordinates in EDGE (two per coordinate pair).

NW is the number of words per line in the binary image.

AREA is returned as the number of sample points contained in the chromosome.

ORIOB

Purpose: Orient objects.
CALL ORIOB(IBUF,OBUF,EF,CHDIR,NL,OPROT,RCODE)
ORIOB finds the minimum enclosing rectangle for the object in IBUF using the endpoint table EP and 32 rotations from 0° to 90°. It then rotates the object into OBUF and sets the rotated NL and NS in CHDIR. OPROT specifies any additional rotation desired by the operator.

EPROT

Purpose: Rotates chromosome endpoints.
CALL EPROT(SIN,COS,NL,EP,XMIN,XMAX,YMIN,YMAX)
EPROT rotates the endpoints (EP) by the angle specified by SIN and COS. It returns the limits of the enclosing rectangle (XMIN,XMAX, YMIN,YMZX).

OBROT

Purpose: To rotate objects.
CALL OBROT(XMIN,XMAX,YMIN,YMAX,COS,SIN,IBUF,OBUF)
OBROT rotates the object in IBUF into OBUF. COS and SIN specify the rotation angle and XMIN,XMAX,YMIN,YMAX give the enclosing rectangle of the object in unrotated coordinates.

Four point linear interpolation is used to set the intensity values of the rotated object.

ACCSUB

Purpose: Accumulate area and density by sample for rotated object.
CALL ACCSUB(BUF,NL,MS,AREAA,DENA,TAREA,TDEN)
The chromosome is located in BUF and is NL by NS. AREAA is the area accumulator by sample and DENA is the density by sample. TAREA and TDEN are the area and density totals for the object.

CHROUT

Purpose: To stand objects up and move them into the output buffer.
CALL CHROUT(IBUF,OBUF,NS,NL,LPB,IP,FLG,BUFSZ)
CHROUT rotates the object in IBUF (NS X NL) by ± 90° in to OBUF for output. LPB gives # of lines that will fit into OBUF, FLG tell which way to rotate object and BUFSZ is NS for IBUF.

KURSOR

Purpose: To locate information about the karyogram for the current cursor position.
CALL KURSO R(Y,X,L,S,SLID,SLCL,SLCS,N)
Y,X,L,S are the cursor coordinates returned by cursor. SLID is the slot ID indicated; SLCL and SLCS are the slot center coordinates; and N is the object ID of the object residing in the slot.

COMPUTER PRINTOUT PROG 1

```
        .TITLE   CALMS - CALMS SUPERVISOR
        .NLIST   BEX
        .MCALL   .CALL,.EXIT,.PAUSE,.INIT,.TRAN,.WAIT,.RLSE
        .GLOBL   RLS.,CVT.,CDT.   ;MAKE EMTS RESIDENT
;SUPERVISOR FOR THE CLINICAL AUTOMATED LIGHT MICROSCOPE SYSTEM
;FOR CHROMOSOME ANALYSIS.
;THE SUPERVISOR CONTROLS SLIDE SEARCH, SCANNING, ANALYSIS, AND HARD-COPY
;OUTPUT OF KARYOTYPES OR COUNTS.
;SEARCH AND HARD-COPY ARE PERMANENTLY RESIDENT BELOW LOCATION 60000.
;SCAN AND ANALYSIS CONSISTS OF 16 PHASES THAT RESIDE ON DISK IN CORE-
;IMAGE FORMAT.  ONE PHASE AT A TIME IS LOADED AT LOCATION 60000 AND
;CALLED BY THE SUPERVISOR.

LF=12              ;LINE FEED
        PSW=177776
        NPH=24.            ;# OF PHASES
        BINPH=2            ;BINARY PHASE NUMBER
        NOBPH=6            ;NOB PHASE NUMBER
        INTPH=7            ;INT1 PHASE NUMBER
        MOBPH=8.           ;MOB PHASE NUMBER
        MASKPH=13.         ;MASK PHASE NUMBER
        NSDS=3             ;# OF SCAN DATA SETS
        NHDS=2             ;# OF HARDCOPY DATA SETS
        SDU=5              ;SCAN DISK UNIT
        HDU=3              ;HARDCOPY DISK UNIT
        MVBSIZ=56.
        LABSIZ=12.
        IBN=12             ;MVB DEFINITIONS
        IBA=14
        CURREC=30
        SBN=46
        RECLEN=54
        BUFSIZ=69
        BPB=62
        DBFLAG=64
        SWR =177570
```

```
; CURRENT ORIGIN IS 30000
SOURCE:  .WORD    8.
NSCAN:   .WORD    0              ;# TO BE SCANNED
PNUM:    .WORD    .-.            ;CURRENT PHASE NUMBER
PANUM:   .ASCII   /12345678 /    ;PATIENT IDENTIFICATION
SLNUM:   .ASCII   /123A1   /     ;SLIDE IDENTIFICATION
PASEX:   .ASCII   /F /           ;PATIENT SEX
SPN:     .WORD    .-.            ;CURRENT SPREAD NUMBER
CSPQ:    .WORD    SPQ+.-.        ;CURRENT LOC IN SPQ
SPR:     .BLKB    300.           ;SPREAD RATINGS
SPQ:     .BLKW    600.           ;SPREAD QUEUE (X,Y)
LPANUM:  .WORD    19.            ;LENGTH OF PANUM IN BYTES
LSLNUM:  .WORD    8.             ;LENGTH OF SLNUM
NPHASE:  .WORD    .-.            ;NEXT PHASE TO BE CALLED
         .PAGE
CALMS:   .CALL    TYPE,<MSG2,ZERO>        ;ASK ABOUT RESTART
         MOV      #6,R1
         CLR      LINE
CLED:    .CALL    LED,<LINE,ZERO> ;INITIALIZE LEDS
         INC      LINE
         SOB      R1,CLED
         .CALL    OPEN,<MVB,PSIZE,ZERO,ZERO,LNAM> ;OPEN OVERLAY DATASET
         MOV      PSIZE,MVB+RECLEN
         .CALL    OPEN,<PMVB,PARSIZ,ZERO,TWO,PLNAM>      ;PARAMETER DS
         MOV      PARSIZ,PMVB+RECLEN
         MOV      #4,DNPTAB+INTPH+INTPH-2 ;SET TO READ 4 CURSOR ADJMNTS
         MOV      #512.,NPTAB    ;ALLOW RESTART
         MOV      #512.,DNPTAB
         MOV      #HHDS,R0       ;SET UP THE START BLOCK NUMBERS FOR
         MOV      #HSBN,R1       ;ALL HARDCOPY DATA SETS
C05:     MOVB     R0,FILPEX+1
         BISB     #60,FILPEX+1   ;CONVERT TO ASCII
         .CALL    AFILE,<A,LHDU,FILPEX,TWO,TWO>
         .CALL    OPEN,<A,TWELVE,ZERO,ZERO,LNAME>
         MOV      A+SBN,(R1)+    ;SAVE THE START BLOCK NUMBER
         SOB      R0,C05
         .CALL    SEARCH         ;INITIAL CALL TO SEARCH
         JSR      PC,PPAR        ;PROCESS RESTART AND PHASE PARAMETERS
         TST      NSCAN
         BNE      S10            ;BR IF A SCAN RESTART
S06:     JSR      PC,TNSCAN      ;IF NSCAN=0 , ALLOW SEARCH START
;
S10:     TSTB     SFLAG          ;'IDLE LOOP' STARTS HERE
         BNE      S40            ;BR IF SEARCH RUNNING
         TST      NSCAN
         BEQ      S40            ;BR IF NONE TO SCAN
S13:     MOV      #NSDS,R0       ;LOOK FOR SCAN DS
S15:     MOV      #SDS,R1
         MOV      NFSDS,R2       ;# FULL SCAN DATASETS
         BEQ      S22            ;BR IF ZERO
S20:     CMPB     R0,(R1)+       ;CHECK R0 AGAINST ALL FULL DATASETS
         BEQ      S25            ;BR IF DATASET IS IN USE
         SOB      R2,S20         ;BR IF MORE TO CHECK
S22:     MOVB     R0,@R1         ;OK TO USE THIS DATASET, STORE IT
         BR       S30            ;GO CALL SCAN
S25:     SOB      R0,S15         ;BR IF MORE TO TEST
         BR       S40            ;NONE AVAILABLE
S30:     BIS      #60,R0         ;CONVERT TO ASCII
         MOVB     R0,FILPEX+1    ;STORE IN FILENAME
         MOVB     #'S,FILPEX     ;AS SN
         MOV      #SDU,DUNIT     ;STORE SCAN DISK UNIT
         DEC      NSCAN          ;NSCAN=NSCAN-1
S31:     .CALL    PHASE,<ONE>    ;SCAN
         .CALL    LED,<SQLED,NSCAN>
         TST      NPHASE
         BEQ      S06            ;BR IF SCAN WAS ABORTED
         CLR      NPTAB+NOBPH+NOBPH-2     ;CLEAR NOB PARAMETERS FOR INT1
S315:    CLR      NPTAB+BINPH+BINPH-2     ;CLEAR BINARY PARAMETERS
         .CALL    PHASE,LINTPH   ;CALL INT1 FOR THE PRE-FOB ADL
         CMP      NPHASE,#1      ;TEST FOR RESCAN OR ABORT
         BEQ      S31            ;BR IF RESCAN
         BLT      S06            ;BR IF SPREAD WAS ABORTED IN INT1
         CMP      NPHASE,#NOBPH
         BNE      S33            ;BR IF NOT A COUNT
         .CALL    PHASE,NPHASE   ;CALL NOB
```

```
              CMP       NPHASE,#MASKPH
              BNE       S315                ;BR IF NOT MASK
    S32:      JSR       PC,TNSCAN           ;IF NSCAN = 0 , ALLOW SEARCH START
              JMP       C15                 ;GO CALL MASK2
    S33:      CMP       NPHASE,#MASKPH
              BEQ       S32                 ;BR IF MASK
              TST       NPTAB+BINPH+BINPH-2
              BEQ       S38                 ;BR IF NOT QUICK OPTION
              .CALL     PHASE,NPHASE        ;CALL BINARY
              BR        S315
    S38:      INC       NFSDS               ;INCREMENT ANALYSIS QUEUE
              .CALL     LED,<AQLED,NFSDS>   ;UPDATE ANALYSIS QUEUE
              BR        S06
    S40:      TSTB      PFLAG               ;SEE IF PATIENT REPORT WAS REQUESTED
              BEQ       S42                 ;BR IF NOT
              CLRB      PFLAG
              .CALL     PHASE,PPHASE        ;CALL THE PATIENT REPORTER
    S42:      TSTB      EFLAG               ;SEE IF TEXT EDITOR WAS REQUESTED
              BEQ       S45                 ;BR IF NOT
              CLRB      EFLAG
              .CALL     PHASE,EPHASE        ;CALL THE EDITOR
    S45:      TSTB      FRFLAG              ;SEE IF FORTRN WAS REQUESTED
              BEQ       S46                 ;BR IF NOT
              CLRB      FRFLAG
              .CALL     PHASE,FFHSE         ;CALL FORTRN
    S46:      TSTB      RFLAG               ;SEE IF RESTART WAS REQUESTED
              BEQ       S47                 ;BR IF NOT
              CLRB      RFLAG
              JSR       PC,RSTRT
              BR        JPS10               ;GO BACK FOR RESTART
    S47:      MOV       #SDS,R1             ;SEE IF READY FOR ANALYSIS
              MOV       NFSDS,R2
              BEQ       JPS10               ;BR IF NO FULL SCAN DATASETS
              MOVB      #'S,FILPEX
              MOV       #SDU,DUNIT
              MOVB      @R1,FILPEX+1
              MOVB      @R1,R0              ;SAVE DATA SET # IN R0
              BISB      #60,FILPEX+1        ;CONVERT TO ASCII
              DEC       NFSDS
              DEC       R2
              BEQ       S60                 ;BR IF NO DATASET NUMBERS TO MOVE
    S50:      MOVB      1(R1),@R1           ;MOVE DATASET NUMBERS TO TOP OF LIST
              INC       R1
              SOB       R2,S50
    S60:      MOV       FPHASE,NPHASE       ;START ANALYSIS WITH PHASE 2 OR DEBUG PHASE
              MOV       #DNPTAB,R0
              MOV       #NPTAB,R1
              MOV       #NPH,R2
    S65:      MOV       (R0)+,(R1)+         ;MOVE DNPTAB TO NPTAB
              SOB       R2,S65
                                            ;ANALYSIS LOOP STARTS HERE
    S75:      .CALL     PHASE,<NPHASE>      ;CALL AN ANALYSIS PHASE
              TSTB      RFLAG               ;TEST RESTART FLAG
              BEQ       S80                 ;BR IF NOT SET
              CLRB      RFLAG
              JSR       PC,RSTRT
    S80:      TST       NPHASE              ;TEST FOR ABORT (OR ANALYSIS RESTART)
              BNE       S85                 ;BR IF NOT AN ABORT (NPHASE=0)
              .CALL     LED,<AQLED,NFSDS>
    JPS10:    JMP       S10
    S85:      CMP       NPHASE,#MASKPH
              BNE       S75                 ;BR IF NOT THE MASK PHASE
                                            ;END OF ANALYSIS LOOP
                                            ;LOOK FOR HARDCOPY DATA SET
    C15:      MOV       #NHDS,R0            ;# HCOPY DATA SETS
              MOV       #HDS,R1
              MOV       #HSBN,R2
    C20:      TSTB      (R1)+
              BEQ       C30                 ;BR IF DATASET IS EMPTY
              TST       (R2)+               ;STEP HSBN
              SOB       R0,C20              ;BR IF MORE TO TEST
              BR        C15                 ;NONE AVAILABLE, KEEP LOOKING
    C30:      BIS       #60,R0              ;CONVERT TO ASCII
              MOVB      R0,FILPEX+1         ;STORE IN FILENAME
```

```
         MOVB    #'H,FILPEX              ;AS HH
         MOV     #HDU,DUNIT              ;HARDCOPY DISK UNIT
         INCB    -(R1)                   ;SET DATASET BUSY
         MOV     R1,CMDS                 ;SAVE LOC OF CURRENT MASK DATASET
         MOV     R2,CSBN                 ;SAVE SBN LOCATION
         .CALL   PHASE,<NPHASE>          ;MASK2
         MOVB    #-1,@CMDS               ;SET DATASET FULL OF DATA
         INC     NHCOPY
         .CALL   LED,<HQLED,NHCOPY>
         .CALL   LED,<AQLED,NFSDS>
         TSTB    HCFLG
         BNE     JS10                    ;BR IF HCOPY IS OPERATING
         INCB    HCFLG                   ;SET HCOPY OPERATING
         BIS     #1,@#LITES              ;TURN ON HCOPY LITE
         MOV     CMDS,CHDS
         MOV     @CSBN,A+SBN             ;SET UP START BLOCK NUMBER
         MOV     @#PSW,-(SP)             ;SAVE PSW TO SIMULATE TRAP
         JSR     PC,HCOPY                ;CALL HCOPY
JS10:    JMP     S10
         .PAGE
         PLOC=60000                      ;PHASE START LOCATION
PHASE:   MOV     @2(R5),R1
         MOV     R1,PNUM                 ;STORE PHASE NUMBER
         INC     R1
         MOV     R1,NPHASE               ;NPHASE=PNUM+1
         .CALL   ZIA,<157000,L377>       ;ZERO 510 BYTES OF UPPER CORE
         .CALL   READ,<MYB,PNUM,INDEX,PLOC>  ;READ PHASE PNUM INTO PLOC
         ASL     R1
         ADD     #PLITE-4,R1
         BIS     @R1,@#LITES             ;TURN ON THE LITE FOR THIS PHASE
         .CALL   PLOC,<DUNIT,FILPEX>     ;CALL THE PHASE, GIVING IT A DATA SET NAME
         BIC     #14176,@#LITES          ;TURN OFF ANALYSIS LITES
         RTS     R5
;
PPAR:    .CALL   PARAM,<NP,PAR,MAXNP>    ;JSR PC,PPAR
         DEC     NP
         BMI     PPEXT                   ;BR IF NP WAS 0
         CMPB    PAR,#'N
         BEQ     PPEXT                   ;BR IF NO RESTART
         CMPB    PAR,#'Y
         BEQ     RSTRT                   ;BR IF A RESTART
         JMP     PP40                    ;PHASE NUMBER AND PARAMETERS
PPEXT:   RTS     PC
RSTRT:   TSTB    SFLAG                   ;JSR PC,RSTRT
         BNE     PP05                    ;BR IF SEARCHING
         .CALL   TYPE,<M4,ZERO>          ;ASK ABOUT SCAN RESTART
         .CALL   PARAM,<NP,PAR,MAXNP>
         CMPB    PARBUF,#'Y
         BNE     PP05                    ;BR IF NO SCAN RESTART
         .CALL   RPARAM,<NP,SOURCE,L512,ONE>  ;READ RESTART INFO
         .CALL   TYPE,<M7,ZERO>          ;ASK FOR FIRST SPREAD NUMBER
         .CALL   PARAM,<NP,PAR,MAXNP>
         MOV     PAR,R0
         CMP     R0,#1
         BLE     PP02                    ;BR IF NUMBER LE 1
         CMP     R0,NSCAN
         BGT     PP02                    ;BR IF GT NSCAN
         DEC     R0                      ;LEGAL NUMBER, DECREMENT IT
         MOV     R0,SPN                  ;STORE IT
         SUB     R0,NSCAN                ;ADJUST NSCAN
         ASL     R0
         ASL     R0                      ;N*4
         ADD     R0,CSPQ                 ;ADJUST CSPQ
PP02:    .CALL   GNSTS                   ;GET FIRST SPREAD TO SCAN AND ENABLE SPIRAL SEARCH
         .CALL   LED,<SQLED,NSCAN>
PP05:    .CALL   TYPE,<M5,ZERO>          ;ASK ABOUT ANALYSIS RESTART
         .CALL   PARAM,<NP,PAR,MAXNP>
         CMPB    PARBUF,#'Y
         BNE     PP15                    ;BR IF NO ANALYSIS RESTART
         CLR     NPHASE                  ;NPHASE=0
         MOV     #HSDS,R0
         MOV     #SDS,R1
```

```
            MOV     R0,NFSDS            ;SET ALL SCAN DATA SETS AS FULL
PP10:       MOVB    R0,(R1)+
            SOB     R0,PP10
            .CALL   TYPE,<M8,ZERO>      ;ASK HOW MANY
            .CALL   PARAM,<NP,PAR,MAXNP>
            TST     PAR
            BLE     PP12                ;BR IF N LE 0
            CMP     PAR,#NSDS
            BGE     PP12                ;BR IF N GE NSDS
            MOV     PAR,NFSDS           ;STORE NFSDS
PP12:       .CALL   LED,<AQLED,NFSDS>   ;DISPLAY ANALYSIS QUEUE
PP15:       TSTB    HCFLG
            BNE     PPEX                ;BR IF HCOPY RUNNING
            .CALL   TYPE,<M6,ZERO>      ;ASK ABOUT HARDCOPY RESTART
            .CALL   PARAM,<NP,PAR,MAXNP>
            CMPB    PARBUF,#'Y
            BNE     PPEX                ;BR IF NO HARDCOPY RESTART
            MOV     #NHDS,R0
            MOV     #HDS,R1
            .CALL   TYPE,<M8,ZERO>      ;ASK HOW MANY
            .CALL   PARAM,<NP,PAR,MAXNP>
            TST     PAR
            BLE     PP18                ;BR IF N LE 0
            CMP     PAR,#NHDS
            BGE     PP18                ;BR IF N GE NHDS
            MOV     PAR,R0              ;LEGAL N
PP18:       MOV     R0,NHCOPY           ;SET N HARDCOPY DATA SETS AS FULL
PP20:       MOVB    #-1,(R1)+
            SOB     R0,PP20
            INCB    HCFLG               ;SET HARDCOPY OPERATING
            BIS     #1,@#LITES          ;TURN ON HARDCOPY LITE
            MOV     @#PSW,-(SP)
            JSR     PC,HCLED            ;SIMULATE INTERRUPT TO HCOPY END RTE
PPEX:       RTS     PC
PP40:       MOV     PAR,R0              ;PHASE NUMBER
            BLE     PERR
            CMP     R0,#NPH
            BGT     PERR
            ASL     R0
            ADD     #DNPTAB-2,R0        ;DNPTAB+2*PNUM-2
            MOV     NP,@R0              ;STORE NP FOR THE PHASE
            .CALL   UPARAM,<NP,PAR+2,PAR>
JPPAR:      JMP     PPAR
PERR:       .CALL   TYPE,<PEMSG,ZERO>
            BR      JPPAR

TNSCAN:     TST     NSCAN               ;JSR PC,TNSCAN
            BNE     CGNS                ;BR IF NSCAN NOT ZERO
            .CALL   TYPE,MSG1           ;TYPE 'OK TO START SEARCH'
            .CALL   SEARCH              ;ALLOW SEARCH START
            RTS     PC
CGNS:       .CALL   GNSTS               ;GET NEXT SPREAD TO SCAN
            RTS     PC

MYB:        .BLKW   18.                 ;MYB FOR READING PHASE FROM CALMS.OVR
            .BYTE   1,5                 ;DK5.
            .RAD50  /DK/
            .BLKW   2
            .RAD50  /CALMS OVR/
            .BYTE   2,2
            .BLKW   18.
L377:       .WORD   377
PSIZE:      .WORD   32256.
TWO:        .WORD   2
INDEX:      .WORD   .-.
FPHASE:     .WORD   2                   ;FIRST ANALYSIS PHASE (OR DEBUG PHASE)
HPHASE:     .WORD   MASKPH
PPHASE:     .WORD   16.                 ;PREP PHASE
EPHASE:     .WORD   17.                 ;TEXT EDITOR PHASE
FFASE:      .WORD   18.                 ;FORTRN PHASE
DUNIT:      .WORD   .-.                 ;DISK UNIT FOR SCAN OR HARDCOPY DATA SET
LNAM:       .ASCII  /OVO/
PLNAM:      .ASCII  /PAR/
```

```
PMVB:   .BLKW   10.                     ;MVB FOR WRITING AND READING PARAMETERS
        .BYTE   1,1                     ;DK1:
        .RAD50  /DK /
        .BLKW   2
        .RAD50  /CALMS.PAR/             ;CALMS.PAR
        .BYTE   2,2                     ;[2,2]
        .BLKW   10.
PARSIZ: .WORD   1024.
PLITE:  .WORD   100,40,40,40,40,40,20,10,10,10,4,2,2,10010,10010,4000
        .WORD   4000,4000,4000,10010,0,0,0,0
NPTAB:  .BLKW   NPH                     ;NP TABLE
DNPTAB: .BLKW   NPH                     ;DEFAULT NP TABLE
        .PAGE
        HCWC=172430                     ;HARDCOPY WORD COUNT REGISTER
        HCAD=172432
        HCST=172434
        HCMD=172434
        HCIV1=440
        HCIV2=442
        INTPS=340                       ;INTERRUPT PRIORITY LEVEL 7
HCOPY:  MOV     #77777,A                ;CLEAR ACTIVE BLOCK NUMBER
        MOV     #77777,A+IBN            ;AND INACTIVE BLOCK NUMBER
        MOV     #SLAB,A+2               ;READ LABEL INTO SLAB
        MOV     #LABSIZ,A+BUFSIZ        ;READ LABSIZ BYTES
        CLRB    A+DBFLAG                ;PREVENT READ-AHEAD
        CLR     A+CURREC                ;CLEAR CURRENT RECORD NUMBER
        .CALL   GLABEL,<A,SPAR,IA>
;READ THE LABEL INFORMATION INTO LOW CORE AND CALCULATE RECLEN.
;THEN, SET UP THE MVB TO USE TWO 4096 BYTE BUFFERS IN HIGH CORE
;FOR THE DISK TO CORE TO HARD-COPY DMA TRANSFER.
        MOV     #77777,A                ;CLEAR ACTIVE BLOCK NUMBER
        MOV     #160000,A+2             ;ONE BUFFER AT 160000
        MOV     #77777,A+IBN            ;CLEAR INACTIVE BLOCK NUMBER
        MOV     #170000,A+IBA           ;ONE BUFFER AT 170000
        MOV     #10000,A+BUFSIZ         ;BUFSIZ=4096 BYTES
        MOV     #8,A+BPB                ;8 BLOCKS PER BUFFER
        INCB    A+DBFLAG                ;SET DOUBLE BUFFERING
;
        CLR     LINE                    ;INITIALIZE LINE COUNTER
        MOV     #INTRY,@#HCIV1          ;INT ENTRY ADDR TO HCPY INT VEC
        MOV     #INTPS,@#HCIV2          ;INT SVC PSW TO HCPY INT VEC
        INC     BPL                     ;IN CASE OF ODD BYTES
        ASR     BPL                     ;WD CNT FOR HCPY LINE IS BPL/2
        MOV     BPL,BPL2
        ASL     BPL2                    ;2*WDCNT
        MOV     A+54,RMB                ;RECLEN
        SUB     BPL,RMB
        SUB     BPL,RMB
        MOV     #160000,@#HCAD
        SUB     RMB,@#HCAD
        CLR     @#HCWC                  ;CLEAR HCPY WD CNT REGISTER
ONTST:  CLR     @#HCST                  ;TEST FOR HCPY DEVICE ON
        BIT     #2000,@#HCST            ;BIT-10 IS HC RUNNING
        BNE     ONTST                   ;WAIT FOR PREVIOUS END-FRAME
        BIT     #4000,@#HCST            ;BIT-11 IS HC READY
        BNE     REPL                    ;BR IF HC READY
HCOFF:  MOV     @#HCST,-(SP)            ;DISPLAY HCST
        MOV     #501,-(SP)              ;A101 MSG, HC OFF
IOT:    IOT                             ;ACTION MSG TO OPERATOR
        BR      ONTST                   ;CHECK HCPY DEVICE AGAIN

; HARDCOPY DEVICE INTERRUPT SERVICE ROUTINE
;
INTRY:  BIT     #10000,@#SWR
        BNE     NXTLN                   ;BR IF SW 12 UP
        COM     LXPND
        BEQ     NXTLN                   ;BR IF NEW LINE
        SUB     BPL2,@#HCAD             ;RESTORE HCAD
        BR      NOGET                   ;REPEAT THE LAST LINE
NXTLN:  DEC     NL                      ;DECREMENT LINE COUNT & TEST
        BEQ     EODS                    ;BRANCH IF END
REPL:   INC     LINE
        ADD     RMB,@#HCAD
        BIT     #7777,@#HCAD
        BNE     NOGET
```

```
            .CALL   GET,<A,LINE,INDEX>      ;GET LOCATION OF LINE
            MOV     #A,@#HCAD               ; AND LOAD INTO
            ADD     INDEX,@#HCAD            ; HC BUS ADDR REG
HOGET:      SUB     WDCNT,@#HCWC            ;STORE NEGATIVE WORD COUNT
            MOV     #113,@#HCMD             ;COMMAND LINE OUTPUT WITH PDATA=1, LXPND=0
            RTI                             ;RETURN FROM INTERRUPT
;
EODS:       CLR     @#HCST                  ;STOP HCOPY DEVICE
            CLR     @#PSW                   ;LOWER PRIORITY
            BIT     #4,@#SWR
            BEQ     HCOK                    ;BR IF SW 2 DOWN (NO RERUN CHECK)
            TSTB    PBUSY                   ;TEST PARAM BUSY BYTE
            BEQ     SCP                     ;BR IF NOT
            MOV     #SCP,PINT               ;STORE INTERRUPT ADDRESS
            RTI
SCP:        .CALL   TYPE,<MSG3,ZERO>
            .CALL   PARAM,<NP,PAR,MAXNP,SPBUF>
            CMPB    SPBUF,#'Y
            BNE     HCOK                    ;BR IF OUTPUT WAS OK
            JMP     HCOPY                   ;RE-DO THE OUTPUT
HCOK:       CLRB    @CHDS                   ;RELEASE THE HCOPY DATASET
            DEC     NHCOPY
HCLED:      .CALL   LED,<HQLED,NHCOPY>      ;ENTRY FOR RESTART
            MOV     R0,-(SP)
            MOV     R1,-(SP)
            MOV     #NHDS,R0
            MOV     #HDS,R1
            MOV     #HSBN,REG2
H40:        TSTB    (R1)+
            BMI     H50
            ADD     #2,REG2                 ;BR IF DATASET IS FULL
            SOB     R0,H40
            CLRB    HCFLG                   ;SET HCOPY NO LONGER OPERATING
            BIC     #1,@#LITES              ;TURN OFF HCOPY LITE
            MOV     (SP)+,R1
            MOV     (SP)+,R0
            RTI                             ;RETURN FROM INTERRUPT
H50:        MOV     @REG2,A+SBN             ;SET UP START BLOCK NUMBER
            DEC     R1
            MOV     R1,CHDS
            MOV     (SP)+,R1
            MOV     (SP)+,R0
            JMP     HCOPY                   ;START NEW DATASET
            .PAGE
LINTPH:     .WORD   INTPH
NP:         .WORD   .-.
PAR:        .BLKW   20
MAXNP:      .WORD   20
LHDW:       .WORD   HDW
ZERO:       .WORD   0
ONE:        .WORD   1
FOUR:       .WORD   4
FIVE:       .WORD   5
TWELVE:     .WORD   12.
IA:         .WORD   .-.
A:          .BLKB   MYBSIZ
SLAB:       .BLKB   LABSIZ
SPAR=SLAB+2
NL=SPAR
BPL=SPAR+2
WDCNT=BPL
BPE=SPAR+4
LXPND:      .WORD   .-.
RWB:        .WORD   .-.
BPL2:       .WORD   .-.
LINE:       .WORD   .-.
NFSDS:      .WORD   .-.                     ;# OF FULL SCAN DATASETS
CMDS:       .WORD   .-.                     ;LOC OF CURRENT MASK DATASET FLAG
CHDS:       .WORD   .-.                     ;LOC OF CURRENT HARDCOPY DATASET FLAG
HSBN:       .BLKW   NHDS                    ;HARDCOPY DATASET START BLOCK NUMBERS
CSBN:       .WORD   .-.
REG2:       .WORD   .-.
XVAL:       .WORD   2098.
YVAL:       .WORD   2030.
```

```
NHCOPY: .WORD   .-.                     ;# IN HCOPY QUEUE
SFLAG:  .BYTE   0                       ;FLAG FOR SEARCH OPERATING
SDS:    .BLKB   NSDS                    ;SCAN DATA SET FLAGS
HDS:    .BLKB   NHDS                    ;HARDCOPY DATA SET FLAGS
HCFLG:  .BYTE   0                       ;FLAG FOR HARDCOPY OPERATING
RFLAG:  .BYTE   0                       ;FLAG FOR RESTART REQUEST
PFLAG:  .BYTE   0                       ;FLAG TO CALL THE PATIENT REPORTER
EFLAG:  .BYTE   0                       ;FLAG TO CALL THE TEXT EDITOR
FRFLAG: .BYTE   0                       ;FLAG TO CALL FORTRN
BLZE:   .ASCIZ  / /
MSG1:   .ASCIZ  / OK TO START SEARCH/<LF><LF>
MSG2:   .ASCIZ  / IS THIS A RESTART? /
PEMSG:  .ASCIZ  / ILLEGAL PHASE NUMBER! /
MSG3:   .ASCIZ  / RERUN HCOPY? /
M4:     .ASCIZ  / RESTART SCAN? /
M5:     .ASCIZ  / RESTART ANALYSIS? /
M6:     .ASCIZ  / RESTART HARDCOPY? /
M7:     .ASCIZ  / WHICH SPREAD? /
M8:     .ASCIZ  / HOW MANY SPREADS? /
SPBUF:  .BLKB   83.                     ;HCOPY PARBUF
FILPEX: .ASCII  /H*      /
LNAME:  .ASCII  /XXX/
        .EVEN
        .BLKB   SOURCE+13900-.          ;MAKE PROGRAM LENGTH CONSTANT
        .END    CALMS

.TITLE  SEARCH - SEARCH PARTITION OF CALMS
        .MCALL  .CALL,.PAUSE
        LF=12
        CR=15
        FTIME=15.                       ;MAX TIME BETWEEN FOCUS DURING SEARCH
        PSW=177776
        SWR=177579
        .MACRO  GETK@   MSG,?LOC
        TSTB    PBUSY
        BEQ     LOC
        MOV     #LOC,PINT+2
        RTI
LOC:    CLR     @#PSW
        .CALL   TYPE,<MSG,ZERO>
        .ENDM
;
        .MACRO  ENI     CODE            ;ENABLE INTERRUPT
        BIS     #CODE,@#IEAPD
        .ENDM
;
        .MACRO  DSI     CODE            ;DISABLE INTERRUPT
        BIC     #CODE,@#IEAPD
        .ENDM
;
        .MACRO  LON     CODE            ;TURN LIGHT ON
        BIS     #CODE,@#LITES
        .ENDM
;
        .MACRO  LOFF    CODE            ;TURN LIGHT OFF
        BIC     #CODE,@#LITES
        .ENDM
;
        .MACRO  HINT    KEY             ;HANDLE INTERRUPT FOR KEYS 5-8 (AC,RJ,HX,LA)
        DSI     100
        LOFF    100000
        MOV     R0,-(SP)
        .CALL   LED,<LKLED,KEY>
        .ENDM
;
;       CURRENT ORIGIN IS 40000
;
GNSTS:  JMP     GNS                     ;ENTRY POINT FOR GNSTS
;
SEARCH: MOV     #SRSTA,R0               ;INITIAL CALL FROM SUPERVISOR
        MOV     #SRST,(R0)+             ;SET UP SEARCH START INTERRUPT VECTO
        MOV     #200,(R0)+              ;PRIORITY 4
        MOV     #15.,R1
```

```
IS20:   MOV     #UINT,(R0)+             ;UNEXPECTED INTERRUPT RTE TO OTHERS
        MOV     #200,(R0)+              ;PRIORITY 4
        SOB     R1,IS20
        MOV     #FOC,@#FOCA
        MOV     #KYRQ,@#KYRQA
        MOV     #200,@#KYRQA+2
        .CALL   MFST,<MAGN,FPOS>
        ENI     1410                    ;ENABLE SRCH START, FOCUS AND KBD REQUEST
        DSI     367                     ;DISABLE OTHERS
        RTS     R5                      ;RETURN TO SUPERVISOR
UINT:   .PAUSE  IEAPD                   ;UNEXPECTED INTERRUPT
        RTI
SRST:   DSI     10
        .CALL   LED,<LKLED,SSKEY>
        GETKB   M1                      ;GET KEYBOARD AND TYPE M1
        .CALL   PARAM,<NP,PAR,MAXNP,SPBUF>
        CMP     NP,#2
        BNE     SR20                    ;BR IF NOT 2 WORDS
        CMP     PAR,#"A
        BNE     SR20                    ;BR IF NOT ABORT
        .CALL   TYPE,M7                 ;SEARCH ABORTED, TYPE M7
        ENI     10
        RTI
SR20:   INCB    SFLAG                   ;SET SEARCH OPERATING
        LOFF    162599                  ;TURN OFF EDIT LIGHTS
        LON     1000                    ;TURN SEARCH LIGHT ON
        TST     NP
        BEQ     SR30                    ;BR IF SAME PATIENT AND SLIDE
        .CALL   MVCR,<SPBUF,PANUM,LPANUM>       ;MOVE PATIENT NUMBER
        .CALL   TYPE,<M2,ZERO>
        MOVB    #' ,PAR                 ;INITIALIZE SEX TO BLANK
        .CALL   PARAM,<NP,PAR,MAXNP,SPBUF>
        MOVB    PAR,PASEX               ;STORE PATIENT SEX
        .CALL   TYPE,<M3,ZERO>
        .CALL   PARAM,<NP,PAR,MAXNP,SPBUF>
        .CALL   MVCR,<SPBUF,SLNUM,LSLNUM>       ;MOVE SLIDE NUMBER
        .CALL   TYPE,<M8,ZERO>
        .CALL   PARAM,<NP,PAR,MAXNP,SPBUF>
        MOV     PAR,SOURCE              ;STORE SOURCE CODE
SR30:   MOV     #SPQ,CSPQ               ;INITIALIZE SEARCH QUEUE POINTER
        CLR     NSP                     ;NSP=0
        MOV     R0,-(SP)                ;SAVE R0 BEFORE CALLING ZIA
        .CALL   ZIA,<SPR,LSPR>          ;ZERO THE SPREAD RATINGS
        MOV     (SP)+,R0
        .CALL   LED,<SNLED,NSP>
        .CALL   MFST,<MAGN,FPOS>
        MOV     XLGTH,XCTR              ;INITIALIZE SEARCH PATTERN
        MOV     IXDEL,XDEL
        MOV     #SDR,@#SDFPA            ;SEARCH DATA READY INTERRUPT
        MOV     #SRHA,@#SRHAA
        MOV     #SRRS,@#SRRSA
        MOV     #EDST,@#EDSTA
        ENI     74                      ;ENABLE INTERRUPTS
        RTI

FOC:    .CALL   LED,<LKLED,FOKEY>       ;FOCUS INTERRUPT FROM FOCUS KEY
FOCSUB: DSI     400                     ;FOCUS SUBROUTINE
        LON     40000                   ;IT MAY BE ENTERED BY ANOTHER INTERRUPT
        MOV     #FTIME,FCNT             ;RESET FOCUS COUNT
        MOV     @#IEAPD,OIEAPD          ;SAVE OLD IEAPD AND SDFPA
        MOV     @#SDFPA,OSDFPA
        .CALL   MFST,<MAGN,FPOS>        ;FIND FSTEP & FLAST FOR THIS MAGNIFICATION
        MOV     #F410,@#SDFPA           ;SET UP INTERRUPT VECTOR
        ENI     4
        RTI
F410:   .CALL   CFOC,OLDF               ;CALCULATE FOCUS
        .CALL   IFREL,FSTEP
F420:   MOV     #F430,@#SDFPA
        RTI
F430:   .CALL   CFOC,F
        CMP     F,OLDF                  ;SEE IF WE ARE GOING IN THE RIGHT DIR
        BGT     F450                    ;BR IF SO
        MOV     FSTEP,N                 ;CHANGE DIRECTION
        ASL     N
        NEG     N                       ;MOVE TWICE AS FAR IN REVERSE
```

```
            .CALL   IFREL,N
            MOV     #F440,@#SDFPA
            RTI
F440:       .CALL   CFOC,F
            CMP     F,OLDF                  ;SEE IF OTHER DIRECTION IS BETTER
            BGT     F448                    ;BR IF SO
            CMP     FSTEP,FLAST             ;SEE IF STEP SIZE IS SMALL ENOUGH
            BLE     F480                    ;BR IF SO
            MOV     FSTEP,N                 ;TRY A SMALLER STEP
            ASR     FSTEP
            ADD     FSTEP,N                 ;N=FSTEP+FSTEP/2
            .CALL   IFREL,N
            BR      F420
F448:       NEG     FSTEP
F450:       MOV     F,OLDF
            .CALL   IFREL,FSTEP             ;TAKE ANOTHER STEP
            MOV     #F460,@#SDFPA
            RTI
F460:       .CALL   CFOC,F
            CMP     F,OLDF
            BGT     F450                    ;BR IF FOCUS STILL INCREASING
            MOV     FSTEP,N
            BPL     F470                    ;GET ABSOLUTE VALUE FOR TEST
            NEG     N
F470:       NEG     FSTEP
            CMP     N,FLAST                 ;TEST FOR LAST STEP
            BLE     F480                    ;BR IF SO
            ASR     FSTEP                   ;DECREASE STEP SIZE
            BR      F450
F480:       .CALL   IFREL,FSTEP             ;TAKE LAST STEP BACK
            MOV     #F490,@#SDFPA
            RTI
F490:       DSI     4
            .CALL   RMCI
            MOV     OSDFPA,@#SDFPA          ;RESTORE SDFPA
            BIT     #4,@#IEAPD              ;SEE IF INTERRUPT WAS ENABLED
            BEQ     F500                    ;BR IF NOT
            BIT     #1000,@#LITES
            BEQ     F498                    ;RE-ENABLE IT IF NOT IN SEARCH
            TST     @#SPRD
            BPL     F498                    ;OR SPREAD NOT PRESENT
            BIT     #4000,@#SWR
            BEQ     F498                    ;OR SW 11 DOWN
            LON     20000                   ;TURN ON SEARCH HALTED LIGHT
            BR      F500                    ;DON'T RE-ENABLE THE INTERRUPT
F498:       ENI     4                       ;RE-ENABLE INTERRUPT
F500:       ENI     400
            LOFF    40000                   ;TURN OFF FOCUSING LITE
            RTI
KYRQ:       DSI     1000                    ;DISABLE ANY FURTHER KBD REQ
            .CALL   LED,<LKLED,KRKEY>
            GETKB   N4
            .CALL   PARAM,<NP,PAR,MAXNP,SPBUF>
            TST     NP
            BEQ     BKYEX                   ;BR IF NO INPUT
            CMPB    PAR,#'A
            BNE     KY10                    ;BR IF NOT ABORT REQUEST
            .CALL   APHASE,<ZERO>
            BR      BKYEX
KY10:       CMPB    PAR,#'C
            BNE     KY20                    ;BR IF NOT CALIBRATE MICROSCOPE
            .CALL   IXREL,BIG
            .CALL   IYREL,BIG               ;MOVE TO LIMITS
            .CALL   IFREL,BIG
            .CALL   XWAIT
            .CALL   YWAIT
            .CALL   FWAIT                   ;WAIT FOR END OF MOVES
            .CALL   IFCPR                   ;INITIALIZE F,X, AND Y
            .CALL   IXCPR
            .CALL   IYCPR
            .CALL   IXYABS,<XVAL,YVAL>      ;MOVE STAGE TO 1000,1000 OR LAST POSITION
```

```
              .CALL    IFREL,FVAL        ;MOVE FOCUS TO 3000
              .CALL    XWAIT
              .CALL    YWAIT
              .CALL    FWAIT
              .CALL    RMCI
BKYEX:        BR       KYEX
KY20:         CMPB     PAR,#'R
              BNE      KY30              ;BR IF NOT RESTART REQUEST
              INCB     RFLAG             ;SET RESTART FLAG IN CALMS
KY30:         CMPB     PAR,#'E
              BNE      KY35
              INCB     EFLAG             ;SET EDIT FLAG
              BR       KYEX
KY35:         CMPB     PAR,#'F
              BNE      KY40              ;BR IF NOT FORTRN REQUEST
              INCB     FRFLAG            ;SET FORTRN FLAG
              BR       KYEX
KY40:         CMPB     PAR,#'Z
              BNE      KY50              ;BR IF NOT ZERO SCAN QUEUE REQUEST
              CLR      NSCAN
              .CALL    LED,<SQLED,NSCAN>
              MOV      #SRST,@#SRSTA     ;ALLOW SEARCH START
              BR       KYEX
KY50:         CMPB     PAR,#'Q
              BNE      KY60              ;BR IF NOT QUEUE ADJUST
              MOV      @#XCPR,XOFF
              SUB      XVAL,XOFF         ;STORE X OFFSET
              MOV      @#YCPR,YOFF
              SUB      YVAL,YOFF         ;STORE Y OFFSET
              BR       KYEX
KY60:         CMPB     PAR,#'S
              BNE      KY70              ;BR IF NOT SCAN REQUEST
KY65:         INC      NSCAN
              .CALL    LED,<SQLED,NSCAN>
              MOV      #SPSRCH,@#SRSTA   ;SET UP SPIRAL SEARCH
              CMP      NP,#4             ;SEE IF X AND Y WERE GIVEN
              BNE      KYEX              ;BR IF NOT
              .CALL    IXYABS,<PAR+4,PAR+6>
              ENI      1000
              JMP      FOCSUB
KY70:         CMPB     PAR,#'D
              BNE      KY80              ;BR IF NOT DEBUG REQUEST
              MOV      PAR+4,FPHASE      ;STORE PHASE NUMBER
              BR       KY65              ;GO INCREMENT NSCAN
KY80:         CMPB     PAR,#'B
              BNE      KY90              ;BR IF NOT BANDED REQUEST
              MOV      #-8.,SOURCE       ;SET SOURCE OF -8
              BR       KYEX
KY90:         CMPB     PAR,#'P
              BNE      KY100             ;BR IF NOT PATIENT REPORT REQUEST
              INCB     PFLAG             ;SET PREP FLAG
              .CALL    UPARAM,<ONE,PAR,FPHASE> ;WRITE PREP PARAM
              BR       KYEX
KY100:
;
KYEX:         ENI      1000
              RTI
;
SDR:          TST      @#SPRD            ;SPREAD DATA READY (SEARCH)
              BMI      SPRES             ;BR IF SPREAD PRESENT
              MOV      #1,FFLAG          ;RESET FOCUS FLAG
              DEC      FCNT              ;DECREMENT FOCUS COUNT
              BPL      GNP               ;BR IF NO NEED TO FOCUS
              BIT      #60000,@#SPRD
              BEQ      GNP               ;BR IF NOTHING TO FOCUS ON
              JMP      FOCSUB            ;GO FOCUS
SPRES:        NEG      FFLAG
              BPL      NOFOC             ;BR IF NO FOCUS THIS TIME
              JMP      FOCSUB            ;GO TO FOCUS SUBROUTINE
NOFOC:        MOV      R0,-(SP)
              MOV      CSPQ,R0           ;R0=CURRENT SPREAD QUEUE POINTER
              MOV      @#XCPR,(R0)+      ;STORE X
              BPL      XOK               ;BR IF X IS POSITIVE
XYNG:         GETKB    N6                ;REQUEST CALIBRATION
              MOV      (SP)+,R0
```

```
              DSI      4                       ;DISABLE INTERRUPT
              RTI
XOK:          MOV      @#YCPR,(R0)+            ;STORE Y
              BMI      XYNG                    ;BR IF Y IS NEGATIVE
              CMP      MAGN,#63.               ;SEE IF SEARCH IS AT HI-MAG
              BLT      LOMAG
              NEG      -4(R0)                  ;IF AT HI-MAG, FLAG AS ACCEPTED IN ED-LO
LOMAG:        MOV      R0,CSPQ
              MOV      (SP)+,R0
              INC      NSP                     ;INCREMENT # SPREADS FOUND
              .CALL    LED,<SNLED,NSP>
              CMP      NSP,MAXNSP
              BGE      EDLO                    ;BR IF ENOUGH SPREADS FOUND
GNP:          TST      XCTR
              BGT      G50                     ;BR IF ANOTHER X MOVE IS OK
              BLT      G40                     ;BR IF LAST MOVE WAS A Y
              NEG      XDEL                    ;END OF ROW, REVERSE DIRECTION
              .CALL    IYREL,<YDEL>            ;AFTER MOVING DOWN
              BR       G60
G40:          MOV      XLGTH,XCTR              ;RELOAD XCTR
G50:          .CALL    IXREL,<XDEL>            ;MOVE IN X DIRECTION
G60:          DEC      XCTR
              BIS      #4,@#IEAPD              ;ENABLE INTERRUPT
              RTI
;
SRHA:         DSI      4                       ;SEARCH OR FOCUS HALT
              BIC      #4,@#IEAPD              ;PREVENT END OF FOCUS FROM RESUMING SRCH
              .CALL    LED,<LKLED,SHAKEY>
              LON      20000                   ;TURN ON SEARCH HALTED LIGHT
              .CALL    RMCI
              RTI
;
SRRS:         ENI      4                       ;SEARCH OR FOCUS RESUME
              .CALL    LED,<LKLED,RSKEY>
              LOFF     20000                   ;TURN OFF SEARCH HALTED LIGHT
              RTI
;
EDST:         DSI      104                     ;EDIT START
              LOFF     120000
              .CALL    LED,<LKLED,ESKEY>
              .CALL    HFST,<MAGN,FPOS>
              ENI      400                     ;ENABLE FOCUS INTERRUPT
              MOV      #1,FFLAG                ;INITIALIZE FOCUS FLAG
              BIT      #1000,@#LITES
              BNE      EDLO                    ;BR TO EDIT-LO IF IN SEARCH
              BIT      #400,@#LITES
              BNE      ES40                    ;BR IF ON EDIT-LO
              CMP      MAGN,#63.
              BLT      ELSTT                   ;BR IF LO-MAG (IN EDIT-HI)
              JMP      EHRST                   ;HI-MAG (IN EDIT-HI)
ES40:         CMP      MAGN,#63.               ;IN EDIT-LO, TEST MAG
              BLT      ELRST                   ;BR IF LO-MAG
              JMP      EHSTT                   ;HI-MAG, START EDIT-HI
;
EDLO:         CLR      @CSPQ                   ;MARK END OF QUEUE
              DSI      20
              CLR      NSPAL
              CMP      MAGN,#63.
              BLT      ELSTT                   ;BR IF LO MAG
              JMP      EHSTT                   ;START ED-HI IF HI MAG
ELSTT:        .CALL    LED,<SQLED,NSPAL>
              LOFF     1200
              LON      400                     ;TURN ON EDIT LO LIGHT
              MOV      #ELAC,@#ACSPA           ;ACCEPT SPRD
              MOV      #ELRJ,@#RJSPA           ;REJECT SPRD
              MOV      #ELNX,@#NXSPA           ;NEXT SPRD
              MOV      #ELLA,@#LASPA           ;LAST SPRD
ELRST:        CLR      SPN                     ;SPREAD NUMBER
              MOV      #SPQ,CSPQ
              MOV      R0,-(SP)                ;SAVE R0 ON THE STACK
EDNXT:        MOV      CSPQ,R0
              LOFF     40000                   ;TURN OFF FOCUS LITE IN CASE FOCUS
              ENI      400                     ;WAS INTERRUPTED BY ARNL
              INC      SPN
              .CALL    LED,<SNLED,SPN>
```

```
              LOFF     2000
              MOV      (R0)+,X
              BEQ      JEDHI           ;BR IF END OF QUEUE
              BPL      EL30            ;BR IF NOT ALREADY ACCEPTED
              LON      2000            ;INDICATE ALREADY ACCEPTED
    EL30:     MOV      (R0)+,Y
              MOV      R0,CSPQ         ;SAVE UPDATED Q POINTER
              MOV      (SP)+,R0        ;RESTORE R0
              .CALL    IXYABS,<X,Y>    ;INITIATE MOTOR MOVE TO X,Y
              MOV      #ESDR,@#SDFPA
              MOV      #1,FFLAG
              ENI      4               ;ENABLE SPRD DATA READY INTERRUPT
              RTI
    ;
    JEDHI:    JMP      EDHI
    ;
    ESDR:     ENI      100             ;ALLOW RJ DURING FOCUS
              NEG      FFLAG           ;EDIT SPREAD DATA READY
              BPL      ES20            ;BR IF NO FOCUS THIS TIME
              JMP      FOCSUB
    ES20:     DSI      4               ;NOW DISABLE THE SDR INTERRUPT
              .CALL    RMCI            ;RELASE MCI FROM COMPUTER CONTROL
              LON      100000          ;TURN ON OPERATOR ACTION LIGHT
              RTI
    ;
    ELAC:     HINT     ACKEY           ;ACCEPT SPRD INTERRUPT
              MOV      CSPQ,R0
              TST      -4(R0)
              BPL      ELA20           ;BR IF NOT PREVIOUSLY ACCEPTED
              DEC      NSPAL           ;DON'T COUNT IT TWICE
    ELA20:    MOV      @#YCPR,-(R0)    ;STORE UPDATED Y AND X
              MOV      @#XCPR,-(R0)
              NEG      @R0             ;MAKE X NEGATIVE TO FLAG THIS SPREAD
              INC      NSPAL
              .CALL    LED,<SQLED,NSPAL>
              CMP      NSPAL,NLMAX
              BGE      EDHI            ;BR IF ENOUGH FOUND
              BR       EDNXT           ;GO TO NEXT SPREAD
    ;
    ELRJ:     HINT     RJKEY           ;REJECT SPREAD INTERRUPT
              MOV      CSPQ,R0
              TST      -4(R0)
              BPL      JEDNXT          ;BR IF NOT PREVIOUSLY ACCEPTED
              NEG      -4(R0)          ;MARK IT REJECTED X+
              DEC      NSPAL
              .CALL    LED,<SQLED,NSPAL>
              BR       JEDNXT
    ELNX:     HINT     NXKEY           ;NEXT SPREAD
              BR       JEDNXT
    ;
    ELLA:     HINT     LAKEY           ;LAST SPREAD
              SUB      #4,CSPQ         ;MOVE BACK TO CURRENT SPREAD
              DEC      SPN
              BEQ      JEDNXT          ;BR IF FIRST SPREAD IN QUEUE
              SUB      #4,CSPQ         ;BACK UP ANOTHER SPREAD
              DEC      SPN
    JEDNXT:   JMP      EDNXT
    ;
    EDHI:     MOV      (SP)+,R0        ;RESTORE R0
              GETKB    M5              ;REQUEST HI MAGNIFICATION
    EHSTT:    LOFF     1400
              LON      200             ;TURN ON EDIT HI LIGHT
              MOV      #EHAC,@#ACSPA   ;SET UP EDIT HI INTERRUPTS
              MOV      #EHRJ,@#RJSPA
              MOV      #EHNX,@#NXSPA
              MOV      #EHLA,@#LASPA
              MOV      #EDEN,@#EDENA
              ENI      200
              CLR      NSCAN
              .CALL    LED,<SQLED,NSCAN>
    EHRST:    CLR      SPN
              MOV      #SPQ,CSPQ
              MOV      R0,-(SP)        ;SAVE R0
    EHNXT:    MOV      CSPQ,R0
```

```
            LOFF    40000           ;TURN OFF FOCUS LITE IN CASE FOCUS
            ENI     400             ;WAS INTERRUPTED BY ARNL
EH10:       INC     SPN
            MOV     (R0)+,X
            BEQ     JEDEND          ;BR IF END OF QUEUE
            BMI     EH20            ;BR IF -X (ACCEPTED IN EDIT LO)
            TST     (R0)+
            BR      EH10            ;TRY THE NEXT SPREAD
EH20:       LOFF    2000
            MOV     (R0)+,Y
            BPL     EH30            ;BR IF NOT ALREADY ACCEPTED
            LON     2000            ;TURN ON LITE
            BR      EH40            ;NO ADJUSTMENT IF ALREADY ACCEPTED
EH30:       .CALL   MFST,<MAGN,FPOS>   ;SETUP XADJ AND YADJ
            SUB     XADJ,X          ;X IS NEGATIVE, ADJUST FOR CENTRALITY
            ADD     YADJ,Y          ;ADJUST POSITIVE Y FOR CENTRALITY
EH40:       MOV     R0,CSPQ
            MOV     (SP)+,R0        ;RESTORE R0
            .CALL   LED,<SHLED,SPN>
            .CALL   IXYABS,<X,Y>    ;INITIATE MOVE TO X,Y
            MOV     #ESDR,@#SDFPA
            MOV     #1,FFLAG
            ENI     4               ;ENABLE SPRD DATA READY INTERRUPT
            RTI
JEDEND.     JMP     EDEND
;
EHAC:       HINT    ACKEY           ;ED HI ACCEPT
            MOV     CSPQ,R0
            TST     -2(R0)
            BPL     EHA20           ;BR IF NOT ALREADY ACCEPTED AT HI MAG
            DEC     NSCAN           ;DON'T COUNT IT TWICE
EHA20:      MOV     @#YCPR,-(R0)
            NEG     @R0             ;STORE -X AND -Y
            MOV     @#XCPR,-(R0)
            NEG     @R0
            INC     NSCAN
            .CALL   LED,<SQLED,NSCAN>
            SUB     #SPQ,R0         ;FIND LOC IN SPR
            ASH     #-2,R0
            INCB    SPR(R0)         ;INCREMENT SPREAD RATING
            MOV     (SP)+,R0
            LON     100000
            ENI     100
            RTI                     ;RETURN FOR ANOTHER AC OR NX
;
EHRJ:       HINT    RJKEY           ;ED HI REJECT
            MOV     CSPQ,R0
            TST     -(R0)
            BPL     EHNXT
            NEG     @R0             ;MAKE IT POSITIVE IF PREVIOUSLY ACCEPTED
            DEC     NSCAN
            TST     -(R0)           ;GET LOC IN SPR FOR THE SPREAD
            SUB     #SPQ,R0
            ASH     #-2,R0
            CLRB    SPR(R0)         ;ZERO THE SPREAD RATING
            .CALL   LED,<SQLED,NSCAN>
            BR      JEHNXT
;
EHNX:       HINT    NXKEY
            CMP     NSCAN,MAXSC
            BGE     EDEND           ;BR IF ENOUGH FOUND
            BR      JEHNXT
;
EHLA:       HINT    LAKEY           ;ED HI LAST
            SUB     #4,CSPQ
            DEC     SPN
            BEQ     JEHNXT          ;BR IF FIRST SPRD IN Q
EHL20:      SUB     #4,CSPQ         ;MOVE BACK ANOTHER SPREAD
            DEC     SPN
            BEQ     JEHNXT
            TST     @CSPQ
            BPL     EHL20           ;BR IF NOT -X
JEHNXT:     JMP     EHNXT           ;LAST -X
;
EDEN:       .CALL   LED,<LKLED,EEKEY>
```

```
              MOV     R0,-(SP)
EDEND:  LOFF    102200            ;TURN OFF ED HI AND ACC LIGHT
        DSI     104               ;DISABLE ARNL AND SDR
        TST     NSCAN
        BEQ     EE30              ;BR IF NONE TO SCAN
        DSI     40                ;DISABLE EDIT START
        JSR     R5,SORTQ          ;SORT THE QUEUE ACCORDING TO RATING
        MOV     #SPQ,CSPQ
        CLR     SPN
        .CALL   UPARAM,<L512,SOURCE,ONE>    ;SAVE INFO FOR RESTART
        CLR     XOFF
        CLR     YOFF
        .CALL   GNSTS             ;GET FIRST SPREAD TO SCAN
        BR      EE40
EE30:   MOV     #SRST,@#SRSTA     ;ALLOW SEARCH START
EE40:   MOV     (SP)+,R0          ;RESTORE R0
        CLRB    SFLAG
        RTI
;
;
GNS::   MOV     R0,-(SP)          ;GET NEXT SPREAD TO SCAN SBRTE
        MOV     CSPQ,R0
        MOV     #SPSRCH,@#SRSTA
        ENI     10                ;ENABLE SPIRAL SEARCH
EE10:   INC     SPN               ;LOOK FOR FIRST -Y
        MOV     (R0)+,XVAL
        BEQ     GNEX              ;BR IF END OF QUEUE
        MOV     (R0)+,YVAL
        BPL     EE10              ;BR IF NOT ACCEPTED
        NEG     XVAL              ;MAKE XVAL AND YVAL POSITIVE
        NEG     YVAL
        ADD     XOFF,XVAL         ;ADD OFFSET
        ADD     YOFF,YVAL
        MOV     R0,CSPQ
        .CALL   IXYABS,<XVAL,YVAL>          ;INITIATE MOTOR MOVE
        MOV     @#PSW,-(SP)
        JSR     PC,FOCSUB         ;START FOCUSING
GNEX:   .CALL   LED,<SNLED,SPN>
        MOV     (SP)+,R0
        RTS     R5
;
SPSRCH: .CALL   LED,<LKLED,SSKEY>           ;SPIRAL SEARCH
        CLR     XCTR              ;INITIALIZE SPIRAL SEARCH
        CLR     YCTR
        CLR     SPLEN
        MOV     #SPSDR,@#SDFPA
        MOV     #SRHA,@#SRHAA
        MOV     #SRRS,@#SRRSA
        ENI     24                ;ENABLE SEARCH HALT & RESUME & SDR
        RTI
SPSDR:  BIT     #60000,@#SPRD     ;SEE IF ANYTHING THERE
        BEQ     SGNP              ;BR IF NOT
        NEG     FFLAG
        BPL     SGNP              ;BR IF NO NEED TO FOCUS
        JMP     FOCSUB
SGNP:   TST     XCTR
        BGT     SXOK              ;BR IF ANOTHER X MOVE IS OK
        TST     YCTR
        BGT     SYOK              ;BR IF ANOTHER Y MOVE IS OK
        INC     SPLEN             ;INCREMENT SPIRAL LENGTH
        MOV     SPLEN,XCTR        ;RELOAD X AND Y COUNTERS
        MOV     SPLEN,YCTR
        NEG     SPSTEP            ;CHANGE DIRECTION
SXOK:   .CALL   IXREL,SPSTEP
        DEC     XCTR
        RTI
SYOK:   .CALL   IYREL,SPSTEP
        DEC     YCTR
        RTI
;
SPLEN:  .WORD   .-.               ;SPIRAL LENGTH
SPSTEP: .WORD   5                 ;OR -5
YCTR:   .WORD   .-.
BIG:    .WORD   9900.
XOFF:   .WORD   .-.
YOFF:   .WORD   .-.
```

```
FFLAG:  .WORD   1               ;FLAG OSCILLATES FROM 1 TO -1
OIEAPD: .WORD   0
OSDFPA: .WORD   0
F:      .WORD   0
OLDF:   .WORD   0
N:      .WORD   0
;
SSKEY:  .WORD   1
SHAKEY: .WORD   2
RSKEY:  .WORD   3
ESKEY:  .WORD   4
ACKEY:  .WORD   5
RJKEY:  .WORD   6
NXKEY:  .WORD   7
LAKEY:  .WORD   8.
EEKEY:  .WORD   9.
FOKEY:  .WORD   10.
KRKEY:  .WORD   11.
MAXSC:  .WORD   300.            ;MAXIMUM TO SCAN
NLMAX:  .WORD   300.            ;MAXIMUM TO ACCEPT IN EDIT-LO
X:      .WORD   -.
Y:      .WORD   -.
FPOS:   .WORD   -.
MAGN:   .WORD   -.
FCNT:   .WORD   15.+-.          ;TIME TO FOCUS COUNTER
IXDEL:  .WORD   -13.            ;INITIAL XDEL
XDEL:   .WORD   -13.
YDEL:   .WORD   -13.
XCTR:   .WORD   75.+-.
XLGTH:  .WORD   75.
FVAL:   .WORD   -3800.          ;INITIAL FOCUS AFTER CALIBRATION
NSP:    .WORD   0               ;NUMBER OF SPREADS IN THE QUEUE
NSPAL:  .WORD   0
MAXNSP: .WORD   299.            ;MAXIMUM SEARCH QUEUE
LSPR:   .WORD   150.            ;LENGTH OF SPR IN WORDS
L512:   .WORD   512.
ZERO:   .WORD   0
NP:     .WORD   -.
PAR:    .BLKW   20.
MAXNP:  .WORD   20.
SPBUF:  .BLKB   83.
        .NLIST  BEX
M1:     .ASCIZ  / ENTER PATIENT ID /
M2:     .ASCIZ  / ENTER PATIENT SEX /
M3:     .ASCIZ  / ENTER SLIDE ID /
M4:     .ASCIZ  / ENTER REQUEST /
M5:     .ASCIZ  / CHANGE TO HIGH MAGNIFICATION /<CR><LF><LF>
M6:     .ASCIZ  / PLEASE CALIBRATE THE MICROSCOPE /<CR><LF><LF>
M7:     .ASCIZ  / ILLEGAL ID, SEARCH NOT STARTED/<LF><LF>
M8:     .ASCIZ  / ENTER SOURCE CODE  (NEGATIVE FOR BANDED) /
        .BLKB   GNSTS+7000-.    ;MAKE LENGTH CONSTANT
        .END

.TITLE  DLINE - DISPLAY A LINE ON THE INTERACTIVE DISPLAY
        CALMS VERSION
        DRWC=172410             ;WORD COUNT REGISTER
        DRBA=DRWC+2             ;BUS ADDRESS REGISTER
        DRST=DRWC+4             ;STATUS AND COMMAND REGISTER
        YREG=164106             ;LINE REGISTER
        XREG=164104             ;SAMPLE REGISTER
        GSST=164100             ;GRAY SCALE STATUS/COMMAND REGISTER
        GSPC=164110             ;GRAY SCALE PIXEL COUNT REGISTER
        GSXCP=164112            ;GRAY SCALE X CURSOR POSITION
        GSYCP=164114            ;GRAY SCALE Y CURSOR POSITION
        WRCMD=4                 ;WRITE COMMAND
        ERCMD=6                 ;ERASE COMMAND
        EWCMD=2                 ;ERASE/WRITE COMMAND
        RBIT=10                 ;REPLICATE BIT
        SWR=177570
        LF=12
        .MCALL  BIN2O,.CALL,.PAUSE
;
;       CALL DWAIT
;
DWAIT:  TST     @#GSST          ;TEST READY BIT
```

```
            BPL     DWAIT                   ;BR IF NOT READY
            RTS     R5
;
;           CALL DCLEAR
;
DCLEAR:     JSR     R5,DWAIT
            INC     @#GSST                  ;STORE CLEAR COMMAND
            RTS     R5
;
;           CALL DLINE(LOC,Y,X,NS,REPL,ERASE) -1=ERASE ONLY
;
DLINE:      JSR     R4,SAVER
            JSR     R5,DWAIT
            MOV     @4(R5),@#YREG           ;STARTING LINE ON DISPLAY
            MOV     #WRCMD,R1
            BIS     #400,@#DRST             ;ASSUME WRITE, SET CYCLE BIT
            TST     @14(R5)
            BEQ     NOER                    ;BR IF NO ERASE
            MOV     #EWCMD,R1               ;ASSUME ERASE/WRITE
            TST     @14(R5)
            BPL     NOER                    ;BR IF ERASE/WRITE
            MOV     #ERCMD,R1               ;ERASE ONLY
            BIC     #400,@#DRST             ;CLEAR CYCLE BIT
NOER:       MOV     @10(R5),R3              ;NS
            MOV     @12(R5),R2              ;REPL
            BEQ     NOREP                   ;BR IF NO REPLICATION
            BIS     #RBIT,R1                ;INSERT REPLICATE BIT
            ASL     R3                      ;2*NS
NOREP:      NEG     R3
            MOV     R3,@#GSPC               ;STORE PIXEL COUNT -N OR -2*N
REP:        MOV     2(R5),@#DRBA            ;LOC TO BUS ADDRESS REGISTER
            MOV     @6(R5),@#XREG           ;STARTING SAMPLE ON DISPLAY
            MOV     @10(R5),R3              ;SAMPLE COUNT
            INC     R3
            ASR     R3
            NEG     R3
            MOV     R3,@#DRWC               ;STORE NEGATIVE WORD COUNT
            MOV     R1,@#GSST               ;STORE WRITE OR ERASE/WRITE COMMAND
            INC     @#DRST                  ;ISSUE GO
            TST     R2
            BLE     EXIT                    ;BR IF DONE
            BIT     #10,@#SWR               ;REPLICATE UNLESS SW 3 IS UP
            BNE     EXIT                    ;EXIT IF SW 3 UP
            CLR     R2
            JSR     R5,DWAIT                ;WAIT
            INC     @#YREG                  ;STEP TO NEXT LINE
            BR      REP                     ;GO DO THE REPLICATION
EXIT:       JMP     RESTR
;
;           CALL SC TO SET UP THE CURSOR
;
SC:         JSR     R4,SAVER
            MOV     #3,R3
SC10:       MOV     #32.,X
            MOV     #32.,Y                  ;WRITE A MARK AT 32,32
            .CALL   DLINE,<ZERO,Y,X,TEN,ONE,ZERO>
            MOV     #9.,R4
SC20:       ADD     #2,Y
            .CALL   DLINE,<ZERO,Y,X,ONE,ONE,ZERO>
            SOB     R4,SC20
            SOB     R3,SC10                 ;REPEAT TO MAKE IT WHITE ENOUGH
            MOV     #3,R3
SC30:       MOV     #973.,Y
            MOV     #992.,X                 ;WRITE A MARK AT 992,992
            MOV     #9.,R4
SC40:       .CALL   DLINE,<ZERO,Y,X,ONE,ONE,ZERO>
            ADD     #2,Y
            SOB     R4,SC40
            MOV     #973.,X
            .CALL   DLINE,<ZERO,Y,X,TEN,ONE,ZERO>
            SOB     R3,SC30
            .CALL   TYPE,<M3,ZERO>          ;TELL OPERATOR TO MOVE CURSOR
SC50:       .CALL   PARAM,<NP,PAR,FIVE>
            JSR     R5,ULDR                 ;CHECK FOR REQUESTED CURSOR MOVE
            BR      SC50                    ;CURSOR WAS MOVED
            MOV     @#GSYCP,YZ              ;STORE Y ZERO ADJUSTMENT
```

```
             MOV      @#GSXCP,XZ        ;STORE X ZERO ADJUSTMENT
             .CALL    TYPE,<M4,ZERO>    ;MOVE TO LOWER RIGHT
SC60:        .CALL    PARAM,<NP,PAR,FIVE>
             JSR      R5,ULDR
             BR       SC60              ;CURSOR WAS MOVED
             MOV      @#GSYCP,YD
             SUB      YZ,YD             ;STORE Y DELTA
             MOV      @#GSXCP,XD
             SUB      XZ,XD
             BIC      #176000,YZ
             BIC      #176000,XZ
             .CALL    WPARAM,<FOUR,YZ,INTPH>  ;SAVE THE ADJUSTMENTS ON DISK
             JMP      RESTR
;
RCA::        .CALL    PPARAM,<NP,YZ,FOUR,INTPH>    ;READ ADJUSTMNTS FROM DISK
             RTS      R5
;
;            CALL CURSOR(YCP,XCP[,LINE,SAMP])
;
CURSOR::JSR  R4,SAVER
             MOV      @#GSYCP,R0
             BIC      #176000,R0
             SUB      YZ,R0             ;ADJUST THE READING
             MUL      #960.,R0
             DIV      YD,R0
             ADD      #32.,R0           ;AY=(Y-YZ)*960/YD+32
             ASL      R1
             CMP      R1,YD
             BLT      C20
             INC      R0                ;ROUND UP
C20:         MOV      @#GSXCP,R2
             BIC      #176000,R2
             SUB      XZ,R2             ;ADJUST THE X READING
             MUL      #960.,R2
             DIV      XD,R2
             ADD      #32.,R2
             ASL      R3
             CMP      R3,XD
             BLT      C40
             INC      R2                ;ROUND UP
C40:         MOV      R0,@2(R5)         ;STORE YCP
             MOV      R2,@4(R5)         ;STORE XCP
             BIT      #4,@R5
             BEQ      CEX               ;BR IF NOT 4 PARAMETERS
             ASR      R0
             INC      R0
             MOV      R0,@6(R5)         ;LINE=YCP/2+1
             ASR      R2
             INC      R2
             MOV      R2,@10(R5)        ;SAMP=XCP/2+1
CEX:         JMP      RESTR
;
MCU::        SUB      #2,@#GSYCP        ;CALL MCU TO MOVE CURSOR UP
             RTS      R5
MCD::        ADD      #2,@#GSYCP        ;CALL MCD TO MOVE CURSOR DOWN
             RTS      R5
MCL::        SUB      #2,@#GSXCP        ;CALL MCL TO MOVE CURSOR LEFT
             RTS      R5
MCR::        ADD      #2,@#GSXCP        ;CALL MCR TO MOVE CURSOR RIGHT
             RTS      R5
;
UDLR::       MOV      @2(R5),PAR        ;CALL UDLR(PAR) EXTERNAL CALL
             BR       UL20
                                        ;CALL ULDR  INTERNAL CALL
ULDR:        TST      NP                ;CHECK FOR U,L,D, OR R TYPED
             BNE      UL20              ;BR IF A LETTER WAS TYPED
             TST      (R5)+             ;SET FOR NO TYPEIN RETURN
             RTS      R5
UL20:        CMPB     PAR,#'U
             BNE      UL30
             DEC      @#GSYCP           ;MOVE CURSOR UP ONE STEP
UL30:        CMPB     PAR,#'D
             BNE      UL40
             INC      @#GSYCP           ;MOVE CURSOR DOWN ONE STEP
UL40:        CMPB     PAR,#'L
             BNE      UL50
```

```
            DEC      @#GSXCP         ;MOVE CURSOR LEFT ONE STEP
    UL50:   CMPB     PAR,#'R
            BNE      UL60
            INC      @#GSXCP  ;MOVE CURSOR RIGHT ONE STEP
    UL60:   RTS      R5              ;TYPEIN RETURN
    ;
    ZERO:   .WORD    0,0,0,0,0
    ONE:    .WORD    1
    FOUR:   .WORD    4
    FIVE:   .WORD    5
    TEN:    .WORD    10.
    INTPH:  .WORD    7               ;INT1 PHASE NUMBER
    PAR:    .BLKW    5
            X=PAR
            Y=PAR+2
            NP=PAR+4
            .NLIST   BEX
    M3:     .ASCIZ   / MOVE CURSOR TO UPPER LEFT MARK/
    M4:     .ASCIZ   / MOVE CURSOR TO LOWER RIGHT MARK/
            .EVEN
    YZ:     .WORD    32.
    YD:     .WORD    960.
    XZ:     .WORD    32.
    XD:     .WORD    960.
            .BLKB    DWAIT+1500-.
            .END

.TITLE   MCISUB - MCI SUBROUTINES
    ;                CALNS VERSION
            .MCALL   CALL,.PAUSE
            XCPR==164040
            YCPR==164042
            FCPR==164044
            SMSC==164046
            IEAPD==164050
            SPRD==164074
            FOCP==164076
            LITES==164134
            LEDS==164136
            SRSTA==300              ;SEARCH START INTERRUPT ADDRESS
            SRHAA==304              ;SEARCH HALT
            SRRSA==310              ;SEARCH RESUME
            EDSTA==314              ;EDIT START
            ACSPA==320              ;ACCEPT SPREAD
            RJSPA==324              ;REJECT SPREAD
            NXSPA==330              ;NEXT SPREAD
            LASPA==334              ;LAST SPREAD
            EDENA==340              ;EDIT END 9
            FOCA==344               ;FOCUS 10
            KYRQA==350              ;KBD REQUEST 11
            SDFPA==374              ;SPRD/FOCUS DATA READY INTERRUPT ADDR
    ;
            ;CURRENT ORIGIN IS 50500
    ;
    CMCI::  BIS      #40000,@#SMSC   ;CAPTURE MCI
            RTS      R5
    RMCI::  BIC      #40000,@#SMSC   ;RELEASE MCI
            RTS      R5
    XWAIT:  BIT      #4000,@#SMSC
            BNE      XWAIT
            RTS      R5
    YWAIT:  BIT      #200,@#SMSC
            BNE      YWAIT
            RTS      R5
    FWAIT:  BIT      #10,@#SMSC
            BNE      FWAIT
            RTS      R5
    ;
    IXYABS::.CALL    XWAIT           ;CALL IXYABS(X,Y) TO INITIATE ABS MOVE
            .CALL    YWAIT
            .CALL    CMCI
            MOV      @2(R5),X
            BPL      IXY20
```

```
            NEG     X                       ;MAKE X POSITIVE
IXY20:  MOV     @4(R5),Y
            BPL     IXY30
            NEG     Y                       ;MAKE Y POSITIVE
IXY30:  SUB     X,@#XCPR                ;INITIATE MOVE TO X,Y
            SUB     Y,@#YCPR
            RTS     R5
;
IXREL:  .CALL   XWAIT                   ;CALL IXREL(XDEL) TO INITIATE X MOVE
            .CALL   CMCI
            MOV     @2(R5),@#XCPR
            RTS     R5
IYREL:  .CALL   YWAIT
            .CALL   CMCI
            MOV     @2(R5),@#YCPR
            RTS     R5
IFREL:  .CALL   FWAIT                   ;CALL IFREL(FDEL) TO INITIATE FOCUS MOVE
            .CALL   CMCI
            MOV     @2(R5),@#FCPR
            RTS     R5
CFOC:   MOV     @#FOCP,TEMP             ;CALL CFOC(F) TO CALCULATE FOCUS
            CLR     @2(R5)
            MOVB    TEMP+1,@2(R5)
            CLRB    TEMP+1
            ADD     TEMP,@2(R5)             ;FOCUS=F1+F2
            RTS     R5
IXCPR:  BIS     #400,@#SMSC             ;INITIALIZE XCPR
            RTS     R5
IYCPR:  BIS     #20,@#SMSC
            RTS     R5
IFCPR:  BIS     #1,@#SMSC
            RTS     R5
;
LED:    JSR     R4,SAVER                ;CALL LED(CODE,VAL)
            MOV     @2(R5),R0               ;CODE TO R0
            ASH     #13.,R0                 ;SHIFT TO HI ORDER 3 BITS
            MOV     @4(R5),R1               ;VALUE TO R1
            BIC     #177000,R1
            ADD     R1,R0
            MOV     R0,@#LEDS               ;OUTPUT DISPLAY
            JMP     RESTR
;
MFST:   JSR     R4,SAVER                ;CALL MFST(MAGN,FPOS)
            MOV     @#IEAPD,R0              ;FLTR/MAGN POS REG TO R0
            MOV     R0,R1                   ;ALSO R1
            ASH     #-10.,R0
            BIC     #177770,R0              ;MASK OUT MAGN
            MOVB    LENS(R0),MAGN           ;STORE MAGN
            CLR     FSTEP                   ;CLEAR TOP BYTE
            MOVB    FSTAB(R0),FSTEP         ;STORE FOCUS STEP SIZE
            MOVB    FLTAB(R0),FLAST         ;STORE LAST STEP SIZE
            MOVB    XATAB(R0),R2            ;ADJUSTMENT FOR NON-CENTRALITY
            MOV     R2,XADJ
            MOVB    YATAB(R0),R2            ;ADJUSTMENTS ARE FOR 63 AND 100
            MOV     R2,YADJ                 ;RELATIVE TO 40
            MOV     MAGN,@2(R5)
            ASH     #-13.,R1                ;SHIFT FILTER CODE
            BIC     #177770,R1
            MOV     R1,@4(R5)
            MOV     R1,FPOS
            .CALL   LED,<OMLED,MAGN>        ;DISPLAY MAGNIFICATION
            JMP     RESTR
;
SORTQ:  JSR     R4,SAVER                ;SUBROUTINE TO SORT THE QUEUE
            MOV     #SPR,R3                 ;R3 AND R4 POINT TO LOW QUEUE POSITIONS
            MOV     #SPQ,R4                 ;THE CURRENT HI RATING IS MOVED HERE
            MOV     NSP,NSR                 ;INITIALIZE # SPREADS REMAINING
SQ20:   CLR     R0                      ;R0 HAS MAX RATING
            MOV     R3,R1                   ;USE R1 TO EXAMINE REMAINING SPRDS
            MOV     NSR,R2
            BEQ     SQEX                    ;BR IF NO SPREADS REMAIN
SQ30:   CMPB    (R1)+,R0                ;EXAMINE A RATING
            BLE     SQ40                    ;BR IF NOT GREATER THAN MAX
            MOVB    -(R1),R0                ;STORE NEW MAX
            MOV     R1,REG1                 ;SAVE R1
```

```
        INC     R1
SQ40:   SOB     R2,SQ30         ;BR IF MORE TO EXAMINE
        DEC     HSR
        TST     R0
        BEQ     SQEX            ;BR IF ALL HAVE BEEN SORTED
        MOV     REG1,R1
        MOV     R1,R2           ;R2 WILL HAVE POSITION IN SPQ
        SUB     #SPR,R2
        ASH     #2,R2
        ADD     #SPQ,R2
        MOVB    @R1,R0
        MOVB    @R3,@R1         ;SWITCH RATINGS
        MOVB    R0,(R3)+
        MOV     @R2,R0          ;SWITCH X AND Y VALUES
        MOV     @R4,(R2)+
        MOV     R0,(R4)+
        MOV     @R2,R0
        MOV     @R4,@R2
        MOV     R0,(R4)+        ;R3 AND R4 ARE UPDATED
        BR      SQ20            ;GO GET THE NEXT HIGHEST
SQEX:   CLR     @R4             ;MARK END OF QUEUE
        CLRB    @R3             ;MARK END OF RATINGS
        JMP     RESTR
;
MAGN:   .WORD   0
FPOS:   .WORD   0
LENS:   .BYTE   0,40.,64.,100.,101.,4.,63.,0
FSTAB:  .BYTE   1,15.,10.,8.,8.,25.,8.,1
FLTAB:  .BYTE   1,8.,5.,2,2.,15.,4,1
XATAB:  .BYTE   0,0,0,3,0,0,9.,0    ;XADJ FOR 63 AND 100 REL TO 40
YATAB:  .BYTE   0,0,0,3,0,0,2,0     ;YADJ
XADJ:   .WORD   .-.
YADJ:   .WORD   .-.
FSTEP:  .WORD   .-.
FLAST:  .WORD   .-.
X:      .WORD   0
Y:      .WORD   0
SNLED:  .WORD   0               ;CODE FOR SPREAD NUMBER DISPLAY
SQLED:  .WORD   1               ;SCAN QUEUE
AQLED:  .WORD   2               ;ANALYSIS QUEUE
OMLED:  .WORD   3               ;OBJ MAGN
HQLED:  .WORD   4               ;HARD COPY QUEUE
LKLED:  .WORD   5               ;LAST KEY
TEMP:   .WORD   0
HSR:    .WORD   .-.
REG1:   .WORD   .-.
        .BLKB   CMCI+1300-.     ;MAKE LENGTH CONSTANT
        .END
        .TITLE  RPARAM  READ AND WRITE PARAMETERS UNDER CALMS
        .MCALL  .CALL
        BUFSIZ=60
;
APHASE: MOV     @2(R5),NPHASE   ;ASSIGN NEXT PHASE CALL APHASE(N)
        RTS     R5
;
WPARAM: JSR     R4,SAVER        ;CALL WPARAM(NP,PAR,PNUM)
        MOV     @2(R5),R0       ;NP
        MOV     4(R5),WP20+12   ;PAR LOCATION
        MOV     @6(R5),R1       ;PNUM
        MOV     R1,PREC
        ASL     R1
        ADD     #NPTAB-2,R1
        MOV     R0,@R1          ;STORE NP
WP20:   .CALL   WRITE,<PMVB,PREC,.-.>   ;WRITE THE PARAMETER DATASET
        JMP     RESTR
;
RPARAM: JSR     R4,SAVER        ;CALL RPARAM(NP,PAR,NPMAXE,PNUM)
        MOV     PNUM,R0
        BIT     #4,@R5
        BEQ     RP10            ;BR IF NOT 4 PARAMETERS
        MOV     @10(R5),R0      ;USE PNUM FROM PARAMETER LIST
RP10:   MOV     R0,PREC
        ASL     R0
        ADD     #NPTAB-2,R0
```

```
            MOV     @R0,02(R5)      ;STORE NP FOR THIS PHASE
            BEQ     RP40            ;SKIP THE READ IF NP=0
            CMP     @R0,06(R5)
            BHI     RPERR           ;BR IF NP GT NPMAX
            MOV     4(R5),RP20+14
            MOV     @R0,PMYB+BUFSIZ ;SET UP TO READ NP WORDS
            ASL     PMYB+BUFSIZ
RP20:       .CALL   READ,<PMYB,PREC,INDEX,.-.>     ;READ THE PARAMETER DS
RP40:       JMP     RESTR
RPERR:      MOV     PNUM,-(SP)      ;TOO MANY PARAMETERS
            MOV     #1770,-(SP)
            IOT                     ;PRINT F370
;
PREC:       .WORD   .-.
INDEX:      .WORD   .-.
            .END

.TITLE  SCAN - SDS DATA CAMERA DRIVER
;
;CALMS VERSION   CALL SCAN(DUNIT,FILPEX)
;THIS VERSION USES MYIO IN DOUBLE BUFFERING 24
;TV VERTICAL LINES AT A TIME FROM CAMERA TO A DISK DATA SET
;IN NON-INTERRUPT MODE.
;THE PICTURE IS DISPLAYED ON THE GRAY SCALE.
;SECTOR HISTOGRAMS ARE GENERATED AS THE PIXELS ARE SCANNED.
;THRESHOLDS ARE FOUND AFTER EACH GROUP OF SECTORS AND TYPED
;OUT WHILE THE NEXT ROW OF SECTORS IS SCANNED IF SW1 IS UP.
;THE SCAN AREA IS VARIABLE WITH A MAXIMUM OF 512 LINES AND
;400 SAMPLES PER LINE.
;
            .GLOBL  OPEN,GET,PUT,CLOSE,PARAM,QPRINT,PLABEL,PARBUF
            .GLOBL  AFILE,SCAN
            .MCALL  .PARAM,.EXIT,.CVTDT,.CALL,.PAUSE
            .PARAM
            .NLIST  BEX
;
            LF=12
            CR=15
            COMD=164020
            STAT=164020
            XREG=164022
            YREG=164024
            ZREG=164026
            XJREG=164030    ;X JOYSTICK REGISTER
            YJREG=164032    ;Y JOYSTICK REGISTER
;
SCAN:       MOV     R5,-(SP)        ;SAVE R5
            MOV     2(R5),S100+10   ;CALL SCAN(DUNIT,FILPEX) STORE DUNIT
            MOV     4(R5),S100+12   ;STORE CALMS DATA SET NAME
            MOV     #2,UIC          ;AND UIC OF [2,2]
S100:       .CALL   AFILE,<BUF,.-.,.-.,UIC,UIC>    ;ASSIGN DEFAULT FILE
            .CALL   OPEN,<BUF,SIZE,ONE,ONE,LNAME>  ;OPEN DISK DATA SET
S102:       .CALL   TYPE,<M1,ZERO>
TFCI:       BIT     #400,@#IEAPD    ;TEST IF STILL FOCUSING
            BEQ     TFCI            ;BR IF SO
            .CALL   RMCI            ;RELEASE MCI TO OPERATOR
            .CALL   PARAM,<NPAR,PAR,NPMAX>  ;READ LABEL
            MOV     SOURCE,L+12.    ;MOVE INFO INTO LABEL
            MOV     PANUM,L+14.
            MOV     SLNUM,L+16.
            MOV     @#XCPR,L+18.
            MOV     @#YCPR,L+20.
            .CALL   OUTCON,<SOURCE,L+81.,TWO>
            .CALL   MVL,<PANUM,L+92.,LPANUM>       ;MOVE PANUM INTO LABEL
            MOVB    PASEX,L+103.
            .CALL   MVL,<SLNUM,L+112.,LSLNUM>
            TST     NPAR
            BEQ     S106            ;BR IF NO PARAMETERS (USE OLD LABEL)
            CMP     NPAR,#2
            BNE     S104            ;BR IF NOT TWO PARAMETER WORDS
            CMP     #"PQ,PAR
            BNE     NOTPQ           ;BR IF NOT PRINT Q REQUEST
            .CALL   PRINTQ,<L+72.,SPR,SPQ>
```

```
           JMP     S102
NOTPQ:     CMP     #'A,PAR
           BNE     NOTAB           ;BR IF NOT ABORT
           .CALL   APHASE,ZERO
           JMP     S330
NOTAB:     CMP     #'Z,PAR
           BNE     S103            ;BR IF NOT ZERO QUEUE REQUEST
           CLR     NSCAN           ;ZERO NSCAN
           .CALL   APHASE,ZERO     ;AND ABORT THIS SCAN
           JMP     SEXIT
S103:      CMP     #'EX,PAR
           BNE     S104            ;SCAN IF EX WAS NOT TYPED
           JMP     SEXIT
S104:      CMP     #'DS,PAR
           BNE     S105            ;BR IF NOT DUMMY SCAN
           INC     DFLAG           ;SET DFLAG
           BR      S106
S105:      MOV     #PARBUF,R1
           MOV     #L+217.,R2      ;ADD ANOTHER LABEL WITH MISC ID
           MOV     #69.,R3         ;MAX OF 69 CHARACTERS IN LABEL
HLAB:      MOVB    (R1)+,R0
           CMP     R0,#CR
           BEQ     ELAB            ;BR IF END OF LABEL (CR)
           MOVB    R0,(R2)+        ;STORE LABEL CHARACTER
           SOB     R3,HLAB
           BR      S106
ELAB:      MOVB    #40,(R2)+       ;PAD REST OF LABEL WITH BLANKS
           SOB     R3,ELAB
S106:      JSR     PC,PPAR         ;PROCESS PARAMETERS
           .CALL   OUTCON,<XCPR,L+127.,FOUR>
           .CALL   OUTCON,<YCPR,L+135.,FOUR>
           .CALL   MVL,<L+124.,M2+15.,FOUR>
           .CALL   MVL,<L+132.,M2+22.,FOUR>
           .CALL   TYPE,M2
           .CVTDT  #0,#L+145.      ;STORE DATE IN LABEL
           .CVTDT  #1,#L+155.      ;STORE TIME IN LABEL
           TST     DFLAG
           BNE     S108            ;NO OUTPUT LABEL IF DUMMY SCAN
           .CALL   PLABEL,<BUF,SPAR,L>   ;OUTPUT LABEL
S108:      .CALL   DCLEAR
           .CALL   DCLEAR          ;CLEAR THE GRAY SCALE
S110:      CLR     LINE            ;LINE=0
           MOV     SL,X            ;INITIAL XCOUNT
           CLR     @#COMD          ;DISABLE PIXEL INTERRUPT
           CLR     GY              ;CLEAR GS LINE COUNTER
           MOV     #TTAB,TX
           MOV     #BTAB,BX
           JSR     PC,THEAD        ;TYPE HEADING
           CLR     SNUM            ;SECTOR NUMBER=0
LSEC:      MOV     LPS,SCTR
           .CALL   ZIA,<HIST,HDIM> ;ZERO HISTOGRAM COUNTS
EFLIN:     MOV     SS,Y            ;INITIAL Y
           MOV     X,@#XREG        ;SET LINE COUNT
           INC     LINE            ;INCREMENT MVIO LINE COUNT
           TST     DFLAG
           BNE     S115            ;BR IF DUMMY SCAN
           .CALL   PUT,<BUF,LINE,INDEX>   ;PREPARE STORAGE OF NEXT TV LINE
S115:      MOV     BUFF,R0         ;INIT BUFFER POINTER TO BUF+NS-1
OFLIN:     ADD     INDEX,R0        ;SET POINTER FOR NEXT LINE
           MOV     #HIST,R4        ;R4 HAS LOC OF HIST
           MOV     ISPS,R3         ;INITIAL SAMPLES PER SECTOR
           MOV     Y,@#YREG        ;SET PIXEL COUNT
           MOV     #COMD,R2        ;A(COMD-STATUS REGISTER) TO R2
           MOV     #3,@R2          ;GET FIRST PIXEL OF THIS FIELD
           TSTB    @R2
           BPL     .-2             ;WAIT UNTIL READY
           MOV     #300,@#PSW      ;SET PRIORITY 6 FOR THE REST OF THE FIELD
           BR      MOVB
SECTOR:    MOV     SPS,R3          ;R3=SAMPLES PER SECTOR
PIXEL:     MOV     #3,@R2          ;PIXEL COMMAND
           TSTB    @R2
           BPL     .-2             ;WAIT UNTIL READY
MOVB:      MOVB    @#ZREG,R1       ;MOVE PIXEL INTO BUFFER
           BNE     NOTZE           ;BR IF NOT ZERO
```

```
           INC    R1                          ;CONVERT 0 TO 1
HOTZE:     CMP    R1,#127.
           BNE    NOT127                      ;BR IF NOT 127
           MOV    #126.,R1                    ;CHANGE 127 TO 126
HOT127.    MOVB   R1,@R0                      ;STORE PIXEL IN BUFFER
           BIC    #1,R1
           ADD    R4,R1                       ;HIST + PIXEL VALUE (0,2,4,...62)
           INC    @R1                         ;INC COUNT FOR THIS VALUE
           SUB    #2,R0                       ;DECREMENT POINTER
           SOB    R3,PIXEL                    ;BR IF MORE PIXELS IN THIS SECTOR
           ADD    #128.,R4                    ;STEP HISTOGRAM POINTER
HTEST:     CMP    R4,#HIST+1024.+.-.          ;HIST+NC*128
           BLO    SECTOR                      ;BR IF MORE SECTORS
;
           BIT    #1,Y                        ;TEST FOR EVEN OR ODD FIELD
           BGT    OFEND                       ;BR IF END OF ODD FIELD
EFEND:     CLR    @#PSW                       ;RETURN TO PRIORITY 0 AT END OF FIELD
           INC    Y                           ;SET Y FOR ODD FIELD PIXELS
           TST    GY
           BEQ    EFMOV                       ;BR IF FIRST LINE
           BIT    #10,@#SWR
           BNE    EFMOV                       ;FOR QUICK LOOK, WRITE EVERY OTHER LINE
EFCALL:    .CALL  DLINE,<.-.,GY,GX,NS,REPL,ZERO>  ;REPLICATE PREVIOUS LINE
           INC    GY
EFMOV:     MOV    BUFF,R0
           DEC    R0                          ;SET BUFFER POINTER TO BUF+NS-2
           JMP    OFLIN                       ;GO GET ODD FIELD PIXELS
OFEND:     CLR    @#PSW                       ;RETURN TO PRIORITY 0 AT END OF FIELD
           ADD    #2,R0
           MOV    R0,OFCALL+6                 ;STORE START OF CURRENT LINE
           MOV    R0,EFCALL+6                 ;IN BOTH CALLS TO DLINE
OFCALL:    .CALL  DLINE,<.-.,GY,GX,NS,REPL,ZERO>  ;WRITE TO GRAY SCALE
           INC    GY
           BIT    #10,@#SWR
           BEQ    5$                          ;BR IF NOT QUICK LOOK
           INC    GY                          ;STEP GY AGAIN
5$:        INC    X                           ;INCREMENT X (LINE COUNT)
           DEC    SCTR
           BGT    NOTES                       ;BR IF NOT END OF SECTOR
           JSR    PC,THRESH                   ;CALC THRESHOLDS FOR THESE SECTORS
           CMP    X,EL
           BGE    FIN                         ;BR IF FINISHED
           JMP    LSEC                        ;GO START NEXT LINE SECTOR
JEFLIN:    JMP    EFLIN
NOTES:     CMP    X,EL                        ;TEST FOR END OF PICTURE
           BLT    JEFLIN                      ;GO START NEXT LINE OF PIXELS
           JSR    PC,THRESH                   ;CALC THRESH FOR LAST SECTORS
FIN:       MOV    #TDATA,R1
           TST    DFLAG
           BNE    S202
CPUT:      .CALL  PUT,<BUF,ZERO,INDEX>
           MOV    #BUF,R2
           ADD    INDEX,R2
           MOV    NS,R3
MTD:       MOVB   (R1)+,(R2)+                 ;MOVE TDATA TO BUF
           SOB    R3,MTD
           CMP    R1,#TDATA+266.
           BLO    CPUT                        ;BR IF MORE OF TDATA TO OUTPUT
S202:S300:
SEXIT:     .CALL  CLOSE,BUF
TSTR5:     MOV    (SP)+,R5                    ;RESTORE R5
RTS:       RTS    R5                          ;RETURN TO SUPERVISOR **************
;
PPAR:      .CALL  TYPE,<M3,ZERO>              ;JSR PC,PPAR
           .CALL  PARAM,<NPAR,PAR,NPMAX>
           MOV    #PAR,R1
           CLR    NR
           CLR    NC
P10:       TST    NPAR
           BGT    P15                         ;BR IF MORE PARAMETERS
           JMP    P150
P15:       MOV    (R1)+,R0                    ;R0=PARAMETER WORD
           MOV    #NK,R2
           MOV    #KEY,R3
P20:       CMP    R0,(R3)+
```

```
                BEQ     P50                 ;BR IF PARAMETER EQ KEYWORD
                SOB     R2,P20              ;BR IF MORE KEYWORDS
                CMP     NPAR,#4             ;NOT A KEYWORD, MAYBE AREA IS SPECIFIED
                BGE     P30                 ;BR IF 4 WORDS LEFT
P25:            .CALL   TYPE,M4             ;PARAMETER ERROR
                BR      PPAR
P30:            CMP     R0,#MAXNL
                BGE     P25                 ;BR IF SL TOO LARGE
                MOV     R0,SL
                BLT     P25                 ;BR IF SL TOO SMALL
                MOV     (R1)+,R0            ;EL
                BLE     P25                 ;BR IF EL TOO SMALL
                CMP     R0,#MAXNL
                BGT     P25                 ;BR IF EL TOO LARGE
                MOV     R0,EL
                SUB     SL,R0
                BLE     P25                 ;BR IF NL TOO SMALL
                MOV     R0,NL               ;NL=EL-SL
                MOV     (R1)+,R0            ;SS
                BLT     P25                 ;BR IF SS TOO SMALL
                CMP     R0,#MAXNS
                BGE     P25                 ;BR IF SS TOO LARGE
                BIC     #1,R0               ;MAKE SS EVEN
                MOV     R0,SS
                MOV     (R1)+,R0            ;ES
                BIC     #1,R0               ;ES MUST BE EVEN
                BLE     P25                 ;BR IF ES TOO SMALL
                CMP     R0,#MAXNS
                BGT     P25                 ;BR IF ES TOO LARGE
                SUB     SS,R0               ;NS=ES-SS
                BLE     P25                 ;BR IF NS TOO SMALL
                MOV     R0,NS
                MOV     #512.,R3
                CLR     R2
                DIV     R0,R2
                MOV     R2,NLR              ;NLR=512/NS
                ADD     #BUF,R0
                DEC     R0
                MOV     R0,BUFF             ;BUFF=BUF+NS-1
                SUB     #4,NPAR             ;NPAR=NPAR-4
                BR      P10
P50:            TST     (R1)+               ;STEP OVER SECOND WORD
                ADD     #NK+NK-2,R3         ;LOC FOR THIS KEYWORD
                MOV     @R3,PC              ;GO THERE
P60:            MOV     (R1)+,DPER
                MOV     #100.,BPER
                SUB     DPER,BPER           ;BPER=100-DPER
P63:            SUB     #3,NPAR             ;NPAR=NPAR-3
                BR      P10
P70:            MOV     @R1,DBEG            ;DBEG
                MOV     (R1)+,BKSIZ
                ASR     BKSIZ
                DEC     BKSIZ               ;BKSIZ=DBEG/2-1
                MOV     #62.,DTSIZ
                SUB     BKSIZ,DTSIZ         ;DTSIZ=62-BKSIZ
                BR      P63
P80:            MOV     (R1)+,NR            ;NR
                BR      P63
P90:            MOV     (R1)+,NC            ;NC
                BR      P63
P95:            INC     QFLAG               ;QUICK LOOK (WHILE SCANNING)
                SUB     #2,NPAR
                BR      P10
P100:           MOV     @#YJREG,JPAR+4      ;JOYSTICK
                MOV     @#XJREG,JPAR        ;STORE SL AND SS
                BIC     #177000,JPAR
                .CALL   TYPE,<M5,ZERO>      ;REQUEST MOVE TO LOWER RIGHT
                .CALL   PARAM,<NPAR,PAR,NPMAX>
                MOV     @#YJREG,JPAR+6      ;STORE ES
                MOV     @#XJREG,JPAR+2      ;EL
                BIC     #177000,JPAR+2
                MOV     #JPAR,R1
                MOV     (R1)+,R0
                MOV     #4,NPAR
```

```
              JMP     P30              ;GO PROCESS AREA PARAMETERS
;
P150:   TST     NR               ;DONE WITH PARAMETERS
        BGT     P160             ;BR IF NR WAS A PARAMETER
        MOV     NL,R0
        ADD     #32.,R0
        ASH     #-6,R0
        BGT     P155             ;BR IF NL GT 31
        INC     R0               ;NR=1
P155:   MOV     R0,NR            ;NR=(NL+32)/64
P160:   TST     NC
        BGT     P170             ;BR IF NC WAS A PARAMETER
        MOV     NS,R0
        ADD     #32.,R0
        ASH     #-6,R0
        BGT     P165             ;BR IF NS GT 31
        INC     R0               ;NC=1
P165:   MOV     R0,NC            ;NC=(NS+32)/64
P170:   MOV     NL,R1
        ADD     NR,R1
        DEC     R1
        CLR     R0
        DIV     NR,R0
        INC     R0
        BIC     #1,R0            ;MAKE LPS EVEN
        MOV     R0,LPS           ;LPS=(NL+NR-1)/NR
        MOV     NS,R1
        CLR     R0
        DIV     NC,R0
        BIC     #1,R0            ;MAKE IT EVEN
        MOV     R0,SPS2          ;SPS2=NS/NC  SPS FOR 2 FIELDS
        ASR     R0
        MOV     R0,SPS           ;SPS FOR ONE FIELD
        MOV     NC,R1
        DEC     R1
        MUL     SPS,R1
        MOV     NS,R0
        ASR     R0
        SUB     R1,R0            ;ISPS=NS/2-(NC-1)*SPS
        MOV     R0,ISPS
        MOV     NC,R1
        ASH     #7,R1
        ADD     #HIST,R1         ;HIST+NC*128
        MOV     R1,HTEST+2
        SUB     #128.,R1
        MOV     R1,T05+2
        RTS     PC
;
;
;
THRESH:
        MOV     #MSG+3,T50+10
        MOV     #MSG+6,T60+10
T05:    MOV     #HIST+895.+.-.,R4    ;HIST +(NC-1)*128
T10:    JSR     PC,SMOOTH
        JSR     PC,TSUB          ;FIND BACK AND DATA
        MOV     DPER,R1
        MUL     DATA,R1
        MOV     BPER,R3
        MUL     BACK,R3
        ADD     R3,R1
        ADD     #50.,R1
        CLR     R0
        DIV     #100.,R0         ;ITHR=(DPER*DATA+(100-DPER)*BACK+50)/100
        MOV     DATA,R1
        SUB     BACK,R1
        CMP     R1,#8.           ;CHECK FOR SMALL DIFFERENCE BETWEEN D AND B
        BGT     T20              ;BR IF OK
        MOV     BKSIZ,R0         ;ITHR=DBEG/2  (UNDIVIDED NUCLEUS)
T20:    TST     DATA
        BGT     T30
        MOV     #127.,R0         ;ITHR=127 IF NO DATA IN SECTOR
T30:    TST     BACK
        BGT     T40              ;BR IF BACK OK
        CMP     BX,#BTAB         ;SEE IF FIRST SECTOR
        BEQ     T40
```

```
              MOV      BX,R1            ;USE BACK FROM PREVIOUS SECTOR
              MOV      -(R1),BACK
T40:          MOV      R0,@TX
              MOV      R0,ITHR
              TST      DATA
              BGT      T45
              CLR      ITHR             ;ITHR=0 IF NO DATA
T45:          MOV      BACK,@BX         ;STORE IN TTAB AND BTAB
              ADD      #2,TX
              ADD      #2,BX            ;INCREMENT POINTERS
T50:          .CALL    OUTCON,<ITHR,.-.,FOUR>
              ADD      #7,T50+10
T60:          .CALL    OUTCON,<BACK,.-.,THREE>
              ADD      #7,T60+10
              SUB      #128.,R4
              CMP      R4,#HIST
              BHIS     T10              ;BR IF MORE HISTOGRAMS TO ANALYZE
              SUB      #6,T60+10
              CLRB     @T60+10
              INC      SNUM
              .CALL    OUTCON,<SNUM,M0+2,THREE>
              ADD      NC,SNUM
              DEC      SNUM
              MOVB     #'-,M0+3
              .CALL    OUTCON,<SNUM,M0+5,TWO>
              BIT      #2,@$SWR
              BEQ      T70              ;BR IF SW 1 DOWN
              .CALL    TYPE,M0
T70:          RTS      PC
;
;
;
THEAD:        MOV      NC,R1            ;JSR PC,THEAD   SET UP NC HEADINGS
              MOV      #MSG,R2
TH10:         MOV      #SHEAD,R3
              MOV      #7,R4
TH20:         MOVB     (R3)+,(R2)+
              SOB      R4,TH20          ;MOVE A SECTOR HEADING TO MSG
              SOB      R1,TH10          ;BR IF MORE SECTORS
              CLRB     @R2
              MOV      #6,R4
              MOV      #M0,R2
              MOV      #FHEAD,R3        ;FINAL HEADING
TH33:         MOVB     (R3)+,(R2)+
              SOB      R4,TH30
              BIT      #2,@$SWR
              BEQ      TH70             ;BR IF SW 1 DOWN
              .CALL    TYPE,M0
TH70:         RTS      PC
;
SMOOTH:       MOV      R4,-(SP)         ;JSR PC,SMOOTH   SAVE R4
              MOV      #HIS+2,R3
              MOV      #62.,R2
SM20:         MOV      (R4)+,R0         ;HIS(I)=HIST(I-1)+HIST(I)+HIST(I+1)
              ADD      @R4,R0
              ADD      2(R4),R0
              MOV      R0,(R3)+
              SOB      R2,SM20
              MOV      (SP)+,R4
              RTS      PC
;
;             JSR      PC,TSUB
TSUB:         MOV      #HIS,R0          ;R0=BACK=HIS+0
              MOV      #10,R1           ;R1=MAX1=10
              MOV      BKSIZ,R2         ;BACK RANGE IS NOMINALLY 2-40
              MOV      #HIS+2,R3
TS40:         CMP      R1,(R3)+
              BGE      TS45
              MOV      -(R3),R1         ;MAX1=HIS(I)
              MOV      R3,R0            ;R0=HIS+I
              TST      (R3)+
TS45:         SOB      R2,TS40          ;BR IF MORE TO SEARCH
              SUB      #HIS,R0
              MOV      R0,BACK          ;STORE BACK
;
              MOV      #HIS,R0
```

```
            MOV     #4,R1
            MOV     DTSIZ,R2        ;DATA RANGE IS NOMINALLY FROM 58-124
TS50:       CMP     R1,(R3)+
            BGE     TS60            ;BR IF MAX GE HIS(I)
            CMP     -2(R3),-4(R3)   ;LOOK FOR RELATIVE MAXIMUM ON LEFT SIDE
            BLT     TS60            ;BR IF NOT
            MOV     -(R3),R1
            MOV     R3,R0           ;R0=HIS+I
            TST     (R3)+
TS60:       SOB     R2,TS50
            SUB     #HIS,R0
            MOV     R0,DATA         ;STORE DATA
            RTS     PC
;
;
;
            MAXNL=512.
            MAXNS=480.
            NK=6
KEY:        .ASCII  /DPDBNRNCQLJ /
            .WORD   P60,P70,P80,P90,P95,P100
SL:         .WORD   8.              ;STARTING LINE
EL:         .WORD   506.            ;ENDING LINE
SS:         .WORD   0               ;STARTING SAMPLE
DBEG:       .WORD   58.             ;DATA BEGIN
SPS:        .WORD   30.             ;SAMPLES PER SECTOR OF A FIELD
ISPS:       .WORD   30.             ;INITIAL SPS
BKSIZ:      .WORD   24.             ;DBEG/2-1
DTSIZ:      .WORD   38.             ;62-BKSIZ
SIZE:       .WORD   12288.          ;SIZE OF EACH 24-LINE BUFFER
SCTR:       .WORD   .-.
HDIM:       .WORD   512.            ;HIST DIMENSION (512 WORDS)
SPACE:      .WORD   40
EJECT:      .WORD   61
UIC:        .WORD   2               ;DEFAULT UIC IS 2,2
SYTY:       .WORD   70.
ZERO:       .WORD   0
ONE:        .WORD   1               ;CONSTANT
TWO:        .WORD   2
THREE:      .WORD   3
FOUR:       .WORD   4
FIVE:       .WORD   5
X:          .WORD   .-.
Y:          .WORD   .-.
LINE:       .WORD   .-.             ;LINE NUMBER TO PUT SUBROUTINE
QFLAG:      .WORD   0               ;FLAG FOR QUICK LOOK (WHILE SCANNING)
DFLAG:      .WORD   0               ;FLAG FOR DUMMY SCAN
INDEX:      .WORD   56.+.-.         ;REL BUFR ADDR FROM PUT
NPAR:       .WORD   .-.
JPAR:       .BLKW   4               ;JOYSTICK PARAMETERS
PAR:        .BLKW   80.
NPMAX:      .WORD   80.
SPAR:
NL:         .WORD   498.            ;# LINES
NS:         .WORD   472.            ;# SAMPLES
            .WORD   7               ;BPE
NLR:        .WORD   1               ;NLR
            .WORD   512.            ;BLKSIZ
HIST:       .BLKW   512.            ;8 64 WORD HISTOGRAMS
HIS:        .BLKW   64.             ;SMOOTHED HISTOGRAM
TDATA:
NR:         .WORD   .-.             ;# ROWS OF SECTORS
NC:         .WORD   .-.             ;# COLUMNS OF SECTORS
LPS:        .WORD   63.             ;LINES PER SECTOR
SPS2:       .WORD   60.             ;SAMPLES PER SECTOR
TTAB:       .BLKW   64.
BTAB:       .BLKW   64.
DPER:       .WORD   60.             ;DATA PERCENT
BPER:       .WORD   40.             ;BACK PERCENT
TX:         .WORD   TTAB+.-.
BX:         .WORD   BTAB+.-.
BACK:       .WORD   .-.
DATA:       .WORD   .-.
ITHR:       .WORD   .-.
SNUM:       .WORD   .-.             ;SECTOR NUMBER
SY:         .WORD   .-.
```

```
GX:     .WORD   0
REPL:   .WORD   -1
M0:     .BLKB   80.
MSG=M0+6
L:      .BLKB   32.
        .BYTE   360,365,360,360 ;VICAR NL ' 500' IN EBCDIC
        .BYTE   360,364,367,364 ;VICAR NS ' 474' IN EBCDIC
        .BYTE   100,323,100,361 ;VICAR FORMAT ' L 1' IN EBCDIC
        .BLKB   26.
        .ASCII  /SC/
        .ASCII  / SOURCE **  PATIENT ********** M  SLIDE /
        .ASCII  /********  X=****   Y=****         AC/
        .ASCII  / **-***-** **:**:**                    /
        .REPT   4.
        .ASCII  /                      /
        .ENDR
        .ASCII  /AC/
        .REPT   7
        .ASCII  /                /    ;SCAN ID
        .ENDR
        .ASCII  /AC/
        .REPT   7
        .ASCII  /                /    ;INT2 ID
        .ENDR
        .ASCII  /AL/
        .BLKB   152.
BUF:    .BLKB   24650.                ;TWO 24 LINE BUFFERS + MVB
BUFF:   .WORD   BUF+471.+.-.          ;BUF+NS-1
LNAME:  .ASCII  /SCN/                 ;PICTURE FILE DESIGNATOR TO MVIO
SHEAD:  .ASCII  /  ST-SB/
FHEAD:  .ASCII  / SECTS/
M1:     .ASCIZ  / ENTER SCAN ID /
M2:     .ASCIZ  / SCANNING AT X=**** Y=****/
M3:     .ASCIZ  / ENTER PARAMETERS (SL,EL,SS,ES) /
M4:     .ASCIZ  / PARAMETER ERROR/ <LF><LF>
M5:     .ASCIZ  / MOVE JOYSTICK TO J2 /
        .EVEN
        .END    SCAN

C       ***** BINARY PICTURE GENERATOR  ****
        SUBROUTINE BINARY(DUNIT,FILPEX)
        BYTE FILPEX(9)
        IMPLICIT INTEGER (A-Z)
        COMMON/C1/NR,NC,LPS,SPS,TTAB(64),BTAB(64),BPER
        COMMON/C1/SLO,SSO,NLO,NSO,NOB,B,MAXNOB
        COMMON/C1/MNAREA,MXAREA,MNEPT,MXEPT,MAXLEN,NW,TOBN,ISW1
        COMMON/C1/ WORD(4128),PIC(12344),PBUF(512)
        INTEGER PAR(20),KEY(6),SPAR(5),CTAB(30),NTAB(30)
        BYTE PIC,PMSG(22),PBUF
        DATA NKEY/6/
        DATA KEY/'BP','TO','AR','EP','LE','SK'/
        CALL SSWTCH(4,ISW4)
        IF(ISW4.EQ.1) CALL TIMER
        CALL SSWTCH(1,ISW1)
        IF(ISW1.EQ.1) CALL TYPE(' BINARY')
        CALL RPARAM(NPAR,PAR,20)
C NPAR WILL BE ZERO THE FIRST TIME BINARY IS RUN ON A SPREAD
        IF(NPAR.EQ.0) CALL TYPE(' STARTING ANALYSIS ON')
        CALL AFILE(PIC,DUNIT,FILPEX,2,2)
        CALL OPEN(PIC,6144,1,0,'SCN')
        CALL GLABEL(PIC,SPAR,INDEX)
        IF(NPAR.EQ.0) CALL TYPE(PIC(INDEX+73),64)
C               DEFAULT PARAMETERS
        B = 3
        MAXNOB = 85
        MNAREA = 32
        MXAREA = 2000
        MNEPT = 8
        MXEPT = 200
        SLO = 1
        MAXLEN = 98
        SSO = 1
```

```
              NLO = SPAR(1)
              NSO = MIN0(SPAR(2),511)
              CALL GET(PIC,NLO+1,I)
              CALL MVW(PIC(I+1),NR,133)
C
              CALL RPARAM(NPAR,PAR,20)
              I = -2
1             I = I + 1
2             I = I + 2
              IF(I.GT.NPAR) GOTO 20
              DO 5 K=1,NKEY
              IF(PAR(I).NE.KEY(K)) GOTO 5
              GOTO(2,12,13,14,15,16),K
5             CONTINUE
C
C PARAMETER ERROR
              PAUSE 1
              GOTO 20
12            TOON = PAR(I+2)
              GOTO 1
13            I = I + 2
              MNAREA = PAR(I)
              MXAREA = PAR(I+1)
              GOTO 2
14            I = I + 2
              MNEPT = PAR(I)
              MXEPT = PAR(I+1)
              GOTO 2
15            MAXLEN = PAR(I+2)
              GOTO 1
16            B = PAR(I+2)
              GOTO 1
20            CONTINUE
              IF(ISW4.EQ.1) CALL TIMER
              B = (B+1)/2
              SPS2 = (SPS+1)/2
              MSAMPS = NLO - (NR-1)*LPS
              NW = NSO/32 + 1
              NWT = (NSO+31)/32
              NWI = NWT*16
C *** BINARY PICTURE AREA(WORD) IS ASSUMED TO BE ZERO INITIALLY
C             NW = NUMBER OF WORDS OUT PER LINE
C             NWI = NUMBER OF WORDS IN PER LINE
              S = 0
              C = 0
C             CTAB(30) = COLUMN TABLE (CONTAINS COLUMN INDEX FOR WORD)
C             NTAB(30) = NUMBER OF SAMPLES OF WORD BELONGING TO THE
C                         CURRENT COLUMN
              DO 50 W=1,NWT
              CTAB(W) = C
              NTAB(W) = 16
              IF(C.EQ.NC-1) GOTO 50
              S = S + 16
              IF(S.LT.SPS2) GOTO 50
              S = S - SPS2
              NTAB(W) = 16 - S
              C = C + 1
50            CONTINUE
              IF(ISW4.EQ.1) CALL TIMER
C
              SI = 1
              WI = NW
              REC = 1
              ILPS = LPS
C
              DO 300 R=1,NR
              IF(R.EQ.NR) ILPS = MSAMPS
C
              DO 290 L=2,ILPS,2
              CALL GET(PIC,REC,PI)
              REC = 0
              CALL MVW(PIC(PI+1),PBUF,NWI)
              CALL GET(PIC,0,PI)
```

```
              S = 1
C      IF(ISW4.EQ.1) CALL TIMER
C
       IF(TOBN.GE.0) GOTO 250
       DO 200 W=1,NWT
       CALL QTHR(PBUF(S),WORD(WI+W),TTAB(CTAB(W)+SI),PIC(PI+S),NTAB(W))
200    S=S+32
C      IF(ISW4.EQ.1) CALL TIMER
       GOTO 290
C
250    CONTINUE
       DO 280 W=1,NWT
       CALL STHR(PBUF(S),WORD(WI+W),TTAB(CTAB(W)+SI),PIC(PI+S),NTAB(W))
280    S = S + 32
290    WI = WI + NW
C
300    SI = SI + NC
C
       IF(NPAR.EQ.0) CALL TYPE('0')
       PAR(1)='LE'
       PAR(3)=90
       CALL WPARAM(3,PAR,2)
C WRITE PARAMETERS IN CASE OF RERUN
       CALL CLOSE(PIC)
       IF(ISW4.EQ.1) CALL TIMER
       CALL SEGMNT
       IF(ISW4.EQ.1) CALL TIMER
C
       END

SUBROUTINE SEGMNT
       IMPLICIT INTEGER(A-Z)
       COMMON/C1/SPAR(133),SLO,SSO,NLO,NSO,NOB,B,MAXNOB
       COMMON/C1/MNAREA,MXAREA,MNPERM,MXPERM,MAXLEN,NW,TOBN,ISW1
       COMMON/C1/ WORD(4126),N,PERIM,YMIN,XMIN,YMAX,XMAX
       COMMON/C1/DIR(512),EBUF(28),EDGE(4936)
       COMMON/C1/ NK,LIP(60),SIP(60),FI
       INTEGER PAR(5)
       BYTE LABEL(512),M(6),WHITE(14)
       DATA PAR/512,1024,7,1,512/
       DATA LABEL/70*' ','S','C',70*' ','A','L',368*' '/
       DATA MAXN/1022/,DREC/2/
C THE EDGE POINT DIRECTORY CONTAINS THE FOLLOWING FOR EACH OBJECT
C      DIR(DI) = FBW (FIRST BLOCK WRITTEN)
C      DIR(DI+1) = N (NUMBER OF END POINTS)
C      DIR(DI+2) = YMIN
C      DIR(DI+3) = XMIN
C      DIR(DI+4) = YMAX
C      DIR(DI+5) = XMAX
C THE EDGE POINTS ARE GROUPED IN COORDINATE PAIRS REPRESENTING SEGMENTS
C      EDGE(E) = Y          EDGE(E+1) = X1
C      EDGE(E+2) = Y        EDGE(E+3) = X2
       CALL ITLA(0,WHITE,14)
       IF(TOBN.LT.0) CALL RPARAM(NP,NK,122,6)
C READ OLD VALUE OF FI
       NK=0
       MNAR = MNAREA/4
       MXAR = MXAREA/4
       MNEPT = MNPERM/2
       MXEPT = MXPERM/2
       MXLEN = MAXLEN/2
       CALL SSWTCH(1,ISW1)
       IF(ISW1.EQ.1) CALL TYPE(' SEGMNT')
       CALL SSWTCH(4,ISW4)
       IF(ISW4.EQ.1) CALL WPRINT(' SEGMNT')
       CALL ZIA(EBUF,28)
       CALL ZIA(DIR,510)
       CALL ZIA(EDGE,1024)
       CALL MVL(' EDGE FILE',LABEL(73),10)
       IF(TOBN.LT.0) GOTO 130
       CALL AFILE(EBUF,1,'PIC       ',5,5)
       CALL OPEN(EBUF,1024,0,1,'MV2')
       CALL PLABEL(EBUF,PAR,LABEL)
       CALL PUT(EBUF,5,IND)
```

```
100     CONTINUE
C             NW = NUMBER OF WORDS ON A BINARY LINE
        REC = 3
        NWH = NW/2
        NW2 = NW*2
        NL = NLO/2
        NS = NSO/2
C             NOB = NUMBER OF OBJECTS
C             WI = WORD INDEX        EWI = ENDING WORD INDEX
C             EI = EDGE INDEX        DI = DIRECTORY INDEX
C             BI = BIT INDEX (=0,1,2,...,31)
        EWI = NW
        DI = 1
        NOB = 1
C       SCAN BINARY PICTURE (WORD) LINE-BY-LINE
C
        DO 200 L=1,NL
        WI = EWI + 1
        EWI = EWI + NW
        LOOP = 0
C
C       THE ROACH WILL SCAN LINE FOR OBJECTS (ONE-BITS)
C
140     IF(ROACH(WI,BI,WORD,EWI,MASK).EQ.0) GOTO 200
        LOOP = LOOP + 1
        IF(LOOP.EQ.200) PAUSE 1
        EDGE(1) = L
        EDGE(2) = (NW-(EWI-WI+1))*16 + BI + 1
        CALL TURTLE(N,EDGE,WORD(WI),MASK,NW2)
        IF(N.EQ.0) GOTO 140
        N2 = 2*N
        IF(NOB.NE.TOBN) GOTO 141
        CALL ILIST(NOB,N,YMIN,XMIN,YMAX)
C       CALL PDUMP(EDGE,EDGE(N2),1)
141     CONTINUE
        IF(N.GE.255) GOTO 142
        CALL SORTIN(EDGE,N,SIND)
C       IF(NOB.EQ.TOBN) CALL PDUMP(EDGE,EDGE(N2),1)
        IF(SIND.EQ.0) GOTO 145
142     IF(N.LE.MAXN) GOTO 143
        CALL TYPE(' TOO MANY EDGES')
        CALL TYPE(' ')
        GOTO 2000
143     CONTINUE
        IF(ISW1.EQ.1) CALL TYPE('    SORT')
        IF(ISW4.EQ.1) CALL STIMER
        CALL SORT(EDGE,N)
        IF(ISW4.EQ.1) CALL TIMER
C       N = NUMBER OF EDGE POINTS
145     CALL ERASE(WORD,EDGE,AREA,N2,NW)
        IF(N.LT.MNEPT.OR.N.GT.MXEPT) GOTO 196
        IF(AREA.LT.MNAR.OR.AREA.GT.MXAR) GOTO 196
        IF(YMAX-YMIN.GE.MXLEN.OR.XMAX-XMIN.GE.MXLEN) GOTO 196
C
C       ENTER OBJECT INTO DIRECTORY
        IF(NK.GE.60.OR.TOBN.GE.0) GOTO 175
        NK=NK+1
        LIP(NK)=EDGE(1)+EDGE(1)
        SIP(NK)=EDGE(2)+EDGE(2)
C STORE NOB INFORMATION FOR QUICK COUNT OPTION
        Y=4*EDGE(1)
        X=4*EDGE(2)-14
        IF(X.LT.0) X=0
C WRITE AN ARROW BY THE OBJECT
        CALL DLINE(WHITE,Y,X,8,1,0)
        CALL DLINE(WHITE,Y,X,8,1,0)
        CALL SSWTCH(6,ISW6)
        IF(ISW6.EQ.1) GOTO 175
        CALL DLINE(WHITE,Y-4,X+8,2,1,0)
        CALL DLINE(WHITE,Y-4,X+8,2,1,0)
        CALL DLINE(WHITE,Y-2,X+10,2,1,0)
        CALL DLINE(WHITE,Y-2,X+10,2,1,0)
        CALL DLINE(WHITE,Y+2,X+10,2,1,0)
        CALL DLINE(WHITE,Y+2,X+10,2,1,0)
        CALL DLINE(WHITE,Y+4,X+8,2,1,0)
        CALL DLINE(WHITE,Y+4,X+8,2,1,0)
```

```
175     CONTINUE
        DIR(DI) = REC
        DIR(DI+1) = N
        DIR(DI+2) = MAX0(YMIN-B,1)
        DIR(DI+3) = MAX0(XMIN-B,1)
        DIR(DI+4) = MIN0(YMAX+B,NL)
        DIR(DI+5) = MIN0(XMAX+B,NS)
        NOB = NOB + 1
        DI = DI + 6
        IF(NOB.GT.MAXNOB) GOTO 201
C
        IF(TOBN.LT.0) GOTO 140
C DON'T WRITE IF QUICK COUNT OPTION
        DO 195 I=1,N2,512
        CALL WRITE(EBUF,REC,EDGE(I))
195     REC = REC + 1
        GOTO 140
C
196     CALL SSWTCH(4,ISW4)
        IF(ISW4.NE.1) GOTO 140
        CALL QPRINT(' OBJECT REJECTED')
        CALL ILIST(NOB,N,AREA,YMIN,XMIN)
        CALL ILIST(YMAX-YMIN,XMAX-XMIN,MXAR,MXEPT,MXLEN)
        GOTO 140
C
200     MAXN = MAXN + NUM
C
201     NOB=NOB-1
        IF(TOBN.LT.0) GOTO 220
        IF(DI.GT.1) CALL WRITE(EBUF,DREC,DIR)
        CALL WRITE(EBUF,1,SPAR)
        CALL CLOSE(EBUF)
220     IF(NOB.GT.0) GOTO 2000
C IF NO OBJECTS FOUND, TYPE MSG AND CALL INT1
        CALL TYPE(' NO OBJECTS FOUND; CHECK THRESHOLDS')
        CALL TYPE('0')
        CALL APHASE(7)
2000    CONTINUE
        IF(TOBN.GE.0) RETURN
        CALL MVL(' NO=**',M,6)
        CALL OUTCON(NK,M(6),2)
        CALL TYPE(M,6)
        CALL UPARAM(122,NK,6)
        CALL APHASE(7)
C WRITE NOB PARAMETERS AND CALL INT1
        END

SUBROUTINE SKIRT
        IMPLICIT INTEGER(A-Z)
        COMMON/C1/SPAR(133),SLO,SSO,NLO,NSO,NOB,B,OPER
        COMMON/C1/DIR(512),SDIR(512)
        COMMON/C1/EBUF(56),EDGE(1024),SEGB(56),SEG(8192)
        COMMON/C1/SBUF(900),ESI(5)
        INTEGER PAR(5)
        BYTE EBUF,SEGB
        DATA MAXSB/900/,MAXDI/510/,S/1/,DI/1/
        DATA DREC/2/,IDREC/2/
C
C   THE SEGMENT DIRECTORY CONTAINS THE FOLLOWING FOR EACH OBJECT
C           SDIR(DI) = BSI(BEGINNING SEGMENT INDEX)
C           SDIR(DI+1) = ESI(ENDING SEGMENT INDEX)
C           SDIR(DI+2) = YMIN
C           SDIR(DI+3) = XMIN
C           SDIR(DI+4) = YMAX
C           SDIR(DI+5) = XMAX
C   THE SEGMENTS ARE STORED AS TRIPLETS
C           SEG(S) = Y
C           SEG(S+1) = X1
C           SEG(S+2) = X2
C   THE ROB DIRECTORY CONTAINS THE FOLLOWING FOR EACH OBJECT
C           DIR(DI) = BACKGROUND
C           DIR(DI+1) = THRESHOLD
C           DIR(DI+2) = YMIN
```

```
C                 DIR(DI+3) = XMIN
C                 DIR(DI+4) = YMAX
C                 DIR(DI+5) = XMAX
      CALL SSWTCH(1,ISW1)
      IF(ISW1.EQ.1) CALL TYPE(' SKIRT')
      CALL AFILE(EBUF,1,'PIC   ',5,5)
      CALL OPEN(EBUF,1024,0,0,'MY2')
      CALL AFILE(SEGB,5,'PIC   ',5,5)
      CALL OPEN(SEGB,1024,0,1,'MY5')
      CALL GLABEL(EBUF,PAR,IND)
      CALL MVL(' SEGMENT FILE',EBUF(IND+73),13)
      CALL PLABEL(SEGB,PAR,EBUF(IND+1))
      CALL PUT(SEGB,1,IND)
C         GET SHAL PARAMS
      CALL READ(EBUF,1,IND,SPAR)
      DPER = SPAR(133) - 5
      OREC = 2*((NOB+34)/85)+2
      CALL WRITE(SEGB,1,SLO)
      NL = NLO/2
      NS = NSO/2
      B2 = 2*B + 1
      SINC = MAXSB/B2
      MAXSB = SINC*B2
C
C       S = SEGMENT INDEX
C       SI = SEGMENT BUFFER INDEX
C
      DO 200 OBN=1,NOB
      IF(DI.NE.1) GOTO 30
      CALL READ(EBUF,IDREC,IND,DIR)
      IDREC = IDREC + 1
      CALL MVW(DIR,SDIR,512)
30    IREC = DIR(DI)
      N = DIR(DI+1)
      SDIR(DI) = S
      CALL INTERP(DI)
      NEND = 2*N
      NREC = (NEND+511)/512
C
      DO 130 L=1,NREC
      CALL READ(EBUF,IREC,IND,EDGE)
      IREC = IREC + 1
      EIN = MIN0(NEND,512)
C       ADD HORIZONTAL SKIRT TO SEGMENTS
      DO 40 E=2,EIN,4
      EDGE(E) = MAX0(EDGE(E)-B,1)
40    EDGE(E+2) = MIN0(EDGE(E+2) + B,NS)
C
      IF(L.NE.1) GOTO 60
      Y0 = EDGE(1)
      YBAR = Y0 - B
C       USE FIRST SEGMENT END POINT PAIR TO INITIALIZE SBUF
      X1 = EDGE(2)
      X2 = EDGE(4)
      SI = 1
      DO 50 I=1,B2
      SBUF(SI) = X1
      SBUF(SI+1) = X2
      ESI(I) = SI
50    SI = SI + SINC
C
      SI = 1
      I = 1
      EI = 5
C
60    CONTINUE
C       PROCESS REMAINING SEGMENT END POINTS
      DO 120 E=EI,EIN,4
      Y = EDGE(E)
      IF(Y.EQ.Y0) GOTO 90
C       ADVANCE SBUF ONE ROW
      SI = SI + SINC
      I = I + 1
      IF(SI.GT.MAXSB) SI=1
```

```
        IF(I.GT.B2) I=1
        IF(YBAR.LT.0) GOTO 82
C           RELEASE SEGMENTS ON LINE Y0 - 0
        SEND = ESI(I)
        DO 80 SIP=SI,SEND,2
        SEG(S) = YBAR
        SEG(S+1) = SBUF(SIP)
        SEG(S+2) = SBUF(SIP+1)
     80 S = S + 3
C
     82 Y0 = Y0 + 1
        YBAR = YBAR + 1
        SBUF(SI) = EDGE(E+1)
        SBUF(SI+1) = EDGE(E+3)
        ESI(I) = SI
C
     90 SIP = 1
        X10= EDGE(E+1)
        X20= EDGE(E+3)
C
        DO 100 II=1,B2
        SIQ = SIP
        SEND = ESI(II)
        X1 = X10
        X2 = X20
C
     93 XP1 = SBUF(SIQ)
        IF(X2.LT.XP1-1) GOTO 95
        XP2 = SBUF(SIQ+1)
        IF(X1.GT.XP2+1) GOTO 95
C           SEGMENT (X1,X2) IS CONNECTED TO A PREVIOUS SEGMENT
        IF(SIQ.EQ.SEND) GOTO 94
        X1 = MIN0(X1,XP1)
        X2 = MAX0(X2,XP2)
        SBUF(SIQ) = SBUF(SEND)
        SBUF(SIQ+1) = SBUF(SEND+1)
        SEND = SEND - 2
        GOTO 93
C
     94 SBUF(SEND) = MIN0(X1,XP1)
        SBUF(SEND+1) = MAX0(X2,XP2)
        GOTO 98
C
     95 SIQ = SIQ + 2
        IF(SIQ.LE.SEND) GOTO 93
        SBUF(SIQ) = X1
        SBUF(SIQ+1) = X2
C
     98 ESI(II) = SIQ
    100 SIP = SIP + SINC
C
    120 CONTINUE
C
        EI = 1
    130 NEND = NEND - EIN
C
C           RELEASE REMAINING SEGMENTS
        DO 150 II=1,B2
        IF(YBAR.GT.NL) GOTO 180
        SI = SI + SINC
        I = I + 1
        IF(SI.GT.MAXSB) SI=1
        IF(I.GT.B2) I=1
        SEND = ESI(I)
        DO 140 SIP=SI,SEND,2
        SEG(S) = YBAR
        SEG(S+1) = SBUF(SIP)
        SEG(S+2) = SBUF(SIP+1)
    140 S = S + 3
C
    150 YBAR = YBAR + 1
C
    180    SDIR(DI+1) = S - 1
C
```

```
C
        DI = DI + 6
        IF(DI.LT.MAXDI) GOTO 200
        CALL WRITE(SEGB,DREC,DIR)
        CALL WRITE(SEGB,DREC+1,SDIR)
        DREC = DREC + 2
        DI = 1
200     CONTINUE
C
C
        IF(DI.EQ.1) GOTO 205
        CALL WRITE(SEGB,DREC,DIR)
        CALL WRITE(SEGB,DREC+1,SDIR)
C               WRITE OUT SEGMENT
205     DO 210 I=1,S,512
        CALL WRITE(SEGB,OREC,SEG(I))
210     OREC = OREC + 1
        CALL CLOSE(SEGB)
        CALL CLOSE(EBUF)
        END

SUBROUTINE CHROME(DUNIT,FILPEX)
        BYTE FILPEX(9)
        IMPLICIT INTEGER(A-Z)
        COMMON/C1/SLO,SSO,NLO,NSO,NOB,B
        COMMON/C1/DIR(512),CMYB(1952),C(512),PBUF(1308)
C THE FIRST 28 WORDS OF PBUF ARE THE MVB, FOLLOWED BY 1024 WORDS OF
C BUFFER STORAGE, FOLLOWED BY 256 WORDS OF PICTURE STORAGE
        COMMON/C1/SEGB(56),CBUF(9600),CDIR(518),LBU(100)
        COMMON/C1/OREC,NFSI
        BYTE SEGB,PB(2616)
        EQUIVALENCE (PB,PBUF)
        INTEGER PAR(5)
        DATA SECSIZ/64/,SSM1/63/
        DATA MAXDI/510/,MAXBUF/9600/,IDREC/2/,LPBUF/1052/,DREC/2/
C LPBUF IS THE LENGTH OF PBUF MINUS 256 WORDS OF PICTURE STORAGE
C
        CALL SSWTCH(1,ISW1)
        IF(ISW1.EQ.1) CALL TYPE(' CHROME')
        CALL SSWTCH(4,ISW4)
        IF(ISW4.NE.1) GOTO 3
        CALL QPRINT(' CHROME')
        CALL TIMER
        MAXBUF=7320
3       CONTINUE
        CALL AFILE(PBUF,DUNIT,FILPEX,2,2)
        CALL OPEN(PBUF,LPBUF-28,1,0,0,'SCN')
        CALL GLABEL(PBUF,PAR,IP)
        NW=(PAR(2)+1)/2
        CALL AFILE(SEGB,5,'PIC     ',5,5)
        CALL OPEN(SEGB,1024,0,0,'MV5')
        CALL GLABEL(SEGB,PAR,IND)
        CALL ZIA(CMYB,28)
        CALL AFILE(CMYB,1,'PIC     ',5,5)
        CALL OPEN(CMYB,1024,1,1,'MV2')
        CALL MVL(' CHROME FILE',PB(IP+100),12)
        CALL PLABEL(CMYB,PAR,PB(IP+1))
        CALL READ(SEGB,1,IND,SLO)
        CALL PUT(CMYB,1,IC)
        CALL MVW(SLO,CMYB(IC/2+1),512)
        NREC = (NOB+84)/85
        IREC = 2*NREC + 2
        OREC = NREC + 3
        CALL READ(SEGB,IDREC,IND,DIR)
        CALL PUT(CMYB,DREC,IC)
        CALL MVW(DIR,CMYB(IC/2+1),512)
        CALL READ(SEGB,IDREC+1,IND,DIR)
        IDREC = IDREC + 2
        DREC = DREC + 1
C               FORMAT CBUF
        DEND = NOB*6
        SEND = DIR(DEND-4)
        DISP = MAXBUF-SEND
C
        J = DISP + 1
```

```
C                 READ IN SEGMENT FILE
          DO 5 I=1,SEND,512
          CALL READ(SEGB,IREC,IND,CBUF(J))
          J = J + 512
    5     IREC = IREC + 1
C
          DO 6 DI=1,DEND,6
          DIR(DI) = DIR(DI) + DISP
    6     DIR(DI+1) = DIR(DI+1) + DISP
C
          TNS = (DISP-1)/SECSIZ
          N = TNS*SECSIZ
C
          DO 10 I=1,N,SECSIZ
   10     CBUF(I) = I+SECSIZ
C
          LFSI = N - SSM1
          CBUF(LFSI) = 0
C   THE SEGMENT DIRECTORY CONTAINS THE FOLLOWING INFORMATION FOR EACH OBJ
C           DIR(DI)   = CSI = CURRENT SEGMENT INDEX
C           DIR(DI+1) = ESI = ENDING SEGMENT INDEX
C           DIR(DI+2) = YMIN
C           DIR(DI+3) = XMIN
C           DIR(DI+4) = YMAX
C           DIR(DI+5) = XMAX
C
C   THE CHROMOSOME DIRECTORY CONTAINS THE FOLLOWING INFORMATION FOR EACH
C           CDIR(DI)   = BSI  = BEGINNING SEGMENT INDEX
C           CDIR(DI+1) = NSEC = TOTAL NUMBER OF SECTIONS USED UP BY OBJEC
C           CDIR(DI+2) = FSI  = INDEX OF FIST SECTION USED BY OBJECT
C           CDIR(DI+3) = LSI  = INDEX OF LAST SECTION USED BY OBJECT
C           CDIR(DI+4) = FHW  = FIRST HALFWORD OF SECTION USED BY OBJECT
C           CDIR(DI+5) = LHW  = LAST HALFWORD OF SECTION USED BY OBJECT
C
C           NFSI = NEXT FREE SECTION INDEX
C           LFSI = LAST FREE SECTION INDEX
          NFSI = 1
          DI = 1
C
   50     DBEG = DI
          IF(ISW4.EQ.1) CALL TIMER
C         INCREASE NUMBER OF SECTIONS IF POSSIBLE
          CSI = DIR(DI)
          BSI = CDIR(DI)
          IF(BSI.EQ.0) BSI = CSI
   51     NSI = LFSI + SECSIZ
          IF(NSI.GT.BSI-SECSIZ) GOTO 52
          CBUF(LFSI) = NSI
          LFSI = NSI
          GOTO 51
C
   52     CBUF(LFSI) = 0
          Y0 = CBUF(CSI)
          REC = 2*Y0 - 1
          CALL GET(PBUF,REC,IND)
          CALL MVW(PBUF(IND/2+1),PBUF(LPBUF+1),NW)
          CALL GET(PBUF,0,IND)
          IP=IND/2
C
C         PROCESS OBJECTS 1 TO NOB
C         IF(ISW4.EQ.1) CALL TIMER
          DO 100 DI=DBEG,DEND,6
          CSI = DIR(DI)
          IF(CSI.EQ.0) GOTO 109
          Y = CBUF(CSI)
          IF(Y.GT.Y0) GOTO 110
          ESI = DIR(DI+1)
          LSI = CDIR(DI+3)
          LHW = CDIR(DI+5)
          NSEC = 0
          IF(LSI.NE.0) GOTO 58
C              FIRST SEGMENT OF OBJECT. ASSIGN A SECTION
          IF(NFSI.EQ.0) CALL TYPE(' WNBUF1')
          IF(NFSI.EQ.0) CALL WNBUF(DBEG,DEND,DI)
```

```
            CDIR(DI) = CSI
            CDIR(DI+1) = 1
            CDIR(DI+2) = NFSI
            CDIR(DI+4) = 1
              CDIR(DI+5)=1
            LSI = NFSI
            NFSI = CBUF(NFSI)
            LHW = 1
      C
      C          LOOP THROUGH EACH SEGMENT OF CURRENT OBJECT
         58 DO 80 SI=CSI,ESI,3
            Y = CBUF(SI)
            IF(Y.GT.Y0) GOTO 82
            X1 = CBUF(SI+1) + LPBUF
            X2 = CBUF(SI+2) + LPBUF
      C
            DO 70 L=1,2
      C
            DO 62 X=X1,X2
            IF(LHW.LT.SECSIZ) GOTO 60
      C         ADD ON A NEW SECTION
            IF(NFSI.EQ.0) CALL TYPE('  WNBUF2')
            IF(NFSI.EQ.0) CALL WNBUF(DBEG,DEND,DI)
            NSEC = NSEC + 1
            CBUF(LSI) = NFSI
            LSI = NFSI
            NFSI = CBUF(NFSI)
            LHW = 1
      C
         60 CBUF(LSI+LHW) = PBUF(X)
         62 LHW = LHW + 1
      C
            X1=CBUF(SI+1)+IP
         70 X2=CBUF(SI+2)+IP
      C
         80 CONTINUE
      C
            CDIR(DI+3) = LSI
            CDIR(DI+5) = LHW
      C          END OF OBJECT.  WRITE OUT TO DISK
      C       IF(ISW4.EQ.1) CALL TIMER
         81 CALL WBUF(DI)
            CSI = DIR(DI)
            IF(CSI.NE.0) GOTO 81
      C       IF(ISW4.EQ.1) CALL TIMER
            GOTO 100
      C
      C         REMAINING PORTION OF OBJECT LIES BELOW CURRENT LINE
      C         UPDATE DIRECTORIES AND CONTINUE
         82 CDIR(DI+1) = CDIR(DI+1) + NSEC
            CDIR(DI+3) = LSI
            CDIR(DI+5) = LHW
            DIR(DI) = SI
        100 CONTINUE
      C
      C         NO MORE OBJECTS ON THIS LINE.  UPDATE AND CONTINUE
        110 CONTINUE
      C       IF(ISW4.EQ.1) CALL TIMER
            DO 120 DI=DBEG,DEND,6
            CSI = DIR(DI)
            IF(CSI.NE.0) GOTO 50
        120 CONTINUE
      C
            IF(ISW4.EQ.1) CALL TIMER
            CALL PUT(CNVB,DREC,IC)
            CALL MVW(LBW,CNVB(IC/2+1),102)
            CALL CLOSE(CNVB)
            CALL CLOSE(PBUF)
            CALL CLOSE(SEGB)
            IF(ISW4.EQ.1) CALL TIMER
            END
```

```
      SUBROUTINE ROB
      IMPLICIT INTEGER(A-Z)
      COMMON/C1/CMYB(56),C(512)
      COMMON/C1/SMYB(56),EDGE(1024),LBW(80),BUF,STBL
      COMMON/C1/SLO,SSO,NLO,NSO,NOB,B,OPER
      COMMON/C1/N,PERIM,YMIN,XMIN,YMAX,XMAX
      COMMON/C1/SDIR(660),TTAB(60),AREA(60),IOD(60)
      COMMON/C1/NK,LIP(60),SIP(60),PERM(60),CIRCA(60)
      LOGICAL*1 BUF(10000)
      BYTE CMYB,SMYB,STBL(129),MSG7(20),MSG8(25),TMSG(128)
      INTEGER DIR(510),PAR(100),HIS(64),OTTAB(60)
      EQUIVALENCE (DIR,SDIR(145)),(HIS,EDGE)
      DATA MAXBUF/10000/,RECSIZ/1024/,NOBPH/6/
      DATA NC/0/,IODTOT/0/,NPTOT/0/,MAXNOB/60/,TOBN/0/,MAXNP/100/
      DATA OREC/2/,DREC/2/,RFLAG/1/,OTTAB/60*0/
C
C     THE INPUT CHROMOSOME DIRECTORY CONTAINS THE FOLLOWING FOR EACH OBJ
C           DIR(DI) = BACKGROUND
C           DIR(DI+1) = THRESHOLD
C           DIR(DI+2) = CML (MINIMUM LINE)
C           DIR(DI+3) = CMS (MINIMUM SAMPLE)
C           DIR(DI+4) = CMXL (MAXIMUM LINE)
C           DIR(DI+5) = CMXS (MAXIMUM SAMPLE)
C     THE OUTPUT CHROMOSOME DIRECTORY CONTAINS THE FOLLOWING FOR EACH OBJ
C           SDIR(CDI)= FBW (FIRST RECORD BLOCK WRITTEN TO DISK)
C           SDIR(CDI+1)= ML (MINIMUM LINE)
C           SDIR(CDI+2)= MS (MINIMUM SAMPLE)
C           SDIR(CDI+3)= LBW (LAST RECORD BLOCK WRITTEN TO DISK)
C     THE INPUT CHROMOSOMES ARE IN THE FOLLOWING FORMAT
C           C(1) = PREVIOUS BLOCK WRITTEN
C           C(2) = NSEG (NUMBER OF SEGMENTS IN THIS RECORD)
C           C(CI) = Y (LINE COORDINATE=0 - 255)
C           C(CI+1) = X (STARTING SAMPLE COORDINATE=0 - 255)
C           C(CI+2) = N (NUMBER OF SAMPLES IN SEGMENT)
C     NOTE THAT TWO CONSECUTIVE LINES OF SEGMENT GREY VALUES ARE PRESENT
C     ALSO, THE DIMENSIONS ARE THOSE OF THE HALF-PICTURE AND MUST BE
C     DOUBLED.
C     THE OUTPUT CHROMOSOMES ARE IN THE FOLLOWING FORMAT
C           C(1) = NSEG (NUMBER OF SEGMENTS IN THIS RECORD)
C           C(CI) = Y (LINE COORDINATE=1 - 512)
C           C(CI+1) = X (STARTING SAMPLE COORDINATE=1 - 512)
C           C(CI+2) = N (NUMBER OF SAMPLES IN SEGMENT)
C
      CALL SSWTCH(1,ISW1)
      IF(ISW1.EQ.1) CALL TYPE(' ROB')
      CALL SSWTCH(4,ISW4)
      IF(ISW4.EQ.1) CALL QPRINT(' ROB')
      CALL RPARAM(NP,PAR,MAXNP)
      IP=1
20    IF(IP.GT.NP) GOTO 35
      IF(PAR(IP).EQ.'TO') GOTO 30
      IF(PAR(IP).NE.'OT') GOTO 35
      OTTAB(PAR(IP+2))=PAR(IP+3)
      IP=IP+4
      GOTO 20
30    TOBN=PAR(IP+2)
      IP=IP+3
      GOTO 20
35    CONTINUE
      RECSZ2 = RECSIZ/2
C     LBW(80) = LAST BLOCK WRITTEN FOR CURRENT CHROMOSOME
C     DI = DIRECTORY INDEX
C     NC = NUMBER OF CHROMOSOMES
C
      CALL AFILE(CMYB,1,'PIC      ',5,5)
      CALL OPEN(CMYB,1024,0,0,'MV2')
      CALL AFILE(SMYB,5,'UCR      ',"13,"13)
      CALL OPEN(SMYB,1024,0,1,'UCR')
      CALL GLABEL(CMYB,PAR,IND)
      CALL MVL(' ROB FILE   ',CMYB(IND+139),12)
      CALL PLABEL(SMYB,PAR,CMYB(IND+1))
      CALL SSWTCH(9,ISW9)
      IF(ISW9.NE.1) GOTO 37
      CALL QPRINT(' ')
      CALL QPRINT(CMYB(IND+73),70)
```

```
              CALL QPRINT(CMVB(IND+145),30)
              CALL QPRINT(CMVB(IND+217),70)
              CALL QPRINT(' OBJ    PER    B       D MAX   LINE    SAMP
             1  SL   SS   NL   NS          T1  T2   FPOH   AREA   IOD/8  AVG
             2  OBJ')
   37         CALL ITLA(32,TMSG,128)
              CALL PUT(SMVB,DREC,IND)
              CALL READ(CMVB,1,IND,SLO)
              CALL READ(CMVB,DREC,IND,DIR)
              DREC = DREC + 1
              CALL READ(CMVB,DREC,IND,LBW)
              BPER = 100 - DPER
              B = 2*B
              B1 = B + 1
              B2 = B + 2
              B3 = 2*B + 1
              DI = 1
              CDI = 2
C          LOOP THROUGH EACH OBJECT
              DO 500 OBN=1,NOB
              REC = LBW(OBN)
              CML = DIR(DI+2)*2 - 1
              CMS = DIR(DI+3)*2 - 1
              CMXL = DIR(DI+4)*2
              CMXS = DIR(DI+5)*2
              CNL = CMXL - CML + 3
              CNS = CMXS - CMS + 2
              CNLM1 = CNL - 1
              CNSM1 = CNS - 1
              IF(CNL*CNS.LT.MAXBUF) GOTO 50
   45         CALL SSWTCH(1,ISW1)
              IF(ISW1.NE.1) GOTO 500
              CALL MVL(' OBJECT ** TOO LARGE',MSG7,20)
              CALL OUTCON(OBN,MSG7(10),2)
              CALL TYPE(MSG7,20)
              GOTO 500
C
C          READ IN CURRENT CHROMOSOME
   50         CALL ZIA(BUF,MAXBUF/2)
              CALL ZIA(HIS,64)
C
   51         CALL READ(CMVB,REC,IND,C)
              NSEG = C(2)
              CI = 3
C
              DO 60 NN=1,NSEG
              BI = 2*(C(CI)*CNS+C(CI+1)) + CNS + 1
              N = C(CI+2)
              N2 = 2*N
              IF(BI.LT.1) GOTO 60
C IGNORE POSSIBLE BUFG FROM CHROME OUTPUT ***********
              IF(BI.GT.MAXBUF) GOTO 45
              IF(N.LT.1.OR.N.GT.100) GOTO 45
              CALL NHIS(C(CI+3),BUF(BI),HIS,N2)
              CALL NHIS(C(CI+N+3),BUF(BI+CNS),HIS,N2)
   60         CI = CI + N2 + 3
C
              REC = C(1)
              IF(REC.NE.0) GOTO 51
CCCCCCCC
              IF(OBN.NE.TOBN) GOTO 63
              BI = 1
              DO 62 I=1,CNL
              CALL PRT(I,BUF(BI),CNS)
   62         BI = BI + CNS
   63         CONTINUE
CCCCCCCC
C
              BACK = DIR(DI)/2
              ITHRES = DIR(DI+1)/2
C          RETHRESHOLD OBJECT
              HIS(1) = 0
              DATA = ITHRES
              THRESH = ITHRES
```

```
          IF(RFLAG.EQ.0) GOTO 72
          HIS(64) = 0
          MAX = 0
   C
          DO 65 I=ITHRES,63
          F = HIS(I-1) + HIS(I) + HIS(I+1)
          IF(F.LE.MAX) GOTO 65
          MAX = F
          DATA = I
   65     CONTINUE
          THRESH = (BPER*BACK + DPER*DATA)/100
          IF(OTTAB(OBN).NE.0) THRESH=OTTAB(OBN)/2
   72     CALL STRECH(HIS,STBL,THRESH,DMAX)
   C
   C         BI = BUFFER INDEX       EI = EDGE INDEX
   C         DI = DIRECTORY INDEX    CDI = CHROMOSOME DIRECTORY INDEX
          EBI = CNS
          EI = 1
          CNL2 = CNL - 2
          CNS1 = CNS - 1
          THRESH = THRESH*2
          NLB = CNL2 - B
          NSB = CNS1-B
          BCNS = B*CNS
   C
          DO 300 L=1,CNL2
          BI = EBI + 1
          EBI = EBI + CNS
   C
   210    IF(ISEG(BI,BUF,THRESH,EBI).EQ.0) GOTO 300
          SDIR(CDI) = OREC+ 1
          EDGE(1) = L
          S = CNS - (EBI - BI)
          EDGE(2) = S
          CALL SOT(N,EDGE,BUF(BI),THRESH,CNS)
          IF(N.EQ.0) GOTO 210
          IF(OBN.EQ.TOBN) CALL ILIST(N,YMIN,XMIN,YMAX,XMAX)
          IF(OBN.EQ.TOBN) CALL PDUMP(EDGE,EDGE(2*N),1)
          IF(N.GE.255) GOTO 213
          CALL SORTIN(EDGE,N,SIND)
          IF(SIND.EQ.0) GOTO 215
   213    IF(N.LE.512) GOTO 214
          CALL TYPE(' EDGE OVERFLOW, THRESHOLD RAISED')
          CALL TYPE(' ')
          THRESH = THRESH + 4
          GOTO 210
   214    IF(ISW1.EQ.1) CALL TYPE('   SORT')
          IF(ISW4.EQ.1) CALL STIMER
          CALL SORT(EDGE,N)
          IF(ISW4.EQ.1) CALL TIMER
   215    CONTINUE
          IF(OBN.EQ.TOBN) CALL PDUMP(EDGE,EDGE(2*N),1)
          IF(OBN.EQ.TOBN) CALL ILIST(L,S,CNL,CNS,OBN)
   C         MAKE SURE THAT OBJECT CONTAINS AN INTERNAL POINT
          INTPNT = 0
          N2 = 2*N
          DO 235 E=1,N2,4
          Y = EDGE(E)
          IF(Y.LT.B1.OR.Y.GT.NLB) GOTO 235
          X1 = MAX0(EDGE(E+1),B1)
          X2 = MIN0(EDGE(E+3),NSB)
          IF(X1.GT.X2) GOTO 235
          B0 = Y*CNS + X1
          I = B0 - B
   C
          DO 220 LEFT=1,B0
          IF(IV(BUF(LEFT)).NE.0) GOTO 221
   220    CONTINUE
   C
   221    RIGHT = B0 + X2-X1 + B
   C
          DO 222 I=1,B1
          IF(IV(BUF(RIGHT)).NE.0) GOTO 223
   222    RIGHT = RIGHT - 1
   C
```

```
223     LEFT = LEFT + 8
        RIGHT = RIGHT - 8
        IF(TOBN.EQ.OBN) CALL ILIST(X1,X2,LEFT,RIGHT,Y)
        IF(LEFT.GT.RIGHT) GOTO 235
C
        DO 230 I=LEFT,RIGHT
        TP = I - BCNS - 1
        BP = I + BCNS + 1
        DO 225 LL=1,BCNS,CNS
        IF(TOBN.EQ.OBN) CALL ILIST(TP,BP,LL,IV(BUF(TP+LL)),IV(BUF(BP-LL)))
        IF(IV(BUF(TP+LL)).EQ.0.OR.IV(BUF(BP-LL)).EQ.0)GOTO 230
225     CONTINUE
C            THIS IS AN INTERNAL POINT
        INTPNT = 1
        GOTO 236
C
230     CONTINUE
235     CONTINUE
C
C       REMOVE OBJECT FROM BUF
236     NSEG = 0
        NP = 0
        IODN = 0
        ECI = 1
C
        DO 250 E=1,N2,4
        Y = EDGE(E)
        X1 = EDGE(E+1)
        X2 = EDGE(E+3)
        NS = X2 - X1 + 1
        IF(NS.GT.0) GOTO 238
        CALL TYPE(' ROB - NS LE 0')
        CALL TYPE('0')
        CALL ILIST(E,N2,X1,X2,NS)
        PAUSE
        GOTO 250
238     CONTINUE
        NS2 = (NS+1)/2
        BCI = ECI + 1
        ECI = ECI + NS2 + 3
        IF(ECI.LE.RECSZ2) GOTO 240
C
C       WRITE OUT CHROMOSOME LINE
        C(1) = NSEG
        OREC = OREC + 1
        CALL WRITE(SHVB,OREC,C)
        NSEG = 0
        BCI = 2
        ECI = NS2 + 4
C
240     C(BCI) = CNLM1 + Y
        C(BCI+1) = CNSM1 + X1
        C(BCI+2) = NS
        CALL REMOVE(BUF(Y*CNS+X1),C(BCI+3),STBL,NS,IODN,THRESH)
        NP = NP + NS
250     NSEG = NSEG + 1
C
        IF(NP.GE.25.AND.INTPNT.NE.0) GOTO 260
        CALL SSWTCH(4,ISW4)
        IF(ISW4.NE.1) GOTO 210
        CALL QPRINT(' OBJECT REJECTED')
        CALL ILIST(OBN,N,NP,YMIN,XMIN)
        CALL ILIST(YMAX-YMIN,XMAX-XMIN,L,S,NC)
        GOTO 210
C       WRITE OUT LAST LINE
260     OREC = OREC + 1
        C(1) = NSEG
        CALL WRITE(SHVB,OREC,C)
C
        NC = NC + 1
        NL = YMAX - YMIN + 1
        NS = XMAX - XMIN + 1
        IODN = IODN - BACK*NP/4
        TTAB(NC) = THRESH
        LIP(NC) = CNLM1 + L
```

```
      SIP(NC) = CMSM1 + S
      IOD(NC) = IODN
      AREA(NC) = NP
      PERM(NC) = PERIM
      CALL SSWTCH(0,ISW0)
      IF(ISW0.NE.1) GOTO 280
C PRINT IF SW0 IS UP
      CALL OUTCON(NC,TMSG(4),2)
      CALL OUTCON(PERM(NC),TMSG(10),3)
      CALL OUTCON(BACK*2,TMSG(17),3)
      CALL OUTCON(DATA*2,TMSG(27),3)
      CALL OUTCON(DMAX*2,TMSG(31),3)
      CALL OUTCON(CML,TMSG(39),4)
      CALL OUTCON(CMS,TMSG(47),4)
      CALL OUTCON(CMLM1+L,TMSG(55),5)
      CALL OUTCON(CMSM1+S,TMSG(60),5)
      CALL OUTCON(NL,TMSG(65),5)
      CALL OUTCON(NS,TMSG(70),5)
      CALL OUTCON(ITHRES*2,TMSG(80),3)
      CALL OUTCON(THRESH,TMSG(86),3)
      CALL OUTCON(OBN,TMSG(94),2)
      CALL OUTCON(NP,TMSG(102),8)
      CALL OUTCON(IODN,TMSG(111),9)
      CALL OUTCON(IODN/(NP/8),TMSG(116),3)
      CALL OUTCON(NC,TMSG(122),2)
      CALL QPRINT(TMSG,128)
C         ENTER OBJECT IN CHROMOSOME DIRECTORY
280   SDIR(CDI+1) = CML + YMIN - 1
      SDIR(CDI+2) = CMS + XMIN - 1
      SDIR(CDI+3) = OREC
      CDI = CDI + 4
      IF(NC.EQ.MAXNOB) GOTO 510
      GOTO 210
C
300   CONTINUE
500   DI = DI + 6
C
510   CONTINUE
      SDIR(1) = CDI/4
      NK=SDIR(1)
      TEMP=PERM(1)
      PERM(1)=64
C STORE NOB PARAMETER TEMPORARILY IN PERM(1)
      CALL WPARAM(122,NK,NOBPH)
      PERM(1)=TEMP
C WRITE NOB PARAMETERS
      CALL MVW(TTAB,SDIR(241),60)
      CALL WRITE(SMVB,1,SDIR)
      CALL WRITE(SMVB,2,LIP)
      IF(ISW0.EQ.1) CALL QPRINT('1')
      CALL CLOSE(SMVB)
      CALL CLOSE(CMVB)
      END

C*******
C*     *
C* NOB *   CALMS VERSION
C*     *
C*******
C
C NOB NUMBERS THE RAW SPREAD WITH THE OBJECT NUMBERSGENERATED
C BY FOB
C
      SUBROUTINE NOB(DUMIT,FILPEX)
      IMPLICIT INTEGER(A-Z)
      COMMON/C1/ NK,LT,ST,FI
      LOGICAL ORDER
      BYTE FILPEX(9)
C I/O BUFFERS
      BYTE IBUF2(12344),OBUF(12344)
C RANDOM AREAS
      INTEGER SPAR(10)
      BYTE CHAR(2)
```

```
C SAMPLE AND LINE TABLES FOR OBJECT NUMBERS
      INTEGER ST(60),LT(60),TEMP(60)
      DATA Y/0/,X/0/,REPL/1/,MASKPH/13/
C
C INITIALIZE DATA SETS
C
      CALL SSWTCH(1,ISW1)
      IF(ISW1.EQ.1) CALL TYPE(' NOB')
C
C READ PARAMETERS
C
      CALL RPARAM(NP,NK,122)
      IF(FI.EQ.0) CALL APHASE(MASKPH)
      IF(FI.NE.0) CALL DCLEAR
C CLEAR THE GRAY SCALE UNLESS FINISHING UP A COUNT
      CALL AFILE(IBUF2,DUNIT,FILPEX,2,2)
      CALL AFILE(OBUF,1,'PIC        ',' 5',' 5')
      CALL OPEN(IBUF2,6144,1,0,'SCN')
      CALL OPEN(OBUF,6144,1,1,'NOB')
      CALL GLABEL(IBUF2,SPAR,I2)
      NLI=SPAR(1)
      NSI=SPAR(2)
      NW=NSI/2
      N1=1
      CALL PLABEL(OBUF,SPAR,IBUF2(I2+1))
C
C SEE IF LT IS IN ORDER
      ORDER=.TRUE.
      IF(NK.LT.2) GOTO 45
      DO 40 N=2,NK
      IF(LT(N).LT.LT(N-1)) GOTO 42
40    CONTINUE
      GOTO 45
42    ORDER=.FALSE.
45    CONTINUE
C
C RUN THROUGH EACH LINE OF THE PICTURE
C
      DO 500 L=1,NLI
      CALL GET(IBUF2,L,I2)
      CALL PUT(OBUF,L,O)
      CALL MVW(IBUF2(I2+1),OBUF(O+1),NW)
C
C GENERATE NUMBER FOR EACH OBJECT AT APPROPRIATE TIME
C
      IF(NK.EQ.0.OR.N1.GT.NK) GOTO 210
      DO 200 N=N1,NK
      LD=L-LT(N)
      IF(LD.GT.4) GOTO 200
      IF(LD.GE.-4) GOTO 48
      IF(ORDER) GOTO 210
      GOTO 200
48    CONTINUE
      SD=ST(N)-13
      NCHAR=2
      IF(N.GE.10) GO TO 50
      NCHAR=1
      SD=SD+6
50    IF(SD.LT.1) SD=1
      IF(LD.EQ.-4) GOTO 75
      IF(LD.EQ.4) GOTO 70
      CALL OUTCON(N,CHAR(2),2)
      CALL TEXT(CHAR(3-NCHAR),NCHAR,LD+3,OBUF(O+SD),1)
      CALL ITL(0,OBUF(O+SD+6*NCHAR))
      GO TO 200
70    IF(ORDER) N1=N1+1
75    CALL ITLA(0,OBUF(O+SD),6*NCHAR+1)
200   CONTINUE
210   IF(FI.EQ.0) GOTO 500
C NO DISPLAY IF FINISHING UP A COUNT
      CALL DLINE(OBUF(O+1),Y,X,NSI,REPL,0)
      Y=Y+REPL+1
500   CONTINUE
C
C CLOSE DATA SETS
```

```
C
        CALL CLOSE(IBUF2)
        CALL CLOSE(OBUF)
        CALL EXIT
        END

C       INT1 - INTERACTION 1 TO CHECK NOB OUTPUT AND CORRECT FOB ERRORS
        SUBROUTINE INT1(DUNIT,FILPEX)
        IMPLICIT INTEGER (A-Z)
        COMMON/C1/ NK,LTAB,STAB,FI
        INTEGER PAR(10),SPAR(5),SST(513),NST(513),TTAB(133),MPAR(5)
        INTEGER XTAB(60),YTAB(60),LTAB(60),STAB(60),TEMP(60),RPAR(100)
        BYTE A(12344),BLACK(512),FILPEX(9),BPAR(20),KEY(20),LIGHT(512)
        BYTE MB(19),MT(21),GMSG(128),MK(8),WHITE(8),CHAR(2)
        BYTE BELL(3)
        EQUIVALENCE (PAR,BPAR),(NC,TTAB(2)),(LPS,TTAB(3)),(SPS,TTAB(4))
        EQUIVALENCE (NL,SPAR(1)),(HS,SPAR(2))
        DATA BELL/'+',7,0/
        DATA NTIME/1000/
        DATA MASKPH/13/,NOBPH/6/,ERASE/'105'/,KOUNT/'113'/,ROBPH/5/
        DATA NKEY/20/,KEY/'H','C','J','B','T','A','F','S','I','N'
        1,'U','D','L','R','K','M','X','Z','O','O'/
        NFLAG=1
C ALWAYS SET NFLAG TO 1
C FLAG TO CALL NOB FOR A FINISH COUNT
        CALL ITLA(32,LIGHT,512)
        CALL ZIA(WHITE,4)
        CALL MVL(' DN=*** BACK=*** ',MB,18)
        CALL MVL(' DN=*** THRESH=*** ',MT,20)
        CALL MVL(' NC=** ',MK,7)
        MB(19)=0
        MT(21)=0
        MK(8)=0
        RERUN=0
        CALL TYPE('0CHECK SPREAD',0)
        NK=0
        CALL RPARAM(NRP,RPAR,100,ROBPH)
        CALL RPARAM(NP,NK,122,NOBPH)
        IF(NP.EQ.0) FI=64
        CALL DCOUNT(NK,FI)
C DISPLAY THE COUNT
20      CALL ITLA(32,GMSG,128)
        CALL RCA
C READ CURSOR ADJUSTMENTS
        CALL AFILE(A,DUNIT,FILPEX,2,2)
C OPEN SCAN DATA SET AND READ TTAB
        CALL OPEN(A,6144,1,2,'SCN')
        CALL GLABEL(A,SPAR,IA)
        CALL MVL(A(IA+73),GMSG,64)
C SAVE LABEL FOR PATIENT REPORT
        CALL GET(A,SPAR(1)+1,IA)
        CALL MVU(A(IA+1),TTAB,133)
25      CONTINUE
        CALL PARAM(NP,PAR,10)
30      IF(NP.EQ.0) GOTO 1000
35      IF(PAR(1).EQ.'RS') GOTO 80
        IF(PAR(1).EQ.'SN') GOTO 85
        DO 50 K=1,NKEY
        IF(IV(BPAR(1)).NE.IV(KEY(K))) GOTO 50
        GOTO (90,100,200,300,400,500,600,700,800,850,900,910,920,930,940
        1,1100,1200,1300,1350,1400),K
50      CONTINUE
60      CALL TYPE(' PARAMETER ERROR')
65      CALL TYPE('0')
        GOTO 25
80      CONTINUE
C RS - RESCAN
C
        CALL APHASE(1)
        CALL CLOSE(A)
        CALL EXIT
```

```
 85        CONTINUE
C
C SM  -  SKIP MOB AND CLASFY
C
           CALL APHASE(10)
           CALL CLOSE(A)
           CALL EXIT
 90        CALL TYPE(' TYPE ONE OF THE FOLLOWING KEYWORDS TO SELECT AN OPTION')
           CALL TYPE('  Q - QUICK COUNT')
           CALL TYPE('  C - CUT APART A TOUCH (POSITION CURSOR FIRST)')
           CALL TYPE('  J - JOIN TWO PIECES TOGETHER (USE CURSOR)')
           CALL TYPE('  T - CHANGE THRESHOLD (USE CURSOR)')
           CALL TYPE('  B - CHANGE BACKGROUND (USE CURSOR)')
           CALL TYPE('  S - SET UP THE CURSOR TO CORRECT FOR DRIFT')
           CALL TYPE('  A - ABORT THIS SPREAD')
           CALL TYPE('  RS - RESCAN')
           CALL TYPE('  F - FINISH THIS SPREAD (NO KARYOTYPE)')
           CALL TYPE('  F,NN - FINISH THIS SPREAD; IT HAS NN CHROMOSOMES')
           CALL TYPE('  I - DISPLAY THE INITIAL (UN-NUMBERED) SPREAD')
           CALL TYPE('  N - DISPLAY THE NUMBERED SPREAD')
           CALL TYPE('  E - ERASE THE LAST CUT OR JOIN REQUEST')
           CALL TYPE('  U,D,L,OR R - MOVE THE CURSOR UP,DOWN,LEFT, OR RIGHT')
           CALL TYPE('  K - INTERACTIVE COUNT WITH CURSOR AND BELL')
           CALL TYPE('  M - ADD A MISSING NUMBER (ONLY FOR COUNTS)')
           CALL TYPE('  X - REMOVE AN EXTRA NUMBER (ONLY FOR COUNTS)')
           CALL TYPE('  Z - ZERO THE CHROMOSOME COUNT')
           CALL TYPE('  SM - SKIP MOB (USE OLD RCR)')
           CALL TYPE('  OT N,T - SET THRESH FOR OBJECT N TO T')
           CALL TYPE('  IF SPREAD IS OK, TYPE CARRIAGE RETURN')
           CALL TYPE('0')
           GOTO 25
C
C     C - CUT APART A TOUCH
C
 100       CALL CURSOR(Y1,X1,SL,SS)
           CALL TYPE('+MOVE CURSOR TO END OF CUT ',0)
           DO 105 J=1,2
           DO 105 I=1,3
 105       CALL DLINE(WHITE,Y1-2+I,X1-1,3,0,0)
C MARK THE FIRST ENDPOINT
 110       CALL PARAM(NP,PAR,10)
           IF(NP.EQ.0) GOTO 120
           P=PAR(1)
           IF(P.EQ.'U '.OR.P.EQ.'D '.OR.P.EQ.'L '.OR.P.EQ.'R ') GOTO 115
           IF(P.NE.'E ') GOTO 120
C ERASE THE MARK IF E WAS TYPED
           DO 112 I=1,3
 112       CALL DLINE(255,Y1-2+I,X1-1,3,0,-1)
           GOTO 25
 115       CALL UDLR(PAR)
C CHECK FOR UP,DOWN,LEFT, OR RIGHT
           GOTO 110
 120       CONTINUE
           CALL CURSOR(Y2,X2,EL,ES)
           CALL ADL(SL,SS,EL,ES,SST,NST,NL,NS)
           DO 135 L=SL,EL
           Y=2*(L-1)
           X=2*(SST(L)-1)
 135       CALL DLINE(LIGHT,Y,X,NST(L),1,0)
 140       CALL PARAM(NP,PAR,10)
           IF(IV(BPAR(1)).NE.ERASE) GOTO 150
C RESTORE THE DATA IF E WAS TYPED
           DO 155 L=SL,EL
           Y=2*(L-1)
           X=2*(SST(L)-1)
 155       CALL DLINE(127,Y,X,NST(L),1,-1)
           GOTO 25
 158       RERUN=1
           DO 175 L=SL,EL
           CALL GET(A,L,IB)
           CALL PUT(A,L,IA)
           IF(IA.NE.IB) PAUSE 55
 175       CALL ITLR(0,A(IA+SST(L)),NST(L))
C WRITE ZEROES IN THE DATA SET
           GOTO 30
```

```
C
C       J -- JOIN TWO PIECES TOGETHER
C
200     CONTINUE
        CALL CURSOR(Y1,X1,SL,SS)
        CALL TYPE('+MOVE CURSOR TO END OF JOIN ',0)
        DO 205 I=1,3
205     CALL DLINE(255,Y1-2+I,X1-1,3,0,-1)
C MARK END-POINT
210     CALL PARAM(NP,PAR,10)
        IF(NP.EQ.0) GOTO 220
        P=PAR(1)
        IF(P.EQ.'U ',OR.P.EQ.'D ',OR.P.EQ.'L ',OR.P.EQ.'R ') GOTO 215
        IF(P.NE.'E ') GOTO 220
C ERASE THE MARK IF E WAS TYPED
        DO 212 I=1,3
212     CALL DLINE(WHITE,Y1-2+I,X1-1,3,0,0)
        GOTO 25
215     CALL UDLR(PAR)
        GOTO 210
220     CONTINUE
        CALL CURSOR(Y2,X2,EL,ES)
        CALL ADL(SL,SS,EL,ES,SST,NST,NL,NS)
        DO 235 L=SL,EL
        Y=2*(L-1)
        X=2*(SST(L)-1)
235     CALL DLINE(127,Y,X,NST(L),1,-1)
C ERASE ON THE GRAY SCALE TO INDICATE THE JOIN LINE
240     CALL PARAM(NP,PAR,10)
        IF(IV(SPAR(1)).NE.ERASE) GOTO 258
        DO 255 L=SL,EL
        S=SST(L)
        CALL GET(A,L,IA)
255     CALL DLINE(A(IA+S),2*(L-1),2*(S-1),NST(L),1,0)
C REWRITE THE DATA
        GOTO 25
258     RERUN=1
        DO 275 L=SL,EL
        CALL GET(A,L,IA)
        CALL PUT(A,L,IA)
275     CALL ITLA(127,A(IA+SST(L)),NST(L))
C WRITE 127 IN THE DATA SET FOR THE JOIN LINE
        GOTO 30
C
C       B - CHANGE BACKGROUND
C
300     CONTINUE
        CALL CURSOR(Y,X,L,S)
        CALL GET(A,L,IA)
        CALL OUTCON(IV(A(IA+S)),MB(7),3)
        IT=(L/LPS)*NC+S/SPS+1
        IF(S/SPS.EQ.NC) IT=IT-1
        CALL OUTCON(TTAB(68+IT),MB(16),3)
        CALL TYPE(MB,0)
        BORT=68
C SET TO CHANGE BACK
320     CALL PARAM(NP,PAR,10)
        IF(NP.EQ.0) GOTO 25
        IF(NP.GT.1) GOTO 35
        IF(PAR(1).GT.127.OR.PAR(1).LT.0) GOTO 60
        TTAB(BORT+IT)=PAR
        CALL GET(A,SPAR(1)+1,IA)
        CALL PUT(A,SPAR(1)+1,IA)
        CALL NVU(TTAB,A(IA+1),133)
        RERUN=1
        GOTO 25
C
C       T - CHANGE THRESHOLD
C
400     CONTINUE
        IF(IV(MT(7)).NE.IV('*')) GOTO 440
C GOTO 440 IF T WAS ALREADY REQUESTED
C DISPLAY THE SECTOR BOUNDARIES
        DO 410 L=LPS,NL,LPS
410     CALL DLINE(WHITE,L+L,NS+NS,0,1,0)
```

```
              CALL ITLA(127,BLACK,512)
              DO 415 S=SPS,NS,SPS
    415       BLACK(S)=0
              DO 420 I=1,5
    420       CALL DLINE(BLACK,NL+NL+I+I-2,0,NS,1,0)
    440       CONTINUE
              CALL CURSOR(Y,X,L,S)
              CALL GET(A,L,IA)
              CALL OUTCON(IY(A(IA+S)),MT(7),3)
              IT=(L/LPS)*NC+S/SPS+1
              IF(S/SPS.EQ.NC) IT=IT-1
              CALL OUTCON(TTAB(4+IT),MT(18),3)
              CALL TYPE(MT,0)
              BORT=4
C SET TO CHANGE THRESH
              GOTO 320
C
C      A - ABORT
C
    500       CONTINUE
              CALL APHASE(0)
              RERUN=0
              GOTO 1000
    600       CONTINUE
C
C F - FINISH KEYWORD
C
              IF(NFLAG.NE.0) GOTO 610
C IF NOB WILL BE CALLED GOTO 610
              CALL APHASE(MASKPH)
              CALL CLOSE(A)
              CALL AFILE(A,1,'PIC      ',5,5)
              CALL OPEN(A,512,0,2,'NOB')
C SET TO ADD NK TO NOB OUTPUT LABEL
              GOTO 620
    610       CONTINUE
              FI=0
              CALL UPARAM(122,NK,NOBPH)
C SET NOB TO CALL MASK AND NOT PUT UP THE DISPLAY
              CALL APHASE(NOBPH)
    620       IF(NP.EQ.3) NK=PAR(3)
C USE OPERATOR SUPPLIED COUNT
              CALL OUTCON(NK,GMSG(68),4)
C CONVERT NK FOR GMSG
              CALL MVL(GMSG,TEMP,69)
              TEMP(25)="50:2
C INSERT LF LF
              CALL TYPE(TEMP,70)
              CALL GLABEL(A,SPAR,IA)
              CALL MVL(GMSG(67),A(IA+290),2)
              CALL PLABEL(A,SPAR,A(IA+1))
C INSERT NK IN THE LABEL
    630       CALL CLOSE(A)
              CALL AFILE(A,4,'PDATA    ',6,6)
              CALL OPEN(A,512,0,2,'PRP')
              CALL GLABEL(A,SPAR,IA)
              NL=NL+1
              CALL PLABEL(A,SPAR,A(IA+1))
              CALL GET(A,NL,IA)
              CALL MVL(GMSG,A(IA+1),128)
              CALL PUT(A,NL,IA)
              PAR(1)='KG'
              PAR(3)=DUNIT
              CALL MVL(FILPEX,PAR(4),10)
              CALL UPARAM(8,PAR,MASKPH)
              CALL CLOSE(A)
              CALL EXIT
    700       CALL SC
              GOTO 25
C
C DISPLAY THE RAW SCAN WITHOUT OBJECT NUMBERS
C
    800       CALL DCLEAR
              FI=64
              MT(7)='*'
```

```
C RESET THRESH INDICATOR
      DO 820 L=1,NL
      CALL GET(A,L,IA)
820   CALL DLINE(A(IA+1),2*(L-1),0,NS,1,0)
      CALL DCOUNT(NK,FI)
      GOTO 25
C
C DISPLAY THE NOB OUTPUT
C
850   FI=64
      CALL UPARAM(122,NK,NOBPH)
      CALL APHASE(NOBPH)
      CALL CLOSE(A)
      CALL EXIT
900   CALL MCU
      GOTO 25
910   CALL MCD
      GOTO 25
920   CALL MCL
      GOTO 25
930   CALL MCR
      GOTO 25
940   CONTINUE
C
C INTERACTIVE COUNT
C
945   CALL CURSOR(Y0,X0,L,S)
      DO 947 I=1,NTIME
      CALL CURSOR(Y,X,L,S)
      IF(Y.NE.Y0.OR.X.NE.X0) GOTO 945
947   CONTINUE
C CURSOR HAS NOT MOVED IN A WHILE
      IF(Y.LT.24.AND.X.GT.1000) GOTO 995
C IF UPPER RIGHT GOTO 995
      CALL CURSOR(Y,X,L,S)
      IF(Y.GT.1000.AND.X.GT.1000) GOTO 970
      CALL TYPE(BELL,0)
C RING THE BELL
      NFLAG=1
      IF(NK.LT.60) NK=NK+1
      CALL DCOUNT(NK,FI)
      YTAB(NK)=Y
      XTAB(NK)=X
      LTAB(NK)=L
      STAB(NK)=S
      DO 950 J=1,2
      DO 950 I=1,3
950   CALL DLINE(WHITE,Y-2+I,X-1,3,0,0)
960   CALL CURSOR(Y2,X2,L,S)
      IF(Y2.EQ.Y.AND.X2.EQ.X) GOTO 960
C WAIT FOR CURSOR TO BE MOVED
      GOTO 945
970   CALL OUTCON(HK,MK(6),2)
      CALL TYPE(MK,0)
      IF(NK.LT.2) GOTO 25
C ORDER THE TABLE
      DO 990 N=2,NK
      IF(LTAB(N).GE.LTAB(N-1)) GOTO 990
      LTN=LTAB(N)
      DO 980 J=1,N
      IF(LTN.LE.LTAB(J)) GOTO 985
980   CONTINUE
985   NMOV=N-J
      CALL MVW(LTAB(J),TEMP,NMOV)
      LTAB(J)=LTN
      CALL MVW(TEMP,LTAB(J+1),NMOV)
      CALL MVW(STAB(J),TEMP,NMOV)
      STAB(J)=STAB(N)
      CALL MVW(TEMP,STAB(J+1),NMOV)
990   CONTINUE
      GOTO 25
995   CONTINUE
C ERASE THE LAST SPOT
      DO 997 J=1,2
      DO 997 I=1,3
```

```
 997    CALL DLINE(127,YTAB(NK)-2+I,XTAB(NK)-1,3,0,-1)
        IF(NK.GT.0) NK=NK-1
        CALL DCOUNT(NK,FI)
        GOTO 960
1080    CALL CLOSE(A)
        IF(RERUN.GT.0) CALL APHASE(2)
        CALL EXIT
C
1100    CONTINUE
C
C N PARAMETER - ADD A NUMBER FOR THE MISSING OBJECT
C
        NFLAG=1
        IF(NK.GE.60) GOTO 60
        CALL CURSOR(Y,X,L,S)
        DO 1110 J=1,2
        DO 1110 I=1,5
1110    CALL DLINE(WHITE,Y-3+I,X-2,5,0,0)
        DO 1120 N=1,NK
        IF(L.LT.LTAB(N)) GOTO 1130
1120    CONTINUE
        LTAB(NK+1)=L
        STAB(NK+1)=S
        GOTO 1140
1130    NMOV=NK-N+1
        CALL MVW(LTAB(N),TEMP,NMOV)
        CALL MVW(TEMP,LTAB(N+1),NMOV)
        LTAB(N)=L
        CALL MVW(STAB(N),TEMP,NMOV)
        CALL MVW(TEMP,STAB(N+1),NMOV)
        STAB(N)=S
1140    NK=NK+1
        CALL DCOUNT(NK,FI)
        GOTO 25
1200    CONTINUE
C
C X PARAMETER - REMOVE ONE OF THE NUMBERED OBJECTS
C
        NFLAG=1
        IF(NK.LT.1) GOTO 60
        CALL CURSOR(Y,X,L,S)
        MIN=20
C FIND THE OBJECT CLOSEST TO L,S AND NO MORE THAN 20 AWAY
        DO 1220 N=1,NK
        DIF=IABS(LTAB(N)-L)+IABS(STAB(N)-S)
        IF(DIF.GT.MIN) GOTO 1220
        MIN=DIF
        NMIN=N
1220    CONTINUE
        IF(MIN.EQ.20) GOTO 60
        N=NMIN
        Y=LTAB(N)*2-2
        X=STAB(N)*2-2
        IF(X.LT.7) X=7
        DO 1240 J=1,2
        DO 1240 I=1,9
1240    CALL DLINE(127,Y-5+I,X-7,9,0,-1)
C ERASE THE OLD NUMBER
        NMOV=NK-N
        IF(NMOV.EQ.0) GOTO 1250
        CALL MVW(LTAB(N+1),LTAB(N),NMOV)
        CALL MVW(STAB(N+1),STAB(N),NMOV)
1250    NK=NK-1
        CALL DCOUNT(NK,FI)
        GOTO 25
C
C       Z - ZERO CHROMOSOME COUNT
C
1300    NK=0
        GOTO 25
C
C       Q - QUICK COUNT
C
1350    PAR(1)='TO'
        PAR(3)=-1
```

```
        CALL UPARAM(3,PAR,2)
        CALL APHASE(2)
        CALL UPARAM(122,NK,NOBPH)
        CALL CLOSE(A)
        CALL EXIT
C QUICK COUNT OPTION
C
C       OT - SET OBJECT THRESHOLD
C
1400    CALL MVU(PAR,RPAR(NRP+1),4)
        NRP=NRP+4
        CALL UPARAM(NRP,RPAR,ROBPH)
        RERUN=1
        GOTO 25
        END

C
C       **********
C       *        *
C       *  MOB   *
C       *        *
C       **********
C
C       MOB PROVIDES:
C  A)   THE ORIENTATION MECHANISMS.  EACH INPUT OBJECT
C       IS FIRST ENCLOSED IN A MINIMUM ENCLOSING RCTANGLE.  THEN, THE OBJE
C       IS ROTATED INTO TH INDICATED ORIENTATION , MEASURED
C       AND THEN WRITTEN OUT.  MOB ACCUMULATES A CHROMOSOE
C       DIRCTORYE CONTAINING THE RESULTS OF THE MEASUREMENTS
C
        SUBROUTINE MOB
C
        COMMON/C1/NOB,IDIR
        COMMON/C1/CHDIR,SMLBUF,LRGBUF,NS,NL,CUROLN
        COMMON/C1/ SST,EST
        COMMON/C1/SPIOD,SPLTH,SPAREA
C SMALL BUFFER, FOR HOLDING ROTATED, UNMAGNIFIED OBJECT
        BYTE SMLBUF(90,50)
C LARGE BUFFER, FOR HOLDING UNROTATED OBJECT
        BYTE LRGBUF(90,90)
C BUFFER FOR I/O
        BYTE BUF(2124)
        BYTE OBUF(2124)
C NUMBER OF INPUT OBJECTS
        INTEGER NOB
C SYSTEM PARAMETERS
        INTEGER SPAR(5)
        EQUIVALENCE (SPAR(1),NLI),(SPAR(2),NSI)
C PARAMETER DEY FOR DECODING
        INTEGER NKEY,KEY(11)
C ENDPOINT TRACKERS (8 FRACTIONAL BITS)
        INTEGER XMIN,XMAX,YMIN,YMAX,XSMIN,XSMAX,YSMIN,YSMAX
C STARTING & ENDING SAMPLE TABLE
        INTEGER*2 SST(88),EST(88)
C RANDOM AREAS
C RETURN CODE FROM ORIENTATION SUBROUTINE
        INTEGER RCODE
C RADIANS/DEGREE
        REAL RPD
C OPERATOR SPECIFIED CENTROMERE POSITION
        INTEGER OPCEN(60)
C OPERATOR FLIP FLAG
        LOGICAL OPFLIP(60)
C OPERATOR SPECIFIED ROTTATION
        INTEGER OPROT(60)
C CENTROMERE LOCATION METHOD
        INTEGER CLMETH
C SKELETON FLAG
        LOGICAL SKFLG
C SKELETON SWITCH
        LOGICAL SWSK
C SKELETON ROUTINE PARAMETERS
```

```
        INTEGER SKMIN,SKDELT
C PI & PI/2
        REAL PI,PIHALF
C DELTA THETA
        REAL DELTA
        LOGICAL L4
        INTEGER SEGLTH
        INTEGER BLK,BS,SL
C CURRENT OUTPUT LINE #
        INTEGER CUROLN,BL,CHRENT
C       PARAMETER AREA
        INTEGER PAR(500)
        EQUIVALENCE (PAR,LRGBUF)
C
C INPUT DIRECTORY
C
        INTEGER IDIR(4,60)
C FIRST BLOCK WRITTEN
        INTEGER FBW
C MINIMUM LINE
        INTEGER ML
C MINIMUM SAMPLE
        INTEGER MS
C LAST BLOCK WRITTEN
        INTEGER LBW
C
C CHROMOSOME DIRECTORY AND ITS FORMAT
C
        INTEGER CHDIR(15,60)
C BLOCK NUMBER OF 1ST LINE OF OBJECT
        INTEGER BLKNO
C NUMBER OF SAMPLES IN OBJECT
        INTEGER DIRNS
C NUMBER OF LINES IN OBJECT
        INTEGER DIRNL
C LENGTH OF CHRORMOSONE
        INTEGER LENGTH
C INTEGERATED OPTICAL DENSITY
        INTEGER IOD
C CENTROMERIC INDICIES
        INTEGER CIL,CID,CIA
C CENTROMERE LINE NUMBER
        INTEGER CENLIN
C PERIMETER
        INTEGER PERIM
C AREA
        INTEGER AREA
C PERIMETER SQUARED DIVIDED BY AREA
        INTEGER PSQDA
C CENTROMERE LOCATION METHOD
        INTEGER CEMETH
C MINIMUM AND MAXIMUM AREAS FOR CHROMOSOMES
        INTEGER MAXOA,MINOA
C DEGREES/ ROTATION INCREMENT
C SAMPLE ACCUMULATORS
        INTEGER DENA(88),AREAA(88),ACC(176)
        EQUIVALENCE(DENA(1),ACC(1)),(AREAA(1),ACC(89))
C
C TOTAL AREA AND TOTAL DENSITY FOR NORMALIZING
C
        INTEGER TAREA,TDEN
C
C ACCUMULTORS FOR CALCULATING CIA AND CID
C
        INTEGER CDEN,CAREA
C
C SPREAD MEASUREMENTS
C
        REAL SPIOD,SPAREA,SPLTH
C
C SHORT ARM INDICATOR
C
        INTEGER SHRTA
C
C RANDOM AREAS
C
```

```
       INTEGER CEN,CENP1,S,PER
       REAL DPINC
       BYTE EM(28)
C REMEASUREMENT CHROMOSOME SELECTOR
       LOGICAL SELFLG,SEL(60)
C
C DATA STATEMENTS
C
       DATA DPINC/2.8125/
       DATA MAXCHR/60/
       DATA NKEY/11/,KEY/'AR','RO','FL','CI','LW','SK','SP','SE',
     - 'LD','MW','MD'/
       DATA SKMIN/16/,SKDELT/2/
       DATA ID/3/,RPD/.017453/,PI/3.14159/,PIHALF/1.5708/
       DATA FBW/1/,HL/2/,MS/3/,LBW/4/
       DATA DELTA/.05236/
       DATA SKFLG/.FALSE./
       DATA BLKNO/1/,DIRNS/2/,DIRNL/3/,LENGTH/4/,IOD/5/,CIL/6/,CID/7/
       DATA CIA/8/,CENLIN/9/,PERIM/10/,AREA/11/,PSQDA/12/,CEMETH/13/
       DATA OPFLIP/60*.FALSE./,OPCEN/60*0/,OPROT/60*0/
       DATA MAXNL/80/,MAXNS/80/,CHRENT/15/
       DATA SELFLG/.FALSE./,SEL/60*.FALSE./
       CALL MVL(' OBJ ** REJECTED **** ** **',EM,28)
C
C INITIALIZE SPREAD MEASUREMENTS
C
       SPIOD=0
       SPAREA=0
       SPLTH=0
       CUROLN=0
       NC=0
C
C INITIALIIZE CHROMOSOME DIRECTORY
C
       CALL ITIA(0,CHDIR,MAXCHR*CHRENT)
       MINOA=30
       MAXOA=2000
       CLMETH=80
       SWSK=.FALSE.
C DEFAULT IS LW - NO SKELETON AND WIDTH TO LOCATE CENTROMERE
C
C RETRIEVE PARAMETERS AND DECODE
C
95     CALL RPARAM(NP,PAR,500,8)
       IP=1
10     IF(IP.GT.NP) GO TO 50
       IPN=PAR(IP+2)
       DO 12 J=1,NKEY
       IF(PAR(IP).EQ.KEY(J)) GO TO (15,18,21,24,32,40,45,47,51,54,57),J
   12  CONTINUE
C
C INVALID PARAMETER
C
13     CALL TYPE(' *** PARAMETER ERROR')
       GO TO 95
C
C PARAMETER AR - SET MINIMUM & MAXIMUM OBJECT AREA
C
15     MINOA=PAR(IP+2)
       MAXOA=PAR(IP+3)
       IP=IP+4
       GO TO 10
C
C PARAMETER ROTA - ROTATE SPECIFIED OBJECT PRESCRIBED AMOUNT
C
18     IF(IPN.LT.1.OR.IPN.GT.MAXCHR) GO TO 13
       K=PAR(IP+3)/DPINC
       OPROT(IPN)=K*4
   19  IP=IP+4
       GO TO 10
C
C PARAMETER FLIP - FLIP SPECIFIED OBJECT
C
21     IF(IPN.LT.1.OR.IPN.GT.MAXCHR) GO TO 13
```

```
              OPFLIP(IPN)=.TRUE.
          GO TO 25
C
C PARAMETER CIL - SET CENTROMERIC INDEX
  24      IF(IPN.LT.1.OR.IPN.GT.MAXCHR) GO TO 13
          OPFLIP(IPN)=.FALSE.
  25      OPCEN(IPN)=PAR(IP+3)
          GO TO 19
C
C PARAMETER LW - LOCATE CENTORMERE BY WIDTH
C
  32      CLMETH=88
          SWSK = .FALSE.
          IP=IP+2
          GO TO 10
C
C PARAMETER SK - OUTPUT SKELETON PICTURES
C
  40      SKFLG=.TRUE.
          IP=IP+2
          GO TO 10
C
C PARAMETER SP - SET SKELETON PARAMETERS
C
  45      SKMIN=PAR(IP+2)
          SKDELT=PAR(IP+3)
          IP=IP+4
          GO TO 10
C
C PARAMETER SE - SELECT CHROMOSOMES FOR REMEASUREMENT
C NOTE - THIS PARAMETER ASSUMES THAT A CHROMOSOME DIRECTORY
C EXISTS FROM PREVIOUS MOBBING ON RCR
C
  47      K=PAR(IP+2)
          IF(K.LT.1.OR.K.GT.60) GO TO 13
          SELFLG=.TRUE.
          IP=IP+3
          DO 48 M=1,K
          L=PAR(IP)
          IP=IP+1
          SEL(L)=.TRUE.
  48      CONTINUE
          GO TO 10
C
C PARAMETER LD - LOCATE CENTROMERE BY DENSITY
C
  51      CLMETH=0
          SWSK = .FALSE.
          IP=IP+2
          GO TO 10
C
C PARAMETER MW - LOCATE CENTROMERE USING WIDTH AND MODEL(SKELETON)
C
  54      CLMETH = 88
          IP=IP+2
          SWSK=.TRUE.
          GO TO 10
C
C PARAMETER MD - LOCATE CENTROMERRE USING DENSITY AND MODEL(SKELETON)
C
  57      CLMETH =0
          IP=IP+2
          SWSK=.TRUE.
          GO TO 10
C
C OPEN DATA SETS
C
  58      CALL AFILE(BUF,3,'UCR       ','13,'13)
          CALL AFILE(OBUF,1,'RCR       ','13,'13)
          CALL OPEN(BUF,1024,1,0,'UCR')
          CALL OPEN(OBUF,1024,1,1,'RCR')
          CALL GLABEL(BUF,SPAR,IB)
          SPAR(1)=125
C PUT MAX NL IN LABEL SO COPY WILL NOT CAUSE F374
          CALL PLABEL(OBUF,SPAR,BUF(IB+1))
```

```
C
C READ IN ROB DIRECTORY
C
        CALL GET(BUF,1,IB)
        CALL MVL(BUF(IB+1),NOB,MAXCHR*8+2)
        CALL GET(BUF,2,IB)
        DO 55 I=1,NOB
55      CHDIR(PERIM,I)=IV2(BUF(IB+241+(I-1)*2))
        IF(.NOT.SELFLG) GO TO 60
C
C READ PREVIOUS MOB RESULTS IF SELECTIVELY RE-MEASUREING
C
        CALL GET(OBUF,1,IB)
        CALL MVL(OBUF(IB+3),SPIOD,12)
        CUROLN=IV2(OBUF(IB+15))
        NC=IV2(OBUF(IB+17))
        CALL MVL(OBUF(IB+31),CHDIR(1,1),2*15*30)
        CALL GET(OBUF,2,IB)
        CALL MVL(OBUF(IB+31),CHDIR(1,31),2*15*30)
60      CONTINUE
C
C
C MAIN PROGRAM LOOP - EXECUTED ONCE FOR EACH OBJECT TO BE MEASURED
C
C
        DO 500 N=1,NOB
        IF(.NOT.SELFLG)GO TO 70
        IF(.NOT.SEL(N)) GO TO 500
        SPIOD=SPIOD-CHDIR(IOD,N)
        SPLTH=SPLTH-CHDIR(LENGTH,N)
        SPAREA=SPAREA-CHDIR(AREA,N)
        NC=NC-1
70      CONTINUE
C
C INITIALIZE STORAGE FOR THE OBJECT
C
        CALL ITIA(89,SST,MAXNS)
        CALL ITIA(0,EST,MAXNS)
        CALL ITIA(0,LRGBUF,90*90/2)
        NL=0
        NS=0
C
C READ & PROCESS OBJECT BLOCKS
C
        KK=0
        IL=0
        BL=0
        IFB=IDIR(FBW,N)
        ILB=IDIR(LBW,N)
        MINS=IDIR(MS,N)-1
C
C READ EACH BLOCK ONE BY ONE
C
        DO 145 BLK=IFB,ILB
        CALL GET(BUF,BLK,IB)
        NSEG=IV2(BUF(IB+1))
        II=IB+3
C
C PROCESS EACH SEGMENT WITHIN THE BLOCK
C
        DO 140 I1=1,NSEG
        IF(IL.EQ.IV2(BUF(II))) GO TO 110
        IL=IV2(BUF(II))
        BL=BL+1
        IF(BL.GT.88) GO TO 490
110     BS=IV2(BUF(II+2))-MINS
        IF(BS.LT.0) GOTO 490
C IGNORE POSSIBLE BUG IN FOB OUTPUT DATA ******************
        IF(SST(BL).EQ.89) SST(BL)=BS
        NSAMP=IV2(BUF(II+4))
        IF(NSAMP.GT.88) GO TO 490
        KK=KK+NSAMP
        EST(BL)=BS+NSAMP-1
        IF(EST(BL).GT.MAXNS) GO TO 490
C
```

```
C TRANSFER SEGMENT INTO LRGBUF
C
        CALL MVL(BUF(II+6),LRGBUF(BS,BL),NSAMP)
        IF(NSAMP-(NSAMP/2)*2.NE.0) NSAMP=NSAMP+1
140     II=II+NSAMP+6
145     CONTINUE
C
C REJECT OBJECT IF IT IS TOO SMALL OR TOO LARGE
C
        IF(KK.GT.MAXOA.OR.KK.LT.MINOA) GO TO 490
C
C ORIENT THE OBJECT
C
        CALL ORIOB(LRGBUF,SMLBUF,SST,CHDIR(1,N),BL,OPROT(N),RCODE)
        NS=CHDIR(DIRNS,N)
        NL=CHDIR(DIRNL,N)
        IF(RCODE.NE.0) GO TO 490
        NC=NC+1
C
C BUILD ACCUMULATOR TABLES
C
        CALL ACCSUB(SMLBUF,NL,NS,AREAA,DENA,TAREA,TDEN)
C
C BUILD AND ANALYZE THE SKELETON IF LOCATING
C THE CENTROMERE BY DENSITY
C
        METH=1
C ASSUME OPERATOR SUPPLIED CENTROMERE (SET METH=1)
        CEN=OPCEN(N)
        IF(CEN.NE.0) GOTO 170
C CHECK FOR OPERATOR SUPPLIED CENTROMERE
        METH=0
C SET METH=0 FOR AUTOMATIC CENTROMERE
C       IF(.NOT.SWSK) GO TO 150
C       CALL SKSUB(SMLBUF,NL,NS,LRGBUF,CEN,DENA,SKMIN,SKDELT,CLMETH)
C       IF(CEN.NE.0) GO TO 250
C
C THE PREVIOUS STATEMENTS WERE COMMENTED OUT TO MAKE MORE ROOM
C
C LOCATE CENTROMERE BY ALTERNATE METHOD
C
150     ASSIGN 165 TO LOOP
C
C LOOK FOR CENTROMERE IN MIDDLE HALF OF IMAGE
C
        NS1=(NS-(NS/2)+1)/2
C
C FIND MINIMUM
C
155     CONTINUE
        NS2=NS-NS1+1
        MINA=ACC(NS1+CLMETH)
        CEN=NS1
        DO 160 I=NS1,NS2
        IF(ACC(I+CLMETH).GE.MINA) GO TO 160
        MINA=ACC(I+CLMETH)
        CEN=I
160     CONTINUE
        GO TO LOOP
C
C CENTROMERE HAS BEEN TENTATIVELY LOCATED.  IT IS CORRECT
C IF NOT ONE OF THE ENDPOINTS. IF IT IS AN ENDPOINT, LOOK
C FOR A CENTROMERE WITH AN INDEX BETWEEN .75 AND .87
C
165     IF(CEN.NE.NS1.AND.CEN.NE.NS2) GO TO 230
        ASSIGN 230 TO LOOP
        NS1=(NS+4)/8+1
        GO TO 155
C
C ADJUST CENTROMERE AS REQUIRED BY OPERATOR
C
170     IF(CHDIR(CENLIN,N).LT.0) CEN=NS-CEN+1
C ADJUST FOR SHORT ARM ON RIGHT ORIGINALLY
        MINA=ACC(CEN+CLMETH)
C LOOK ONE UP AND DOWN TO SEE IF THEY ARE SMALLER
        IF(ACC(CEN+1+CLMETH).LT.MINA) GOTO 180
```

```
             IF(ACC(CEN-1+CLMETH).LT.MINA) CEN=CEN-1
             GOTO 250
 180         CEN=CEN+1
             GOTO 250
C
C CHECK FOR DUPLICATE MINIMA AND TAKE AVERAGE IF SO
C
 230         J=0
             CENP1=CEN+1
             DO 240 I=CENP1,NS2
             IF(ACC(I+CLMETH).NE.MINA) GOTO 245
 240         J=J+1
 245         CEN=CEN+J/2
C
C MEASURE THE ARMS
C
 250         CALL DPT(SMLBUF,HL,CEN,LD2)
             CALL DPT(SMLBUF,HL,1,LD1)
             CALL DPT(SMLBUF,HL,NS,LD3)
             A1LTH=SQRT((CEN-.5)**2+(FLOAT(LD2-LD1))**2)
             A2LTH=SQRT((NS-CEN+.5)**2+(FLOAT(LD3-LD2))**2)
             CHRLTH=A1LTH+A2LTH
             ICMR=100.*A1LTH/CHRLTH+.5
             SHRTA=1
             IF(OPCEN(N).EQ.0) GOTO 260
C FIND SHORT ARM FOR OPERATOR SUPPLIED CENTROMERE
             IF(CHDIR(CENLIN,N).LT.0) SHRTA=-1
             IF(OPFLIP(N)) SHRTA=-SHRTA
             GOTO 265
 260         IF(ICMR.GE.50) SHRTA=-1
 265         IF(ICMR.LT.50) ICMR=100-ICMR
             IF(ICMR.GT.99) ICMR=99
C
C CALCULATE CID AND CIA
C
             CDEN=0
             CAREA=0
             DO 270 I=1,CEN
             CDEN=CDEN+DENA(I)
 270         CAREA=CAREA+AREAA(I)
             IDR=((200.*CDEN)-(100.*DENA(CEN))+FLOAT(TDEN))/(2.*TDEN)
             IF(IDR.LT.50) IDR=100-IDR
             IF(IDR.GT.99)IDR=99
             IAR=((200.*CAREA)-(100.*AREAA(CEN))+FLOAT(TAREA))/FLOAT(TAREA+TAREA)
             IF(IAR.LT.50) IAR=100-IAR
             IF(IAR.GT.99) IAR=99
C
C ADD MEASUREMENTS TO CHROMOSOME DIRECTORY
C
             IF(SHRTA.EQ.-1) CEN=CEN-NS-1
C STORE NEGATIVE CEN TO FLAG SHORT ARM ON RIGHT
             CHDIR(CENLIN,N)=CEN
             CHDIR(LENGTH,N)=CHRLTH+.5
             CHDIR(IOD,N)=TDEN
             CHDIR(AREA,N)=TAREA
             CHDIR(CIL,N)=ICMR
             CHDIR(CIA,N)=IAR
             CHDIR(CID,N)=IDR
             FPER=CHDIR(PERIM,N)
             FPSDA=(FPER*FPER)/(TAREA-.5*FPER)
             IF(FPSDA.GT.327.) FPSDA=327.
C CHECK FOR INTEGER OVERFLOW
             CHDIR(PSQDA,N)=100.*FPSDA
             CHDIR(CEMETH,N)=METH
C
C ADD INDIVIDUAL MEASUREMENTS TO SPREAD MEASUREMENTS
C
             SPIOD=SPIOD+TDEN
             SPAREA=SPAREA+TAREA
             SPLTH=SPLTH+CHRLTH
C
C STAND CHROMOSOME UP AND WRITE IT INTO ROTATED FILE
C
             IP=NS
             LPB=1024/HL
             CHDIR(BLKNO,N)=CUROLN
```

```
300     CALL PUT(OBUF,CUROLN,IB)
        CUROLN=CUROLN+1
        IF(SKFLG) GO TO 305
        CALL CHROUT(SMLBUF,OBUF(IB+1),NS,NL,LPB,IP,SHRTA,90)
        GO TO 310
305     CALL CHROUT(LRGBUF,OBUF(IB+1),NS,NL,LPB,IP,SHRTA,90)
310     CONTINUE
        IF(IP.NE.0) GO TO 300
        GO TO 500
C
C OBJECT BYPASSED
C
490     CONTINUE
        CHDIR(BLKNO,N)=0
        CALL OUTCON(N,EM(7),2)
        CALL OUTCON(KK,EM(22),4)
        CALL OUTCON(NL,EM(25),2)
        CALL OUTCON(NS,EM(28),2)
        CALL TYPE(EM,28)
C
C END OF MAIN LOOP
C
500     CONTINUE
C
C UPDATE CHROMOSOME DIRECTORY ON DISC
C
        CALL PUT(OBUF,1,IB)
        CALL ITL2(NOB,OBUF(IB+1))
        CALL ITL2(CUROLN,OBUF(IB+15))
        CALL ITL2(NC,OBUF(IB+17))
        CALL MVL(SPIOD,OBUF(IB+3),12)
        CALL MVL(CHDIR(1,1),OBUF(IB+31),2*30*15)
        CALL PUT(OBUF,2,IB)
        CALL MVL(CHDIR(1,31),OBUF(IB+31),2*30*15)
        CALL CLOSE(OBUF)
        CALL CLOSE(BUF)
C
C MEASUREMENTS COMPLETED
C
999     CONTINUE
        CALL EXIT
        END

C
C**********
C*        *
C* CLASFY *         COMPILE WITH /CO:25        ************
C*        *
C**********
C
C
C CLASFY PROVIDES THE CLASSIFICATION MECHANISM FOR THE CLINICLA
C ALMS SYSTEM.  ITS INPUT IS THE CHROMOSOEM DIRCTORY PRODUCED BY NOB
C AND ITS OUTPUT CONSISTS OF THE RESULTS OF THE CLASSIFICATION PRO-
C CEDURE WHICH IS UTILIZED BY KTYPE TO PRODUCE THE KARYOGRAM
C
C
        SUBROUTINE CLASFY
        COMMON/C1/IIG,CIG,OFG,ICTB,ILTB
        COMMON/C1/NOB,SPIOD,SPLTH,SPAREA,CHDIR,IOBUF
        COMMON/C1/NSO,NFLAG,GID,SID4,ISR,OFS,SCLT,SCS
C
C COMMON REGION
C
C NUMBER OF CHROMOSOMES
C
        INTEGER NOB
C
C CHROMOSOME DIRECTORY
C
        INTEGER CHDIR(15,60)
C
C FORMAT OF DIRECTORY
C
C BLOCK NO. OF FIRST BLOCK OF AN OBJECT
```

```
      INTEGER BLKNO
C NUMBER OF LINES IN OBJECT
      INTEGER DIRNL
C NUMBER OF SAMPLES IN OBJECT
      INTEGER DIRNS
C CHROMOSOME LENGTH
      INTEGER LENGTH
C INTEGERATED OPTICAL DENSITY
      INTEGER IOD
C CENTROMERIC INDEX BY LENGHT
      INTEGER CIL
C CENTROMERIC INDEX BY DENSITY
      INTEGER CID
C CENTROMERIC INDEX BY AREA
      INTEGER CIA
C CENTROMERE LINE NUMBER IN ORIGINAL PICTURE
      INTEGER CENLIN
C PERIMETER
      INTEGER PERIM
C AREA OF CHROMOSOME
      INTEGER AREA
C PERIM**2/AREA
      INTEGER PSQDA
C # OF DIRECTORY ENTRIES FOR EACH CHROMOSOME
      INTEGER CHRENT
C
C IO BUFFER
C
      BYTE IOBUF(4200)
C
C RANDOM AREAS
C
      INTEGER SPAR(10)
      BYTE ICIL(27)
      INTEGER SLSIZ,RECSIZ,OFSF,SEX
      INTEGER SCSFLG
      INTEGER CNAM(20)
      BYTE MMSG(29),FMSG(36),SMSG(39),PEM(22)
      INTEGER KG(10),JG(10),IG(10),KFAIL(10),JFAIL(10)
      INTEGER CT(20,51),MCT(20,51),MAC(10),MAL(10)
      REAL ST(11)
      INTEGER IST(12),NOG(11),OLDS(50),NEUS(50)
      INTEGER SCS(90),SCLT(5),XTBL(40),ISR(6),CIG(11),IIG(11)
      INTEGER SID4(90),OFG(275),ICTB(60),ILTB(60)
      INTEGER AC(10),AL(10),MING(10),MAXG(10),CTAB(6)
      INTEGER OFS(91),PAR(900),KEY(19)
      LOGICAL GID(10)
      INTEGER YINT(275),YID,BID
      LOGICAL DEBUG,NOX
C
C DATA STATEMENTS
C
      DATA NG/10/,NG1/11/,NG2/12/,NGT2/20/,NGT2M1/19/,YID/'Y '/
      DATA BID/'  '/,ST/6*20.,2*.25,-1.,2*20./,Z/0./
      DATA CT/120*0,18*0,68,99,18*0,68,99,16*0,
     150,67,68,99,16*0,50,67,68,99,
     116*0,59,67,68,99,14*0,62,82,50,67,68,99,14*0,62,84,50,67,68,
     299,10*0,85,99,57,67,62,84,50,67,81,99,10*0,85,99,55,67,62,84,
     350,63,81,99,10*0,81,99,54,67,62,84,50,59,12*0,80,99,54,67,
     462,81,50,57,12*0,80,99,54,67,62,81,50,56,10*0,50,79,80,99,
     554,67,62,81,4*0,8*0,50,79,80,99,54,64,14*0,50,79,80,99,16*0,
     650,79,80,99,16*0,50,79,80,99,16*0,50,79,80,99,16*0,50,79,
     780,99,14*0,70,79,50,79,80,99,12*0,50,59,70,79,53,79,14*0,
     850,59,68,79,53,70,14*0,50,59,68,79,56,68,14*0,50,59,68,79,
     956,68,14*0,50,59,68,79,58,68,12*0,50,67,50,59,68,79,58,68,10*0,
     150,56,58,67,50,59,58,79,58,68,10*0,50,56,58,67,50,59,68,
     179,58,68,10*0,50,56,55,67,50,59,68,79,12*0,50,56,55,67,50,
     150,68,79,12*0,50,56,55,67,50,56,68,79,12*0,50,56,55,67,50,
     156,68,79,12*0,50,56,55,67,16*0,50,56,55,67,16*0,50,57,55,67,
     116*0,50,57,55,67,16*0,50,57,55,67,16*0,50,57,55,67,16*0,
     150,57,55,67,16*0,50,57,55,67,16*0,50,57,55,67,16*0,50,57,
     155,67,16*0,50,57,55,67,16*0,50,57,30*0/
      DATA MCT/100*0,18*0,70,99,18*0,70,99,18*0,70,99,18*0,70,99,
     9 18*0,70,99,18*0,70,99,16*0,50,66,70,99,14*0,53,78,50,66,2*0,
     3 14*0,53,78,50,66,14*0,50,60,53,78,50,66,2*0,
     5 12*0,50,60,53,78,50,66,12*0,68,99,50,68,53,78,50,66,2*0,
```

```
      7 8*0,50,75,68,99,50,60,14*0,50,75,68,99,50,60,6*0,
      9 8*0,50,75,68,99,8*0,8*0,50,75,68,99,8*0,
      1 8*0,50,75,68,99,16*0,50,75,68,99,8*0,
      3 8*0,50,75,68,99,8*0,6*0,68,78,50,75,10*0,
      5 4*0,50,60,68,78,58,69,12*0,63,71,50,60,68,78,60,68,10*0,
      7 0,0,63,71,50,60,68,78,60,68,12*0,63,71,50,60,68,78,60,68,10*0,
      9 50,65,63,71,50,60,68,78,60,68,10*0,
      9 50,65,63,71,50,60,68,78,12*0,
      1 50,65,63,71,50,60,68,78,12*0,50,65,18*0,
      3 50,65,18*0,50,65,18*0,50,65,18*0,50,65,18*0,
      7 50,65,18*0,50,65,18*0,50,65,18*0,50,65,18*0,200*0/
      DATA MAC/60,66,57,72,65,75,56,67,57,88/
      DATA MAL/34,29,27,27,21,19,16,15,13,8/
      DATA IST/1,5,9,13,19,37,45,49,55,65,75,91/,NOG/11*0/
      DATA SLSIZ/0/,SCSFLG/0/,MAXNSO/512/,NSMOV/0/
      DATA CNAM/'A1',' ','A2',' ','A3',' ','B ',' ','C ',' ',
     1'D ',' ','E1','6 ','E ',' ','F ',' ','G ',' '/
      DATA XTBL/1,2,5,6,9,10,13,14,15,16,19,20,21,22,23,24,25,
     1 26,27,28,29,30,31,32,33,34,37,38,39,40,41,42,45,46,
     2 49,50,51,52,53,56,57,58,65,66,67,68,69,70/
      DATA AC/52,6,54,73,66,89,58,72,57,89/
      DATA AL/40,38,31,29,23,18,17,15,13,10/
      DATA MING/2,2,2,4,15,6,2,4,4,4/
      DATA MAXG/2,2,2,4,16,6,2,4,4,5/
      DATA CTAB/100,0,0,0,0,100/
      DATA NOX/.FALSE./DEBUG/.FALSE./,RECSIZ/1024/
      DATA BLKNO/1/,DIRNL/2/,DIRNS/3/,LENGTH/4/,IOD/5/,CIL/6/
      DATA CID/7/,CIA/8/,CENLIN/9/,PERIM/10/,AREA/11/,PSQDA/12/
      DATA CHRENT/15/
      DATA OFSF/0/,NSOF/0/,SEX/0/,NKEY/19/
      ISR(1)=1
      ISR(2)=19
      ISR(3)=37
      ISR(4)=55
      ISR(5)=73
      ISR(6)=91
      DO 12 I=1,5
   12 SCLT(I)=30
      GID(1)='A-'
      GID(2)='B '
      GID(3)='C '
      GID(4)=' '
      GID(5)='D-'
      GID(6)='E '
      GID(7)='F-'
      GID(8)='G '
      GID(9)='U '
      GID(10)=' '
      CALL MYL('A-1      A-2      A-3     B-4 B-5     C-6 C-7 C-8
     1C-9 C-10C-11C-12   X     D-13D-14D-15    E-16    E-17
     1E-18    F-19F-20            G-21G-22   Y
     1                                           ',SID4,180)
      CALL MYL('  SIMPLE MOVE FROM *** TO ***',MMSG,29)
      CALL MYL(' COMPLEX MOVE FROM *** TO *** FAILED',FMSG,36)
      CALL MYL(' H=     IC=     IL=    GROUP=   ',ICIL,27)
      CALL MYL(' COMPLEX MOVE FROM *** TO *** SUCCEEDED',SMSG,39)
      CALL MYL('CTSTMIMXCSCLIRIGOSCONNSOSIMAFENXDESZMY',KEY,38)
      CALL MYL('0*** PARAM ERR, IP= ***',PEM,22)
      NLO=0
      NSO=460
C NLO AND NSO ARE DETERMINED AUTOMATICALLY, BUT A LARGER NSO IS OK
C
C GET PARAMETERS
C
  990 CONTINUE
      CALL RPARAM(NP,PAR,300,9)
      IP=1
   10 CONTINUE
      IF(IP.GT.NP) GOTO 70
      DO 20 J=1,NKEY
      IF(PAR(IP).EQ.KEY(J)) GOTO(1,2,3,4,5,6,7,8,9,15,
     X 1100,1200,1300,1400,1500,1510,1520,1530,1540),J
   20 CONTINUE
C
C PARAMETER ERROR
```

```
   25 CALL OUTCON(IP,PEM(22),3)
      CALL QPRINT(PEM,22)
      GO TO 990
C
C PARAMETER CT - ADJUST THE DECISOIN TABLE
C
    1 IL=PAR(IP+2)+1
      IF(IL.LT.1.OR.IL.GT.51) GOTO 25
      DO 1000 I=1,NGT2
 1000 CT(I,IL)=0
      IP=IP+3
 1010 IF(IP.GT.NP) GOTO 70
      DO 1020 J=1,NG
      IF(PAR(IP).EQ.GNAM(J)) GOTO 1030
 1020 CONTINUE
      GOTO 10
 1030 JJ=J+J
      CT(JJ,IL)=PAR(IP+3)
      CT(JJ-1,IL)=PAR(IP+2)
      IP=IP+4
      GOTO 1010
C
C PARAMETER NN - NO OBJECT NUMBERS OR CENTROMERE FLAG
C
 1100 NFLAG=1
      IP=IP+2
      GOTO 10
C
C PARAMETER SO - SET # OF OUTPUT SAMPLES
C
 1200 NSO=PAR(IP+2)
      NSOF=1
 1203 IP=IP+3
      GOTO 10
C
C PARAMETER SI - SET SLOT ID'S
C
 1300 DO 1310 I=1,90
 1310 SID4(I)=PAR(IP+1+I)
      IP=IP+47
      GOTO 10
C
C PARAMETER MA - MALE KARYOTYPE
C
 1400 SEX=1
 1410 IP=IP+2
      GOTO 10
C
C PARAMETER FE - FEMALE KARYOTYPE
C
 1500 SEX=2
      GOTO 1410
C
C PARAMETER NX - NO X SEPARATION FROM C GROUP
C
 1510 NOX=.TRUE.
      CALL MVL(' B      B              ( C + X  )
     1 D    D    D        E-16      E    E
     2 F    F                     G    G  ',SID4(13),112)
      GOTO 1410
C
C PARAMETER DE - DEBUG OPTION ON
C
 1520 DEBUG=.TRUE.
      GOTO 1410
C
C PARAMETER SZ - SET SLOT SIZE
C
 1530 SLSIZ=PAR(IP+2)
      GOTO 1203
C
C PARAMETER MV - MOVE CHROMOSOMES AROUND FROM PREVIOUS KARYOTYPE
C
 1540 IF(NSMOV.LT.50) NSMOV=NSMOV+1
      OLDS(NSMOV)=PAR(IP+2)
      NEWS(NSMOV)=PAR(IP+3)
```

```
      IP=IP+4
      GOTO 10
C
C PARAMETER ST - SET SLOPE TABLE
C
2     DO 2000 I=1,NGT2M1
2000    ST(I)=PAR(IP+1+I)/PAR(IP+2+I)
      IP=IP+NGT2M1+2
      GOTO 10
C
C PARAMETER MI - SET MINIMUM # OF CHROMS. FOR EACH GROUP
C
3     DO 3300 I=1,NG
3300    MING(I)=PAR(IP+1+I)
      IP=IP+NG2
      GOTO 10
C
C PARAMETER MX - SET MAXIMUM # OF CHROMS. FOR EACH GROUP
C
4     DO 4000 I=1,NG
4000    MAXG(I)=PAR(IP+1+I)
      IP=IP+NG2
      GOTO 10
C
C PARAMETER CS - SET CENTER SAMPLES FOR EACH SLOT
C
5     DO 5000 I=1,90
5000    SCS(I)=PAR(IP+1+I)
      SCSFLG=1
      IP=IP+92
      GOTO 10
C
C PARAMETER CL - SET CENTER LINE FOR EACH GROUP
C
6     DO 6000 I=1,5
6000    SCLT(I)=PAR(IP+1+I)
      IP=IP+7
      GOTO 10
C
C PARAMETER IR - SET INITIAL SLOT FOR EACH ROW
C
7     DO 7000 I=1,6
7000    ISR(I)=PAR(IP+1+I)
      IP=IP+8
      GOTO 10
C
C PARAMETER IG - SET INITIAL SLOT FOR EACH GROUP
C
8     DO 8000 I=1,NG2
8000    IST(I)=PAR(IP+1+I)
      IP=IP+NG2+2
      GOTO 10
C
C PARAMETER OS - MANUALLY INSERT CHROMOSOMES INTO SLOTS
C
9     OFSF=1
      NOFS=NP-IP-1
      IF(NOFS.NE.48.AND.NOFS.NE.46) GOTO 8950
C SEE IF 48 OR 46 OFS PARAMETERS WERE USED
      DO 8900 I=1,NOFS
8900  OFS(XTBL(I))=PAR(IP+1+I)
C ALLOW FOR THE EXTRA SLOTS
      GOTO 70
8950  CONTINUE
      DO 9000 I=1,90
      IF(IP+1+I.GT.NP) GOTO 70

9000  OFS(I)=PAR(IP+1+I)
      IP=IP+92
      GOTO 10
C
C PARAMETER CO - ADJUST COEEFICIENTS
C
15    DO 71 I=1,6
      CTAB(I)=PAR(IP+1+I)
```

```
71      CONTINUE
        IF(CTAB(1)+CTAB(2)+CTAB(3).NE.100) GO TO 900
        IF(CTAB(4)+CTAB(5)+CTAB(6).NE.100) GO TO 900
        GO TO 10
900     CALL TYPE(' *** COEFFICIENT SUM NOT = 100')
        CALL TYPE('0')
        GO TO 990
C
C READ IN CHROMOSOME DIRECTORY
C
70      CALL AFILE(IOBUF,1,'RCR       ','13,'13)
        CALL OPEN(IOBUF,1024,1,0,'RCR')
        CALL GLABEL(IOBUF,SPAR,IB)
        LSEX=0
        IF(IOBUF(IB+104).EQ."115) LSEX=1
        IF(IOBUF(IB+104).EQ."106) LSEX=2
        IF(IY(IOBUF(IB+82)).NE."71) GOTO 777
C GOTO 777 IF NOT SOURCE 9, 19, 29, ..., (MONKEY)
        CALL MYW(MCT,CT,1020)
C REPLACE HUMAN TABLES WITH MONKEY TABLES FOR SOURCE 9
        CALL MYW(MAC,AC,10)
        CALL MYW(MAL,AL,10)
        MING(10)=0
        MAXG(10)=1
        IST(10)=70
C SET G+Y GROUP FOR POSSIBLE 1
777     CONTINUE
        CALL GET(IOBUF,1,IB)
        CALL MYL(IOBUF(IB+1),NOB,16)
        NC=IY2(IOBUF(IB+17))
        SPLTH=SPLTH*46/NC
        SPIOD=SPIOD*46/NC
        SPAREA=SPAREA*46/NC
        CALL MYL(IOBUF(IB+31),CHDIR(1,1),2*15*30)
        CALL GET(IOBUF,2,IB)
        CALL MYL(IOBUF(IB+31),CHDIR(1,31),2*15*30)
        DO 72 I=1,NOB
        CHDIR(LENGTH,I)=CHDIR(LENGTH,I)*10000./SPLTH
        CHDIR(IOD,I)=CHDIR(IOD,I)*10000./SPIOD
        CHDIR(AREA,I)=CHDIR(AREA,I)*10000./SPAREA
72      CONTINUE
C
C INITIALIZE CURRENT INDEX AND INITIAL INDEX FOR EACH GROUP
C
        CIG(1)=0
        IIG(1)=1
        DO 75 I=2,NG1
        CIG(I)=CIG(I-1)+25
75      IIG(I)=IIG(I-1)+25
C
C SET UP SLOT SIZE IF NOT INPUT
C
        IF(SLSIZ.EQ.0) SLSIZ=24
        IF(SLSIZ.GT.28) SLSIZ=28
        IF(SLSIZ.LT.12) SLSIZ=12
        PSEP=SLSIZ/3
C PAIR SEPARATION
        SCS(1)=PSEP+SLSIZ/2
        SCS(2)=SCS(1)+SLSIZ
        DO 752 I=3,17,2
        SCS(I)=SCS(I-1)+SLSIZ+PSEP
752     SCS(I+1)=SCS(I)+SLSIZ
        DO 756 I=1,18
        DO 754 J=1,4
754     SCS(18*J+I)=SCS(I)
756     CONTINUE
758     CONTINUE
C
C CHECK SEX
C
        IF(SEX.GT.0) GOTO 76
        SEX=LSEX
76      IF(SEX.NE.1) GOTO 77
C MALE
        MAXG(5)=15
        MING(10)=MING(10)+1
```

```
      77 IF(SEX.NE.2) GOTO 78
C FEMALE
         MING(5)=16
         MAXG(10)=MAXG(10)-1
         IF(SID4(78).EQ.YID) SID4(78)=BID
C CHANGE Y TO BLANK UNLESS SID WAS CHANGED BY USER
      78 CONTINUE
         IF(OFSF.EQ.1) GOTO 403
C
C SKIP CLASSIFICATION IF OFS TABLE IS INPUT
C
C DO INITIAL ASSIGNMENTS OF CHROMOSOMES TO GROUPS
C
         DO 200 N=1,NOB
         IF(CHDIR(BLKNO,N).EQ.0) GO TO 200
         IC=(CHDIR(CIL,N)*CTAB(4)+CHDIR(CID,N)*CTAB(5)+CHDIR(CIA,N)
        1*CTAB(6))/100
         IL=((FLOAT(CHDIR(LENGTH,N))*CTAB(1)+FLOAT(CHDIR(IOD,N))
        1*CTAB(2)+FLOAT(CHDIR(AREA,N))*CTAB(3))/1000.)+1
         IF(IL.GT.51) IL=51
         CALL OUTCON(N,ICIL(5),-2)
         CALL OUTCON(IC,ICIL(11),-2)
         CALL OUTCON(IL,ICIL(17),-2)
         ICTB(N)=IC
         ILTB(N)=IL
         IF(IC.EQ.0.OR.CHDIR(PSQBA,N).LT.1340.OR.CHDIR(AREA,N).GT.600)
        1GO TO 82
C PUT IN UNKNOWN GROUP IF BLOB OR OVERLAP
         DO 80 J=1,NGT2M1,2
         IF(IC.GE.CT(J,IL).AND.IC.LE.CT(J+1,IL)) GOTO 100
C IF IC IS WITHIN THE GROUP LIMITS FOR THIS VALUE OF IL GOTO 100
      80 CONTINUE
      82 J=NG1
C        OBJECT IS IN THE FORBIDDEN ZONE
         GOTO 110
      85 CONTINUE
         CALL TYPE(' ALL SLOTS FULL')
         GOTO 200
     100 CONTINUE
         J=(J+1)/2
     110 CONTINUE
         CALL OUTCON(J,ICIL(26),-2)
         IF(DEBUG) CALL QPRINT(ICIL,27)
         IF(NOG(J).EQ.25) GOTO 85
         NOG(J)=NOG(J)+1
         CIG(J)=CIG(J)+1
         OFG(CIG(J))=N
     200 CONTINUE
C
C IF ANY GROUP IS HEAVY OR LIGHT, TRY TO MOVE CHROMOSOEMS AROUND
C
     210 NFAIL=0
     220 CONTINUE
         KH=0
         NMOV=0
         DO 3000 J=2,NG
         IF(NOG(J).GE.MAXG(J)) GOTO 3000
         K2=J-1
         NCAN=0
         DMIN=100000.
C GROUP J IS LIGHT, SEE IF A PRECEDING GROUP IS HEAVY
         DO 2500 K=1,K2
         IF(NOG(K).LE.MING(K)) GOTO 2500
C GROUP K IS HEAVY
         IF(NFAIL.EQ.0) GOTO 230
         DO 225 N=1,NFAIL
         IF(K.EQ.KFAIL(N).AND.J.EQ.JFAIL(N)) GOTO 235
C THIS J AND K HAS ALREADY FAILED
     225 CONTINUE
     230 KH=K
         JL=J
C SAVE HEAVY AND LIGHT GROUP NUMBERS
     235 CONTINUE
         I1=IIG(K)
         I2=CIG(K)
```

```
      DO 2400 I=I1,I2
      N=OFG(I)
      IC=ICTB(N)
      IL=ILTB(N)
      JJ=J+J
      IF(IC.LT.CT(JJ-1,IL).OR.IC.GT.CT(JJ,IL)) GOTO 2400
C OBJECT IS IN GROUP J, MOST LIKELY IF CLOSE TO CENTER OF J
C AND FAR FROM CENTER OF K
      D = ((IC-AC(J))**2+(IL-AL(J))**2*2) /
     1 MAX0(((IC-AC(K))**2+(IL-AL(K))**2),1)
      IF(D.GE.DMIN) GOTO 2400
C THIS IS THE MOST LIKELY CANDIDATE SO FAR
      KSAV=K
      ISAV=I
      NCAN=N
      DMIN=D
2400  CONTINUE
2500  CONTINUE
      IF(NCAN.EQ.0) GOTO 3000
      NMOV=NMOV+1
C MOVE OBJECT N FROM GROUP KSAV TO GROUP J
      CALL OUTCON(KSAV,MMSG(22),3)
      CALL OUTCON(J,MMSG(29),3)
      IF(DEBUG) CALL QPRINT(MMSG,29)
      NOG(J)=NOG(J)+1
      CIG(J)=CIG(J)+1
      OFG(CIG(J))=NCAN
      CIG(KSAV)=CIG(KSAV)-1
      NOG(KSAV)=NOG(KSAV)-1
      I2=CIG(KSAV)
      DO 2600 I=ISAV,I2
2600  OFG(I)=OFG(I+1)
C CLOSE UP THE REMAINING OBJECTS IN THE GROUP
3000  CONTINUE
      IF(NMOV.GT.0) GOTO 220
C IF SOMETHING WAS MOVED, SEE IF MORE MOVES ARE POSSIBLE
      IF(KH.EQ.0) GOTO 3100
C KH IS HEAVY AND JL IS LIGHT BUT NO SIMPLE MOVE WAS POSSIBLE
C SEE IF THERE IS A COMPLEX (MULTI-LEVEL) MOVE THAT CAN BE MADE
      L=1
      JG(1)=JL
3010  KG(L)=KH
3020  CALL CFO(KG(L),JG(L),IX,AC,AL,CT)
C CHECK FOR A CHROMOSOME IN THE KG-JG OVERLAP AREA
      IF(IX.EQ.0) GOTO 3040
      IG(L)=IX
C SAVE INDEX NUMBER
      IF(KG(L).EQ.KH) GOTO 3060
C WE NEED TO GO UP ONE LEVEL
      L=L+1
      JG(L)=KG(L-1)
      GOTO 3010
3040  KG(L)=KG(L)+1
C LOOK AT THE NEXT GROUP ON THIS LEVEL
      IF(KG(L).LT.JG(L)) GOTO 3020
      L=L-1
C GO DOWN ONE LEVEL
      IF(L.GT.0) GOTO 3040
C FAILED TO FIND A GOOD MOVE
      NFAIL=NFAIL+1
      IF(NFAIL.GT.10) GOTO 3100
      KFAIL(NFAIL)=KH
      JFAIL(NFAIL)=JL
      CALL OUTCON(KH,FMSG(22),3)
      CALL OUTCON(JL,FMSG(29),3)
      IF(DEBUG) CALL QPRINT(FMSG,36)
      GOTO 220
3060  CONTINUE
C MAKE THE L MOVES THAT HAVE BEEN FOUND
      DO 3080 M=1,L
      ISAV=IG(M)
      JGM=JG(M)
      KGM=KG(M)
      NOG(JGM)=NOG(JGM)+1
      CIG(JGM)=CIG(JGM)+1
```

```
      OFG(CIG(JGM))=OFG(ISAV)
      CIG(KGM)=CIG(KGM)-1
      NOG(KGM)=NOG(KGM)-1
      I2=CIG(KGM)
      DO 3070 I=ISAV,I2
3070  OFG(I)=OFG(I+1)
3080  CONTINUE
      CALL OUTCON(KH,SMSG(22),3)
      CALL OUTCON(JL,SMSG(29),3)
      IF(DEBUG) CALL QPRINT(SMSG,39)
      GOTO 210
C LOOK FOR MORE MOVES
C
C DONE MOVING CHROMOSOMES BETWEEN GROUPS.  NOW ORDER THE CHROMOSOMES
C WITHIN EACH GROUP
C
3100  CONTINUE
      DO 300 J=1,NG1
      IF(NOG(J).EQ.0) GOTO 300
      I1=IIG(J)
      I2=CIG(J)
      DO 240 I=I1,I2
      N=OFG(I)
      IC=ICTB(N)
      IL=ILTB(N)
      YINT(I)=IC-ST(J)*IL
      IF(ST(J).LT.0) YINT(I)=-YINT(I)
240   CONTINUE
C STORE Y INTERCEPT
      L1=IST(J)

242   CONTINUE
      L2=IST(J)+NOG(J)-1
      IF(L2.LT.IST(J+1)) GOTO 246
      NOG(J)=NOG(J)-1
      IF(NOG(NG1).LT.IST(NG2)-IST(NG1)) GOTO 244
      CALL SSWTCH(1,ISW1)
      IF(ISW1.EQ.1) CALL TYPE(' ALL SLOTS FULL')
      GOTO 242
244   CONTINUE
      CIG(NG1)=CIG(NG1)+1
      NOG(NG1)=NOG(NG1)+1
      OFG(CIG(NG1))=OFG(I2)
      I2=I2-1
      GOTO 242
246   CONTINUE
      DO 260 L=L1,L2
      MINY=9999
      DO 250 I=I1,I2
      IF(YINT(I).GE.MINY) GOTO 250
      MINY=YINT(I)
      MINI=I
250   CONTINUE
      OFS(L)=OFG(MINI)
      YINT(MINI)=9999
260   CONTINUE
C STORE THE GROUP IN ORDER OF YINT
300   CONTINUE
310   CONTINUE
C
C NOW MAKE ANY OTHER ADJUSTMENTS REQUIRED
C
      IF(NOX) GOTO 350
C CHECK FOR NO X SEPARATION FROM C GROUP DESIRED
C FIND THE X OR X-X IN GROUP C
      I1=IST(5)
      I2=I1+15
      I3=I1+2
      I4=I2-2
      IF(NOG(5).EQ.16) GOTO 330
      IF(NOG(5).NE.15) GOTO 350
C C HAS 15, THIRD LARGEST IS X
      OFS(I2)=OFS(I3)
      DO 320 I=I3,I4
320   OFS(I)=OFS(I+1)
      OFS(I2-1)=0
```

```
      GOTO 350
  330 CONTINUE
C C HAS 16, 3 AND 4 ARE X-X
      ITEMP=OFS(I3)
      ITAMP=OFS(I3+1)
      DO 340 I=I3,I4
  340 OFS(I)=OFS(I+2)
      OFS(I2-1)=ITEMP
      OFS(I2)=ITAMP
  350 CONTINUE
      IF(NOG(NG).NE.5.OR.SEX.EQ.2) GOTO 400
C IF 5 IN GROUP G, FIND THE Y CHROMOSOME
      I1=IST(NG)
      I2=I1+4
      IF(OFS(I2).EQ.0) GOTO 400
      MAX=-1
      DO 360 I=I1,I2
      N=OFS(I)
        M=50*CHDIR(AREA,N)/(CHDIR(DIRNL,N)*CHDIR(DIRNS,N))
      IF(M.LE.MAX) GOTO 360
      MAX=M
      IMAX=I
      NMAX=N
  360 CONTINUE
      I4=I2-1
      DO 370 I=IMAX,I4
  370 OFS(I)=OFS(I+1)
      OFS(I2)=0
      OFS(I2+1)=NMAX
  400 CONTINUE
      IF(NSMOV.EQ.0) GOTO 403
      DO 402 N=1,NSMOV
      NEWSN=NEWS(N)
      OLDSN=OLDS(N)
        IF(NEWSN.NE.0) GOTO 401
C DELETE OBJECT IN OLDSN IF NEWSN = 0
      OFS(OLDSN)=0
      GOTO 402
  401 CONTINUE
      NSAVE=OFS(NEWSN)
      OFS(NEWSN)=OFS(OLDSN)
      OFS(OLDSN)=NSAVE
  402 CONTINUE
  403 CONTINUE
C ADJUST TABLE FRO OBJECTS WIDER THAN 24 SAMPLES
      DO 410 J=1,NG1
      I1=IST(J)
      I2=IST(J+1)-1
      IDEL=0
      DO 405 I=I1,I2
      SCS(I)=SCS(I)+IDEL
C ADD ON ANY PREVIOUS DELTA
      INP=OFS(I)
      IF(INP.EQ.0) GOTO 404
      NSTM24=CHDIR(DIRNS,INP)-SLSIZ
      IF(NSTM24.LE.0) GOTO 404
      SCS(I)=SCS(I)+NSTM24/2
C ADD DELTA FOR THIS OBJECT
      IDEL=IDEL+NSTM24
  404 IF(SCS(I).GT.506) SCS(I)=506
  405 CONTINUE
  410 CONTINUE
      IF(NSOF.EQ.1.AND.NSO.EQ.0) GOTO 425
C IF NSO OF 0 WAS SPECIFIED, DO NOT CHANGE IT
C NOW FIND NSO
      DO 420 J=2,6
      DO 415 I=1,18
      INP=OFS(ISR(J)-I)
      IF(INP.EQ.0) GOTO 415
C THIS IS THE LAST NON-VACANT SLOT ON THE ROW
      ITEMP=SCS(ISR(J)-I)+SLSIZ/2+PSEP
      IF(ITEMP.GT.NSO) NSO=ITEMP
C ADJUST NSO IF REQUIRED
      GOTO 420
  415 CONTINUE
```

```
      420 CONTINUE
          IF(NSO.GT.MAXNSO) NSO=MAXNSO
C
C OUTPUT RESULTS OF CLASSIFICATION
C
  425     CONTINUE
          DO 500 I=1,5
          ISRI=ISR(I)
          DO 450 J=1,18
          JJ=ISRI+J-1
          INP=OFS(JJ)
          IF(JJ.GE.ISR(I+1)) INP=0
          IF(INP.EQ.0) GO TO 450
          ITEMP=CHDIR(DIRNL,INP)/2+28
          IF(SCLT(I).LT.ITEMP) SCLT(I)=ITEMP
  450     CONTINUE
  500     CONTINUE
          CALL PUT(IOBUF,3,IB)
          CALL MVL(NSO,IOBUF(IB+1),2*294)
          CALL CLOSE(IOBUF)
C
C DOEN RETURN
C
          CALL EXIT
          END

C
C**********
C*        *
C* KTYPE  *
C*        *
C**********
C
C KTYPE PRODUCES THE OUTPUT KARYOGRAM FROM THE CLASSIFICATIONTABLES
C PRODUCED BY CLASFY AND THE ROTATED CHROMOSOME IMAGES
C PRODUCED BY ORIENT.
          SUBROUTINE KTYPE
          COMMON/C1/INVB,IBUF,OBUF,NLT,NST,FBN,CENLIN,CEMETH
          COMMON/C1/NSO,NFLAG,GID,SID,ISR,OFS,SCLT,SCS
          INTEGER SPAR(18),CEMETH(60)
          BYTE INVB(56)
          INTEGER ISR(6),GID(18),SID(98)
          INTEGER R(39)
          BYTE OBUF(3128),IBUF(20480)
          INTEGER FBN(60),NST(60),NLT(60),CENLIN(60),OFS(91),SCS(98)
          BYTE LABEL(216)
          INTEGER SCLT(5)
          CALL MVL('0 * *  **  **  **  **  **  **  **  **  **  **  **
         1 **  **  **  **  **  **  **  ',R,78)
C
C
C OPEN DATA SETS
C
          CALL DCLEAR
C CLEAR GRAY SCALE
          CALL AFILE(INVB,1,'RCR       ','13,'13)
          CALL AFILE(OBUF,5,'PIC       ','5,'5)
          CALL OPEN(INVB,1024,0,0,'RCR')
          CALL OPEN(OBUF,1536,1,1,'KGM')
          CALL GLABEL(INVB,SPAR,IB)
          CALL MVL(INVB(IB+1),LABEL,216)
          NLO=0
C
C READ CHROMOSOME DIRECTORY & BUILD TABLES
C
          CALL READ(INVB,1,IB,IBUF(1))
          NOB=IV2(IBUF(1))
          DO 10 I=1,30
          FBN(I)=IV2(IBUF(1+30*I))
          NLT(I)=IV2(IBUF(3+30*I))
          NST(I)=IV2(IBUF(5+30*I))
          CENLIN(I)=IABS(IV2(IBUF(17+30*I)))
```

```
              CEMETH(I)=IV(IBUF(25+30*I))
              IF (NOB.EQ.I) GO TO 40
      10      CONTINUE
              CALL READ(INVB,2,IB,IBUF(1))
              DO 20 I=1,30
              FBN(I+30)=IV2(IBUF(1+30*I))
              NLT(I+30)=IV2(IBUF(3+30*I))
              NST(I+30)=IV2(IBUF(5+30*I))
              CENLIN(I+30)=IABS(IV2(IBUF(17+30*I)))
              CEMETH(I+30)=IV(IBUF(25+30*I))
              IF(NOB.EQ.I+30)GO TO 40
      20      CONTINUE
      C
      C READ IN CLASSIFICATION TABLES
      C
      40      CONTINUE
              CALL READ(INVB,3,IB,IBUF(1))
              CALL MVL(IBUF(1),NSO,2*294)
              IF(NSO.GT.512) GO TO 900
              SPAR(1)=512
              SPAR(2)=NSO
              SPAR(5)=512
              CALL PLABEL(OBUF,SPAR,LABEL)
      C
      C MAIN LOOP:
      C     BUILD EACH ROW OF THE OUTPUT KARYOGRAM
      C
              DO 500 I=1,5
              ISRI=ISR(I)
              IF(I.LT.5) GOTO 430
      C SEE IF THERE ARE ANY OBJECTS ON ROW 5
              DO 420 J=1,18
              IF(OFS(ISRI+J-1).NE.0) GOTO 430
      420     CONTINUE
              GOTO 500
      C NO OBJECTS ON ROW 5
      430     CONTINUE
              R(2)=GID(1+(I-1)*2)
              R(3)=GID(2+(I-1)*2)
              DO 450 J=1,18
              JJ=ISRI+J-1
              INP=OFS(JJ)
              IF(JJ.GE.ISR(I+1)) INP=0
              CALL OUTCON(INP,R(5+(J-1)*2),-2)
              IF(INP.EQ.0) CALL ITL(32,R(5+(J-1)*2))
      450     CONTINUE
              CALL SSWTCH(1,IBIT)
              IF(IBIT.NE.1) GO TO 475
              CALL TYPE(R,78)
      C
      C INVOKE THE ROW BUILDING ROUTINE
      C
      475     CONTINUE
              CALL KROW(ISR(I+1)-ISRI,OFS(ISRI),SCLT(I),SCS(ISRI),NSO,
             1SID(ISRI),NFLAG)
              NLO=NLO+2*SCLT(I)
      500     CONTINUE
      C
      C CLOSE UP DATA SETS AND RETURN
      C
              SPAR(1)=NLO
              CALL PLABEL(OBUF,SPAR,LABEL)
              CALL CLOSE(INVB)
              CALL CLOSE(OBUF)
              CALL EXIT
      C
      C ERROR
      C
      900     CALL TYPE(' *** NSO TOO BIG')
              CALL TYPE('0')
              CALL EXIT
              END
```

```
      SUBROUTINE KROW(NSL,OFS,SCL,SCS,NSO,SID,NFLAG)
C
C********
C*      *
C* KROW *
C*      *
C********
C
C KROW CONSTRUCTS A ROW OF THE OUTPUT KARYOGRAM.  IT IS INVOKED BY
C KTYPE.
C
      COMMON/C1/IMVB,IBUF,OBUF,NLT,NST,FBN,CENLIN,CEMETH
      INTEGER CENLIN(60),CEMETH(60)
      INTEGER X,Y,REPL
      BYTE CHAR(4)
      INTEGER SCL,SID(90)
      BYTE IMVB(56)
      INTEGER IDT(60)
      INTEGER OFS(91),SCS(90),NLT(60),NST(60),FBN(60)
      INTEGER NSL,NSO,SCL2
      BYTE OBUF(3128),IBUF(20480),L00,LFF
      INTEGER RECSIZ,MAXNSL
      DATA L00/0/,LFF/127/,RECSIZ/1024/,MAXNSL/20/
      DATA X/0/,Y/0/,REPL/1/
C
C RETURN IF NSO=0
C
      IF(NSO.EQ.0) GO TO 910
      IF(NSL.GT.MAXNSL) GO TO 900
C
C SET UP BUFFER INDICIES
C
      IDT(1)=1
      DO 50 I=2,NSL
50    IDT(I)=IDT(I-1)+RECSIZ
      NSO4=(NSO+1)/2
      SCL2=SCL*2
C
C MAIN ROW LOOP - PROCESSES EACH LINE WITHIN THE ROW
C
      DO 209 L=1,SCL2
      CALL PUT(OBUF,0,IO)
      CALL ZIA(OBUF(IO+1),NSO4)
C
C   SLOT LOOP - PROCESSES EACH SLOT WITHIN THE CURRENT LINE
C
      DO 150 I=1,NSL
      N=OFS(I)
      N1=OFS(I+1)
      IF(N.NE.0) GO TO 80
C CHECK FOR FIRST SLOT OF A PAIR EMPTY, BUT SECOND SLOT FULL
      IF(N1.EQ.0) GO TO 150
C GOTO 150 IF BOTH SLOTS ARE EMPTY
      NL2=0
      GO TO 130
C
C DECIDE IF OBJECT APPEARS ON THIS LINE
C
80    CONTINUE
      NLTH=NLT(N)
      NL2=NLTH/2
      IF(L.LT.SCL-NL2.OR.L.GE.SCL+NL2) GO TO 120
      LO=L-SCL+NL2
C
C CALCULATE INITIAL SAMPLE FOR OBJECT ON OUTPUT LINE
C
      NSTH=NST(N)
      NS2=NSTH/2
      IF(SCS(I)+NS2.GT.511) SCS(I)=511-NS2
      IS=SCS(I)-NS2
C
C GET FIRST BLOCK # OF THE OBJECT
C
      IB=FBN(N)
      IF(IB.EQ.0) GO TO 120
```

```
C BYPASS OBJECT IF NOT IN DIRECTORY
        LPBN=RECSIZ/NSTN
        MLO=MOD(LO,LPBN)
        IF(MLO.GT.0) GO TO 90
        CALL READ(IMYB,IB+LO/LPBN,IA,IBUF(IDT(I)))
90      J1=IDT(I)+MLO*NSTN
C
C TRANSFER OBJECT SEGMENT INTO THE OUTPUT BUFFER
C
        CALL MVL(IBUF(J1),OBUF(IO+IS),NSTN)
        IS=IS+NSTN
C
C SEE IF THIS IS THE CENTROMERE LINE
C
        IF(NFLAG.NE.0) GO TO 150
        IF(LO.NE.CENLIN(N)-1) GO TO 150
C
C CENTROMERE LINE, FIND WHERE TO PUT THE CENTROMERE ARROWS
C
        IT=IS-NSTN
        ITMAX=IS-1
        DO 110 IU=IT,ITMAX
        IF(OBUF(IO+IU).GT.L00) GO TO 112
110     CONTINUE
        GO TO 117
112     CONTINUE
        IT=IS
115     IT=IT-1
        IF(OBUF(IO+IT).EQ.L00) GO TO 115
117     CONTINUE
        DO 118 K=3,5
        OBUF(IO+IU-K)=LFF
118     OBUF(IO+IT+K)=LFF
        GO TO 150
C
C CHECK TO SEE IF LINE CONTAINS OBJECT #
C
120     CONTINUE
        IF(NFLAG.NE.0.OR.L.LT.SCL-NL2-9.OR.L.GT.SCL-NL2-3) GO TO 130
C
C LINE CONTAINS OBJECT #, SO PUT NUMBER INTO OUTPUT BUFFER
C
        LO=L-SCL+NL2+9
        IS=SCS(I)-11
        IF(IS.GT.500) IS=500
        IF(N.LT.10) IS=IS-3
        NN=N
        IF(CEMETH(N).EQ.1) NN=-N
C FLAG OPERATOR CORRECTED CENTROMERES
        CALL OUTCON(NN,CHAR(3),3)
        CALL TEXT(CHAR,3,LO,OBUF(IO+IS),1)
        GO TO 150
C
C CHECK TO SEE IF LINE CONTAINS GROUP ID
C
130     CONTINUE
        IF(I.EQ.(I/2)*2) GO TO 150
        IF(N1.EQ.0) GO TO 140
        NL3=NLT(N1)/2
        IF(NL3.GT.NL2) NL2=NL3
140     CONTINUE
        IF(L.LT.SCL+NL2+5.OR.L.GT.SCL+NL2+10) GO TO 150
C
C LINE CONTAINS GROUP ID, SO OUTPUT A LINE OF THE ID TO THE OUTPUTBUF
C
        LO=(L-SCL-NL2-5)/2
        IS=((SCS(I)+SCS(I+1))/4)*2-23
        IF(IS.GT.464) IS=464
        CALL TEXT(SID(I),4,LO,OBUF(IO+IS),2)
150     CONTINUE
        IF(Y.LT.1024) CALL DLINE(OBUF(IO+1),Y,X,NSO,REPL,0)
        Y=Y+REPL+1
200     CONTINUE
        RETURN
C
```

```
C BUFFER TOO SMALL TO HANDLE THE ROW
C
900     CONTINUE
        CALL TYPE(' *** BUFFER TOO SMALL FOR ROW')
        CALL TYPE('0')
        RETURN
C
C NSO=0
C
910     CONTINUE
        CALL TYPE(' *** NSO=0')
        CALL TYPE('0')
        RETURN
        END

SUBROUTINE INT2
C********
C*      *
C* INT2 *
C*      *
C********
C
C THIS ROUTINE IS THE SECOND OPERATOR INTERACTION PHASE.  IT
C ALLOWS THE OPERATOR TO EITHER APPROVE THE KARYOTYPE WHICH IS
C BEING DISPLAYED ON THE GRAY SCALE DEVICE, FOR HARD COPY OUTPUT
C OR ELSE MAKE CHANGES VIA MOB AND/OR CLASFY/KTYPE PARAMETERS.
C
C COMMON REGION
        COMMON/C1/NSO,NFLAG,GID,SID,ISR,OFS,SCLT,SCS
        COMMON/C1/CHDIR,MOB,SPIOD,SPLTH,SPAREA,CUROLN,NC
C I/O BUFFER
        BYTE IOBUF(2124)
C MOB PARAMETERS AND CURRENT PARAMETER HIGH WATER MARK
        INTEGER MOBPAR(500),M,BADPAR(4)
C CLSFY/KTYPE PARAMETERS AND CURRENT PARM. HIGH WATER MARK
        INTEGER KTYPAR(500),K
C INT2 LOCAL PARAMETER BUFFER AND POINTER
        INTEGER PAR(100),IP
C RE-MOB CHROMOSOME SELECTOR
        LOGICAL SEL(60)
C CLASSIFICATION TABLES
        INTEGER CUROLN
C
C CHROMOSOME DIRECTORY AND ITS FORMAT
C
        INTEGER CHDIR(15,60)
C BLOCK #
        INTEGER BLKNO
C NUMBER OF LINES IN OBJECT
        INTEGER DIRNL
C NUMBER OF SAMPLES IN OBJECT
        INTEGER DIRNS
C LENGTH
        INTEGER LENGTH
C INTEGERATED OPTICAL DENSITY
        INTEGER IOD
C CENTROMERIC INDICIES
        INTEGER CIL,CID,CIA
C CENTROMERE LINE #
        INTEGER CENLIN
C PERIMERE
        INTEGER PERIM
C AREA
        INTEGER AREA
C PERIM SQUARED DIVIDED BY AREA
        INTEGER PSQDA
C CENTROMERE LOCATION METHOD
        INTEGER CEMETH
C PHASE NUMBERS FOR MOB AND FOR CLASFY/KTYPE
        INTEGER MOBPHA,KTYPHA,FOBPHA,BANDPH,FOURPH
C RE-RUN FLAGS
        LOGICAL MOBFLG,KTYFLG,ALLFLG,OSFLG
C RANDOM AREAS
        INTEGER SLCL,SLCS,SLID,S,Y,X,SL1,SL2
```

```
      INTEGER SPAR(10),SST(513),HST(513),S1,S2
      INTEGER KEY(37)
      BYTE LABEL(73),BLACK(72),PARBUF(80),NOBB(568)
C
C CLASSFICIATION TABLES
C
      INTEGER GID(10),SID(90),ISR(6),OFS(91),SCLT(5),SCS(90)
C
C DATA STATEMENTS
C
      DATA BLKNO/1/,DIRNL/2/,DIRNS/3/,LENGTH/4/,IOD/5/,CIL/6/,CID/7/
     1,CIA/8/,CENLIN/9/,PERIM/10/,AREA/11/,PSQDA/12/,CEMETH/13/
      DATA MAXPAR/500/,FOSPHA/6/,MOBPHA/8/,KTYPHA/9/,BANDPH/14/
      DATA DEGPRD/57.2958/,FOURPH/15/
      DATA LABEL/73*' '/,BLACK/72*127/
      DATA NKEY/37/
      DATA MOBFLG/.FALSE./,KTYFLG/.FALSE./,ALLFLG/.FALSE./,OSFLG/.FALSE./
      CALL MVL('ARLUU D BCALSKNNMAKCFENXDEP SPMXIRIGMCDSRF
     1A X C F R M S LDNWMDL H UAAXRBQB',KEY,74)
C
C INITIALIZE CHROMOSOME DATA SET
      CALL TYPE(' CHECK KARYOTYPE ',0)
      CALL RCA
C READ CURSOR ADJUSTMENTS
      CALL AFILE(IOBUF,1,'RCR      ','13,'13)
      CALL OPEN(IOBUF,1024,1,1,'RCR')
      CALL GLABEL(IOBUF,SPAR,IB)
      CALL MVL(IOBUF(IB+1+72),LABEL(2),72)
C
C READ IN DIRECTORY AND CLASSIFICATION TABLES
C
      CALL GET(IOBUF,1,IB)
      CALL MVL(IOBUF(IB+1),NOB,18)
      CALL MVL(IOBUF(IB+31),CHDIR(1,1),2*15*30)
      CALL GET(IOBUF,2,IB)
      CALL MVL(IOBUF(IB+31),CHDIR(1,31),2*15*30)
      CALL GET(IOBUF,3,IB)
      CALL MVL(IOBUF(IB+1),NSO,2*294)
C
C READ PREVIOS PARAMETERS
C
      CALL RPARAM(M,MOBPAR,MAXPAR,MOBPHA)
      CALL RPARAM(K,KTYPAR,MAXPAR,KTYPHA)
      IF(K.LT.92) GOTO 65
      K=K-92
      OSFLG=.TRUE.
C DO NOT RECLASSIFY IF OFS PARAMETERS ARE PRESENT
C ERASE OLD OFS PARAMETERS, IF PRESENT
C
65    IF(M.EQ.0) GOTO 100
      DO 70 I=1,M
      IF(MOBPAR(I).EQ.'SE') GOTO 75
70    CONTINUE
      GOTO 100
C REMOVE OLD SE PARAMETERS
75    M=I-1
C REQUEST OPERATOR INTERACTION
C
100   CONTINUE
110   CALL PARAM(NP,PAR,100,PARBUF)
      IF(NP.EQ.0) GO TO 500
      IP=1
C
C DECODE PARAMETERS
C
      DO 200 J=1,NKEY
      IF(PAR(IP).EQ.KEY(J)) GOTO (1000,1050,900,910,950,1250,1300,1350
     1,1450,1500,1550,1600,1650,1700,1800,1850,1950,2000,2050,2125,2150
     2 2200,2250,1100,1150,1200,1750,2100,1050,1050,1050,2300,3
     3,2350,2400,2450,2500),J
200   CONTINUE
      CALL TYPE(' PARAMETER ERROR')
      CALL TYPE('0')
      GO TO 100
```

```
  250     CALL TYPE(' CURSOR ERROR')
          CALL TYPE('0')
          GOTO 100
  3       CALL TYPE(' TYPE ONE OF THE FOLLOWING KEYWORDS TO SELECT AN OPTION')
          CALL TYPE(' C - CHANGE CENTROMERE (USE CURSOR)')
          CALL TYPE(' F - FLIP AND CHANGE CENTROMERE (USE CURSOR)')
          CALL TYPE(' R - ROTATE CHROMOSOME (USE CURSOR)')
          CALL TYPE(' M - MOVE CHROMOSOME TO ANOTHER SLOT')
          CALL TYPE(' X - REMOVE CHROMOSOME FROM KARYOTYPE')
          CALL TYPE(' P - PUSH A GROUP OF CHROMOSOMES RIGHT OR LEFT')
          CALL TYPE(' L - ADD A LABEL (TYPE LABEL ON SAME LINE)')
          CALL TYPE(' A - ABORT')
          CALL TYPE(' S - SET UP CURSOR TO CORRECT FOR DRIFT')
          CALL TYPE(' U OR D - MOVE CURSOR UP OR DOWN')
          CALL TYPE(' RF - RERUN FOB')
          CALL TYPE(' DS - DISPLAY SPREAD')
          CALL TYPE(' BC - CALL THE BANDED CLASSIFIER')
          CALL TYPE(' RB - RERUN THE BANDED CLASSIFIER')
          CALL TYPE(' QB - QUICK BAND CALCULATION')
          CALL TYPE(' WA - DISPLAY WAVEFORMS')
          CALL TYPE(' AX - DISPLAY AXES')
          CALL TYPE(' KC - CLEAR CLASFY PARAMETERS')
          CALL TYPE(' MC - CLEAR MOB PARAMETERS')
          CALL TYPE(' MA OR FE - MALE OR FEMALE')
          CALL TYPE(' NX - NO X SEPARATION FROM C GROUP')
          CALL TYPE(' IF KARYOTYPE IS OK, TYPE CARRIAGE RETURN')
          CALL TYPE('0')
          GOTO 100
C
C PARAMETER U OR D - MOVE CURSOR UP OR DOWN
C
  930     CALL MCU
          GOTO 110
  910     CALL MCD
          GOTO 110
C
C PARAMETER BC - CALL BANDED CLASSIFIER
C
  950     CALL APHASE(BANDPH)
          GOTO 700
C
C PARAMETER AR - SET MAXIMUM AND MINIMUM AREAS OF VALID CHROMOSOMES
C
  1000    CALL MVL(PAR(IP),MOBPAR(M+1),8)
          M=M+4
          MOBFLG=.TRUE.
          GO TO 110
C
C PARAMETER LW - LOCATE CENTROMERE BY WIDTY RATHER THAN DENSITY
C
  1050    CALL MVL(PAR(IP),MOBPAR(M+1),4)
          M=M+2
          MOBFLG=.TRUE.
          GO TO 110
C
C PARAMETER CI - SET CENTROMERE OF CHROMOSOEM SPECDIFIED TO THAT
C INDICATED BY CURSOR POSITION
C
  1100    CALL KURSOR(Y,X,L,S,SLID,SLCL,SLCS,N)
          IF(N.EQ.0) GOTO 250
          SEL(N)=.TRUE.
          CALL MVL('CI',MOBPAR(M+1),2)
          MOBPAR(M-3)=N
          INL=CHDIR(DIRHL,N)
          MOBPAR(M+4)=L-(SLCL-INL/2)+1
          CALL DLINE(BLACK,Y,X,4,1,-1)
          CALL DLINE(BLACK,Y,X,4,1,-1)
          IF(MOBPAR(M+4).GE.INL.OR.MOBPAR(M+4).LE.1) GOTO 250
          M=M+4
          MOBFLG=.TRUE.
          GO TO 110
C
C PARAMETER FL - FLIP SPECIDFIED CHROMOSOEM AND SET CENTROMERE
C
  1150    CALL KURSOR(Y,X,L,S,SLID,SLCL,SLCS,N)
```

```
            IF(N.EQ.0) GOTO 250
            SEL(N)=.TRUE.
            CALL MVL('FL',MOBPAR(M+1),2)
            MOBPAR(M+3)=N
            INL=CHDIR(DIRNL,N)
            MOBPAR(M+4)=L-(SLCL-INL/2)+1
            CALL DLINE(BLACK,Y,X,4,1,-1)
            CALL DLINE(BLACK,Y,X,4,1,-1)
            IF(MOBPAR(M+4).GE.INL.OR.MOBPAR(M+4).LE.1) GOTO 250
            M=M+4
            MOBFLG=.TRUE.
            GO TO 110
C
C  PARAMETER RO - ROTATE INDICATED CHROMOSOME SO THAT THE 2 CURSOR
C  SPTS BECOME VERTICAL
C
1200        CALL KURSOR(Y,X,L,S,SLID,SLCL,SLCS,N)
            IF(N.EQ.0) GOTO 250
            CALL DLINE(BLACK,Y,X-2,3,1,-1)
            CALL DLINE(BLACK,Y,X-2,3,1,-1)
            SEL(N)=.TRUE.
            CALL MVL('RO',MOBPAR(M+1),2)
            MOBPAR(M+3)=N
            FRSTY=Y
            FRSTX=X
            CALL TYPE('+MOVE CURSOR TO END OF AXIS',0)
            CALL PARAM(NP,PAR,100)
            CALL KURSOR(Y,X,L,S,SLID,SLCL,SLCS,N)
            CALL DLINE(BLACK,Y,X-2,3,1,-1)
            CALL DLINE(BLACK,Y,X-2,3,1,-1)
            SY=Y
            SX=X
            IF(FRSTX.EQ.SX) GO TO 1217
            IF(FRSTY.LE.Y) GO TO 1218
            SY=FRSTY
            SX=FRSTX
            FRSTY=Y
            FRSTX=X
1218        THETA=ATAN2((SX-FRSTX),(SY-FRSTY))
            GO TO 1215
1217        THETA=0.
1215        CONTINUE
            MOBPAR(M+4)=THETA*DEGPRD
            M=M+4
            MOBFLG=.TRUE.
            GOTO 110
C
C  PARAMETER AL - RE-MOB ALL CHROMOSOMES
C
1250        ALLFLG=.TRUE.
            GO TO 110
C
C  PARAMETER SK - OUTPUT SKELETON PICTURES INSTEAD OF GREY LEVEL PICTURE
C
1300        MOBPAR(M+1)=PAR(IP)
            M=M+2
            MOBFLG=.TRUE.
            GO TO 110
C
C  PARAMETER NN - NO OBJECT NUMBERS
C
1350        KTYPAR(K+1)=PAR(IP)
            K=K+2
            KTYFLG=.TRUE.
            GO TO 110
C
C  PARAMETER MA - MALE KARYOTYPE
C
1450        KTYPAR(K+1)=PAR(IP)
            K=K+2
            KTYFLG=.TRUE.
            GO TO 110
C
C  PARAMETER KC - CLEAR CLASFY/KTYPE PARAMETERS
C
1500        K=0
```

```
        CALL UPARAM(K,KTYPAR,KTYPHA)
        OSFLG=.FALSE.
        KTYFLG=.TRUE.
        GO TO 110
C
C PARAMETER FE - FEMALE KARYOTYPE
C
1550    KTYPAR(K+1)=PAR(IP)
        K=K+2
        KTYFLG=.TRUE.
        GO TO 110
C
C PARAMETER HX - HO X SEPARATION FROM C GROUP
C
1600    KTYPAR(K+1)=PAR(IP)
        K=K+2
        KTYFLG=.TRUE.
        GO TO 110
C
C PARAMETER DE DEBUG OPTION ON
C
1650    KTYPAR(K+1)=PAR(IP)
        K=K+2
        KTYFLG=.TRUE.
        GO TO 110
C
C PARAMETER P - PUSH A GROUP OF CHROMOSOMES RIGHT OR LEFT
C
1700    CALL KURSOR(Y,X,L1,S1,SL1,SLCL,SLCS,H)
        CALL TYPE('+MOVE CURSOR TO END OF PUSH ',0)
        CALL PARAM(NP,PAR,100)
        CALL KURSOR(Y,X,L2,S2,SL2,SLCL,SLCS,H)
        IF(S1.LT.S2) GOTO 1725
C GOTO 1725 FOR PUSH TO THE RIGHT
C
C PUSH LEFT
        NSL=SL1-SL2+1
        IF(NSL.LT.2.OR.NSL.GT.18) GOTO 250
        Y=2*(L1-1)
        CALL DLINE(127,Y,2*S2,S1-S2,1,-1)
        X=2*(S2-1)
        DO 1710 I=2,12,2
        CALL DLINE(BLACK,Y+I-14,X+14-I,2,1,-1)
1710    CALL DLINE(BLACK,Y+I,X+I,2,1,-1)
        CALL MVW(OFS(SL2),PAR,NSL)
C SAVE OFS IN PAR
        CALL MVW(PAR(2),OFS(SL2),NSL-1)
        OFS(SL1)=PAR(1)
        GOTO 1776
C PUSH RIGHT   S1 LT S2
1725    Y=2*(L1-1)
        NSL=SL2-SL1+1
        IF(NSL.LT.2.OR.NSL.GT.18) GOTO 250
        CALL DLINE(127,Y,2*S1,S2-S1,1,-1)
        X=2*S2
        DO 1730 I=2,12,2
        CALL DLINE(BLACK,Y+I-14,X+I-14,2,1,-1)
1730    CALL DLINE(BLACK,Y+I,X-I,2,1,-1)
        CALL MVW(OFS(SL1),PAR,NSL)
        CALL MVW(PAR(1),OFS(SL1+1),NSL-1)
        OFS(SL1)=PAR(NSL)
        GOTO 1776
C
C PARAMETER MV - MOVE INDICATED CHROMSOME TO SLOT SHOWN BY CURSOR
C
1750    CALL KURSOR(Y,X,L1,S1,SLID,SLCL,SLCS,N)
        CALL DLINE(BLACK,Y,X-2,3,1,-1)
        SVSLID=SLID
        CALL TYPE('+MOVE CURSOR TO OTHER SLOT ',0)
        CALL PARAM(NP,PAR,100)
        CALL KURSOR(Y,X,L2,S2,SLID,SLCL,SLCS,N)
        CALL ADL(L1,S1,L2,S2,SST,NST,512,512)
        DO 1770 L=L1,L2
        Y=2*(L-1)
```

```
               X=2*(SST(L)-1)
      1770     CALL DLINE(127,Y,X,HST(L),1,-1)
               SVID=OFS(SLID)
               OFS(SLID)=OFS(SVSLID)
               OFS(SVSLID)=SVID
      1776     OSFLG=.TRUE.
               KTYFLG=.TRUE.
               GO TO 110
      C
      C PARAMETER SP - SET SKELETON PARAMETERS
      C
      1800     CALL MVL(PAR(IP),MOBPAR(M+1),8)
               K=K+4
               MOBFLG=.TRUE.
               GO TO 110
      C
      C PARAMETER MX - SET MAXIMUM # OF CHROMOSOEMS PRE GROUP
      C
      1850     CALL MVL(PAR(IP),KTYPAR(K+1),24)
               K=K+12
               KTYFLG=.TRUE.
               GO TO 110
      C
      C PARAMETER IR - SET INITIAL SLOT FOR EACH ROW
      C
      1950     CALL MVL(PAR(IP),KTYPAR(K+1),14)
               K=K+7
               KTYFLG=.TRUE.
               GO TO 110
      C
      C PARAMETER IG - SET INITIAL SLOT FOR EACH GROUP
      C
      2000     CALL MVL(PAR(IP),KTYPAR(K+1),28)
               K=K+14
               KTYFLG=.TRUE.
               GO TO 110
      C
      C PARAMETER MC - CLEAR MOB PARAMETERS
      C
      2050     M=0
               MOBFLG=.TRUE.
               GO TO 110
      C
      C PARAMETER SC - SET UP THE CURSOR
      2100     CALL SC
               GOTO 110
      C SETUP THE CURSOR
      C
      C PARAMETER DS - DISPLAY SPREAD
      C
      2125     CALL APHASE(FOBPHA)
               GOTO 700
      C
      C PARAMETER RF - RERUN FOB
      C
      2150     CALL APHASE(FOBPHA)
               CALL UPARAM(0,MOBPAR,MOBPHA)
               CALL UPARAM(0,KTYPAR,KTYPHA)
               GOTO 700
      C RERUN FOB
      C
      C PARAMETER AB - ABORT
      C
      2200     CALL APHASE(0)
               GOTO 700
      C
      C PARAMETER X - REMOVE OBJECT FROM KARYOTYPE
      C
      2250     CALL KURSOR(Y,X,LI,SI,SLID,SLCL,SLCS,N)
               DO 2260 I=2,26,2
               CALL DLINE(BLACK,Y+I-14,X+I-16,2,1,-1)
               CALL DLINE(BLACK,Y+I-14,X+14-I,2,1,-1)
      2260     CONTINUE
      C DRAW AN X OVER THE OBJECT TO BE DELETED
               OFS(SLID)=0
```

```
            OSFLG=.TRUE.
            KTYFLG=.TRUE.
            GOTO 110
C
C PARAMETER L - ADD A LABEL TO INDICATE DIAGNOSIS
C
2300        DO 2310 I=4,72
            IF(IV(PARBUF(I)).EQ."15) GOTO 2320
2310        CONTINUE
            CALL TYPE(' INCORRECT LABEL FORMAT')
            GOTO 190
2320        LABLEN=I-3
            CALL AFILE(NOBB,1,'PIC      ',5,5)
            CALL OPEN(NOBB,512,0,2,'NOB')
            CALL GET(NOBB,1,IN)
            CALL PUT(NOBB,1,IN)
            CALL MVL(PARBUF(3),NOBB(IN+290),LABLEN)
            CALL CLOSE(NOBB)
C ALSO ADD TO THE NOB OUTPUT LABEL FOR RESEL'S BENEFIT
            CALL GLABEL(IOBUF,SPAR,IB)
            CALL MVL(PARBUF(3),IOBUF(IB+290),LABLEN)
            CALL PLABEL(IOBUF,SPAR,IOBUF(IB+1))
            GOTO 110
C
C PARAMETER WAVE - DISPLAY WAVEFORMS FROM BAND
2350        CALL UPARAM(2,'WAVE',BANDPH)
            GOTO 950
C
C PARAMETER AXIS - DISPLAY AXES FROM BAND
C
2400        CALL UPARAM(2,'AXIS',BANDPH)
            GOTO 950
C
C PARAMETER RB - RERUN BANDED CLASSIFIER
C
2450        CALL APHASE(FOURPH)
            GOTO 700
C
C PARAMETER QB - QUICK BAND CALCULATION (ONLY THE C GROUP)
C
2500        CALL SSWTCH(7,ISW7)
            IF(ISW7.NE.1) CALL UPARAM(2,'QB  ',BANDPH)
            GOTO 950
C
C DONE LOOKING AT PARAMETERS, SEE IF A RE-RUN IS NECCESSARY
C
500         IF(.NOT.ALLFLG.AND..NOT.KTYFLG.AND..NOT.MOBFLG) GO TO 700
            IF(.NOT.OSFLG) GOTO 550
C
C WRITE THE OFS PARAMETERS FOR CLASFY
C
            CALL MVL('OS',KTYPAR(K+1),2)
            CALL MVU(OFS,KTYPAR(K+3),90)
            K=K+92
550         CONTINUE
            IF(.NOT.ALLFLG.AND..NOT.MOBFLG) GO TO 650
            IF(ALLFLG) GO TO 610
C
C MUST RE-RUN MOB ON SELECTED CHROMOSOMES
C
            CALL MVL('SE',MOBPAR(M+1),2)
            M=M+3
            MM=M
            HM=0
            DO 600 N=1,NOB
            IF(.NOT.SEL(N)) GO TO 500
            M=M+1
            NM=NM+1
            MOBPAR(M)=N
600         CONTINUE
            IF(NM.EQ.0) GO TO 695
            MOBPAR(MM)=NM
            CALL PUT(IOBUF,1,IB)
            CALL MVL(NOB,IOBUF(IB+1),18)
            CALL MVL(CHDIR(1,1),IOBUF(IB+31),2*15*30)
```

```
              CALL PUT(IOBUF,2,IB)
              CALL MVL(CHDIR(1,31),IOBUF(IB+31),2*15*30)
              GO TO 610
605           M=M-3
C
C  SELECT MOB AS NEXT PHASE TO BE RUN
C
610           CALL APHASE(MOBPHA)
              CALL UPARAM(M,MOBPAR,MOBPHA)
              CALL UPARAM(K,KTYPAR,KTYPHA)
              GO TO 700
C
C  SELECT CLASFY AS NEXT PHASE TO BE RUN
C
650           CALL APHASE(KTYPHA)
              CALL UPARAM(K,KTYPAR,KTYPHA)
700           CONTINUE
              CALL CLOSE(IOBUF)
              CALL EXIT
              END

SUBROUTINE RESEL
C             RESEL IS USED TO ENTER INFORMATION ON MEASURED CHROMO
C             SOMES INTO KROMDATA. THE INPUT IS FROM MOB OUTPUT.
C
              IMPLICIT INTEGER(A-Z)
              COMMON/C1/ MBUF,KBUF,NEXT,NUSED,PID,RECS,ON,ONL,ONS,
             1OLEN,OIOD,OAREA,OCIL,OCID,OCIA,OFS
              REAL*8 DID(3)
              REAL*4 CFOUR(60,8),PHI(60,8),MU(18,24),SIGMA(18,24)
              REAL*4 ISUM,ASUM,ALSUM,LEN,CI,NCC,SUMXY,OCFOUR(51,8),OPHI(51,7)
              INTEGER NFD(10,3),CSPAR(5),PID(425),RECS(85)
              BYTE ON(80),ONL(80),ONS(80),OLEN(80),OCIL(80),OCID(80),OCIA(80)
              BYTE PBUF(560),LABEL(124),C(3640),OBDATA(3072)
              BYTE MBUF(2104),KBUF(56),FMSG(40),TMSG(23),GMSG(128)
              INTEGER PSPAR(10)
              INTEGER SPAR(10),KSPAR(10),OIOD(80),OAREA(80),OFS(90),
             2TFS(90),SCANDT(9),TN(90),NN(60),GFS(90),NFG(10)
              EQUIVALENCE (OBDATA,OCFOUR),(OBDATA(1633),OPHI)
              EQUIVALENCE (C(57),MU),(C(1785),SIGMA)
              EQUIVALENCE (SPAR(6),SCODE),(NLP,PSPAR(1))
              DATA ND/3/,DID/'46XX    ','46XY    ','45X0    '/
              DATA NFD/6,4,16,6,6,4,4,0,0,0,6,4,15,6,6,4,5,0,0,0,
             1 6,4,15,6,6,4,4,0,0,0/
              DATA GMSG/128*' '/
              DATA TFS/1,1,40,40,2,2,40,40,3,3,40,40,4,4,5,5,40,40
             2,6,6,7,7,8,8,9,9,10,10,11,11,12,12,23,23,40,40
             3,13,13,14,14,15,15,40,40,16,16,40,40,17,17,18,18,40,40
             4,19,19,20,20,40,40,26,26,25,25,21,21,22,22,24,24,40,40
             5,18*40/
              DATA GFS/12*1,6*2,18*3,8*4,10*5,6*6,2*8,10*7,8*8,10*9/
              DATA CMI/61/
C  CURRENT MISCELLANEOUS INDEX = 61
C
C             OPEN MOB OUTPUT AND COPY NECESSARY DATA FROM MOB LABEL
C
              CALL SSWTCH(10,ISW10)
              IF(ISW10.NE.1) CALL APHASE(19)
C  IF SW10 IS DOWN SET TO CALL ABNORM
              CALL AFILE(MBUF,1,'RCR     ','13,'13)
              CALL OPEN(MBUF,1024,1,0,'RCR')
              CALL GLABEL(MBUF,3PAR,NL)
              CALL MVW(MBUF(ML+13),SCODE,1)
              CODE=SCODE
              IF(SCODE.LT.0) SCODE=-SCODE
              IF(SCODE.GT.0.AND.SCODE.LE.15) GOTO 5
C  CHECK FOR VALID CODE
              CALL CLOSE(MBUF)
              RETURN
5             CONTINUE
              CALL MVL(MBUF(ML+73),GMSG(1),64)
              CALL MVL(MBUF(ML+290),GMSG(107),22)
```

```
        CALL MVL(MBUF(NL+73),LABEL,64)
        CALL MVL(MBUF(NL+145),LABEL(65),20)
        CALL MVL(MBUF(NL+217),LABEL(85),20)
        CALL MVL(MBUF(NL+289),LABEL(105),20)
C SAVE LABEL INFORMATION
C
C       OPEN KROMDATA AND GET NL
C
        CALL AFILE(KBUF,4,'KDATA   ',6,6)
        IF(CODE.LT.0) CALL AFILE(KBUF,4,'BDATA   ',6,6)
        CALL OPEN(KBUF,1024,0,2,'KRM')
        CALL GLABEL(KBUF,KSPAR,KL)
        NL=KSPAR(1)
C READ SOURCE DIRECTORY RECORD
C
10      CALL GET(KBUF,SCODE,KD)
        IF(NUSED.LT.85) GOTO 22
C IF SPACE IN THIS RECORD GOTO 85
        IF(NEXT.EQ.0) GOTO 20
C IF LAST DIRECTORY RECORD GO MAKE A NEW ONE
        SCODE=NEXT
        GOTO 10
C GO READ NEXT DIRECTORY RECORD
20      NL=NL+1
        NEXT=NL
C STORE NEXT RECORD IN THIS DIRECTORY RECORD
        CALL PUT(KBUF,SCODE,KD)
        CALL GET(KBUF,NL,KD)
        SCODE=NL
        NUSED=0
22      CONTINUE
        DO 24 I=1,421,5
        IF(PID(I).EQ.0) GOTO 26
C IF THIS SLOT IS FREE GOTO 26
24      CONTINUE
        CALL TYPE(' RESEL ERROR')
        CALL TYPE('0')
        PAUSE 12345
26      CALL MVL(LABEL(21),PID(I),10)
C STORE PATIENT ID
        NUSED=NUSED+1
        IR=(I+4)/5
        REC=RECS(IR)
        IF(REC.NE.0) GOTO 28
C GOTO 28 IF THIS RECORD WAS DELETED
        NL=NL+1
C NEED TO MAKE A NEW RECORD
        REC=NL
        RECS(IR)=REC
        IF(CODE.LT.0) NL=NL+3
C ADD 3 MORE IF BANDED
28      CALL PUT(KBUF,SCODE,KD)
        CALL GLABEL(KBUF,KSPAR,KL)
        KSPAR(1)=NL
C UPDATE NL
        CALL PLABEL(KBUF,KSPAR,KBUF(KL+1))
C
C       GET MOB OUTPUT DATA AND TRANSFER TO KROMDATA
C
C
C       GET OFS FROM MOB OUTPUT AND CONVERT TO TYPE
C
        CALL GET(MBUF,3,MD)
        II=MD+215
        DO 30 I=1,90
        II=II+2
30      CALL MVW(MBUF(II),OFS(I),1)
        CALL ZIA(ON,40)
        CALL ZIA(HN,60)
        CALL ZIA(TN,90)
        CALL ZIA(HFG,10)
        DO 40 J=1,90
        IF(OFS(J).EQ.0) GOTO 40
        G=OFS(J)
```

```
           NFG(G)=NFG(G)+1
           TN(OFS(J))=TFS(J)
    40     CONTINUE
C
C          MOVE NECESSARY DATA FROM NOB LABEL AND LINE 1 TO KBUF
C
           CALL GET(MBUF,1,MD)
           CALL PUT(KBUF,REC,KD)
           CALL MVU(LABEL,KBUF(KD+1),62)
           CALL MVU(MBUF(MD+1),NOB,1)
C
           N=1
    50     IF(TN(N).EQ.0) GOTO 80
C
C          GOTO 80 IF THIS OBJECT IS NOT TO BE ENTER
C
           T=2*TN(N)-1
           IF(T.LT.60.AND.T.GT.0) GOTO 60
           T=CMT
           IF(T.GT.80) GOTO 80
C USE NEXT AVAILABLE SPACE IN MISCELLANEOUS AREA
           CMT=CMT+1
    60     CONTINUE
           IF(ON(T).EQ.0) GOTO 70
C
C          GOTO 70 IF FIRST SLOT FOR THIS TYPE IS EMPTY
C
           T=T+1
    70     ON(T)=N
           NN(N)=T
    80     CONTINUE
           N=N+1
           IF(N.LE.NOB) GOTO 50
C
C          TRANSFER CHDIR. 30 BYTES IS OFFSET OF ONL ON MBUF
C
           II=30+MD
           IST=1
           IEND=30
           DO 100 J=1,2
           K=0
           DO 90 I=IST,IEND
           K=K+1
           NNI=NN(I)
           IF(NNI.EQ.0) GOTO 90
           IM=(K-1)*30+II
           CALL MVL(MBUF(IM+3),ONL(NNI),1)
           CALL MVL(MBUF(IM+5),ON3(NNI),1)
           CALL MVL(MBUF(IM+7),OLEN(NNI),1)
           CSUM=CSUM+1
           LSUM=LSUM+OLEN(NNI)
           CALL MVU(MBUF(IM+9),OIOD(NNI),1)
           ISUM=ISUM+OIOD(NNI)
           CALL MVU(MBUF(IM+21),OAREA(NNI),1)
           ASUM=ASUM+OAREA(NNI)
           CALL MVL(MBUF(IM+11),OCIL(NNI),1)
           CALL MVL(MBUF(IM+13),OCID(NNI),1)
           CALL MVL(MBUF(IM+15),OCIA(NNI),1)
    90     CONTINUE
           IF(J.EQ.2) GOTO 100
           CALL GET(MBUF,2,MD)
           IST=31
           IEND=NOB
           II=30+MD
   100     CONTINUE
           CALL MVU(CSUM,KBUF(KD+125),1)
           CALL MVU(LSUM,KBUF(KD+127),1)
           CALL MVU(ISUM,KBUF(KD+129),2)
           CALL MVU(ASUM,KBUF(KD+133),2)
           IF(CODE.GT.0) GOTO 190
C
C CARDED SPREAD PROCESSING
C
           CALL GET(MBUF,4,IM)
           CALL MVU(MBUF(IM+1),CFOUR(1,1),480)
           CALL GET(MBUF,5,IM)
```

```
        CALL MVW(MBUF(IM+1),CFOUR(1,5),480)
        CALL GET(MBUF,6,IM)
        CALL MVW(MBUF(IM+1),PHI(1,1),480)
        CALL GET(MBUF,7,IM)
        CALL MVW(MBUF(IM+1),PHI(1,5),480)
        DO 110 N=1,NOB
        T=NN(N)
        IF(T.EQ.0.OR.T.GT.51) GOTO 110
C GET THE FOURIER DATA
        DO 102 I=1,8
102     OCFOUR(T,I)=CFOUR(N,I)
        DO 104 I=1,7
104     OPHI(T,I)=PHI(N,I+1)
110     CONTINUE
190     CONTINUE
C
C       WRITE RECORD ON KROMDATA
C
        CALL MVW(ON,KBUF(KD+145),440)
        NC=0
        DO 200 G=1,9
        CALL OUTCON(NFG(G),GMSG(68+G*4),4)
200     NC=NC+NFG(G)
        CALL OUTCON(NC,GMSG(68),4)
        IF(IV(GMSG(107)).NE.32) GOTO 225
C IF OPERATOR SUPPLIED A DIAGNOSIS GOTO 250
        DO 220 N=1,ND
        DO 210 G=1,10
        IF(NFG(G).NE.NFD(G,N)) GOTO 220
210     CONTINUE
C NFG MATCHES THIS DIAGNOSIS
        GOTO 230
220     CONTINUE
C NO MATCH
225     N=0
        GOTO 250
230     CALL MVL(DID(N),GMSG(107),8)
        CALL MVL(DID(N),KBUF(KD+106),8)
250     CALL AFILE(PBUF,1,'PIC     ',5,5)
        CALL OPEN(PBUF,512,0,2,'NOB')
        CALL GET(PBUF,1,IP)
        CALL OUTCON(REC,PBUF(IP+176),4)
        CALL MVL('RECORD',PBUF(IP+166),6)
C STORE RECORD NUMBER IN NOB OUTPUT FOR HCOPY
        IF(N.NE.0) CALL MVL(DID(N),PBUF(IP+290),8)
        CALL PUT(PBUF,1,IP)
        CALL CLOSE(PBUF)
C STORE DIAGNOSIS N IN PREP AND NOB OUTPUT FOR HCOPY
        CALL MVL(' ** XXXXXXXXXX ON RECORD XXXX  ',FMSG,31)
        CALL MVL(LABEL(21),FMSG(5),10)
        CALL OUTCON(REC,FMSG(29),4)
        CALL MVL(GMSG(107),FMSG(32),8)
        CALL TYPE(FMSG)
        IF(CODE.GT.0) GOTO 300
C WRITE THE BANDED RECORDS
        DO 270 I=1,3
        CALL PUT(KBUF,REC+I,IK)
        CALL MVW(OBDATA(I*1024-1023),KBUF(IK+1),512)
270     CONTINUE
300     CONTINUE
C WRITE PATIENT REPORT RECORD
        CALL AFILE(PBUF,4,'PDATA   ',6,6)
        CALL OPEN(PBUF,512,0,2,'PRP')
        CALL GLABEL(PBUF,PSPAR,IP)
        NLP=NLP+1
        CALL PLABEL(PBUF,PSPAR,PBUF(IP+1))
        CALL GET(PBUF,NLP,IP)
        CALL MVL(GMSG,PBUF(IP+1),128)
        CALL PUT(PBUF,NLP,IP)
        CALL CLOSE(PBUF)
        CALL CLOSE(KBUF)
        CALL CLOSE(MBUF)
        CALL TYPE('0')
        RETURN
        END
```

```fortran
C       MASK2 - COMBINE 2 PICTURES AND ADD A BORDER
C       CALMS VERSION
        SUBROUTINE MASK2(DUNIT,FILPEX)
        IMPLICIT INTEGER(A-Z)
        REAL STATS(256)
        BYTE A(6200),B(6200),C(992),LE(12),RE(12)
        COMMON STATS,LE,C,RE
        INTEGER*2 LOW(512),HIGH(511)
        EQUIVALENCE (LOW,STATS),(HIGH(1),LOW(2))
        INTEGER*2 SPAR(5),SPARB(5),PAR(10),KEY(3)
        BYTE FILPEX(12)
        DATA MAXHS/992/
        DATA NKEY/3/,KEY/'HI','HS','KG'/,HFLAG/0/,NFR/128/,ISIZE/100/
        CALL AFILE(A,1,'PIC       ',5,5)
C ASSIGN DK1:PIC[5,5] AS DEFAULT FILE FOR NOB OUTPUT
        CALL OPEN(A,3072,1,0,'NOB')
        CALL GLABEL(A,SPAR,IA)
        CALL AFILE(B,5,'PIC       ',5,5)
C ASSIGN DK5:PIC[5,5] AS DEFAULT FILE FOR KGM
1       CALL RPARAM(NP,PAR,10)
11111   IP=1
3       IF(IP.GT.NP) GOTO 30
        DO 5 J=1,NKEY
        IF(PAR(IP).EQ.KEY(J)) GOTO (10,12,15),J
5       CONTINUE
8       CALL TYPE(' ** PARAMETER ERROR')
        CALL TYPE('0')
        PAUSE
10      HFLAG=1
        CALL ZIA(STATS,512)
        IP=IP+2
        GOTO 3
12      ISIZE=PAR(IP+2)
        IP=IP+1
        GOTO 10
15      CALL AFILE(B,PAR(IP+2),PAR(IP+3),2,2)
C ASSIGN A DIFFERENT KGM FILE
30      CONTINUE
        CALL OPEN(B,3072,1,0,'KGM')
        CALL GLABEL(B,SPARB,IB)
        NL=SPAR(1)
        IF(SPARB(1).GT.NL) NL=SPARB(1)
        NS=SPAR(2)+SPARB(2)+1
        IF(NS.GT.MAXHS) NS=MAXHS
        IF(SPAR(3).NE.7) NFR=256
        CALL MSUB(A(IA+1),NS,DUNIT,FILPEX)
C LABEL CALL TO MSUB
        DO 100 L=1,NL
        IF(L.GT.SPAR(1)) GOTO 50
        CALL GET(A,L,IA)
        CALL MVL(A(IA+1),C,SPAR(2))
        GOTO 55
50      CALL ITLA(0,C,SPAR(2))
55      C(SPAR(2)+1)=127
        IF(L.GT.SPARB(1)) GOTO 60
        CALL GET(B,L,IB)
        CALL MVL(B(IB+1),C(SPAR(2)+2),SPARB(2))
        GOTO 65
60      CALL ITLA(0,C(SPAR(2)+2),SPARB(2))
65      CALL MSUB(C,NS)
        IF(HFLAG.EQ.1) CALL LSTAT(SPAR(2),A(IA+1),STATS,1,1)
C IF HISTOGRAM WAS REQUESTED, GATHER THE STATISTICS
100     CONTINUE
        IF(HFLAG.EQ.0) GOTO 200
        II=1
C CONVERT THE FREQUENCY COUNTS TO REAL NUMBERS
        DO 120 I=1,NFR
        STATS(I)=LOW(II)+HIGH(II)*32768
120     II=II+2
        CALL MSUB(STATS,-NFR,ISIZE)
        GOTO 220
200     CALL MSUB(0,0)
220     CONTINUE
        CALL CLOSE(A)
        END
```

```
      SUBROUTINE MSUB(LOC,NSO,ISIZE,FILPEX)
      IMPLICIT INTEGER(A-Z)
      REAL STATS(256),MAXF,HSIZE
      BYTE FILPEX(12),DATA(1000)
      COMMON STATS,DATA
      INTEGER*2 FREQ(256),SPAR(5)
      EQUIVALENCE (FREQ,STATS)
      INTEGER*2 ISIZE(5)
      BYTE DSRN(6258),T(2104),DMSG(20)
      EQUIVALENCE (DSRN(4153),T),(DSRN(6257),ISW5)
      BYTE LAB(512),LOC(976),BUF(1000),LH(4),LOGN(4)
      DATA MAXNS/976/,MINNS/360/
      DATA SPAR/0,0,4,1,512/
      DATA MAXF/1./,HSIZE/200./,L/0/,WHITE/15/,STEP/16/,LBW/0/
      IF(LBW.GT.0) GOTO 100
C GOTO 100 IF NOT INITIAL CALL
      CALL AFILE(DSRN,ISIZE,FILPEX,2,2)
      CALL SSWTCH(5,ISW5)
      BUFSIZ=3072
      IF(ISW5.EQ.1) BUFSIZ=2048
C IF TAPE OUTPUT, DECREASE SIZE OF DSRN TO MAKE ROOM
      CALL OPEN(DSRN,BUFSIZ,1,1,'MSK')
      CALL MVB(LOC,LAB,256)
      CALL LTI(LAB(7),BPE)
C SAVE LABEL AND BPE
      NS=NSO
      IF(NS.GT.MAXNS) NS=MAXNS
      NSD2=(NS+1)/2
C NSD2 IS THE NUMBER OF WORDS TO MOVE TO DATA
      IF(NS.LT.MINNS) NS=MINNS
C MINNS IS THE MINIMUM SIZE FOR THE DATE AND TIME LABEL AND HSTGRM
      NSW=NS+24
      NWW=(NSW+1)/2
      SPAR(2)=NWW
      SPAR(4)=512/NWW
      IF(SPAR(4).EQ.0) SPAR(4)=1
      CALL PLABEL(DSRN,SPAR,LAB)
      IF(ISW5.NE.1) GOTO 50
      CALL MVB(1,T(21),1)
      CALL MVB(-52140,T(23),1)
C SET MVB FOR MT0:
      CALL OPEN(T,1024,1,5,'TAP')
      CALL MVB(1,T(51),1)
C BPB=1
      CALL MVB(NSW,T(45),1)
C RECLEN=NSW
      CALL MVB(NSW,T(47),1)
C BLOCKSIZE = NSW
50    CONTINUE
      CALL ZIA(BUF,NWW)
      CALL WLINE(DSRN,LBW,NSW,BUF,04)
C WRITE 4 BLANK LINES
      CMID=13+NS/2
      CWW=NS/32
C GREY WEDGE WIDTH
      B1=CMID-16*CWW-1
      B2=32*CWW+3
      CALL ITLA(255,BUF(B1),B2)
      CALL WLINE(DSRN,LBW,NSW,BUF,01)
      CALL WEDGE(WHITE,STEP,BUF,NS)
      CALL WLINE(DSRN,LBW,NSW,BUF,12)
      CAL  WEDGE(255,-STEP,BUF,NS)
      CALL WLINE(DSRN,LBW,NSW,BUF,12)
      CALL ITLA(255,BUF(B1),B2)
      CALL WLINE(DSRN,LBW,NSW,BUF,01)
C WRITE GREY SCALE
      CALL ZIA(BUF,NWW)
      CALL WLINE(DSRN,LBW,NSW,BUF,1)
      DO 80 K=0,6
      IF(K.EQ.3) CALL REF(5,BUF,NSW)
      DO 70 N=100,NS,100
      CALL OUTCON(N,LH(4),4)
70    CALL TEXT(LH(2),1,K,BUF(N+5),1)
80    CALL WLINE(DSRN,LBW,NSW,BUF,1)
      CALL REF(25,BUF,NSW)
```

```
      CALL ULINE(DSRN,LBW,NSW,BUF,83)
C WRITE TOP REFERENCE MARKS
      CALL ITLA(255,BUF(5),8)
      CALL ITLA(255,BUF(13+NS),8)
      CALL ULINE(DSRN,LBW,NSW,BUF,81)
      RETURN
100   CONTINUE
      IF(NSO.LE.0) GOTO 200
C IF END OF PICTURE, GOTO 200
      IF(BPE.NE.7) GOTO 110
      CALL MVW78(LOC,DATA(13),NSD2)
      GOTO 115
110   CALL MVW(LOC,DATA(13),NSD2)
115   L=L+1
C STEP INPUT LINE NUMBER
      CALL ITLA(0,DATA(1),12)
      CALL ITLA(0,DATA(13+NS),12)
C ZERO LINE REFERENCE MARKS
      LP3=L+3
      ML=MOD(LP3,100)
      IF(ML.GT.6.OR.L.LT.4) GOTO 130
C TIME FOR NUMBER OF HUNDREDS
      CALL OUTCON(LP3,LN(4),4)
      CALL TEXT(LN(2),1,ML,DATA(2),1)
      CALL TEXT(LN(2),1,ML,DATA(17+NS),1)
      GOTO 140
130   CONTINUE
      IF(MOD(L,5).NE.0) GOTO 150
      CALL ITLA(255,DATA(5),4)
      CALL ITLA(255,DATA(17+NS),4)
C INSERT EVERY 5 MARK
140   CONTINUE
      IF(MOD(L,25).NE.0) GOTO 150
      CALL ITLA(255,DATA(9),4)
      CALL ITLA(255,DATA(13+NS),4)
150   CONTINUE
      CALL ULINE(DSRN,LBW,NSW,DATA,1)
C WRITE ONE LINE OF DATA
      RETURN
200   CONTINUE
C FINAL ENTRY, WRITE BOTTOM OF PICTURE
      DO 240 K=1,11
      IF(K.LT.5) CALL REF(25,BUF,NSW)
      IF(K.GE.5.AND.K.LE.8) CALL REF(5,BUF,NSW)
      IF(K.EQ.9) CALL ZIA(BUF,NWW)
      IF(ML.GE.6) GOTO 220
C FINISH UP NUMBER THAT WAS STARTED ON LEFT AND RIGHT SIDE
      ML=ML+1
      CALL TEXT(LN(2),1,ML,BUF(2),1)
      CALL TEXT(LN(2),1,ML,BUF(17+NS),1)
220   CONTINUE
      IF(K.LT.5) GOTO 240
      DO 230 N=100,N2,100
      CALL OUTCON(N,LOGN(4),4)
230   CALL TEXT(LOGN(2),1,K-5,BUF(N+9),1)
240   CALL ULINE(DSRN,LBW,NSW,BUF,1)
C WRITE BOTTOM REFERENCE MARKS
      CALL ZIA(BUF,NWW)
      CALL ULINE(DSRN,LBW,NSW,BUF,1)
      CALL ITLA(255,BUF(B1),B2)
      CALL ULINE(DSRN,LBW,NSW,BUF,81)
      CALL WEDGE(255,-STEP,BUF,NS)
      CALL ULINE(DSRN,LBW,NSW,BUF,12)
      CALL WEDGE(WHITE,STEP,BUF,NS)
      CALL ULINE(DSRN,LBW,NSW,BUF,12)
      CALL ITLA(255,BUF(B1),B2)
      CALL ULINE(DSRN,LBW,NSW,BUF,81)
C WRITE GREY SCALE
      MAXCHR=(NS+11)/12
      JMAX=433
      DO 250 J=73,JMAX,72
      IF(IV(LAB(J-1)).NE.67) GOTO 260
C FINISHED WITH LABELS IF NO C IN COLUMN 72
      J1=J+1
C SKIP THE FIRST LABEL CHARACTER WHICH IS ALWAYS BLANK
```

```
C FIND THE LENGTH OF THIS LABEL
      DO 242 I=1,70
         IF(LAB(J+70-I).NE.32) GOTO 243
  242 CONTINUE
C ENTIRE LABEL IS BLANK
      GOTO 250
  243 LABLEN=70-I
  244 CHR=LABLEN
      IF(LABLEN.LE.MAXCHR) GOTO 247
C SPLIT UP LABEL IF IT IS TOO LONG
      DO 245 I=1,20
         IF(LAB(J1+MAXCHR-I).EQ.32) GOTO 246
  245 CONTINUE
C NO BLANK FOUND IN 20 CHARACTERS, MAKE ARBITRARY SPLIT
      I=1
  246 CHR=MAXCHR-I+1
  247 CONTINUE
      CALL ZIA(BUF,NWW)
      CALL WLINE(DSRN,LBW,NSW,BUF,04)
      DO 248 K=0,6
      CALL TEXT(LAB(J1),CHR,K,BUF(13),2)
      CALL WLINE(DSRN,LBW,NSW,BUF,02)
  248 CONTINUE
C WRITE LABELS
      J1=J1+CHR
      LABLEN=LABLEN-CHR
      IF(LABLEN.GT.0) GOTO 244
  250 CONTINUE
  260 CONTINUE
      IF(NSO.EQ.0) GOTO 420
C SKIP HISTOGRAM IF NSO EQ 0
      NFR=-NSO
      HSIZE=ISIZE(1)
      CALL ZIA(BUF,NWW)
      CALL WLINE(DSRN,LBW,NSW,BUF,4)
      NFRM1=NFR-1
      DO 320 I=2,NFRM1
      IF(STATS(I).LE.MAXF) GOTO 320
      MAXF=STATS(I)
  320 CONTINUE
      IF(STATS(1).GT.MAXF) STATS(1)=MAXF
      IF(STATS(NFR).GT.MAXF) STATS(NFR)=MAXF
      DO 330 I=1,NFR
  330    FREQ(I)=(STATS(I)/MAXF)*HSIZE+.9999
      BARW=NS/NFR
      HSTART=(NS-BARW*NFR)/2+12
      J=HSIZE
  340 H=HSTART
      DO 350 I=1,NFR
      IF(FREQ(I).NE.J) GOTO 350
C TIME TO STORE BAR FOR THIS DN
      CALL ITLA(255,BUF(H),BARW)
  350 H=H+BARW
      CALL WLINE(DSRN,LBW,NSW,BUF,1)
      J=J-1
      IF(J.GE.0) GOTO 340
C THE FOLLOWING CODE WAS COMMENTED OUT TO MAKE ROOM FOR TAPE OUTPUT
C     DO 370 J=8,64,56
C     CALL ZIA(BUF,NWW)
C     HSTEP=J*BARW
C     HMAX=HSTART+NFR*BARW+1
C     DO 360 H=HSTART,HMAX,HSTEP
C 360 CALL ITLA(255,BUF(H),BARW)
C     CALL WLINE(DSRN,LBW,NSW,BUF,5)
C 370 CONTINUE
C     CALL ZIA(BUF,NWW)
C     CALL WLINE(DSRN,LBW,NSW,BUF,2)
C     HSTEP=16*BARW
C     DO 400 K=0,6
C     H=HSTART
C     CALL TEXT('0',1,K,BUF(H-2),1)
C     DO 390 N=16,NFR,16
C     H=H+HSTEP
C     IF(BARW.EQ.1.AND.MOD(N,32).EQ.16) GOTO 390
C     CALL OUTCON(H,LN(4),4)
```

```
C       IF(N.GT.99) GOTO 380
CC N IS 2 CHARACTERS
C       CALL TEXT(LN(3),2,K,BUF(H-5),1)
C       GOTO 390
C   380 CALL TEXT(LN(2),3,K,BUF(H-8),1)
C   390 CONTINUE
C   400 CALL ULINE(DSRN,LBU,NSW,BUF,1)
    420 CONTINUE
        CALL MVL('DD-MMM-YY HH,MM,SS JPL/CALMS',DMSG,28)
        CALL DATE(DMSG)
        CALL TIME(DMSG(11))
        CALL ZIA(BUF,NWW)
        CALL ULINE(DSRN,LBU,NSW,BUF,16)
        DO 480 K=0,6
          CALL TEXT(DMSG,28,K,BUF(2*NWW-359),2)
        CALL ULINE(DSRN,LBU,NSW,BUF,02)
C WRITE DATE
    480 CONTINUE
        CALL ZIA(BUF,NWW)
        CALL ULINE(DSRN,LBU,NSW,BUF,04)
        SPAR(1)=LBU
        CALL PLABEL(DSRN,SPAR,LAB)
C REWRITE LABEL WITH CORRECT NL
        L=0
        LBU=0
        IF(ISW5.NE.1) GOTO 500
        CALL CLOSE(T)
        CALL WEF
        CALL WEF
        CALL BSF
    500 CALL CLOSE(DSRN)
        RETURN
        END

C**********
C        *
C   BAND *
C        *
C**********
C
C FIND WAVEFORM AND FOURIER COEFFICIENTS FOR BANDED CHROMOSOMES
C
        COMMON /C1/ NOB,IDIR
        COMMON /C1/ CHDIR,SMLBUF,LRGBUF,NS,NL,CUROLN
        COMMON /C1/ SST,EST
        COMMON /C1/ SPIOD,SPLTH,SPAREA
        COMMON /C1/ NCHR
        COMMON /C1/ CFOUR,PHI
        COMMON /C1/ BAND,AHIS
        COMMON /C1/ OBUF,BUF
        BYTE LRGBUF(79,88)
        BYTE OBUF(4152)
        BYTE TEMPB
        LOGICAL OPT1,OPT2,OPT3,SEL(60)
        INTEGER TEMPI
        INTEGER SPAR(5),OFS(72)
        INTEGER BMAX
        INTEGER BAND(160)
        INTEGER KPAR(200)
        INTEGER BPL
        INTEGER CHDIR(15,60)
        INTEGER CUROLN
        INTEGER PAR(10)
        INTEGER CLPARM(130)
        REAL CFOUR(60,8),PHI(60,8)
        REAL AHIS(150)
        REAL COSINE(150),SINE(150)
        REAL AFOUR(60,8),BFOUR(60,8)
C
        EQUIVALENCE(XP,PP,QQ,SIGX,JX2,YSTAR,AF,JDIF)
        EQUIVALENCE(YP,PPP,QQQ,SIGY,IY2,YEND,BF,JUV)
        EQUIVALENCE(XTERM,PPPP,NSL,NNZ,LPG,EL,RM,JUL)
        EQUIVALENCE(YTERM,PPPPP,NLL,LL,NG,NDIY,RMJ,JLL)
```

```
      EQUIVALENCE(SPAR(2),BPL)
      EQUIVALENCE (CFOUR(1,1),AFOUR(1,1))
      EQUIVALENCE (PHI(1,1),BFOUR(1,1))
      EQUIVALENCE (NL,NLO)
      EQUIVALENCE (NUMOB,II)
      DATA LWIN/8/,OPT1/.FALSE./,OPT2/.FALSE./,OPT3/.FALSE./
C LENGTH OF WINDOW FOR WAVEFORM CALCULATION ON STRAIGHT CHROMOSOMES
      DATA SEL/60*.TRUE./
C
      PAR(1)=0
      CALL RPARAM(NPAR,PAR,10)
      NP=1
      DO 10 NP=1,NPAR,2
      IF(PAR(NP).EQ.'WA') OPT2=.TRUE.
      IF(PAR(NP).EQ.'AX') OPT3=.TRUE.
      IF(PAR(NP).NE.'QB') GOTO 10
      OPT1=.TRUE.
      DO 8 I=1,60
    8 SEL(I)=.FALSE.
   10 CONTINUE
C
      CALL AFILE(OBUF,1,'RCR        ','13,'13)
      CALL OPEN(OBUF,2049,1,0,'RCR')
      CALL GLABEL(OBUF,SPAR,IB)
      IB=0
C
      CALL GET(OBUF,1,IB)
      CALL MVL(OBUF(IB+3),SPIOD,12)
      NCHR=IV(OBUF(IB+17))
      CALL MVL(OBUF(IB+31),CHDIR(1,1),2*15*30)
      CALL GET(OBUF,2,IB)
      CALL MVL(OBUF(IB+31),CHDIR(1,31),2*15*30)
      CALL GET(OBUF,3,IB)
      CALL MVW(OBUF(217+IB),OFS,72)
      IF(.NOT.OPT1) GOTO 30
      DO 20 I=19,34
      IF(OFS(I).EQ.0) GOTO 20
      SEL(OFS(I))=.TRUE.
   20 CONTINUE
   30 CONTINUE
C
      DO 310 II=1,NCHR
      IF(.NOT.SEL(II)) GOTO 310
      CUROLN=CHDIR(1,II)
      NL=CHDIR(2,II)
      IF(CUROLN.EQ.0) NL=0
      NS=CHDIR(3,II)
      IF(NL.LT.1.OR.NS.LT.1) GO TO 310
      NG=0
      LPG=1024/NS
C     LINES/GET
C
      DO 308 I=1,NL
      CALL GET(OBUF,CUROLN,IB)
      IF(I.EQ.1) LASTIB=IB
      CUROLN=CUROLN+1
      DO 301 III=1,LPG
      NG=NG+1
C     WRITE(5,2000) (OBUF(J+IB),J=1,NS)
      CALL MVL(OBUF(IB+1),LRGBUF(1,NG),NS)
      IB=IB+NS
      IF(NG.GE.NL)GO TO 311
  301 CONTINUE
  308 CONTINUE
  311 CONTINUE
C
C
C     TEST THE ORIENTATION
C     SCAN ALONG X (ROW) DIRECTION
C
      JX2=NS/2
      IY2=NL/2
      NNZ=0

NSEGX=0
      NSEGY=0
C
```

```
              DO 400 J=1,NS
              IF(LRGBUF(J,IY2).NE.0) NNZ=NNZ+1
              IF(LRGBUF(J,IY2).EQ.0) NNZ=0
              IF(NNZ.EQ.3) NSEGX=NSEGX+1
       400    CONTINUE
C
C             NOW SCAN IN THE Y (COLUMN) DIRECTION
C
              NNZ=0
C
              DO 401 I=1,NL
              IF(LRGBUF(JX2,I).NE.0) NNZ=NNZ+1
              IF(LRGBUF(JX2,I).EQ.0) NNZ=0
              IF(NNZ.EQ.3) NSEGY=NSEGY+1
       401    CONTINUE
C
C             DECIDE IF IT IS PROBABLY BENT OR NOT MAYBE
C
              IF(NS.GT.25) GO TO 430
              IF(NSEGX.EQ.1.AND.NSEGY.EQ.1) GO TO 410
              IF(NSEGX.GT.1.AND.NSEGY.EQ.1) GO TO 420
              IF(NSEGX.EQ.1.AND.NSEGY.GT.1) GO TO 430
              GO TO 440
C
       410    CONTINUE
C
C             STRAIGHT
C
              DO 411 I=1,NL
              LAST0=0
              DO 405 J=1,NS
              IF(LRGBUF(J,I).NE.0) GO TO 406
              LAST0=J
       405    CONTINUE
       406    CONTINUE
              FIRST0=NS+1
              DO 407 J=1,NS
              J1=NS+1-J
              IF(LRGBUF(J1,I).NE.0) GO TO 408
              FIRST0=J1
       407    CONTINUE
       408    CONTINUE
              LL=(LAST0+FIRST0+1)/2
              IBAND=0
              IL=LAST0+1
              IH=FIRST0-1
              IHMIL=IH-IL+1
              IF(IHMIL.LE.LWIN) GOTO 4200
C IF WIDTH IS LE WINDOW WIDTH GOTO 4200
              IK=LAST0+LWIN
              DO 4100 J=IL,IK
      4100    IBAND=IBAND+LRGBUF(J,I)
              MBAND=IBAND
C MBAND IS MAXIMUM VALUE OF LWIN SAMPLES
      4150    IK=IK+1
              IBAND=IBAND-LRGBUF(IL,I)+LRGBUF(IK,I)
C MOVE ONE PLACE OVER
              IL=IL+1
              IF(IBAND.GT.MBAND) MBAND=IBAND
              IF(IK.LT.IH) GOTO 4150
C CHECK IF ALL SAMPLES PROCESSED
              BAND(I)=MBAND/LWIN
              GOTO 4095
      4200    DO 409 J=IL,IH
       409    IBAND=IBAND+LRGBUF(J,I)
              BAND(I)=IBAND/IHMIL
      4095    CONTINUE
              IF(OPT3) LRGBUF(LL,I)=1
       411    CONTINUE
C
C
              GO TO 440
       420    CONTINUE
C
C             FLIP IT DIAGONALLY
```

```
430     CONTINUE
C
C       BENT AND PROPERLY ORIENTED
C
C       AVE Y   (I)
C
        NLL=((NL/3)*3)+1
        NP=0
        NSIGY=0
C
        DO 431 I=1,NLL,3
        DO 431 J=1,NS
        IF(LRGBUF(J,I).EQ.0) GO TO 431
        NP=NP+1
        NSIGY=NSIGY+FLOAT(I)
431     CONTINUE
        IZERO=NSIGY/NP
C
C       AVE X   (J)
C
        NSL=((NS/3)*3)+1
        NP=0
        NSIGX=0
        DO 422 J=1,NSL,3
        DO 422 I=1,NL
        IF(LRGBUF(J,I).EQ.0) GO TO 422
        NP=NP+1
        NSIGX=NSIGX+J
422     CONTINUE
        JZERO=NSIGX/NP
C
        A11=0.0
        A21=0.0
        A12=0.0
        A22=0.0
        A13=0.0
        A31=0.0
        A32=0.0
        A23=0.0
        S=0.0
        T=0.0
        A33=0.0
        U=0.0
C
C
C
        NSM2=NS-2
        DO 500 J=1,NSM2,3
        DO 500 I=1,NL
C
        IF(LRGBUF(J,I).EQ.0) GO TO 500
        XP=J-JZERO
        YP=I-IZERO
        A33=A33+1.0
        XTERM=XP
        YTERM=YP
        A23=A23+YTERM
        U=U+XTERM
        T=T+XTERM*YTERM
        YTERM=YTERM*YP
        S=S+XTERM*YTERM
        A22=A22+YTERM
        YTERM=YTERM*YP
        A21=A21+YTERM
        YTERM=YTERM*YP
        A11=A11+YTERM
C
500     CONTINUE
C
        A12=A21
        A13=A22
        A31=A13
        A23=A32
        PP=S*A22*A33+A23*(A12*U+A13*T)
        PPP=U*A22*A13+A23*A23*S+A33*T*A12
```

```
      PPPP=A11*A22*A33+A12*A23*(A22+A13)
      PPPPP=A22*A22*A13+A23*A23*A11+A33*A12*A12
      P=(PP-PPP)/(PPPP-PPPPP)
      QQ=A23*(S-A11*P)-A13*(T-A12*P)
      QQQ=A12*A23-A13*A22
      Q=QQ/QQQ
      R=(S-A11*P-A12*Q)/A13
C
C
C
      NDIV=3
C
C
C
      DO 700 I=1,NL
      YP=I-IZERO
      DXDY=2.0*P*YP+Q
      DYDX=1.0/DXDY
      DY=DXDY
      XP=P*(I-IZERO)**2+Q*(I-IZERO)+R+JZERO
C
      MJ=XP+0.5
      MI=YP+IZERO+0.5

IF(OPT3) LRGBUF(MJ,MI)=1
C
      BAND(I)=LRGBUF(MJ,MI)
C
      MI=YP+IZERO+0.5-DY
      MJ=XP+1.5
C
      IF(MI.LE.0) GO TO 701
      IF(MI.GT.NL) GO TO 701
      BAND(I)=BAND(I)+LRGBUF(MJ,MI)
C
      MI=YP+IZERO+0.5+DY
      MJ=XP-0.5
C
      IF(MI.LE.0) GO TO 701
      IF(MI.GT.NL) GO TO 701
      BAND(I)=BAND(I)+LRGBUF(MJ,MI)
C
      GO TO 702
C
 701  CONTINUE
      NDIV=2
      BAND(I)=BAND(I)/NDIV
      NDIV=3
 702  CONTINUE
      BAND(I)=BAND(I)/NDIV
 700  CONTINUE
C
C     CALCULATE LENGTH
C
      PT2=P+P
      YSTAR=-Q/PT2
      YEND=FLOAT(NL)/2.0-YSTAR
      PYE=P*YEND
      PPYE=PYE+PYE
      EL=PPYE*SQRT(PPYE*PPYE+1.0)+ALOG(PPYE+SQRT(PPYE*PPYE+1.0))
      CHDIR(4,II)=EL/PT2+0.5
C
C
C USE MOB LENGTH DUE TO UNUSUAL RESULTS !
C
 440  CONTINUE
C
C
C
C
C     FOURIER COEFFICIENTS
C
C
C
      BMAX=BAND(1)
      DO 710 I=2,NL
      IF(BAND(I).GT.BMAX) BMAX=BAND(I)
```

```
        710     CONTINUE
      C
                DO 711 I=1,NL
                AHIS(I)=(BAND(I)*100)/BMAX
        711     CONTINUE
      C
                NHARM=8
                FNLO=FLOAT(NL-1)
                PIL=6.2832/FNLO
      C
                CALL SSWTCH(4,ISW4)
                IF(ISW4.EQ.1) CALL TIMER
      C
                NLHALF=(NL+1)/2
                DO 5020 J=1,NLHALF
                RMJ=FLOAT(J-1)*PIL
                LRMJI=J
                COSINE(LRMJI)=COS(RMJ)
                SINE(LRMJI)=SIN(RMJ)
                NLMJP1=NL-J+1
                COSINE(NLMJP1)=COSINE(LRMJI)
                SINE(NLMJP1)=-SINE(LRMJI)
       5020    CONTINUE
      C
                DO 5050 I=1,NHARM
                AF=0.0
                BF=0.0
                IM1=I-1
                RM=FLOAT(IM1)*PIL
      C
                DO 5010 J=1,NL
                JM1=J-1
      C         RMJ=RM*FLOAT(J-1)
                LRMJI=JM1*IM1
                LRMJI=MOD(LRMJI,NL-1)+1
      C
                AF=AF+AHIS(J)*COSINE(LRMJI)
                BF=BF+AHIS(J)*SINE(LRMJI)
       5010    CONTINUE
      C
                AF=(AF+AF)/FNLO
                BF=(BF+BF)/FNLO
      C
                CFOUR(NUMOB,I)=SQRT(AF*AF+BF*BF)
                PHI(NUMOB,I)=ATAN2(BF,AF)
      C
       5050    CONTINUE
                IF(ISW4.EQ.1) CALL TIMER
      C
                IF(.NOT.OPT2) GO TO 810
                DO 811 I=1,NL
                JUV=(AHIS(I)/100.0)*AMIN0(NS,20)
      C MAX WIDTH OF WAVEFORM IS 20 SAMPLES
                JDIF=NS-JUV
                JLL=JDIF/2+1
                JUL=NS-JDIF/2
                DO 812 J=1,JLL
        812     LRGBUF(J,I)=0
                DO 813 J=JLL,JUL
        813     LRGBUF(J,I)=127
                DO 814 J=JUL,NS
        814     LRGBUF(J,I)=0
        811     CONTINUE
        810     CONTINUE
      C
                IF(.NOT.OPT3.AND..NOT.OPT2) GO TO 318
      C
                CUROLN=CHDIR(1,II)
                NG=0
                LPG=1024/NS
      C
                DO 800 I=1,NL
                CALL GET(OBUF,CUROLN,IB)
                DO 831 III=1,LPG
                NG=NG+1
```

```
          CALL MVL(LRGBUF(1,NG),OBUF(IB+1),NS)
          IB=IB+NS
          IF(NG.GE.NL) GO TO 842
 831      CONTINUE
 842      CONTINUE
          CALL PUT(OBUF,CUROLN,IB)
          CUROLN=CUROLN+1
          IF(NG.GE.NL) GO TO 841
 808      CONTINUE
 841      CONTINUE
C
 318      CONTINUE
C
C         OUTPUT FOURIER COEF'S TO FILE RCR
C
          CALL PUT(OBUF,4,IB)
          CALL MVU(CFOUR(1,1),OBUF(IB+1),480)
          CALL PUT(OBUF,5,IB)
          CALL MVU(CFOUR(1,5),OBUF(IB+1),480)
          CALL PUT(OBUF,6,IB)
          CALL MVU(PHI(1,1),OBUF(IB+1),480)
          CALL PUT(OBUF,7,IB)
          CALL MVU(PHI(1,5),OBUF(IB+1),480)
C
          CALL CLOSE(OBUF)
C
C         CREATE PARAMETERS FOR PHASE 14 (CLAS)
C
          DO 4880 I=1,NCHR
          CLPARM(9+2*I)=CHDIR(4,I)
          CLPARM(10+2*I)=CHDIR(8,I)
          IF(CHDIR(1,I).EQ.0) CLPARM(9+2*I)=0
          IF(CHDIR(1,I).EQ.0) CLPARM(10+2*I)=0
C IF BLKNO IS ZERO, THE CHROMOSOME WAS REJECTED BY MOB
 4880     CONTINUE
C
C         SET UP PART OF CHROMOSOME DIRECTORY FOR NEXT PHASE
C
          CLPARM(1)=NCHR
C
C         POSITIONS 2 THRU 10 MAY BE REGARDED AS SPARE
C
          CALL UPARAM(130,CLPARM,15)

IF(ISU2.EQ.1) CALL APHASE(10)
C IF SU8 IS UP, CALL KTYPE INSTEAD OF FOUR
          IF(OPT2.OR.OPT3) CALL APHASE(10)
          CALL EXIT
          END
          SUBROUTINE FOUR
          COMMON /C1/ CHDIR,SMLBUF,LRGBUF,NS,NL,CUROLN
          COMMON /C1/ SPIOD,SPLTH,SPAREA
          COMMON /C1/ NCHR
          COMMON /C1/ CFOUR,PHI
          COMMON /C1/ OBUF,BUF
          INTEGER JV(50),IITAB(100),JJTAB(100)
          BYTE JMSG(132)
          BYTE OBUF(2124)
          BYTE C(3640)
          REAL LTAB(60),CTAB(60)
          INTEGER START(25),INCR(25),MNC(25)
          INTEGER LOFS(91)
          INTEGER OFS(118),KPAR(92)
          INTEGER CLPARM(130)
          INTEGER CPAR(5)
          INTEGER SPAR(5)
          INTEGER CUROLN
          INTEGER PPL
          REAL CFOUR(60,10),PHI(60,10)
          INTEGER NCHROM(24)
          INTEGER CLASS(60)
          BYTE MSG(30)
          REAL DIST(18)
          REAL VECTOR(18)
          REAL LIKLE(60,24)
```

```
      REAL NU(18,24)
      REAL SIGMA(18,24)
      REAL MBUF(18,24)
      REAL SBUF(18,24)
C
      EQUIVALENCE(MBUF(1,1),C(57))
      EQUIVALENCE(SBUF(1,1),C(1785))
      EQUIVALENCE(SBUF(1,1),SIGMA(1,1))
      EQUIVALENCE(MBUF(1,1),NU(1,1))
      EQUIVALENCE(KPAR(3),OFS(1))
C
      DATA NMEAS/16/,LMEAS/11/,IMEAS/5/,JMEAS/12/
      DATA YMAX1/36./,YMAX2/36./,YMAX3/50./,YMAX4/50./,YMAX5/64./
      DATA IS1/19/,IS2/34/
      DATA JC1/6/,JC2/13/
C SLOTS TO BE CLASSIFIED WITH HYBRID CLASSIFIER
      DATA NEXTPH/20/
C NEXT PHASE TO CALL FOR HYBRID CLASSIFIER
      DATA K1MEAS/2/,K2MEAS/3/,KXMEAS/1/,NGROUP/24/
      DATA START/ 1,5,9,13,15,19,21,23,25,
     1    27,29,31,37,39,41,45,49,51,
     1    55,57,65,67,34,70,74    /
      DATA INCR/22*1,-1,-1,1/
      DATA MNC/23*2,1,46/
      DATA OFS/118*0/
      DATA NCHROM/24*0/
      DATA CLASS /60*0/
C
C     OBTAIN PARAMETERS, LENGTH AND CENTROMERE INDEX,
C     AS WELL AS THE NUMBER OF CHROMOSOMES IN THE SPREAD
C
      CALL RPARAM(NPAR,CLPARM,130)
      CALL SSWTCH(4,ISW4)
      IF(ISW4.EQ.1) PAUSE 15
C PAUSE IF SW4 IS UP
C
      NCHR=CLPARM(1)
C
C     READ BACK FOURIER COEF'S PRODUCED BY BAND (PHASE 14)
C
      CALL AFILE(OBUF,1,'RCR     ','13,'13)
      CALL OPEN(OBUF,1024,1,0,'RCR')
      CALL GLABEL(OBUF,SPAR,IB)
      IF(OBUF(IB+104).EQ."115) MNC(23)=1
      IF(OBUF(IB+104).EQ."106) MNC(24)=0
C
C CHECK FOR SEX OF M OR F AND CHANGE X AND Y MAX
C
      CALL GET(OBUF,3,IB)
      CALL MVL(OBUF(217+IB),LOFS(1),182)
C
      CALL GET(OBUF,4,IB)
      CALL MVL(OBUF(1+IB),CFOUR(1,1),960)
C
      CALL GET(OBUF,5,IB)
      CALL MVL(OBUF(1+IB),CFOUR(1,5),960)
C
      CALL GET(OBUF,6,IB)
      CALL MVL(OBUF(1+IB),PHI(1,1),960)
C
      CALL GET(OBUF,7,IB)
      CALL MVL(OBUF(1+IB),PHI(1,5),960)
C
C
C
C**********************************************
C
C     THE HYBRID CLASSIFIER USES RESULTS OF
C     THE CONVENTIONAL CLASSIFIER
C
      CALL SSWTCH(7,ISW7)
      IF(ISW7.NE.1) GOTO 800
C GOTO 800 FOR THE HYBRID CLASSIFIER
C
```

```
C SW7 UP IS FOR A FULL FOURIER CLASSIFIER
        IS1=1
        IS2=90
        JC1=1
        JC2=24
        NEXTPH=9
        GOTO 820
880     CONTINUE
        CALL MYU(LOFS,OFS,90)
        CALL ZIA(OFS(IS1),35-IS1)
C FOUR WILL CLASSIFY THE C GROUP STARTING WITH IS1
        CALL ZIA(OFS(13),4)
        CALL ZIA(OFS(37),6)
        CALL ZIA(OFS(55),4)
        CALL ZIA(OFS(65),4)
C KFIX WILL CLASSIFY B,D,E, AND G
C
C
820     IF(NCHR.LE.46) GOTO 830
C IF MORE THAN 46, ALLOW FOR 2 X AND 2 Y
        MNC(23)=2
        MNC(24)=2
830     CONTINUE
C
C       GET MEANS AND SIGMAS
C
        CALL AFILE(C,4,'CDATA    ','*6,*6)
        CALL OPEN(C,3504,0,0,'CDA')
        CALL GLABEL(C,CPAR,IC)
        CALL GET(C,1,IC)
895     CONTINUE
C
        ITOTL=0
        NRELCH=NCHR
        DO 899 II=1,NCHR
        IF(CLPARM(9+2*II).EQ.0) NRELCH=NRELCH-1
        ITOTL=ITOTL+CLPARM(9+2*II)
899     CONTINUE
        FTOTL=46.*ITOTL/NRELCH
        DO 4080 I=1,NCHR
        LTAB(I)=(CLPARM(9+2*I)*10000.)/FTOTL
        CTAB(I)=CLPARM(19+2*I)
C STORE REAL LENGTH AND CI
4080    CONTINUE
C
C
        DO 896 II=1,NCHR
        DO 896 JJ=1,NGROUP
        LIKLE(II,JJ)=999.
896     CONTINUE
C
C
        CALL SSWTCH(0,ISW0)
        IF(ISW0.EQ.1) CALL QPRINT('1
     1     OBJ    GROUP      DLEN    DCIA     VLEN     VCIA
     2     VCSUM    VPSUM    TVAR')
C
        DO 900 IS=IS1,IS2
        II=LOFS(IS)
        IF(II.EQ.0) GOTO 900
C
        IF(ISW0.EQ.1) CALL QPRINT(' ')
C
        DO 903 IJ=JC1,JC2
        JJ=IJ
        IF(JJ.EQ.13.AND.ISW7.NE.1) JJ=23
C
        SIG112=SIGMA(K1MEAS,JJ)
        SIG222=SIGMA(K2MEAS,JJ)
        IF(SIG112.LT.0.00001) SIG112=.00001
        IF(SIG222.LT.0.00001) SIG222=.00001
C
        DIST(1)=LTAB(II)-MU(K1MEAS,JJ)
        DIST(2)=CTAB(II)-MU(K2MEAS,JJ)
```

```
          VECTOR(1)=(DIST(1)/SIG112)*DIST(1)
          IF(VECTOR(1).GT.VMAX1) GOTO 903
          VECTOR(2)=(DIST(2)/SIG222)*DIST(2)
          IF(VECTOR(2).GT.VMAX2) GOTO 903
C
          FSUM=0.0
          DO 907 I=IMEAS,LMEAS
          DISTI=CFOUR(II,I-3)-MU(I,JJ)
          FSUM=FSUM+(DISTI*DISTI/SIGMA(I,JJ))
907       CONTINUE
          IF(FSUM.GT.VMAX3) GOTO 903
          PSUM=0.0
          IF(JMEAS.EQ.0) GOTO 9008
          DO 908 I=JMEAS,NMEAS
          DISTI=PHI(II,I-10)-MU(I,JJ)
          IF(DISTI.GT.3.1416) DISTI=6.2832-DISTI
          IF(DISTI.LT.-3.1416) DISTI=-6.2832-DISTI
          PSUM=PSUM+DISTI*DISTI/SIGMA(I,JJ)
908       CONTINUE
          IF(PSUM.GT.VMAX4) GOTO 903
9008      LIKLE(II,JJ)=VECTOR(1)+VECTOR(2)+FSUM+PSUM
          CALL SSWTCH(0,ISW0)
          IF(ISW0.NE.1) GO TO 9010
          JV(1)=II
          JV(2)=JJ
          JV(3)=DIST(1)
          JV(4)=DIST(2)
          JV(5)=VECTOR(1)
          JV(6)=VECTOR(2)
          JV(7)=FSUM
          JV(8)=PSUM
          JV(9)=LIKLE(II,JJ)
          DO 9009 I=1,9
9009      CALL OUTCON(JV(I),JMSG(18*I),10)
          CALL QPRINT(JMSG,90)
9010      CONTINUE
C
903       CONTINUE
908       CONTINUE
C
C
          DO 952 IK=1,NCHR
          ELMIN=VMAX5
          IISAV=0
C
          DO 950 IJ=JC1,JC2
          JJ=IJ
          IF(JJ.EQ.13.AND.ISW7.NE.1) JJ=23
          IF(NCHROM(JJ).GE.MNC(JJ)) GO TO 950
C
C IGNORE GROUPS THAT ARE FULL
C LOOK FOR UNCLASSIFIED CHROMOSOMES
C
          DO 951 IS=IS1,IS2
          II=LOFS(IS)
          IF(II.EQ.0) GOTO 951
          IF(CLASS(II).NE.0) GO TO 951
          IF(LIKLE(II,JJ).GE.ELMIN) GOTO 953
          ELMIN=LIKLE(II,JJ)
          IISAV=II
          JJSAV=JJ
953       CONTINUE
951       CONTINUE
C
950       CONTINUE
C
          IF(IISAV.EQ.0) GO TO 960
          CLASS(IISAV)=JJSAV
          NCHROM(JJSAV)=NCHROM(JJSAV)+1
          OFS(START(JJSAV))=IISAV
          START(JJSAV)=START(JJSAV)+INCR(JJSAV)
952       CONTINUE
C
960       CONTINUE
C
```

```
C LOOK FOR UNCLASSIFIED AND SEE IF MOVES CAN BE MADE
C ORDER UP TO 100 LIKELIHOODS IN IITAB AND JJTAB
C
            DO 300 IK=1,100
            ELMIN=VMAX5
            DO 250 IS=IS1,IS2
            II=IOFS(IS)
            IF(II.EQ.0) GOTO 250
            IF(CLASS(II).NE.0) GOTO 250
            DO 240 IJ=JC1,JC2
            JJ=IJ
            IF(JJ.EQ.13.AND.ISW7.NE.1) JJ=23
            IF(MNC(JJ).EQ.0) GOTO 240
            IF(LIKLE(II,JJ).GE.ELMIN) GOTO 240
            ELMIN=LIKLE(II,JJ)
            IISAV=II
            JJSAV=JJ
240         CONTINUE
250         CONTINUE
            IF(ELMIN.EQ.VMAX5) GOTO 320
C IF NO MORE LIKELY CLASSIFICATIONS GOTO 320
            IITAB(IK)=IISAV
            JJTAB(IK)=JJSAV
            LIKLE(IISAV,JJSAV)=998
C RAISE LIKLE
300         CONTINUE
C
            IK=101
320         IK=IK-1
            IF(IK.EQ.0) GOTO 520
            DO 500 K=1,IK
            II=IITAB(K)
            J=JJTAB(K)
            IF(CLASS(II).NE.0) GOTO 500
C SEE IF WE CAN MOVE SOMEONE OUT OF GROUP J INTO A LIGHT GROUP
            JS1=START(J)-NCHROM(J)*INCR(J)
            JS2=START(J)-INCR(J)
            IF(JS1.GT.JS2) CALL SWAP(JS1,JS2)
            ELMIN=VMAX5
            DO 450 JS=JS1,JS2
            I=OFS(JS)
            DO 440 IJ=JC1,JC2
            JJ=IJ
            IF(JJ.EQ.13.AND.ISW7.NE.1) JJ=23
            IF(NCHROM(JJ).GE.MNC(JJ)) GOTO 440
            IF(LIKLE(I,JJ).GE.VMAX5) GOTO 440
            DLIK=LIKLE(I,JJ)-LIKLE(I,J)
C DLIK IS A MEASURE OF THE LIKELIHOOD THAT I BELONGS TO GROUP JJ
C AND DOESN'T BELONG TO GROUP J
            IF(DLIK.GE.ELMIN) GOTO 440
            ELMIN=DLIK
            ISAV=I
            JSSAV=JS
            JJSAV=JJ
440         CONTINUE
450         CONTINUE
            IF(ELMIN.EQ.VMAX5) GOTO 500
C IF NO MOVE OUT OF J CAN BE MADE, GOTO 500
C OTHERWISE, MOVE OBJECT ISAV FROM SLOT JSSAV TO GROUP JJSAV
C THEN, MOVE OBJECT II TO SLOT JSSAV
            CLASS(ISAV)=JJSAV
            NCHROM(JJSAV)=NCHROM(JJSAV)+1
            OFS(START(JJSAV))=ISAV
            START(JJSAV)=START(JJSAV)+INCR(JJSAV)
C
            CLASS(II)=J
            OFS(JSSAV)=II
500         CONTINUE
C
520         CONTINUE
C
C CHECK FOR STILL UNCLASSIFIED AND PUT AT BOTTOM
C
            DO 980 IS=IS1,IS2
            II=IOFS(IS)
            IF(II.EQ.0) GOTO 980
```

```
        IF(CLASS(II).NE.0) GOTO 980
        CLASS(II)=25
965     IF(START(25).GE.90) GOTO 980
        START(25)=START(25)+1
        IF(OFS(START(25)).NE.0) GOTO 965
        OFS(START(25))=II
980     CONTINUE
C
        CALL MVL('OS  ',KPAR,4)
        CALL UPARAM(92,KPAR,NEXTPH)
C
C
        CUROLN=7
        CALL GET(OBUF,CUROLN,IB)
        CALL MVL(CLASS(1),OBUF(961+IB),60)
        CALL PUT(OBUF,CUROLN,IB)
C
        CALL CLOSE(OBUF)
        CALL APHASE(NEXTPH)
C
        IF(ISU8.EQ.1) CALL QPRINT('1')
        RETURN
        END

C**********
C         *
C   KFIX  *
C         *
C**********
C
C       CHROMOSOME CLASSIFIER PART 3
C       SYNTACTICAL CORRECTION OF CLASSIFICATION
C
        SUBROUTINE KFIX
        COMMON /C1/ NOB,IDIR
        COMMON /C1/ CHDIR,SMLBUF,LRGBUF,NS,NL,CUROLN
        COMMON /C1/ SST,EST
        COMMON /C1/ SPIOD,SPLTH,SPAREA
        COMMON /C1/ NCHR
        COMMON /C1/ CFOUR,PHI
        COMMON /C1/ BAND,AHIS
        COMMON /C1/ OBUF,BUF
        BYTE LRGBUF(78,88)
        BYTE OBUF(2124)
        LOGICAL BGROUP(60)
        LOGICAL DGROUP(60)
        LOGICAL GGROUP(60)
        LOGICAL FGROUP(60)
        LOGICAL EGROUP(60)
        INTEGER IIBCHR(6)
        INTEGER DPOINT(6)
        INTEGER IIDCHR(6)
        INTEGER IIFCHR(6)
        INTEGER IIGCHR(6)
        INTEGER KPAR(92)
        INTEGER OFS(91)
        INTEGER LOFS(90)
        INTEGER IPROF(90)
        INTEGER JPROF(90)
        INTEGER KGBAND(6)
        INTEGER JFETUR(20)
        INTEGER SPAR(5)
        INTEGER BMAX
        INTEGER BPL
        INTEGER CHDIR(15,60)
        INTEGER CUROLN
        INTEGER PAR(18)
        REAL BD(6)
        REAL GD(6)
        REAL RATIO(12)
        REAL CFOUR(60,15),PHI(60,15)
        REAL AFOUR(60,15),BFOUR(60,15)
```

```
C
      EQUIVALENCE (KPAR(3),OFS(1))
      EQUIVALENCE (SPAR(2),BPL)
      EQUIVALENCE (CFOUR(1,1),AFOUR(1,1))
      EQUIVALENCE (PHI(1,1),BFOUR(1,1))
      EQUIVALENCE (NL,NLO)
      EQUIVALENCE (NUMOB,II)
C
      DATA ND/0/
      DATA NDCHR/0/
      DATA DGROUP/60*.FALSE./
      DATA GGROUP/60*.FALSE./
      DATA FGROUP/60*.FALSE./
      DATA EGROUP/60*.FALSE./
C
      CALL AFILE(OBUF,1,'RCR         ','*13,*13)
      CALL OPEN(OBUF,1024,1,0,'RCR')
      CALL GLABEL(OBUF,SPAR,IB)
C
      CALL RPARAM(NPAR,KPAR,92)
C
C     READ RESULTS OF CONVENTIONAL CLASSIFICATION AND
C     EXTRACT GROUP CLASSIFICATIONS
C
C              D-GROUP
C
      CALL GET(OBUF,3,IB)
      CALL MVL(OBUF(217+IB),LOFS(1),182)
C
C
C
      DO 104 I=37,42
      IIDCHR(I-36)=0
      ILOFS=LOFS(I)
      IF(ILOFS.EQ.0) GO TO 104
      DGROUP(ILOFS)=.TRUE.
      IIDCHR(I-36)=ILOFS
  104 CONTINUE
C
C              B-GROUP
C
      DO 102 I=13,16
      IIBCHR(I-12)=0
      ILOFS=LOFS(I)
      IF(ILOFS.EQ.0) GO TO 102
      BGROUP(ILOFS)=.TRUE.
      IIBCHR(I-12)=ILOFS
  102 CONTINUE
C
C              E-GROUP
C
      DO 1050 I=45,46
      ILOFS=LOFS(I)
      IF(ILOFS.EQ.0) GO TO 1050
      EGROUP(ILOFS)=.TRUE.
 1050 CONTINUE
      DO 1051 I=49,52
      ILOFS=LOFS(I)
      IF(ILOFS.EQ.0) GO TO 1051
      EGROUP(ILOFS)=.TRUE.
 1051 CONTINUE
C
C     F-GROUP
C
      DO 106 I=55,58
      IIFCHR(I-54)=0
      ILOFS=LOFS(I)
      IF(ILOFS.EQ.0) GO TO 106
      FGROUP(ILOFS)=.TRUE.
      IIFCHR(I-54)=ILOFS
  106 CONTINUE
C
C              G-GROUP, INCLUDING Y
```

```
              DO 107 I=65,70
              IIGCHR(I-64)=0
              ILOFS=LOFS(I)
              IF(ILOFS.EQ.0) GO TO 107
              GGROUP(ILOFS)=.TRUE.
              IIGCHR(I-64)=ILOFS
      107     CONTINUE
C
C       GET CHROMOSOME DIRECTORY
C
              CALL GET(OBUF,1,IB)
              CALL MVL(OBUF(IB+3),SPIOB,12)
              NCHR=IV2(OBUF(IB+17))
              CALL MVL(OBUF(IB+31),CHDIR(1,1),2*15*30)
              CALL GET(OBUF,2,IB)
              CALL MVL(OBUF(IB+31),CHDIR(1,31),2*15*30)
C
              JAY=0
              DO 310 IX=1,6
              II=IIDCHR(IX)
C
              IF(DGROUP(II)) GO TO 304
              GO TO 310
      304     CONTINUE
C
              JFETUR(1)=0
C
              CUROLN=CHDIR(1,II)
              NL=CHDIR(2,II)
              NS=CHDIR(3,II)
              IF(NL.LT.1.OR.NS.LT.1) GO TO 310
              NG=0
              LPG=1024/NS
C       LINES/GET
C
              DO 300 I=1,NL
              CALL GET(OBUF,CUROLN,IB)
              IF(I.EQ.1) LASTIB=IB
              CUROLN=CUROLN+1
              DO 301 III=1,LPG
              NG=NG+1
              CALL SSWTCH(0,JAY)
              DO 330 J=1,NS
              LRGBUF(J,NG)=OBUF(J+IB)
      330     CONTINUE
              IB=IB+NS
              IF(NG.GE.NL)GO TO 311
      301     CONTINUE
      300     CONTINUE
      311     CONTINUE
C
C       .. MAIN LOGIC
C
              IF(.NOT.DGROUP(II)) GO TO 401
C
              NL2=NL/2
              LTOP1=2
              LTOP2=NL2-1
              LBOT1=NL2+1
              LBOT2=NL-1
C
              ISUMT=0
              ISUMB=0
              NTOP=0
              NBOT=0
C
              DO 411 J=LTOP1,LTOP2
              DO 410 I=1,NS
              IVAL=LRGBUF(I,J)
              IF(IVAL.EQ.0) GO TO 410
              ISUMT=ISUMT+IVAL
              NTOP=NTOP+1
```

```
      410    CONTINUE
      411    CONTINUE
             ITOP=ISUMT/NTOP
C
C
C
             DO 421 J=LBOT1,LBOT2
             DO 420 I=1,NS
             IVAL=LRGBUF(I,J)
             IF(IVAL.EQ.0) GO TO 420
             ISUMB=ISUMB+IVAL
             NBOT=NBOT+1
      420    CONTINUE
      421    CONTINUE
             IBOT=ISUMB/NBOT
C
             ND=ND+1
             RATIO(ND)=FLOAT(ITOP)/FLOAT(IBOT)
             DPOINT(ND)=II
C
      401    CONTINUE
C
      310    CONTINUE
C
C            DO FOR B-GROUP
C
C
             DO 350 IX=1,4
             II=IIBCHR(IX)
             IF(II.EQ.0) GOTO 350
C
             CUROLN=CHDIR(1,II)
             NL=CHDIR(2,II)
             NS=CHDIR(3,II)
             IBCI=CHDIR(8,II)
             NG=0
             LPG=1024/NS
C
             DO 1800 I=1,NL
             CALL GET(OBUF,CUROLN,IB)
             CUROLN=CUROLN+1
             DO 1801 III=1,LPG
             NG=NG+1
             DO 1830 J=1,NS
             LRGBUF(J,NG)=OBUF(J+IB)
      1830   CONTINUE
             IB=IB+NS
             IF(NG.GE.NL) GO TO 1811
      1801   CONTINUE
      1800   CONTINUE
      1811   CONTINUE
C
C            EXTRACT THE SO-CALLED B-BAND
C
             ISTART=FLOAT(IBCI*NL)/100.0
             ISTART=NL-ISTART
             IEND=ISTART+ISTART-1
             NL2=NL/2
             IF(IEND.GT.NL2) IEND=NL2
C
             NPB=0
             BIOD=0.0
             DO 351 I=ISTART,IEND
             DO 352 J=1,NS
             IVAL=LRGBUF(J,I)
             IF(IVAL.EQ.0) GO TO 352
             BIOD=BIOD+FLOAT(IVAL)
             NPB=NPB+1
      352    CONTINUE
      351    CONTINUE
             BD(IX)=BIOD/FLOAT(NPB)
      350    CONTINUE
C
C            CLASSIFY THE B-GROUP
```

```
C
       DO 360 I=1,4
       DENMAX=0.0
       DO 361 J=1,4
       IF(BD(J).LE.DENMAX) GO TO 361
       IOBJ=IIBCHR(J)
       IF(IOBJ.LT.1) GO TO 361
       DENMAX=BD(J)
       JS=J
 361   CONTINUE
       OFS(12+I)=IOBJ
       BD(JS)=0.0
 360   CONTINUE
C
C      DO FOR F-GROUP
C
       DO 450 IX=1,4
       II=IIFCHR(IX)
       IF(II.EQ.0) GOTO 450
C
       CUROLN=CHDIR(1,II)
       NL=CHDIR(2,II)
       NS=CHDIR(3,II)
       NG=0
       LPG=1024/NS
C
       DO 2300 I=1,NL
       CALL GET(OBUF,CUROLN,IB)
       CUROLN=CUROLN+1
       DO 2301 III=1,LPG
       NG=NG+1
       DO 2330 J=1,NS
       LRGBUF(J,NG)=OBUF(J+IB)
 2330  CONTINUE
       IB=IB+NS
       IF(NG.GE.NL) GO TO 2311
 2301  CONTINUE
 2300  CONTINUE
 2311  CONTINUE
C
C      EXTRACT INTEGRATED OPTICAL DENSITY
C
       GIOD=0.0
       NPG=0
       DO 451 I=1,NL
       DO 452 J=1,NS
       IVAL=LRGBUF(J,I)
       IF(IVAL.EQ.0) GO TO 452
       GIOD=GIOD+FLOAT(IVAL)
       NPG=NPG+1
 452   CONTINUE
 451   CONTINUE
       GD(IX)=GIOD/FLOAT(NPG)
C
 450   CONTINUE
C
C      CLASSIFY THE F-GROUP
C
       DO 460 I=1,4
       DENMAX=0.0
       DO 461 J=1,4
       IF(GD(J).LE.DENMAX) GO TO 461
       IOBJ=IIFCHR(J)
       IF(IOBJ.LT.1) GO TO 461
       DENMAX=GD(J)
       JS=J
 461   CONTINUE
       OFS(59-I)=IOBJ
       GD(JS)=0.0
 460   CONTINUE
C
C      DO FOR G-GROUP
C
       DO 510 IX=1,4
       II=IIGCHR(IX)
       IF(II.EQ.0) GOTO 510
```

```
C
            CUROLN=CHDIR(1,II)
            NL=CHDIR(2,II)
            NS=CHDIR(3,II)
            NG=0
            LPG=1024/NS
C
            DO 1300 I=1,NL
            CALL GET(OBUF,CUROLN,IB)
            CUROLN=CUROLN+1
            DO 1301 III=1,LPG
            NG=NG+1
            DO 1330 J=1,NS
            LRGBUF(J,NG)=OBUF(J+IB)
 1330       CONTINUE
            IB=IB+NS
            IF(NG.GE.NL) GO TO 1311
 1301       CONTINUE
 1300       CONTINUE
 1311       CONTINUE
C
C       EXTRACT DENSITY PROFILES
C
            DO 500 K=1,NL
            NP=0
            IPROF(K)=0
            DO 501 L=1,NS
            IVAL=LRGBUF(L,K)
            IF(IVAL.EQ.0) GO TO 501
            IPROF(K)=IPROF(K)+IVAL
            NP=NP+1
  501       CONTINUE
            IPROF(K)=IPROF(K)/NP
  500       CONTINUE
C
C       ANALYZE THE BANDS IN THE G-GROUP
C
            DO 511 K=1,NL
  511       JPROF(K)=0
C
            NLM2=NL-2
            DO 512 K=3,NLM2
            IV=0
            DO 513 KK=1,5
            IV=IV+IPROF(K+KK-3)
  513       CONTINUE
            JPROF(K)=IV
  512       CONTINUE
            MAX=JPROF(3)
            DO 514 K=4,NLM2
            IF(MAX.GE.JPROF(K)) GO TO 514
            MAX=JPROF(K)
            KBAND=K
  514       CONTINUE
C
            NSAME=0
            DO 515 K=KBAND,NLM2
            IF(JPROF(K).NE.MAX) GO TO 516
            NSAME=NSAME+1
  515       CONTINUE
  516       CONTINUE
            KGBAND(IX)=KBAND+NSAME/2
C
  510       CONTINUE
C
C       CLASSIFY TH G-GROUP
C
            DO 521 I=1,4
            MAXBP=0
            DO 522 J=1,4
            IF(KGBAND(J).LE.MAXBP) GO TO 522
            IOBJ=IIGCHR(J)
            IF(IOBJ.LT.1) GO TO 522
            MAXBP=KGBAND(J)
            JS=J
```

```
522     CONTINUE
        OFS(64+I)=IOBJ
        KGBAND(JS)=0
521     CONTINUE
C
C       CLASSIFY THE D-GROUP
C
        DO 601 I=1,6
        RMAX=0.0
        DO 602 J=1,6
        IF(RATIO(J).LE.RMAX) GO TO 602
        IOBJ=DPOINT(J)
        IF(IOBJ.LT.1) GO TO 602
        RMAX=RATIO(J)
        JS=J
602     CONTINUE
        NDCHR=NDCHR+1
        OFS(43-I)=IOBJ
        RATIO(JS)=0.0
601     CONTINUE
600     CONTINUE
C
1000    FORMAT(I10)
2000    FORMAT(3X,39I3)
3000    FORMAT('1CHROMOSOME ',I2)
4000    FORMAT(10F10.2)
C
        CALL UPARAM(92,KPAR,9)
C
        CALL CLOSE(OBUF)
        CALL APHASE(9)
C
        CALL EXIT
        END
C**********
C         *
C  ABNORM *
C         *
C**********
C
C       ROUTINE TO ASSESS NORMALITY OF CHROMOSOMES IN A SPREAD
C
        SUBROUTINE ABNORM
        COMMON /C1/ NOB,IDIR
        COMMON /C1/ CHDIR,SMLBUF,LRGBUF,NS,NL,CUROLN
        COMMON /C1/ SST,EST
        COMMON /C1/ SPIOD,SPLTH,SPAREA
        COMMON /C1/ NCHR
        COMMON /C1/ CFOUR,PHI
        COMMON /C1/ BAND,AHIS
        COMMON /C1/ OBUF,BUF
        BYTE LRGBUF(50,90)
        BYTE OBUF(2124)
        BYTE TEMPB
        LOGICAL OPT1,OPT2,OPT3
        INTEGER IPROF(90)
        INTEGER JFETUR(20)
        INTEGER TEMPI
        INTEGER SPAR(5)
        INTEGER BMAX
        INTEGER BAND(180)
        INTEGER BPL
        INTEGER CHDIR(15,60)
        INTEGER CUROLN
C       INTEGER*2 SST(76),EST(76)
        INTEGER PAR(10)
        REAL CFOUR(60,15),PHI(60,15)
        REAL AHIS(180)
        REAL COSINE(150),SINE(150)
        REAL AFOUR(60,15),BFOUR(60,15)
C
C
C
        EQUIVALENCE(SPAR(2),BPL)
        EQUIVALENCE (CFOUR(1,1),AFOUR(1,1))
```

```
      EQUIVALENCE (PHI(1,1),BFOUR(1,1))
      EQUIVALENCE (NL,NLD)
      EQUIVALENCE (NUMOB,II)
      DATA LOPT1/'T1'/
      DATA LOPT2/'T2'/
      DATA LOPT3/'T3'/
      DATA LOP  /'OP'/
C
C
C
   10 CONTINUE
C
C
C
      CALL AFILE(OBUF,1,'RCR        ','13,'13)
      CALL OPEN(OBUF,1024,1,0,'RCR')
      CALL GLABEL(OBUF,SPAR,IB)
C
C
C
      CALL GET(OBUF,1,IB)
      CALL MYL(OBUF(IB+3),SPIOD,12)
      NCHR=IV(OBUF(IB+17))
      CALL MVL(OBUF(IB+31),CHDIR(1,1),2*15*30)
      CALL GET(OBUF,2,IB)
      CALL MVL(OBUF(IB+31),CHDIR(1,31),2*15*30)
C
C
C
      DO 310 II=1,NCHR
      JFETUR(1)=0
C
      WRITE(5,3000)II
  303 CONTINUE
C
      LASTIB=IB
      CUROLN=CHDIR(1,II)
      NL=CHDIR(2,II)
      NS=CHDIR(3,II)
      IF(NL.LT.1.OR.NS.LT.1) GO TO 310
      NG=0
      LPG=1024/NS
C     LINES/GET
C
      DO 300 I=1,NL
      CALL GET(OBUF,CUROLN,IB)
      IF(I.EQ.1) LASTIB=IB
      CUROLN=CUROLN+1
      DO 301 III=1,LPG
      NG=NG+1
      CALL SSWTCH(0,JAY)
      IF(JAY.EQ.1) WRITE(5,2000) (OBUF(J+IB),J=1,NS)
  302 CONTINUE
      DO 330 J=1,NS
      LRGBUF(J,NG)=OBUF(J+IB)
  330 CONTINUE
      IB=IB+NS
      IF(NG.GE.NL)GO TO 311
  301 CONTINUE
  300 CONTINUE
  311 CONTINUE
C
C
C
C
C     ******************************************
C
C
C
C
C     ... MAIN LOGIC
C
C
C
      NSM1=NS-1
```

```
        NNON0=0
        NMX=0
        NLT0=0
C
C
C
        DO 500 K=1,NL
C
        MAXLOC=1
        LINMAX=LRGBUF(1,K)
C
        DO 510 L=2,NS
        IF(LRGBUF(L,K).LE.LINMAX) GO TO 511
        LINMAX=LRGBUF(L,K)
        MAXLOC=L
  511   CONTINUE
  510   CONTINUE
C
C
C
        JTH=LINMAX/2
        IPROF(K)=NS
C
        DO 530 L=1,NS
        IF(LRGBUF(L,K).GE.JTH) GO TO 532
        IPROF(K)=IPROF(K)-1
  530   CONTINUE
C
  532   CONTINUE
C
        DO 540 L=1,NS
        LL=NS+1-L
        IF(LRGBUF(LL,K).GE.JTH) GO TO 542
        IPROF(K)=IPROF(K)-1
  540   CONTINUE
C
  542   CONTINUE
        IF(IPROF(K).GE.NS) IPROF(K)=0
C
  500   CONTINUE
C
C
C
        IPTOT=0
        NLM2=NL-2
        DO 600 K=3,NLM2
        IPTOT=IPTOT+IPROF(K)
  600   CONTINUE
C
        IPAVE=IPTOT/NLM2
C
        DO 620 K=3,NLM2
        IPROF(K)=IPROF(K)-IPAVE
        IF(IPROF(K).LT.0) NLT0=NLT0+1
  620   CONTINUE
C
        IPROF(1)=1
        IPROF(2)=1
        IPROF(NL)=1
        IPROF(NL-1)=1
C
C
C
        IF(JAY.EQ.1) WRITE(5,1300) (IPROF(L),L=1,NL)
C
C
C
C
C
C
C       TYPE 1 DETECTION-
C            AT LEAST FIVE NEG NUMBERS IN A ROW IN PROFILE
C
C       TYPE 2 DETECTION-
```

```
C         AT LEAST FOUR OUT OF A CONTIGUOUS SEVEN
C         NUMBERS IN PROFILE ARE NEGATIVE BUT NOT
C         FIVE CONTIGUOUS, OR THREE CONTIGUOUS
C
C         NOTE THAT THE SEARCH FOR TYPE 1 TAKES
C         PRECEDENCE, EXCEPT THAT TYPE 2 SPANS A
C         WIDER INTERVAL.  THE SEARCH IS STRICTLY
C         ONE DIRECTIONAL, FROM THE TOP OF THE PROFILE
C         ARRAY TO THE BOTTOM.  THIS SEARCH PATTERN
C         FEATURES SOME AMBIGUITY, BUT NOTHING SERIOUS
C
C
C     TYPE A CENTROMERE-
C         SKEWED, LOWEST DIP IN PROFILE IS FIRST OR
C         LAST ONLY IN SEQUENCE OF NEG NUMBERS THAT
C         INDICATE THE CENTROMERE.  THIS IS EXPECTED TO
C         OCCUR NEAR THE END (TOP) OF THE CHROMOSOME.
C
C     TYPE B CENTROMERE-
C         SYMMETRIC, LOWEST DIP OCCURS CORRESPONDINGLY
C         POSITIONED IN THE PROFILE TO THE CENTER OF
C         THE CENTROMERE IN THE CHROMOSOME.
C
C
C
      K=0
      IFETUR=0
  700 K=K+1
      IF(K.GT.NL-4) GO TO 750
      IF(IPROF(K).GE.0) GO TO 700
      IF(IPROF(K+4).GE.0) GO TO 710
      IF(IPROF(K+3).GE.0) GO TO 710
      IF(IPROF(K+2).GE.0) GO TO 710
      IF(IPROF(K+1).GE.0) GO TO 710
C
      IFETUR=IFETUR+1
      KFETUR=1
      JFETUR(IFETUR)=KFETUR
C
C     SCAN TO POS NUMBER
C
      K=K+4
  701 K=K+1
      IF(IPROF(K+1).LT.0) GO TO 701
      GO TO 700
C
  710 CONTINUE
C
      NMINUS=1
      DO 720 KL=1,6
      KK=KL-2
      IF(K+KK.GT.NL) GO TO 721
      IF(IPROF(K+KK).GE.0) GO TO 720
      NMINUS=NMINUS+1
  720 CONTINUE
  721 CONTINUE
C
      IF(NMINUS.LT.4) GO TO 700
C
      IFETUR=IFETUR+1
      KFETUR=2
      JFETUR(IFETUR)=KFETUR
      K=K+4
  731 K=K+1
      IF(IPROF(K+1).LT.0) GO TO 731
C
      GO TO 700
C
C
C
  750 CONTINUE
C
      WRITE(5,4000) (JFETUR(JF),JF=1,IFETUR)
C
 4000 FORMAT(' FEATURES: ',20I3)
C
C
```

```
C
         IF(NLT0.GT.NL/3) GO TO 940
         GO TO 941
 940     CONTINUE
C
         WRITE(5,1094)
 1094    FORMAT(' NOT A CHROMOSOME')
C
         GO TO 950
C
 941     CONTINUE
         IF(IFETUR.EQ.0) GO TO 900
         IF(IFETUR.EQ.1) GO TO 910
         IF(IFETUR.EQ.2) GO TO 920
         IF(IFETUR.EQ.3) GO TO 930
C
         GO TO 940
 930     CONTINUE
         GO TO 950
C
 920     CONTINUE
         IABIND=JFETUR(1)+JFETUR(2)
         IF(IABIND.EQ.2) WRITE(5,1292)
         IF(IABIND.EQ.3) WRITE(5,1392)
         IF(IABIND.EQ.4) WRITE(5,1492)
 1292    FORMAT(' CHROMOSOME IS BICENTRIC, OR BADLY TWISTED')
 1392    FORMAT(' CHROMOSOME MAY BE BICENTRIC')
 1492    FORMAT(' CENTROMERE LOCATION DOUBTFUL - PROBABLY NORMAL')
         GO TO 950
C
 910     CONTINUE
         IF(JFETUR(1).EQ.1) GO TO 911
         WRITE(5,1291)
         GO TO 912
 911     WRITE(5,1191)
 912     CONTINUE
 1191    FORMAT(' SINGLE CENTROMERE IS WELL DEFINED - NORMAL')
 1291    FORMAT(' SINGLE CENTROMERE POORLY DEFINED - PROBABLY NORMAL')
         GO TO 950
C
 900     CONTINUE
         IF(NL.LT.30) GO TO 901
         WRITE(5,1902)
         GO TO 903
 901     CONTINUE
         WRITE(5,1901)
 903     CONTINUE
C
 1901    FORMAT(' NO CENTROMERE FOUND,',/,
        1 '  COMMON IN SMALL CHROMOSOMES - PROBABLY NORMAL')
 1902    FORMAT(' NO CENTROMERE FOUND - POSSIBLE ACENTRIC')
C
C
C
C
 950     CONTINUE
C
C
C
C        ******************************************
C
C
C
C
 310     CONTINUE
C
         WRITE (5,3030)
         CALL APHASE(13)
         CALL CLOSE(OBUF)
C
C
 1000    FORMAT(I10)
 2000    FORMAT(3X,3913)
 3000    FORMAT('0CHROMOSOME ',I2)
 3030    FORMAT('1')
         CALL EXIT
         END
```

We claim:

1. An operator assisted system using a programmed computer for producing karyotype images from a slide mounted on the stage of a microscope, said slide having a plurality of dispersed metaphase chromosome spreads, comprising moving said stage under instructions of said programmed computer connected to control said microscope to successively present said plurality of dispersed metaphase chromosome spreads to the optics of said microscope, storing the location of each spread, thereby automatically prescanning said slide for chromosome spreads, moving said stage under instructions of said programmed computer to place the slide motionless on said stage at each successive chromosome spread location, thereby enabling an operating to view each successive chromosome spread to inspect the chromosome spread and determine whether it is acceptable for the purpose of analysis or not, deleting under operator control the location of each spread determined not to be acceptable thereby establishing a list by location of which the chromosome spreads are acceptable, again moving said stage under instructions of said programmed computer for generating a digital picture of each of said acceptable chromosome spreads, arranging the chromosomes in the digital picture of an acceptable chromosome spread in a karyotype format, and producing a visible image of the karyotype format for each acceptable chromosome spread.

2. A system as recited in claim 1 wherein said step of producing a visible image of the karyotype format for each acceptable chromosome spread includes, displaying said karyotype format on a gray scale display, correcting any errors to provide a corrected karyotype format, and printing said corrected karyotype format.

3. A system as recited in claim 1 wherein said step of moving said stage under said microscope to successively present said plurality of dispersed metaphase chromosome spreads to the optics of said microscope includes moving said stage with a scanning motion in successive predetermined motion increments underneath the optics of said microscope, detecting whether or not a chromosome spread is present within the distance of the predetermined increment of motion, and storing the location data for each detected chromosome spread.

4. A system as recited in claim 3 wherein said step of generating a digital picture of each of said accepted chromosome spreads includes, successively moving said stage to the undeleted locations of accepted chromosomes spreads to position each such accepted chromosome spread under the microscope optics, automatically focusing the optics of said microscope on an accepted chromosome spread positioned thereunder, photographing each said accepted chromosome spread through said focussed microscope optics in a manner to generate successive picture elements, and digitizing each picture element generated in photographing a chromosome spread.

5. A system as recited in claim 1 wherein said step of arranging the chromosomes in the digital picture of an acceptable chromosome spread in a karyotype format includes locating each chromosome in said digital picture of an acceptable chromosome spread, orienting each chromosome in a predetermined direction, measuring each oriented chromosome, classifying the oriented chromosome on the basis of measured length and centromeric index, and composing the karyotype format from the classified and oriented chromosomes.

6. A system as recited in claim 5 wherein after the step of locating each chromosome in said digital picture of an acceptable spread there is included the step of assigning a different number to each chromosome which has been located.

7. A system as recited in claim 8 wherein said step of composing the karyotype format from the classified and oriented chromosomes includes displaying said composed karyotype format on a gray scale display, and correcting any chromosome orientation and classification errors.

8. A system as recited in claim 4 wherein the step of producing a visible image of the karyotype format includes converting the digitized picture elements into analog picture elements, and printing a picture responsive to said picture elements.

9. An operator-assisted system using a programmed computer for producing karyotype images from a slide mounted on the stage of a microscope, said slide having a plurality of dispersed metaphase chromosome spreads, comprising means for moving said stage under instructions of said programmed computer connected to control said microscope to successively present said plurality of dispersed metaphase chromosome spreads to the optics of said microscope, means for storing the location of each spread, thereby automatically prescanning said slide for chromosome spreads, means for moving said stage under instructions of said programmed computer to place the slide motionless on said stage at each successive chromosome spread location, thereby enabling an operator to view each successive chromosome spread to inspect the chromosome spread and determine whether it is acceptable for the purpose of analysis or not, means for determining under operator control the location of each spread determined not to be accpetable thereby establishing which of said chromosome spreads are acceptable, means under instructions of said programmed computer for generating a digital picture of each of said acceptable chromosome spreads, means for arranging the chromosomes in a digital picture of an acceptable chromosome in a karyotype format, and means for producing a visible image of the karyotype format for each acceptable chromosome spread.

10. A system as recited in claim 9 wherein said step of producing a visible image of the karyotype format includes
    means for displaying said karyotype format on a gray scale display,
    means for correcting any errors to provide a corrected karyotype format, and
    means for printing out said corrected karyotype format.

11. A system as recited in claim 9 wherein means for moving said stage under said microscope to successively present said plurality of dispersed metaphase chromosome spreads to the optics of said microscope includes
    means for moving said stage with a scanning motion in successive predetermined motion increments underneath the optics of said microscope,
    means for detecting whether or not a chromosome spread is present within the distance of the predetermined increment of motion, and
    means for storing the location data for each detected chromosome spread.

12. A system as recited in claim 9 wherein means for generating a digital picture of each of said accepted chromosome spreads includes,
    means for successively moving said stage to the undeleted locations of accepted chromosome spreads to position each such accepted chromosome spread under the microscope optics,
    means for automatically focusing the optics of said microscope on an accepted chromosome spread positioned thereunder,
    means for photographing each said accepted chromosome spread through said focussed microscope optics in a manner to generate successive picture elements, and
    means for digitizing each picture element generated in photographing a chromosome spread.

13. A system as recited in claim 9 wherein the means for locating each chromosome in said digital picture of an acceptable spread includes
    means for assigning a different number to each chromosome which has been located.

14. A system as recited in claim 9 wherein means for producing a visible image of the karyotype format includes
    means for converting the digitized picture elements into analog picture elements, and
    means for printing a picture responsive to said picture elements.

15. A system as recited in claim 9 wherein said means for arranging the chromosomes in a digital picture of an acceptable chromosome spread in a karyotype format comprises
    computer means programmed for locating each chromosome image in an acceptable digital spread, for orienting each chromosome image in a predetermined direction, for measuring each oriented chromosome image for classifying the oriented chromosome images, and for composing the karyotype format from the classified and oriented chromosome images.

* * * * *